(12) United States Patent
Truskolaski et al.

(10) Patent No.: US 12,504,070 B2
(45) Date of Patent: Dec. 23, 2025

(54) ELECTRONICALLY-CONTROLLED CONTINUOUSLY VARIABLE TRANSMISSION FOR A UTILITY VEHICLE

(71) Applicant: Polaris Industries Inc., Medina, MN (US)

(72) Inventors: Dylan T. Truskolaski, Stacy, MN (US); Zacharey J. Hussong, Roseville, MN (US); Gary A. Pinkley, Lino Lakes, MN (US); Adrien O. Lechat, Hinckley (GB); Andrew C. Schleif, Stacy, MN (US); Ryan A. Tholen, St. Paul, MN (US); Anthony J. Ripley, Ham Lake, MN (US); Jeffrey I. Peterman, Stacy, MN (US); Samuel C. Willenbring, Chisago City, MN (US)

(73) Assignee: Polaris Industries Inc., Medina, MN (US)

( * ) Notice: Subject to any disclaimer, the term of this patent is extended or adjusted under 35 U.S.C. 154(b) by 348 days.

(21) Appl. No.: 17/587,486

(22) Filed: Jan. 28, 2022

(65) Prior Publication Data
US 2022/0243810 A1 Aug. 4, 2022

Related U.S. Application Data

(60) Provisional application No. 63/143,644, filed on Jan. 29, 2021.

(51) Int. Cl.
*F16H 63/06* (2006.01)
*F16H 61/00* (2006.01)
(Continued)

(52) U.S. Cl.
CPC ........... *F16H 63/062* (2013.01); *F16H 61/12* (2013.01); *F16H 61/662* (2013.01);
(Continued)

(58) Field of Classification Search
CPC ...... F16H 63/062; F16H 61/12; F16H 61/662; F16H 63/3043; F16H 2061/005; F16H 2061/1272; F16H 2063/3063
(Continued)

(56) References Cited

U.S. PATENT DOCUMENTS

| 62,016 A | 2/1867 | Custer |
|---|---|---|
| 2,145,545 A | 1/1939 | Johnson et al. |

(Continued)

FOREIGN PATENT DOCUMENTS

| AU | 2012323853 A1 | 5/2014 |
|---|---|---|
| CA | 2851626 A1 | 4/2013 |

(Continued)

OTHER PUBLICATIONS

International Search Report and Written Opinion received for PCT Patent Application No. PCT/US2022/014291, mailed on Jun. 21, 2022, 15 pages.

(Continued)

*Primary Examiner* — Henry Y Liu
(74) *Attorney, Agent, or Firm* — Merchant & Gould P.C.

(57) ABSTRACT

A utility vehicle includes a frame assembly, a plurality of ground-engaging members supporting the frame assembly, and a powertrain assembly operably coupled to the ground-engaging members and including a prime mover and a continuously variable transmission. Additionally, the utility vehicle includes an operator defined by a portion of the frame assembly and including seating for at least an operator. The utility vehicle also includes an electrical assembly comprising an electric motor operably coupled to the continuously variable transmission. The electric motor is positioned rearward of the operator area.

18 Claims, 87 Drawing Sheets

(51) Int. Cl.
*F16H 61/12* (2010.01)
*F16H 61/662* (2006.01)
*F16H 63/30* (2006.01)

(52) U.S. Cl.
CPC ... *F16H 63/3043* (2013.01); *F16H 2061/005* (2013.01); *F16H 2061/1272* (2013.01); *F16H 2063/3063* (2013.01)

(58) Field of Classification Search
USPC .......................................................... 474/8
See application file for complete search history.

(56) References Cited

U.S. PATENT DOCUMENTS

| | | | |
|---|---|---|---|
| 2,953,032 A | 9/1960 | Ruess | |
| 3,465,827 A | 9/1969 | Levy | |
| 3,467,177 A | 9/1969 | Hoddinott | |
| 3,623,565 A | 11/1971 | Ward et al. | |
| 3,651,506 A | 3/1972 | Olaf et al. | |
| 3,750,129 A | 7/1973 | Takeno et al. | |
| 3,789,684 A | 2/1974 | Freier | |
| 3,861,229 A | 1/1975 | Domaas | |
| 3,943,785 A | 3/1976 | Percifield | |
| 4,319,298 A | 3/1982 | Davis | |
| 4,340,126 A | 7/1982 | Larson | |
| 4,395,249 A | 7/1983 | Prasad et al. | |
| 4,422,498 A | 12/1983 | Chen | |
| 4,493,677 A | 1/1985 | Ikenoya | |
| 4,531,928 A | 7/1985 | Ikenoya | |
| 4,560,369 A | 12/1985 | Hattori | |
| 4,594,537 A | 6/1986 | Arifian et al. | |
| 4,596,537 A | 6/1986 | Te-Long | |
| 4,621,727 A | 11/1986 | Strader | |
| 4,622,865 A | 11/1986 | Itoh et al. | |
| 4,631,977 A | 12/1986 | Kawashima | |
| 4,632,070 A | 12/1986 | Onda et al. | |
| 4,645,028 A | 2/1987 | Kawashima | |
| 4,671,781 A | 6/1987 | Tanaka et al. | |
| 4,671,782 A | 6/1987 | Ochiai et al. | |
| 4,682,511 A | 7/1987 | Wittke | |
| 4,697,665 A | 10/1987 | Eastman et al. | |
| 4,708,699 A | 11/1987 | Takano et al. | |
| 4,712,629 A | 12/1987 | Takahashi et al. | |
| 4,809,179 A | 2/1989 | Klingler et al. | |
| 4,826,205 A | 5/1989 | Kouda et al. | |
| 4,854,446 A | 8/1989 | Strader | |
| 4,895,555 A | 1/1990 | Watanabe et al. | |
| 4,905,461 A | 3/1990 | Heuer | |
| 4,905,783 A | 3/1990 | Bober | |
| 4,990,126 A | 2/1991 | Ideta et al. | |
| 5,025,686 A | 6/1991 | Sato et al. | |
| 5,052,990 A * | 10/1991 | Sakakibara | F16H 61/66272 475/210 |
| 5,057,061 A * | 10/1991 | Sakakibara | F16H 61/66272 475/210 |
| 5,080,639 A * | 1/1992 | Sakakibara | F16H 37/0813 475/211 |
| 5,086,858 A | 2/1992 | Mizuta et al. | |
| 5,094,652 A * | 3/1992 | Sakakibara | F16H 63/067 474/46 |
| 5,152,361 A | 10/1992 | Hasegawa et al. | |
| 5,191,755 A * | 3/1993 | Gryspeerdt | F16H 55/56 56/16.5 |
| 5,233,530 A | 8/1993 | Shimada et al. | |
| 5,282,773 A * | 2/1994 | Gryspeerdt | F16H 55/56 474/37 |
| 5,334,103 A * | 8/1994 | Gryspeerdt | F16H 55/56 474/18 |
| 5,362,094 A | 11/1994 | Jensen | |
| 5,378,198 A * | 1/1995 | Moroto | F16H 63/062 474/30 |
| 5,432,326 A | 7/1995 | Noblett, Jr. | |
| 5,514,046 A | 5/1996 | Petersmann et al. | |
| 5,536,214 A | 7/1996 | Akita et al. | |
| 5,749,596 A | 5/1998 | Jensen et al. | |
| 5,807,194 A | 9/1998 | Knutson et al. | |
| 5,890,870 A | 4/1999 | Berger et al. | |
| 5,897,287 A | 4/1999 | Berger et al. | |
| 5,976,044 A | 11/1999 | Kuyama | |
| 5,976,054 A | 11/1999 | Yasuoka | |
| 6,047,814 A | 4/2000 | Alles et al. | |
| 6,050,911 A * | 4/2000 | Feuchter | F16H 55/56 474/18 |
| 6,120,411 A | 9/2000 | Booth, Jr. | |
| 6,149,540 A | 11/2000 | Johnson et al. | |
| 6,176,796 B1 | 1/2001 | Lislegard | |
| 6,182,784 B1 | 2/2001 | Pestotnik | |
| 6,189,412 B1 | 2/2001 | Tsubata et al. | |
| 6,254,108 B1 | 7/2001 | Germain et al. | |
| 6,257,081 B1 | 7/2001 | Gagnon et al. | |
| 6,264,577 B1 | 7/2001 | Hutchins | |
| 6,267,700 B1 | 7/2001 | Takayama | |
| 6,338,688 B1 | 1/2002 | Minami et al. | |
| 6,379,278 B1 | 4/2002 | Eguchi et al. | |
| 6,383,102 B1 * | 5/2002 | Onogi | F16H 61/66272 474/18 |
| 6,398,680 B1 * | 6/2002 | Onogi | F16H 61/66272 474/30 |
| 6,445,038 B1 | 9/2002 | Tihanyi | |
| 6,468,170 B1 * | 10/2002 | Ito | F16H 63/067 474/18 |
| 6,494,798 B1 * | 12/2002 | Onogi | F16H 61/66272 474/18 |
| 6,657,539 B2 | 12/2003 | Yamamoto et al. | |
| 6,669,589 B2 * | 12/2003 | Onogi | F16H 63/062 474/30 |
| 6,715,602 B1 | 4/2004 | Gartland | |
| 6,764,421 B2 * | 7/2004 | Onogi | F16H 63/062 474/46 |
| 6,820,708 B2 | 11/2004 | Nakamura | |
| 6,848,348 B2 | 2/2005 | Liao | |
| 6,902,502 B2 | 6/2005 | Murakami et al. | |
| 6,908,405 B2 * | 6/2005 | Otaki | F16H 55/56 74/89.34 |
| 6,938,508 B1 | 9/2005 | Saagge | |
| 6,938,676 B2 | 9/2005 | Lan et al. | |
| 6,962,543 B2 * | 11/2005 | Roby | F16H 63/067 474/37 |
| 6,997,832 B2 * | 2/2006 | Onogi | F16H 63/062 474/46 |
| 7,002,454 B1 | 2/2006 | Gustafson | |
| 7,058,490 B2 | 6/2006 | Kim | |
| 7,062,987 B2 * | 6/2006 | Yoshida | F16H 63/067 474/39 |
| 7,070,527 B1 | 7/2006 | Saagge | |
| 7,086,837 B2 | 8/2006 | Kamoshita et al. | |
| 7,237,638 B2 * | 7/2007 | Ishikawa | F16H 9/18 74/606 R |
| 7,282,010 B2 | 10/2007 | Iriyama et al. | |
| 7,363,999 B2 | 4/2008 | Hastings | |
| 7,367,420 B1 | 5/2008 | Sherrod et al. | |
| 7,392,893 B2 | 7/2008 | Inomoto et al. | |
| 7,407,462 B2 | 8/2008 | Tsukada et al. | |
| 7,427,248 B2 | 9/2008 | Chonan | |
| 7,438,147 B2 | 10/2008 | Kato et al. | |
| 7,454,282 B2 | 11/2008 | Mizuguchi | |
| 7,505,842 B2 | 3/2009 | Luh | |
| 7,556,576 B2 * | 7/2009 | Mochizuki | F16H 63/067 474/18 |
| 7,641,588 B2 | 1/2010 | Thomson et al. | |
| 7,686,123 B2 | 3/2010 | Ishida | |
| 7,688,557 B2 | 3/2010 | Ishioka | |
| 7,731,613 B2 | 6/2010 | Ishida et al. | |
| 7,744,505 B2 | 6/2010 | Tanaka et al. | |
| 7,771,299 B2 | 8/2010 | Mochizuki et al. | |
| 7,823,891 B2 | 11/2010 | Bushko et al. | |
| 7,901,319 B2 | 3/2011 | Tabata et al. | |
| 7,905,803 B2 | 3/2011 | Mochizuki et al. | |
| 7,980,972 B1 * | 7/2011 | Starkey | F16H 63/062 474/8 |
| 8,002,061 B2 | 8/2011 | Yamamura et al. | |
| 8,029,395 B2 | 10/2011 | Hokari et al. | |

(56) References Cited

U.S. PATENT DOCUMENTS

| | | | |
|---|---|---|---|
| 8,052,572 B2 | 11/2011 | Unno | |
| 8,069,975 B2 | 12/2011 | Wallace | |
| 8,104,524 B2 | 1/2012 | Manesh et al. | |
| 8,109,308 B2 | 2/2012 | Manesh et al. | |
| 8,157,039 B2 | 4/2012 | Melvin et al. | |
| 8,176,957 B2 | 5/2012 | Manesh et al. | |
| 8,256,563 B2 | 9/2012 | Suzuki et al. | |
| 8,381,855 B2 | 2/2013 | Suzuki et al. | |
| 8,382,620 B2 | 2/2013 | Morita | |
| 8,439,141 B2 | 5/2013 | Bessho et al. | |
| 8,442,731 B2 | 5/2013 | Unno | |
| 8,459,397 B2 | 6/2013 | Bessho et al. | |
| 8,460,138 B2* | 6/2013 | Unno | F16H 9/18 474/29 |
| 8,517,136 B2* | 8/2013 | Hurd | B60K 5/1241 180/233 |
| 8,534,397 B2 | 9/2013 | Grajkowski et al. | |
| 8,534,413 B2 | 9/2013 | Nelson et al. | |
| 8,556,015 B2 | 10/2013 | Itoo et al. | |
| 8,596,406 B2 | 12/2013 | Itoo et al. | |
| 8,613,335 B2 | 12/2013 | Deckard et al. | |
| 8,662,290 B2 | 3/2014 | Twigger et al. | |
| 8,682,550 B2 | 3/2014 | Nelson et al. | |
| 8,684,887 B2 | 4/2014 | Krosschell | |
| 8,746,719 B2* | 6/2014 | Safranski | B60G 7/008 280/124.152 |
| 8,834,307 B2 | 9/2014 | Itoo et al. | |
| 8,840,496 B2 | 9/2014 | Yamanishi et al. | |
| 8,910,777 B2 | 12/2014 | Minkin | |
| 8,911,312 B2 | 12/2014 | Itoo et al. | |
| 8,950,290 B2 | 2/2015 | Dieter et al. | |
| 8,991,594 B2 | 3/2015 | Nakamura et al. | |
| 8,997,908 B2 | 4/2015 | Kinsman et al. | |
| 8,997,952 B2 | 4/2015 | Getz et al. | |
| 9,027,937 B2 | 5/2015 | Ryan et al. | |
| 9,108,470 B2 | 8/2015 | Tercha et al. | |
| 9,151,384 B2 | 10/2015 | Kohler et al. | |
| 9,162,573 B2 | 10/2015 | Grajkowski et al. | |
| 9,205,717 B2 | 12/2015 | Brady et al. | |
| 9,211,924 B2* | 12/2015 | Safranski | B62D 63/04 |
| 9,341,255 B2 | 5/2016 | Itoo et al. | |
| 9,365,251 B2* | 6/2016 | Safranski | B60G 7/008 |
| 9,366,331 B2 | 6/2016 | Eberhardt | |
| 9,429,235 B2 | 8/2016 | Krosschell et al. | |
| 9,453,573 B2 | 9/2016 | Renner et al. | |
| 9,566,858 B2 | 2/2017 | Hicke et al. | |
| 9,665,418 B2 | 5/2017 | Arnott et al. | |
| 9,695,899 B2 | 7/2017 | Smith et al. | |
| 9,718,351 B2 | 8/2017 | Ripley et al. | |
| 9,771,084 B2 | 9/2017 | Norstad | |
| 9,797,485 B2* | 10/2017 | Ebihara | F16H 63/062 |
| 9,802,621 B2 | 10/2017 | Gillingham et al. | |
| 9,863,523 B2 | 1/2018 | Stocks et al. | |
| 9,909,659 B2 | 3/2018 | Bessho et al. | |
| 9,920,810 B2 | 3/2018 | Smeljanskij et al. | |
| 9,969,259 B2* | 5/2018 | Safranski | B60K 17/354 |
| 10,086,698 B2 | 10/2018 | Grajkowski et al. | |
| 10,183,605 B2 | 1/2019 | Weber et al. | |
| 10,246,153 B2 | 4/2019 | Deckard et al. | |
| 10,363,941 B2 | 7/2019 | Norstad | |
| 10,369,861 B2 | 8/2019 | Deckard et al. | |
| 10,369,886 B2* | 8/2019 | Safranski | B60G 3/202 |
| 10,406,884 B2 | 9/2019 | Oakden-Graus et al. | |
| 10,578,184 B2 | 3/2020 | Gilbert et al. | |
| 10,697,532 B2 | 6/2020 | Schleif et al. | |
| 10,704,640 B2 | 7/2020 | Galasso et al. | |
| 10,723,408 B2 | 7/2020 | Pelot | |
| 10,731,724 B2 | 8/2020 | Laird et al. | |
| 10,774,896 B2 | 9/2020 | Hamers et al. | |
| 10,780,770 B2* | 9/2020 | Kohler | B60K 6/543 |
| 10,933,710 B2 | 3/2021 | Tong | |
| 10,981,429 B2 | 4/2021 | Tsiaras et al. | |
| 10,981,448 B2* | 4/2021 | Safranski | B60K 17/348 |
| 11,001,120 B2 | 5/2021 | Cox | |
| 11,148,748 B2 | 10/2021 | Galasso | |
| 11,162,555 B2 | 11/2021 | Haugen | |
| 11,192,424 B2 | 12/2021 | Tabata et al. | |
| 11,279,198 B2 | 3/2022 | Marking | |
| 11,306,798 B2 | 4/2022 | Cox et al. | |
| 11,351,834 B2 | 6/2022 | Cox | |
| 11,413,924 B2 | 8/2022 | Cox et al. | |
| 11,448,283 B2 | 9/2022 | Strickland | |
| 11,472,252 B2 | 10/2022 | Tong | |
| 11,543,005 B2 | 1/2023 | Zurbruegg et al. | |
| 11,578,793 B2* | 2/2023 | Nelson | F16H 57/027 |
| 11,649,889 B2* | 5/2023 | Nelson | F16H 57/0489 474/93 |
| 11,840,142 B2* | 12/2023 | Safranski | B60G 7/006 |
| 12,007,014 B2* | 6/2024 | Nelson | F16H 41/30 |
| 12,092,198 B2* | 9/2024 | Nelson | F16H 57/0489 |
| 2002/0028727 A1 | 3/2002 | Ida et al. | |
| 2002/0125675 A1 | 9/2002 | Clements et al. | |
| 2003/0096668 A1* | 5/2003 | Yoshida | F16H 63/067 474/42 |
| 2004/0024515 A1 | 2/2004 | Troupe et al. | |
| 2004/0026881 A1 | 2/2004 | Bundy | |
| 2004/0094343 A1 | 5/2004 | Fukuda | |
| 2004/0097328 A1 | 5/2004 | Makiyama et al. | |
| 2004/0116245 A1 | 6/2004 | Yamamoto et al. | |
| 2004/0149049 A1 | 8/2004 | Kuzik et al. | |
| 2004/0171457 A1 | 9/2004 | Fuller | |
| 2004/0195019 A1 | 10/2004 | Kato et al. | |
| 2004/0195034 A1 | 10/2004 | Kato et al. | |
| 2004/0224806 A1 | 11/2004 | Chonan | |
| 2004/0262132 A1 | 12/2004 | Pauley et al. | |
| 2005/0049772 A1 | 3/2005 | Liu | |
| 2005/0077696 A1 | 4/2005 | Ogawa | |
| 2005/0096822 A1 | 5/2005 | Aoki | |
| 2005/0205313 A1 | 9/2005 | Gilmore et al. | |
| 2005/0217953 A1 | 10/2005 | Bossard | |
| 2005/0272540 A1* | 12/2005 | Starkey | F16H 63/062 474/39 |
| 2006/0032690 A1 | 2/2006 | Inomoto et al. | |
| 2006/0055531 A1 | 3/2006 | Cook et al. | |
| 2006/0090942 A1 | 5/2006 | Hastings | |
| 2006/0114452 A1 | 6/2006 | Schnell | |
| 2006/0137920 A1 | 6/2006 | Aoki et al. | |
| 2006/0213703 A1 | 9/2006 | Long | |
| 2006/0229811 A1 | 10/2006 | Herman et al. | |
| 2006/0270503 A1 | 11/2006 | Suzuki et al. | |
| 2007/0004552 A1 | 1/2007 | Matsudaira et al. | |
| 2007/0007742 A1 | 1/2007 | Allen et al. | |
| 2007/0026982 A1 | 2/2007 | Aoyama | |
| 2007/0054763 A1* | 3/2007 | Mochizuki | F16H 9/18 474/18 |
| 2007/0111854 A1 | 5/2007 | Tabata et al. | |
| 2007/0207884 A1 | 9/2007 | Unno | |
| 2007/0219030 A1 | 9/2007 | Ho | |
| 2007/0244619 A1 | 10/2007 | Peterson | |
| 2007/0260372 A1 | 11/2007 | Langer | |
| 2008/0035428 A1 | 2/2008 | Omoto et al. | |
| 2008/0103019 A1 | 5/2008 | Cronin et al. | |
| 2008/0108463 A1 | 5/2008 | Unno | |
| 2008/0178838 A1 | 7/2008 | Ota | |
| 2008/0182713 A1 | 7/2008 | Asaoka | |
| 2008/0183350 A1 | 7/2008 | Noguchi | |
| 2008/0183357 A1 | 7/2008 | Asaoka | |
| 2008/0183359 A1 | 7/2008 | Sawada | |
| 2008/0194380 A1 | 8/2008 | Unno | |
| 2008/0215217 A1 | 9/2008 | Unno | |
| 2008/0257692 A1 | 10/2008 | Wallace | |
| 2008/0283326 A1 | 11/2008 | Bennett et al. | |
| 2008/0284124 A1 | 11/2008 | Brady et al. | |
| 2008/0287256 A1 | 11/2008 | Unno | |
| 2008/0314676 A1 | 12/2008 | Ishida | |
| 2008/0319596 A1 | 12/2008 | Yamada | |
| 2009/0020966 A1 | 1/2009 | Germain | |
| 2009/0050386 A1 | 2/2009 | Nobuhira | |
| 2009/0101482 A1 | 4/2009 | Kusel | |
| 2009/0105039 A1 | 4/2009 | Sah et al. | |
| 2009/0175863 A1 | 7/2009 | Kraus et al. | |
| 2009/0239705 A1 | 9/2009 | Tawara et al. | |
| 2009/0254249 A1 | 10/2009 | Ghoneim et al. | |
| 2009/0291788 A1 | 11/2009 | Hokari et al. | |

(56) References Cited

U.S. PATENT DOCUMENTS

| | | |
|---|---|---|
| 2009/0298627 A1 | 12/2009 | Johnson et al. |
| 2009/0308682 A1 | 12/2009 | Ripley et al. |
| 2010/0152982 A1 | 6/2010 | Bowman et al. |
| 2010/0155170 A1 | 6/2010 | Melvin et al. |
| 2010/0174456 A1 | 7/2010 | Beaudoin et al. |
| 2010/0184543 A1 | 7/2010 | Yamashita et al. |
| 2010/0280712 A1 | 11/2010 | Bowman |
| 2011/0029181 A1 | 2/2011 | Hyde et al. |
| 2011/0034279 A1 | 2/2011 | Yamaguchi et al. |
| 2011/0059821 A1 | 3/2011 | Lee et al. |
| 2011/0070991 A1 | 3/2011 | Wu et al. |
| 2011/0071712 A1 | 3/2011 | Mizuno et al. |
| 2011/0094818 A1 | 4/2011 | Suzuki et al. |
| 2011/0152020 A1 | 6/2011 | Brind et al. |
| 2011/0160696 A1 | 6/2011 | Hoss |
| 2011/0160969 A1 | 6/2011 | Oguri et al. |
| 2011/0166755 A1 | 7/2011 | Eguchi et al. |
| 2011/0190972 A1 | 8/2011 | Timmons et al. |
| 2011/0240394 A1* | 10/2011 | Hurd .................. B60K 5/1241 180/54.1 |
| 2011/0297462 A1 | 12/2011 | Grajkowski et al. |
| 2011/0297463 A1 | 12/2011 | Grajkowski et al. |
| 2011/0301824 A1 | 12/2011 | Nelson et al. |
| 2011/0301825 A1 | 12/2011 | Grajkowski et al. |
| 2011/0306457 A1 | 12/2011 | Lee et al. |
| 2012/0031693 A1 | 2/2012 | Deckard et al. |
| 2012/0031694 A1 | 2/2012 | Deckard et al. |
| 2012/0035019 A1 | 2/2012 | Martini et al. |
| 2012/0055728 A1 | 3/2012 | Bessho et al. |
| 2012/0055729 A1 | 3/2012 | Bessho et al. |
| 2012/0137828 A1 | 6/2012 | Dieter et al. |
| 2012/0178561 A1 | 7/2012 | Lafreniere et al. |
| 2012/0238384 A1 | 9/2012 | Lee et al. |
| 2012/0289370 A1 | 11/2012 | Yamanishi et al. |
| 2012/0309573 A1 | 12/2012 | Well et al. |
| 2012/0316933 A1 | 12/2012 | Pentland et al. |
| 2012/0323371 A1 | 12/2012 | Ballhausen |
| 2013/0001840 A1 | 1/2013 | Reck |
| 2013/0033070 A1 | 2/2013 | Kinsman et al. |
| 2013/0040771 A1 | 2/2013 | Well et al. |
| 2013/0087403 A1 | 4/2013 | Itoo et al. |
| 2013/0090198 A1 | 4/2013 | Itoo et al. |
| 2013/0090199 A1 | 4/2013 | Itoo et al. |
| 2013/0092468 A1 | 4/2013 | Nelson et al. |
| 2013/0096785 A1 | 4/2013 | Kohler et al. |
| 2013/0096793 A1 | 4/2013 | Krosschell |
| 2013/0158823 A1 | 6/2013 | Dec |
| 2013/0220766 A1 | 8/2013 | Tadych et al. |
| 2013/0240272 A1 | 9/2013 | Gass et al. |
| 2013/0244819 A1* | 9/2013 | Eo .................. F16H 37/021 474/8 |
| 2014/0038755 A1 | 2/2014 | Ijichi et al. |
| 2014/0131176 A1 | 5/2014 | Minkin |
| 2014/0232082 A1 | 8/2014 | Oshita et al. |
| 2014/0239602 A1 | 8/2014 | Blankenship et al. |
| 2014/0243125 A1 | 8/2014 | Koga et al. |
| 2014/0243134 A1 | 8/2014 | Kucharczyk et al. |
| 2014/0262584 A1 | 9/2014 | Lovold et al. |
| 2014/0342110 A1 | 11/2014 | Zhu et al. |
| 2014/0348671 A1 | 11/2014 | Pagliarin |
| 2015/0011344 A1 | 1/2015 | Ebihara et al. |
| 2015/0024890 A1 | 1/2015 | Eberhardt |
| 2015/0046034 A1 | 2/2015 | Kikuchi |
| 2015/0061275 A1 | 3/2015 | Deckard et al. |
| 2015/0081171 A1 | 3/2015 | Ericksen et al. |
| 2015/0308560 A1 | 10/2015 | Itoo et al. |
| 2015/0308561 A1 | 10/2015 | Itoo et al. |
| 2015/0329141 A1 | 11/2015 | Preijert |
| 2015/0377341 A1 | 12/2015 | Renner et al. |
| 2016/0061088 A1 | 3/2016 | Minnichsoffer et al. |
| 2016/0061314 A1 | 3/2016 | Kuhl et al. |
| 2016/0121905 A1 | 5/2016 | Gillingham et al. |
| 2016/0121924 A1 | 5/2016 | Norstad |
| 2016/0176283 A1 | 6/2016 | Hicke et al. |
| 2016/0176284 A1 | 6/2016 | Nugteren et al. |
| 2016/0176287 A1 | 6/2016 | Ripley et al. |
| 2016/0186841 A1* | 6/2016 | Ebihara .................. F16H 9/18 474/8 |
| 2016/0200164 A1 | 7/2016 | Tabata et al. |
| 2016/0214455 A1 | 7/2016 | Reul et al. |
| 2016/0215878 A1 | 7/2016 | Hatajima |
| 2017/0002920 A1 | 1/2017 | Bessho et al. |
| 2017/0045131 A1 | 2/2017 | Yolitz |
| 2017/0087950 A1 | 3/2017 | Brady et al. |
| 2017/0106747 A1* | 4/2017 | Safranski .............. B60G 7/008 |
| 2017/0129298 A1 | 5/2017 | Lu et al. |
| 2017/0211467 A1 | 7/2017 | Hall et al. |
| 2017/0254405 A1 | 9/2017 | Ballhausen |
| 2017/0268655 A1 | 9/2017 | Stocks et al. |
| 2017/0343101 A1 | 11/2017 | Yamamoto et al. |
| 2018/0009443 A1 | 1/2018 | Norstad |
| 2018/0037212 A1 | 2/2018 | Beyer |
| 2018/0045301 A1 | 2/2018 | Kato et al. |
| 2018/0126817 A1 | 5/2018 | Russell et al. |
| 2018/0178677 A1 | 6/2018 | Swain et al. |
| 2018/0180163 A1 | 6/2018 | Schleif et al. |
| 2018/0245682 A1 | 8/2018 | Davis |
| 2018/0264902 A1 | 9/2018 | Schroeder et al. |
| 2018/0312025 A1* | 11/2018 | Danielson .............. B60K 11/04 |
| 2018/0320777 A1 | 11/2018 | Becka et al. |
| 2018/0354336 A1 | 12/2018 | Oakden-Graus et al. |
| 2018/0361853 A1 | 12/2018 | Grajkowski et al. |
| 2019/0093745 A1 | 3/2019 | Younggren |
| 2019/0193501 A1 | 6/2019 | Brady et al. |
| 2019/0210457 A1 | 7/2019 | Galsworthy et al. |
| 2019/0285150 A1 | 9/2019 | Zurbruegg et al. |
| 2019/0285159 A1 | 9/2019 | Nelson et al. |
| 2019/0285160 A1* | 9/2019 | Nelson .................. F28F 9/22 |
| 2019/0389478 A1 | 12/2019 | Norstad |
| 2020/0016953 A1 | 1/2020 | Dakden-Graus et al. |
| 2020/0096075 A1 | 3/2020 | Lindblad |
| 2020/0108709 A1* | 4/2020 | Kohler .................. B60K 6/36 |
| 2020/0164742 A1* | 5/2020 | Safranski .............. B60G 3/14 |
| 2020/0223279 A1 | 7/2020 | Mckeefery |
| 2020/0248793 A1 | 8/2020 | Kuhl et al. |
| 2020/0269648 A1 | 8/2020 | Halper |
| 2020/0282786 A1 | 9/2020 | Lorenz et al. |
| 2021/0031579 A1 | 2/2021 | Booth et al. |
| 2021/0088100 A1 | 3/2021 | Woelfel |
| 2021/0102596 A1 | 4/2021 | Malmborg et al. |
| 2021/0108696 A1 | 4/2021 | Connor |
| 2021/0206263 A1 | 7/2021 | Grajkowski et al. |
| 2021/0300140 A1 | 9/2021 | Ericksen et al. |
| 2021/0379957 A1 | 12/2021 | Tabata et al. |
| 2022/0032708 A1 | 2/2022 | Tabata et al. |
| 2022/0041029 A1 | 2/2022 | Randall et al. |
| 2022/0056976 A1 | 2/2022 | Anderson |
| 2022/0082167 A1 | 3/2022 | Kuhl et al. |
| 2022/0088988 A1 | 3/2022 | Menden et al. |
| 2022/0397194 A1 | 12/2022 | Kohler et al. |
| 2023/0019039 A1 | 1/2023 | Kuhl et al. |
| 2023/0083658 A1 | 3/2023 | Nelson et al. |
| 2023/0184318 A1 | 6/2023 | Nelson et al. |

FOREIGN PATENT DOCUMENTS

| | | |
|---|---|---|
| CA | 2807101 A1 | 8/2013 |
| CA | 2965309 A1 | 5/2016 |
| CN | 101372930 A | 2/2009 |
| CN | 101382193 A | 3/2009 |
| CN | 101960175 A | 1/2011 |
| CN | 103032535 A | 4/2013 |
| CN | 103476621 A | 12/2013 |
| CN | 103486233 A | 1/2014 |
| CN | 103912664 A | 7/2014 |
| CN | 103857576 B | 8/2017 |
| CN | 107002859 A | 8/2017 |
| CN | 107406094 A | 11/2017 |
| CN | 107521449 A | 12/2017 |
| CN | 107521499 A | 12/2017 |
| DE | 4328551 | 3/1994 |
| DE | 10231210 A1 | 1/2004 |
| EP | 0421241 A2 | 4/1991 |
| EP | 0829383 A2 | 3/1998 |

(56) References Cited

FOREIGN PATENT DOCUMENTS

| EP | 1022169 A2 | 7/2000 |
|---|---|---|
| EP | 1238833 A1 | 9/2002 |
| EP | 1865227 A1 | 12/2007 |
| EP | 2131074 A1 | 12/2009 |
| EP | 3150454 A1 | 4/2017 |
| GB | 2377415 A | 1/2003 |
| JP | 59-009365 A | 1/1984 |
| JP | 59-077924 | 5/1984 |
| JP | 2009-228708 A | 10/2009 |
| JP | 2011-069457 A | 4/2011 |
| JP | 5990365 B2 | 9/2016 |
| WO | 98/50248 A1 | 11/1998 |
| WO | 2014/059258 A1 | 4/2014 |
| WO | 2016/069405 A2 | 5/2016 |
| WO | 2017/187411 A1 | 11/2017 |
| WO | 2018/118470 A1 | 6/2018 |
| WO | 2019/126485 A1 | 6/2019 |

OTHER PUBLICATIONS

"2011 Polaris Ranger RZR XP 900 First Look-Motorcycle USA", www.motorcycle-usa.com/2011/01/article/2011-polaris-ranger-rzr-xp-900-first-look/, Jan. 3, 2011; 10 pages.
"Alba Racing Belt Gauge", www.Maverickforums.net; 8 pages.
"The Avid Off Racing BITD/SCORE factory Can Am Maverick race build", www.Maverickforums.net; 31 pages.
"UTVOutpost.com-UTV Side by Side Parts, Accessories & Videos", http://www.utvoutpost.com/new-can-am-maverick-belt-cover-back-plate-transmission-clutch-cover-420612313; Jun. 29, 2015; 13 pages.
Decision Institution of Inter Partes Review 37 CFR .sctn. 42.108 issued by the U.S. Patent and Trademark Office Trial and Appeal Board, *Arctic Cat, Inc.* v. *Polaris Industries Inc.*, Feb. 3, 2016; 34 pages.
International Preliminary Report on Patentability received for PCT Patent Application No. PCT/US19/22912, mailed on Apr. 2, 2020, 24 pages.
International Preliminary Report on Patentability received for PCT Patent Application No. PCT/US2017/065520, mailed on Jul. 4, 2019, 9 pages.
International Preliminary Report on Patentability received for PCT Patent Application No. PCT/US2019/022706, mailed on Mar. 31, 2020, 16 pages.
International Preliminary Report on Patentability, issued by the European Patent Office, dated Apr. 14, 2015, for International Patent Application No. PCT/US2013/064516; 18 pages.
International Search Report and Written Opinion of the International Searching Authority, mailed Mar. 25, 2014, for International Patent Application No. PCT/US2013/064516; 23 pages.
International Search Report and Written Opinion received for PCT Patent Application No. PCT/US19/22912, mailed on Jun. 20, 2019, 14 pages.
International Search Report and Written Opinion received for PCT Patent Application No. PCT/US2017/065520, mailed on Mar. 19, 2018, 10 pages.
International Search Report and Written Opinion received for PCT Patent Application No. PCT/US2019/022706, mailed on May 17, 2019, 6 pages.
Office Action issued by the Canadian Intellectual Property Office, dated Jul. 8, 2020, for Canadian Patent Application No. 3,046,825; 5 pages.
Amended claims submitted to the European Patent Office on May 5, 2014, in related European Patent Application No. 12787562.3 (Publication No. EP2766238); 9 pages.
Communication pursuant to Article 94(3) EPC issued by the European Patent Office, dated Mar. 27, 2020, for European Patent Application No. 16198993.4; 5 pages.
European Search Report issued by the European Patent Office, dated Mar. 2, 2017, for related European patent application No. 16198993.4; 11 pages.
Examination Report issued by the Intellectual Property India, dated Jun. 10, 2019, for Indian Patent Application No. 3632/DELNP/2014; 7 pages.
Gangadurai et al.; Development of control strategy for optimal control of a continuously variable transmission operating in combination with a throttle controlled engine; SAE International; Oct. 12, 2005.
http://www.hilliardcorp.com/centrifugal-clutch.html, Motion Control Division, Centrifugal Clutches, accessed Jan. 8, 2013.
International Preliminary Report on Patentability issued by the European Patent Office, dated Feb. 6, 2014, for International Application No. PCT/US2012/060269; 22 pages.
International Preliminary Report on Patentability received for PCT Patent Application No. PCT/US2022/014291, mailed on Aug. 10, 2023, 8 pages.
International Search Report and Written Opinion issued by the European Patent Office, dated Jul. 17, 2013, for International Application No. PCT/US2012/060269; 18 pages.
Non-final Office Action mailed Apr. 9, 2015, in corresponding U.S. Appl. No. 13/652,289; 19 pages.
Office Action issued by the Canadian Intellectual Property Office, dated Jul. 26, 2018, for Canadian Patent Application No. 2,851,626; 4 pages.
U.S. Appl. filed Oct. 15, 2012, Primary Clutch Electronic CVT., U.S. Appl. No. 13/652,304, U.S. Appl. No. 13/652,304.
U.S. Appl. No. 13/399,422, filed Feb. 17, 2012 and issued as U.S. Pat. No. 8,534,413 on Sep. 17, 2013, entitled Primary Clutch Electronic CVT.
U.S. Appl. No. 13/652,253, filed Oct. 15, 2012 and issued as U.S. Pat. No. 8,682,550 on Mar. 25, 2014, entitled Primary Clutch Electronic CVT.
U.S. Appl. No. 13/652,278, filed Oct. 15, 2012 and issued as U.S. Pat. No. 8,684,887 on Apr. 1, 2014, entitled Primary Clutch Electronic CVT.
U.S. Appl. No. 13/652,297, filed Oct. 15, 2012 and issued as U.S. Pat. No. 9,151,384 on Oct. 6, 2015, entitled Primary Clutch Electronic CVT.
U.S. Appl. No. 13/652,289, filed Oct. 15, 2012, entitled Primary Clutch Electronic CVT (related application).
Unno et al.; Development of Electronically Controlled DVT Focusing on Rider's Intention of Acceleration and Deceleration; SAE International; Oct. 30, 2007.

\* cited by examiner

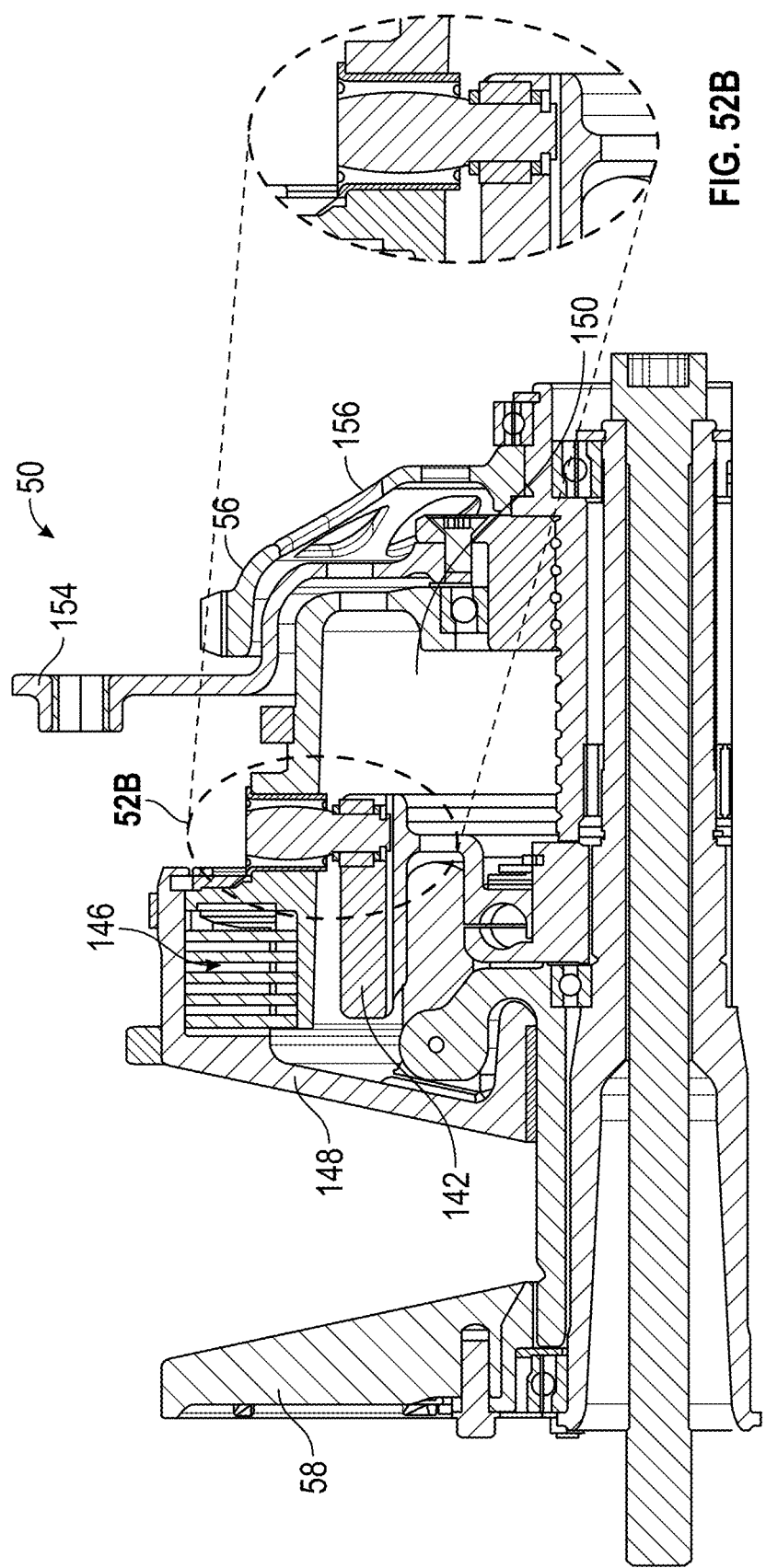

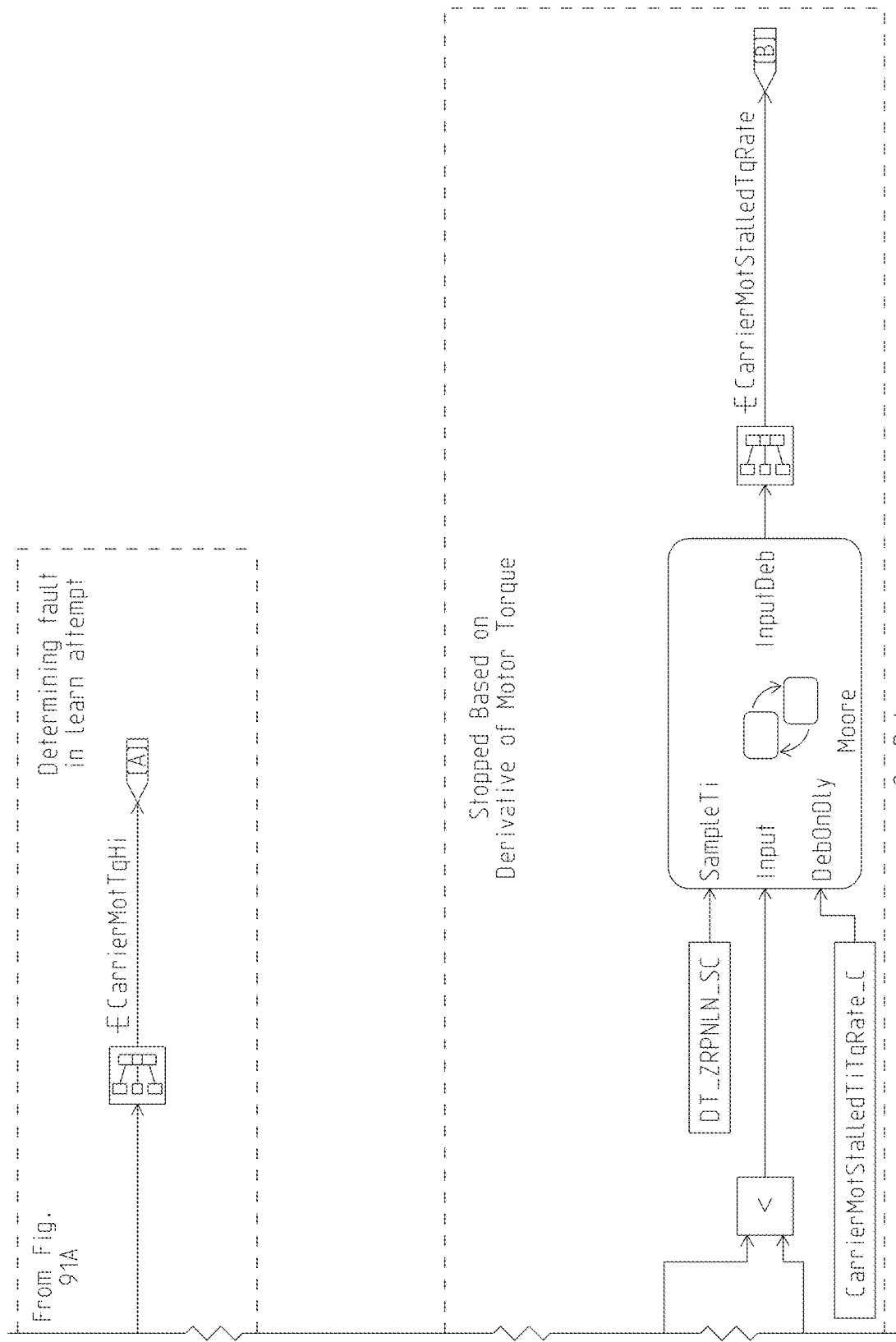

ELECTRONICALLY-CONTROLLED CONTINUOUSLY VARIABLE TRANSMISSION FOR A UTILITY VEHICLE

CROSS-REFERENCE TO RELATED APPLICATION

The present application claims priority to U.S. Provisional Application Ser. No. 63/143,644, filed Jan. 29, 2021, and entitled "ELECTRONICALLY-CONTROLLED CONTINUOUSLY VARIABLE TRANSMISSION FOR A UTILITY VEHICLE," the complete disclosure of which is expressly incorporated by reference herein.

FIELD OF THE DISCLOSURE

The present invention relates generally to a transmission for a vehicle and, in particular, to a continuously variable transmission for a utility or off-road vehicle.

BACKGROUND OF THE DISCLOSURE

Some vehicles such as utility vehicles, all-terrain vehicles, tractors, and others include a continuously variable transmission ("CVT"). The CVT includes a drive clutch, a driven clutch, and a belt configured to rotate between the drive and driven clutches. The position of the drive and driven clutches may be moved between a plurality of positions when the vehicle is operating.

Such transmissions may be electronically controlled, however, positioning all components needed for electronic control on a compact, off-road vehicle may be challenging. For instance, there must be sufficient space available for supporting a motor, various other electrical components, and for accommodating the required cooling of such components. In this way, a need exists for an electronically controlled CVT on an off-road vehicle which improves the life and functionality of the powertrain and does not impact the size of the vehicle.

SUMMARY OF THE DISCLOSURE

In other embodiments of the present disclosure, a utility vehicle comprises a frame assembly, a plurality of ground-engaging members supporting the frame assembly, and a powertrain assembly operably coupled to the ground-engaging members and including a prime mover and a continuously variable transmission. Additionally, the utility vehicle comprises an operator defined by a portion of the frame assembly and including seating for at least an operator. The utility vehicle also comprises an electrical assembly comprising an electric motor operably coupled to the continuously variable transmission. The electric motor is positioned rearward of the operator area.

In one embodiment of the present disclosure, a method of detecting spin burn of a belt of a continuously variable transmission comprises providing a drive clutch of the continuously variable transmission including a moveable sheave configured to engage the belt, providing an electric motor operably coupled to the drive clutch, determining a torque of the electric motor, determining a position of the moveable sheave, determining a force on the belt, determining a temperature of the belt, and identifying conditions indicative of spin burn of the belt.

In another embodiment of the present disclosure, a drive clutch of a continuously variable transmission comprises a stationary sheave and a moveable sheave axially spaced apart from the stationary sheave. The moveable sheave comprises a lead screw and a lead a screw nut configured to move in an generally axial direction relative to the lead screw. The lead screw and the lead screw nut are positioned within a sealed enclosure.

In a further embodiment of the present disclosure, an electronically-controlled continuously variable transmission comprises a belt, a driven clutch, a drive clutch operably coupled to the driven clutch through the belt, a housing surrounding the belt, the driven clutch, and the drive clutch, and a support structure positioned within the housing at a position generally intermediate the drive clutch and the driven clutch. The support structure is configured to increase a strength of the housing and includes a slot configured to receive a portion of the drive clutch.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, where:

FIG. 52A is a cross-sectional view of a portion of the drive clutch of FIG. 48 having at least one bushed drive pin;

FIG. 52B is a detailed view of the at least one bushed drive pin of FIG. 52A;

Corresponding reference characters indicate corresponding parts throughout the several views. Unless stated otherwise the drawings are proportional.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to any vehicle with one or more ground-engaging members and a continuously variable transmission, including, but not limited to, all-terrain vehicles, motorcycles, snowmobiles, scooters, three-wheeled vehicles, and golf carts.

Figure 1:
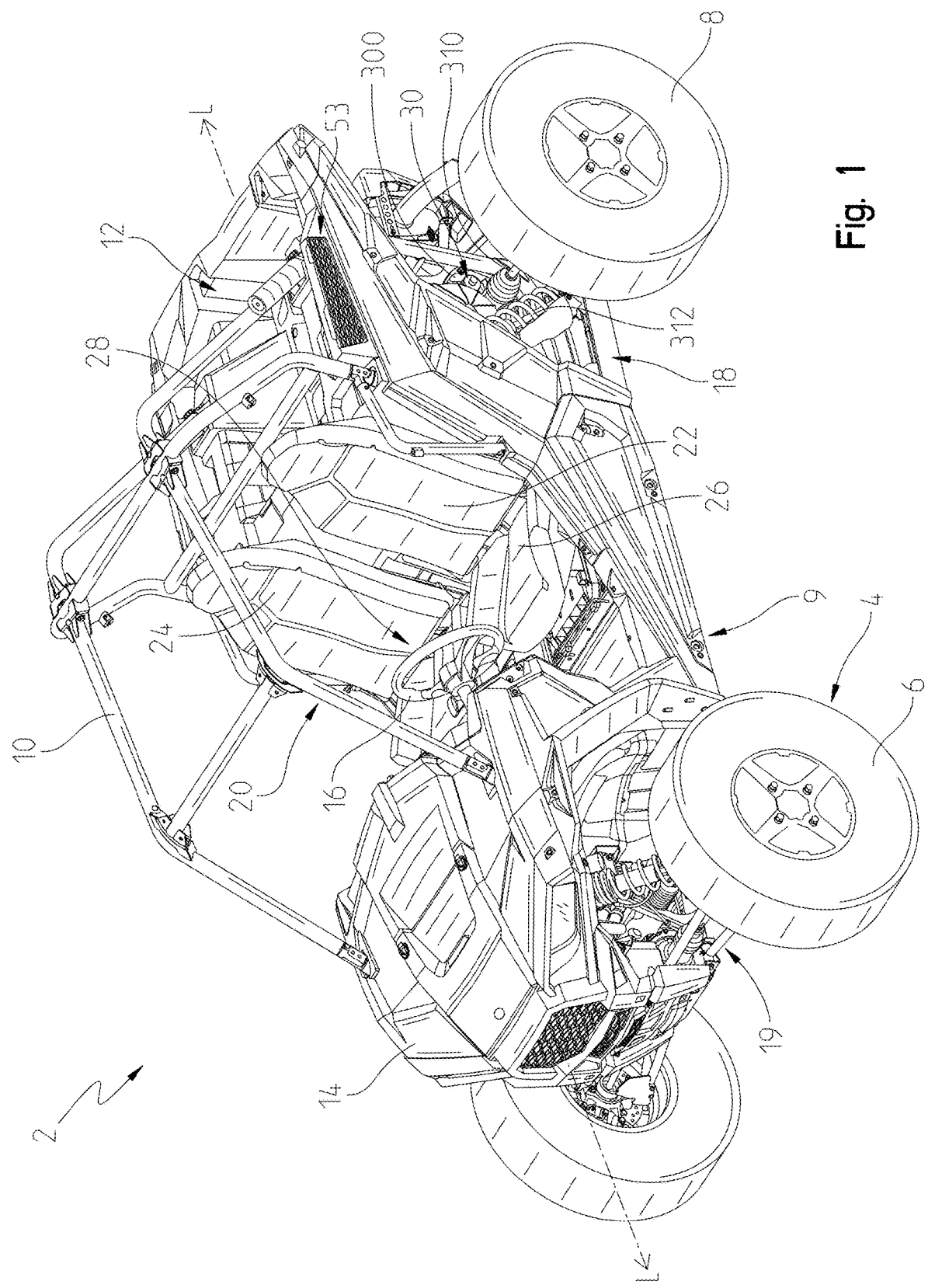
FIG. 1 is a front left perspective view of a utility vehicle of the present disclosure.

Referring to FIG. 1, an illustrative embodiment of a utility vehicle 2 is shown. Vehicle 2 is configured for off-road operation. Vehicle 2 includes a plurality of ground-engaging members 4, illustratively front wheels 6 and rear wheels 8. In one embodiment, one or more of ground-engaging members 4 may be replaced with tracks, such as the Prospector II Tracks available from Polaris Industries, Inc., located at 2100 Highway 55 in Medina, Minn. 55340 or non-pneumatic tires, such as those shown in U.S. Pat. Nos. 8,176,957 and 8,104,524, the complete disclosures of which are expressly incorporated herein by reference.

Vehicle 2 further includes a lower frame assembly supported by ground-engaging members 4, which extends along a longitudinal axis L of vehicle 2. Additionally, in one embodiment, vehicle 2 may include an upper frame assembly 10 extending vertically above the lower frame assembly, however, alternative embodiments of vehicle 2 may not include upper frame assembly 10. The lower frame assembly supports a rear cargo area 12 and a vehicle body 14, which includes a plurality of body panels.

Vehicle 2 also includes an open-air operator area 20 which, illustratively, includes seating 22 for one or more passengers. As such, operator area 20 is exposed to ambient air and is not fully enclosed. Alternatively, vehicle 2 may include a cab assembly (not shown), such as a roof, front windshield, rear windshield, and doors, to enclose operator area 20. Upper frame assembly 10 may be positioned generally around operator area 20 such that seating 22 is at least partially surrounded by upper frame assembly 10. Illustratively, seating 22 includes an operator seat and a passenger seat, however, seating 22 may also include rear seats for additional passengers or may include only a single seat for carrying the operator. Seating 22 may include a seat back 24 and a seat bottom 26.

Operator area 20 further includes a plurality of operator controls 28, such as a steering wheel 16, by which an operator may provide inputs for operating vehicle 2. Various operator controls, including the steering assembly, may be further described in International Patent Application No. PCT/US13/64516, filed on Oct. 11, 2013, the complete disclosure of which is expressly incorporated by reference herein.

Referring still to FIG. 1, vehicle 2 includes a rear suspension assembly 18 and a front suspension assembly 19, both supported by the lower frame assembly. Suspension assemblies 18, 19 include shock absorbers, for example shock absorbers 312 of rear suspension assembly 18. Additional details of rear and front suspension assemblies 18, 19 may be disclosed in U.S. Pat. No. 9,566,858, issued on Feb. 14, 2017 and U.S. patent application Ser. No. 16/226,797, filed Dec. 20, 2018, the complete disclosures of which are expressly incorporated by reference herein.

Figure 2:
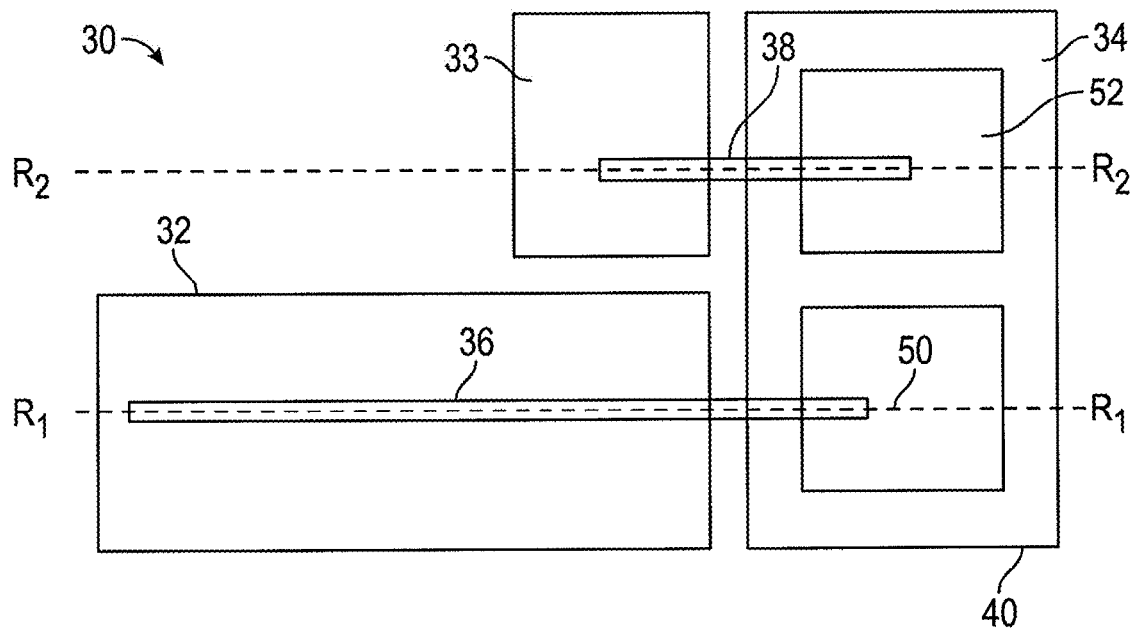
FIG. 2 is a schematic view of a powertrain assembly of the vehicle of FIG. 1.

Referring to FIG. 2, vehicle 2 further includes a powertrain assembly 30 which is supported by the lower frame assembly and includes at least a prime mover, illustratively an engine 32, a geartrain which may be configured as or include a shiftable transmission 33, and a continuously variable transmission ("CVT") 34. Powertrain assembly 30 further includes final drives or differentials, for example a front drive and a rear drive 300. Rear drive 300 is operably coupled to rear ground-engaging members 8 through half shafts 310 and, similarly, the front drive/differential is operably coupled to front ground-engaging members 6 through half shafts (not labeled).

Engine 32 is positioned rearward of operator area 20. While the prime mover is disclosed as engine 32, the prime mover may be any type of device configured to provide power to vehicle 2, such as an electric motor, a fuel-based engine, a hybrid engine, a generator, etc. Engine 32 may be any size and include any number of cylinders, for example one cylinder, two cylinders, three cylinders, four cylinders, six cylinders, or eight cylinders.

In one embodiment, CVT 34 also is positioned at least partially rearward of operator area 20. As shown in FIG. 2, CVT 34 is positioned laterally outward from or to the side of engine 32 in a direction generally perpendicular to a longitudinal axis L of vehicle 2 (FIG. 1) and extends generally parallel to longitudinal axis L. More particularly, CVT 34 is positioned along the left side of vehicle 2. In alternative embodiments, CVT 34 may extend in a generally perpendicular direction relative to longitudinal axis L or may be configured in any orientation relative to longitudinal axis L, engine 32, and geartrain 33. For example, in one embodiment, CVT 34 may be positioned longitudinally forward of engine 32 and configured to extend laterally in a direction generally perpendicular to longitudinal axis L.

As shown in FIG. 2, CVT 34 is operably coupled to both engine 32 and geartrain 33. More particularly, CVT 34 is operably coupled to engine 32 through a crankshaft 36 of engine 32 and is operably coupled to geartrain 33 through an input shaft 38 of geartrain 33.

Figure 3:
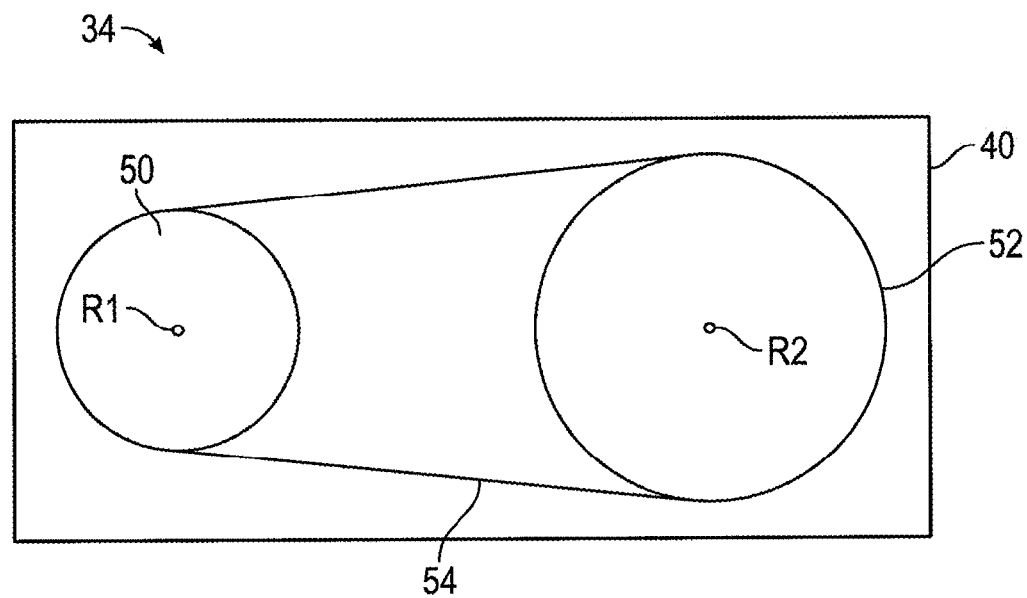
FIG. 3 is a schematic view of a continuously variable transmission ("CVT") of the powertrain assembly of FIG. 2.
Figure 4:
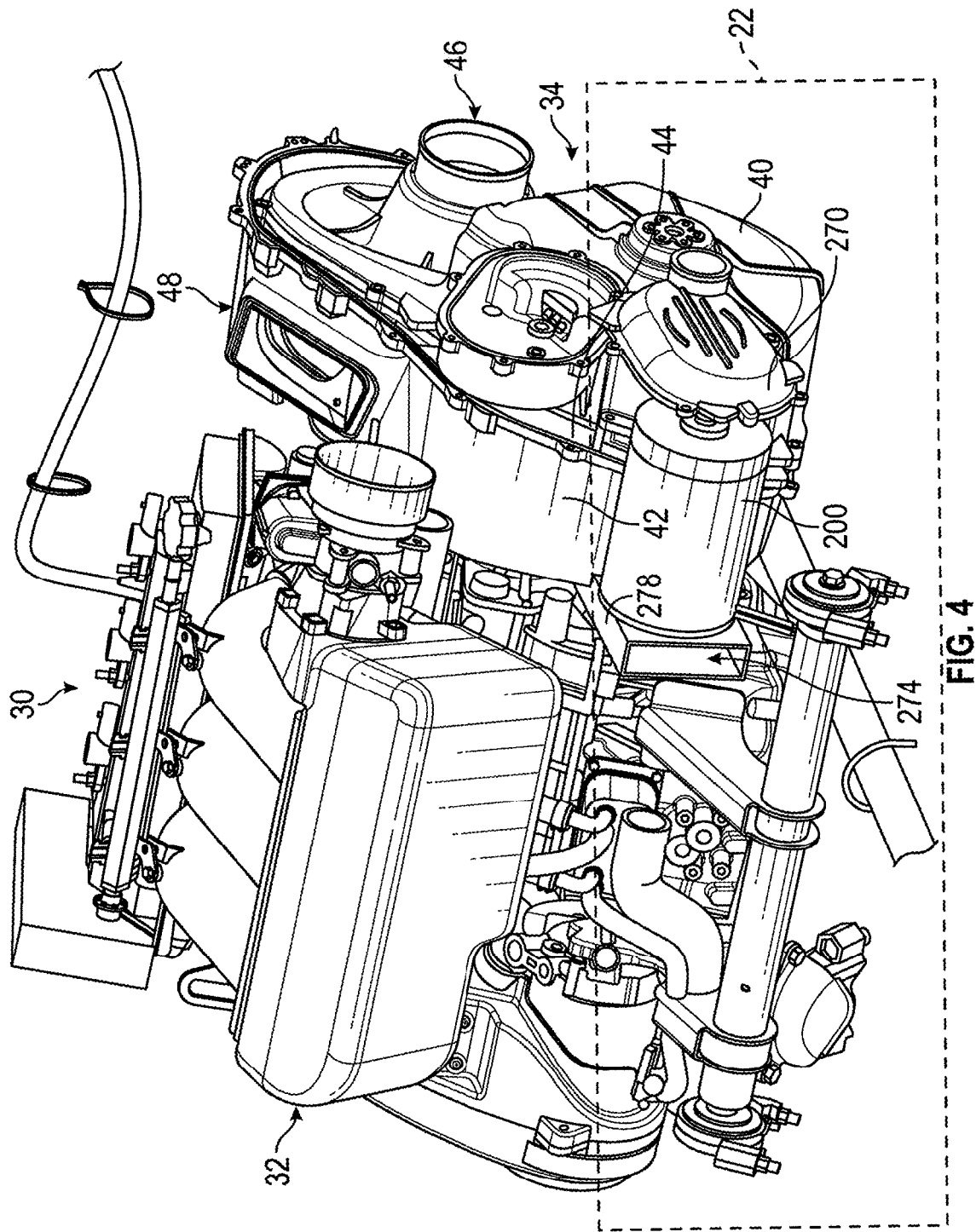
FIG. 4 is a front left perspective view of the powertrain assembly of FIG. 2 which includes the CVT of FIG. 3.

With respect to FIGS. 2-4, CVT 34 includes a housing 40 having an inner portion or cover 42 and an outer portion or cover 44 removably coupled together. In one embodiment, inner cover 42 is comprised of a metallic material, such as aluminum, and/or a polymeric material. Additionally, outer cover 44 may be comprised of a metallic material and/or a polymeric material, such as an injection-moldable plastic. CVT housing 40 includes a single air intake or inlet port 46 for receiving air to cool CVT 34 and a single air outlet port 48 to exhaust warm or hot air from CVT 34. Illustratively, outer cover 44 includes air inlet port 46 and inner cover 42 includes air outlet port 48. Inlet port 46 is sealingly coupled to an intake duct 53 (FIG. 1) to provide cooling, pre-filtered ambient air to CVT 34.

Referring still to FIGS. 2 and 3, CVT 34 includes a primary or drive clutch or pulley 50, a secondary or driven clutch or pulley 52, and a belt 54 extending therebetween. An input shaft 160 of drive clutch 50 is operably coupled to crankshaft 36 such that engine 32 drives rotation of input shaft 160. The rotation of belt 54 caused by drive clutch 50 drives driven clutch 52. Drive clutch 50 is rotatably coupled to crankshaft 36 of engine 32 along a rotational axis $R_1$. Driven clutch 52 is rotatably coupled to an input shaft 38 of geartrain 33 along a rotational axis $R_2$ and is rotatably coupled to drive clutch 50 through belt 54. Belt 54 may be comprised of a polymeric material, for example rubber, and may also include reinforcing members, such as metal cords or other reinforcing material. In one embodiment, belt 54 may be comprised of a metallic material, for example, belt 54 may be a chain. In cross-section, belt 54 may generally define a "V" shape. Belt 54 is configured to contact drive clutch 50 and, in one embodiment, expand in diameter in order to contact driven clutch 52.

Figure 5:
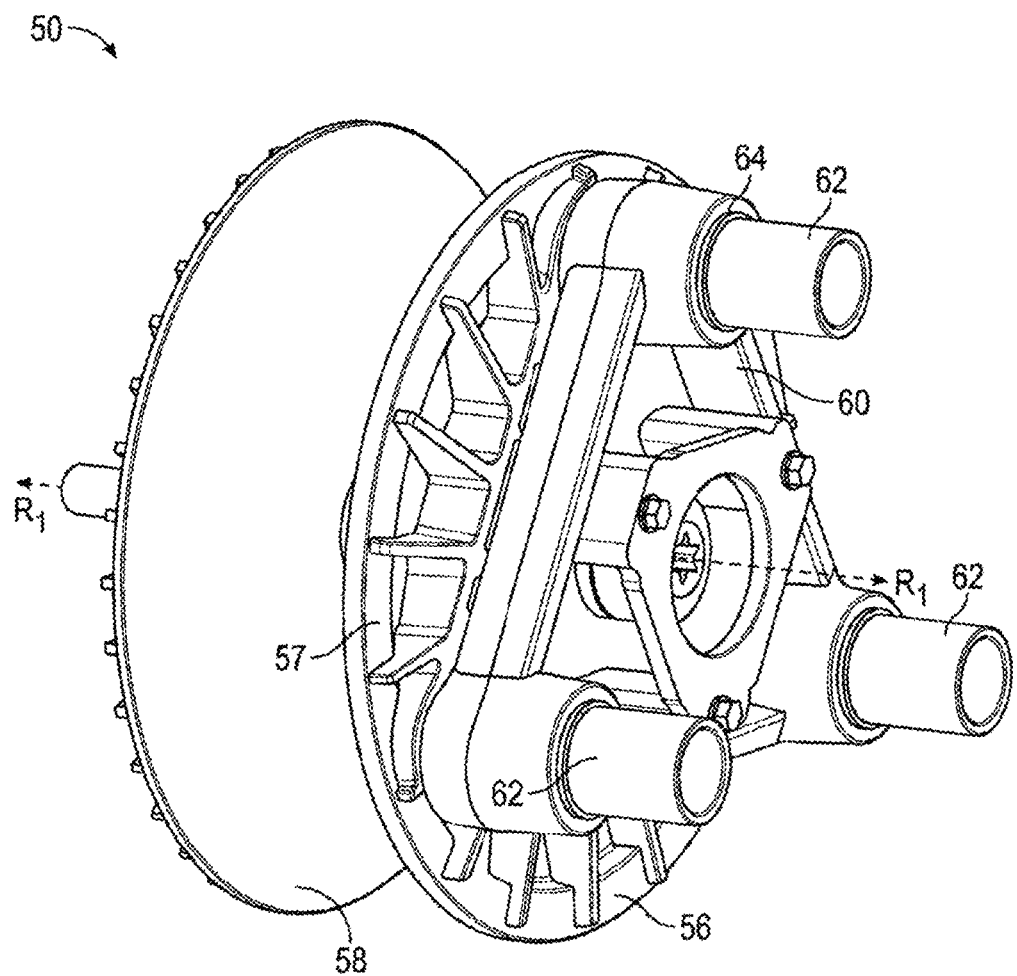
FIG. 5 is a perspective view of a drive clutch of the CVT of FIGS. 3 and 4.
Figure 6:
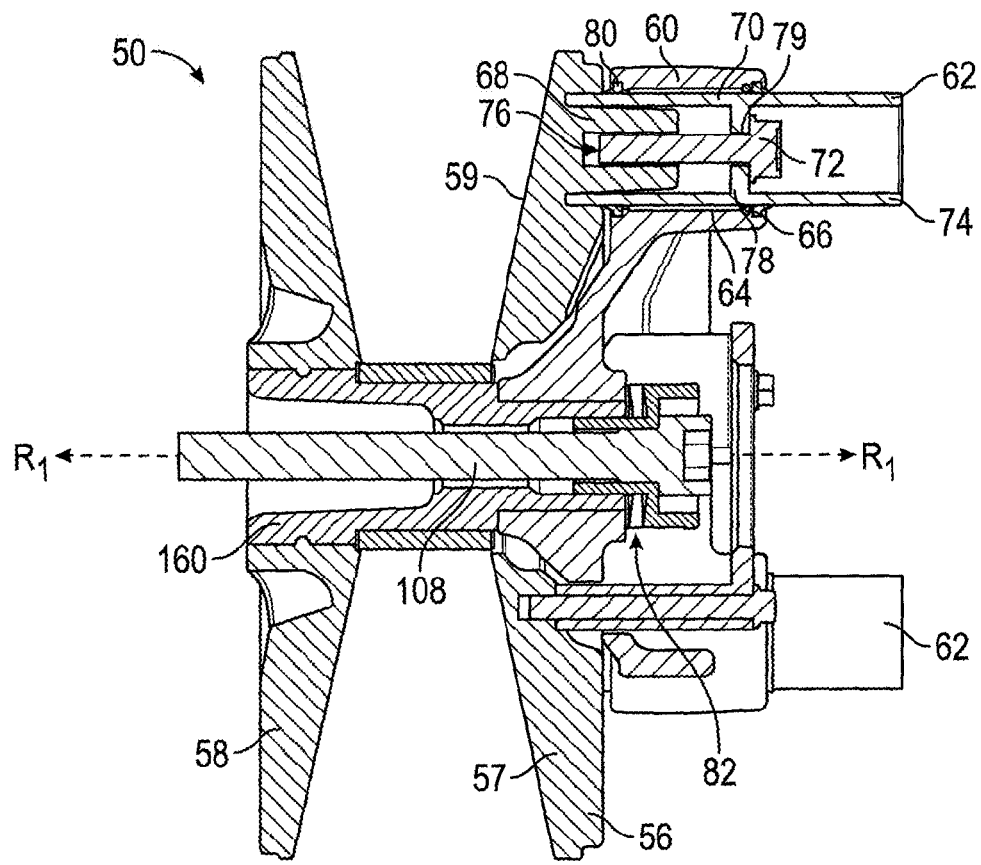
FIG. 6 is a cross-sectional view of the drive clutch of FIG. 5.
Figure 7:
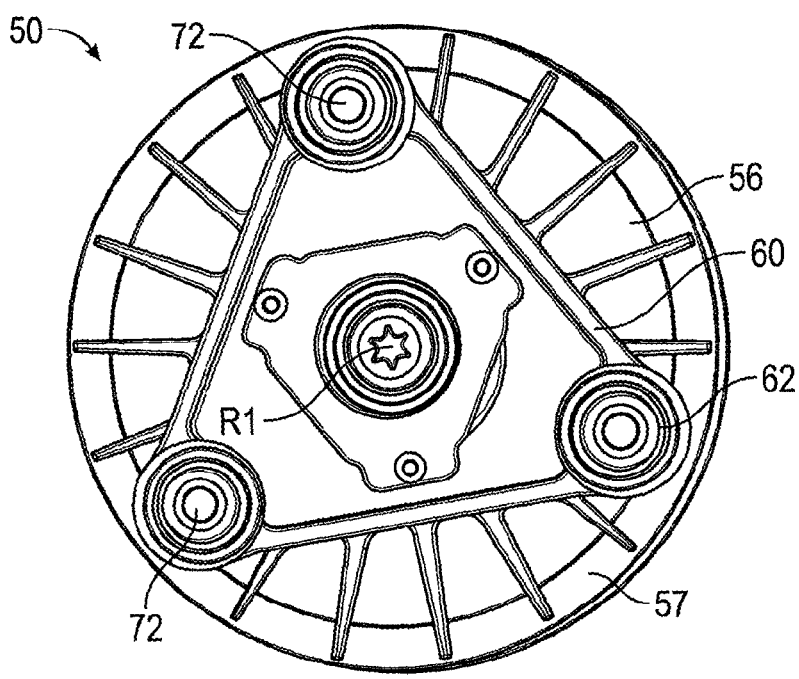
FIG. 7 is an elevational view of a moveable sheave assembly of the drive clutch of FIG. 5.

As shown in FIGS. 5-7, drive clutch 50 includes a moveable sheave 56 positioned adjacent outer cover 44 of CVT 34 and a stationary sheave 58. Moveable sheave 56 includes a body portion 57 and is configured to engage belt 54 at an engagement surface 59. During operation of CVT 34, stationary sheave 58 maintains a fixed position and does not move relative to moveable sheave 56. Conversely, moveable sheave 56 of drive clutch 50 is configured for axial movement relative to stationary sheave 58 in order to engage belt 54 and effect various drive ratios. The axial movement of moveable sheave 56 occurs generally along rotational axis $R_1$ thereof and in a direction perpendicular to longitudinal axis L (FIG. 1). Additional details of drive clutch 50 may be disclosed in U.S. Pat. No. 9,566,858, issued on Feb. 14, 2017; U.S. Pat. No. 10,697,532, issued on Jun. 30, 2020; U.S. patent application Ser. No. 16/357,676, filed Mar. 19, 2019; and U.S. patent application Ser. No. 16/357,695, filed Mar. 19, 2019, the complete disclosures of which are expressly incorporated by reference herein.

Referring still to FIGS. 5-7, in one embodiment, drive clutch 50 includes a spider assembly 60 and, more particularly, moveable sheave 56 of drive clutch 50 is coupled to spider 60 through a plurality of posts 62. In one embodiment, three posts 62 are provided and are configured in a triangular arrangement. Posts 62 may be comprised of a metallic material (e.g., steel) and are received within corresponding bores 64 of spider 60, each of which may include bushings (e.g., composite wear bushings) 66. Illustratively, as shown best in FIG. 6, moveable sheave 56 includes bosses 68, each of which is received within a first portion 70 of each post 62. In this way, each boss 68 extends at least partially into bore 64 such that at least first portion 70 of each post 62 is positioned radially intermediate boss 68 and bore 64 of spider 60.

Referring still to FIG. 6, a coupler 72 (e.g., a bolt) extends through a second portion 74 of post 62 and into first portion 70 to be received within a recessed portion 76 of boss 68. Illustratively, post 62 may include an internal divider or wall 78 which generally separates first portion 70 from second portion 74. Wall 78 includes an opening or aperture 79 such that coupler 72 extends through second portion 74 through aperture 79 of wall 78 and into first portion 70. In this way, post 62 is received within bore 64 of spider 60 and is retained within boss 68 of moveable sheave 56 such that post 62 is fixedly coupled to moveable sheave 56 but is not fixedly coupled to spider 60 such that post 62 may be moveable relative to spider 60.

Figure 8:
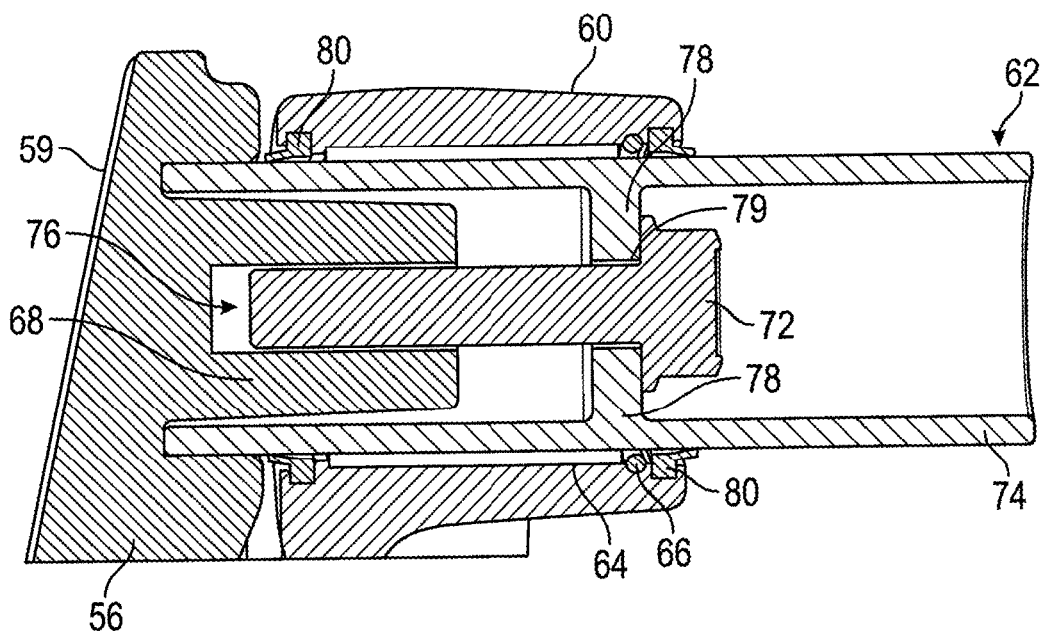
FIG. 8 is a cross-sectional view of a post of a spider of the moveable sheave assembly of FIG. 7.

Referring to FIG. 8, post 62 may be sealed within bore 64 of spider 60 through at least one seal 80. Illustratively, two seals 80 are provided such that one seal 80 is positioned at an inner extent of bore 64 and one seal 80 is positioned at an outer extent of bore 64. In this way, seals 80 prevent debris or other contaminants from entering bore 64 in order to reduce the wear of bushing 66. By reducing the wear of bushing 66, the life of drive clutch 50 may be extended and consistent operation of drive clutch 50 may be increased.

Referring now to FIGS. 11-21, CVT 34 disclosed herein may be mechanically or electronically controlled. For example, drive clutch 50 may be electronically or mechanically driven. When drive clutch 50 is electronically driven, an actuation assembly may be used to control the ratio of CVT 34. CVT 34 and an electrical assembly 280 (FIGS. 58 and 58A) of vehicle 2 includes an actuation assembly 100 and a lead screw and slider assembly 101. Actuation assembly 100 may be operably coupled to lead screw and slider assembly 101 and includes an electric motor 200 configured to adjust the position of moveable sheave 56 and, as such, actuation assembly 100, including motor 200, and lead screw and slider assembly 101 are operably coupled to moveable sheave 56.

Illustratively, actuation assembly 100 includes a clockwork mechanism 302. More particularly, clockwork mechanism 302 is fully enclosed within a sealed housing 244 integrated with or coupled to housing 40, as disclosed further herein. Clockwork mechanism 302 and lead screw and slider assembly 101 are sealed within housing 244 with oil. Housing 244 can either be contained within outer cover 44 and have a splined connection to motor 200 of actuation assembly 100 or can connect to an inner tower support. Because of this connection of housing 244, housing 244 can stay in place while servicing belt 54. It may be appreciated that various components of actuation assembly 100 run in oil unlike the main mechanical components of CVT 34, which may improve the life of actuation assembly 100 and ensures that operation remains consistent for the life of vehicle 2. Wear of the mechanical parts is a concern because CVT 34 is exposed to sand, dirt, dust, and water. Abrasive materials work into interfaces and wear them out, thereby degrading performance over time. Lead screw and slider assembly 101, bearings, and various components (e.g., gears) of clockwork mechanism 302 are particularly vulnerable. However, this configuration of clockwork mechanism 302 allows such components to run in oil and remain sealed from contaminants, thereby increasing the life of such components.

Clockwork mechanism 302 includes a first gear 232 operably coupled to drive clutch 50, a second gear 234, a third gear 236, and a fourth gear 238. Third gear 236 is operably coupled to an output shaft 242 of motor 200 and, when motor 200 is actuated, output shaft 242 and third gear 236 rotate. Output shaft 242 may be a hex shaft which slides into a gear hub cavity of third gear 236. Third gear 236 meshes with second gear 234 such that rotation of third gear 236 drives rotation of second gear 234. Second gear 234 is supported on a shaft 240 with fourth gear 238. Fourth gear 238 meshes with first gear 232 such that when second gear 234 rotates, shaft 240 and fourth gear 238 also rotate which drives first gear 232. Because first gear 232 is operably coupled to drive clutch 50, rotation of first gear 232 drives rotation of drive clutch 50. In this way, motor 200 is configured to actuate drive clutch 50.

Gears 232, 234, 236, 238 are positioned within sealed housing 244. As disclosed herein, oil may flow within housing 244 such that gears 232, 234, 236, 238 operate in oil. More particularly, housing 244 may include a first housing portion 244a and a second housing portion 244b, where first housing portion 244a includes oils and gears 232, 234, 236, 238 and second housing portion 244b may include any components of actuation assembly 100 not positioned within first housing portion 244a. In this way, if it is necessary to remove or repair various components of actuation assembly 100, it may be possible to remove such components and/or remove outer cover 44 without leaking oil from first housing portion 244a. Alternatively, second housing portion 244b may be eliminated. Housing 244a may be vented into housing 40. Housing 244 is axially outward of a portion of housing 40 and motor 200 may be positioned adjacent housing 40 and, specifically, may be coupled to inner cover 42. Housing 244 may be integral with housing 40 or may be coupled to housing 40. As shown best in FIG. 4, actuation assembly 100, including motor 200, is positioned rearward of operator area 20 and, illustratively, is positioned generally rearward of seating 22. In particular, motor 200 is positioned longitudinally intermediate a portion of CVT 34 and seating 22 and also longitudinally intermediate a portion of engine 32 and seating 22. Further, in some embodiments, motor 200 is positioned laterally outward of a portion of engine 22 but is within a width defined by an operator seat of seating 22.

Figure 19:
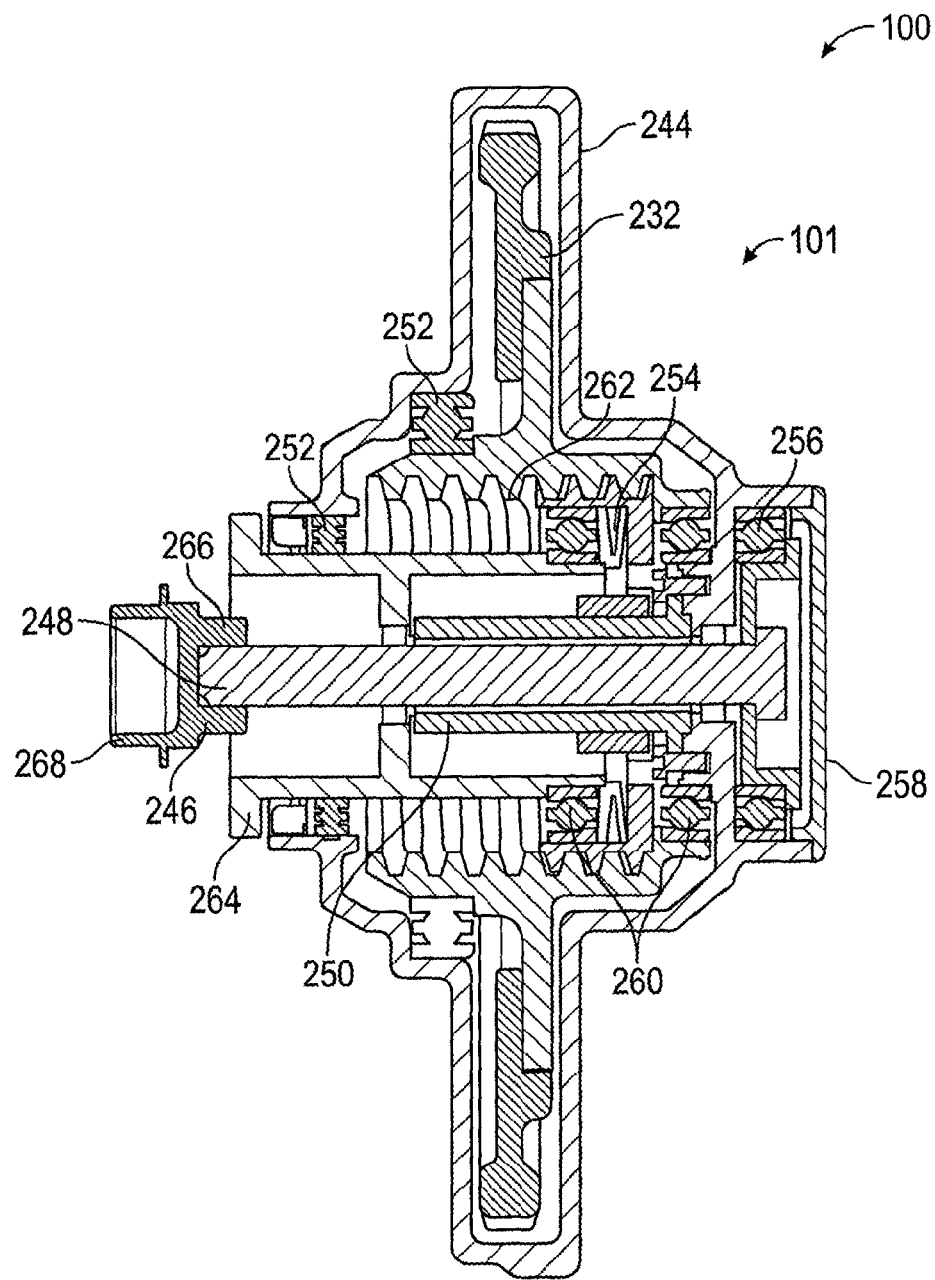
FIG. 19 is a cross-sectional view of the actuation assembly of FIG. 18.
Figure 20:
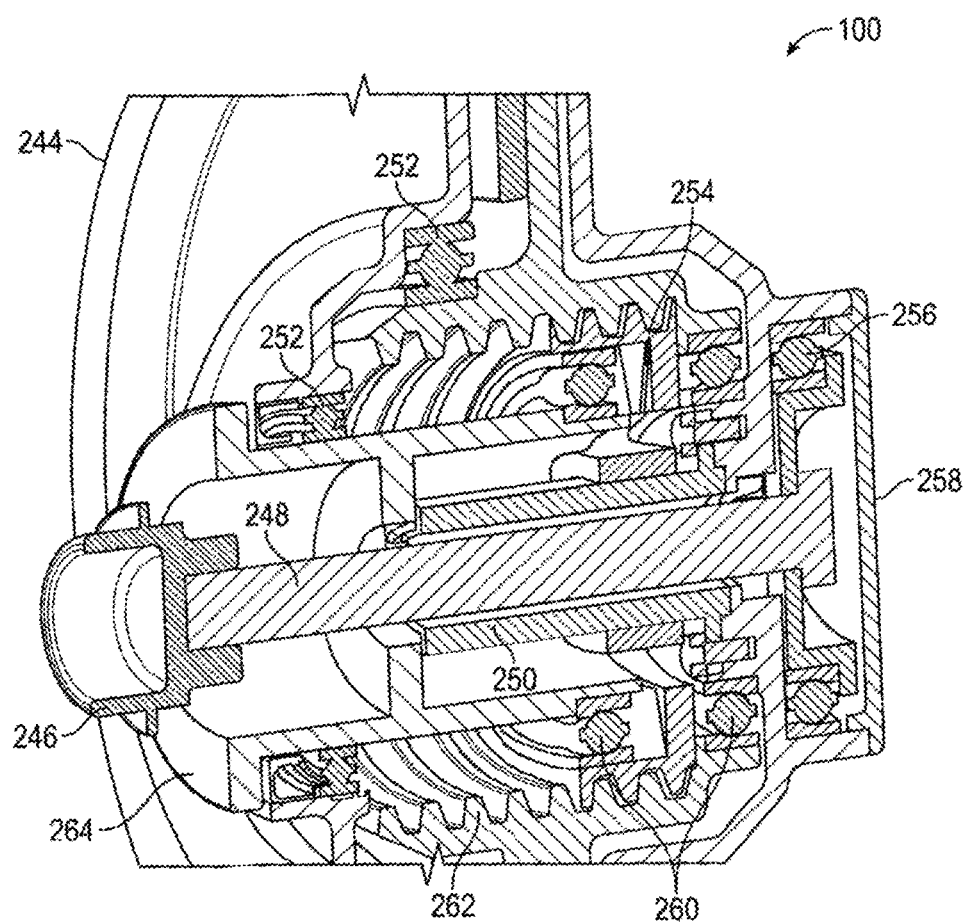
FIG. 20 is a cross-sectional view of the actuation assembly of FIG. 18.
Figure 21:
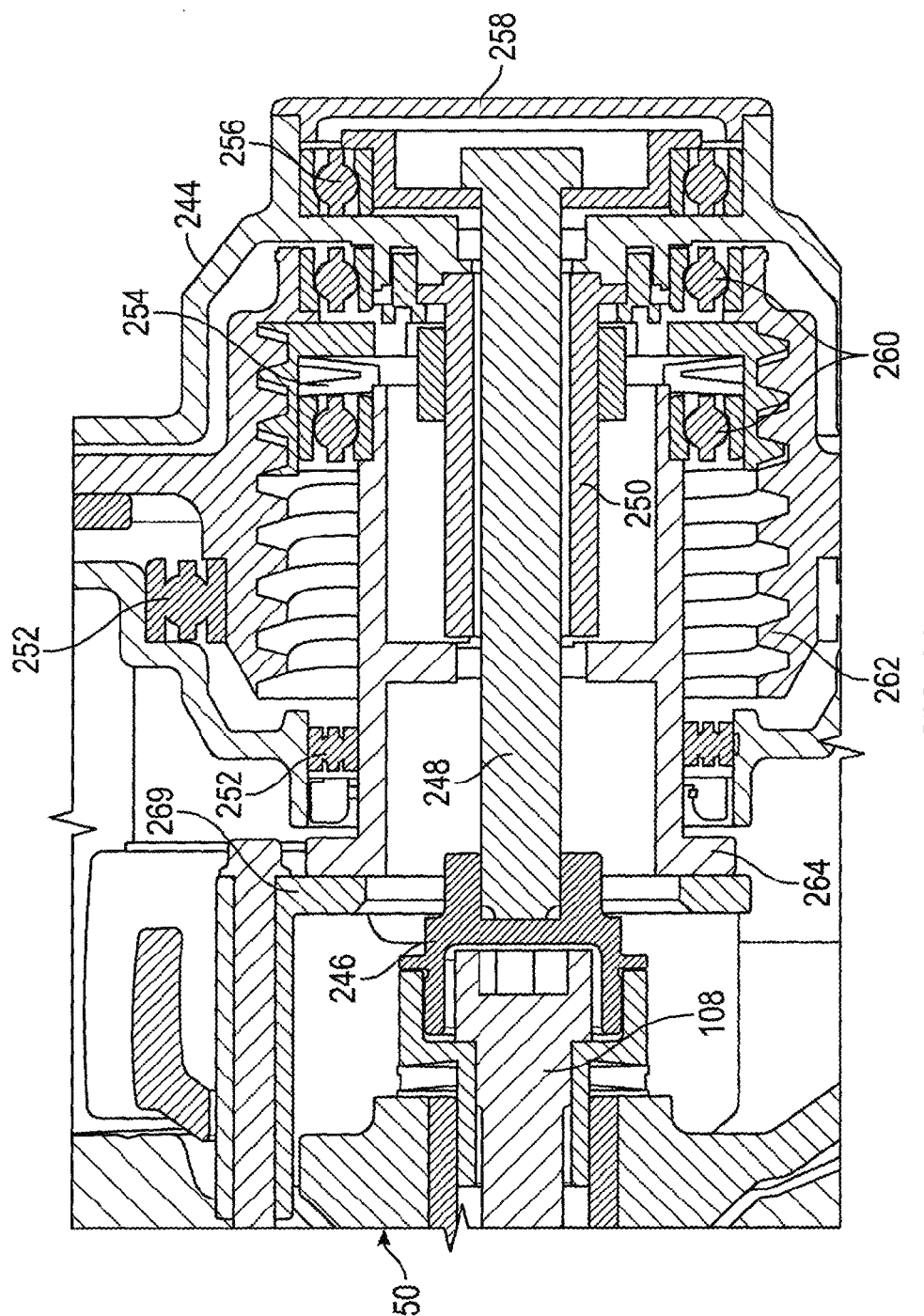
FIG. 21 is a cross-sectional view of the actuation assembly of FIG. 18.
Figure 22:
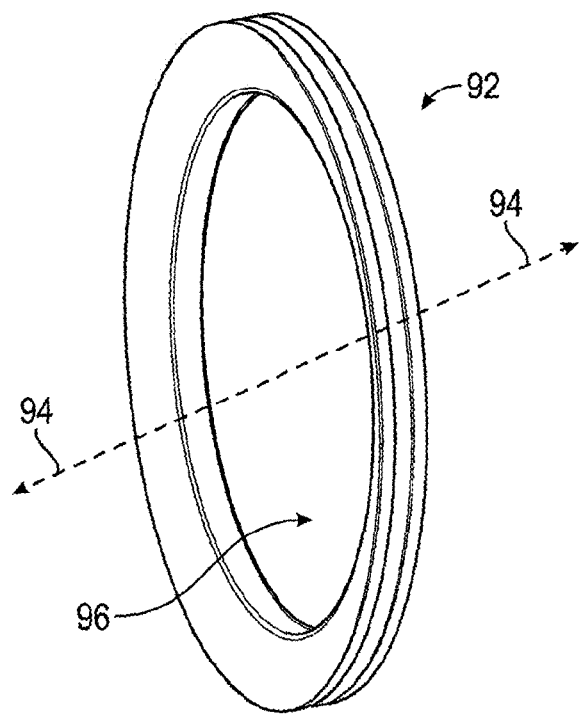
FIG. 22 is a perspective view of a seal of the spider of the drive clutch.
Figure 23:
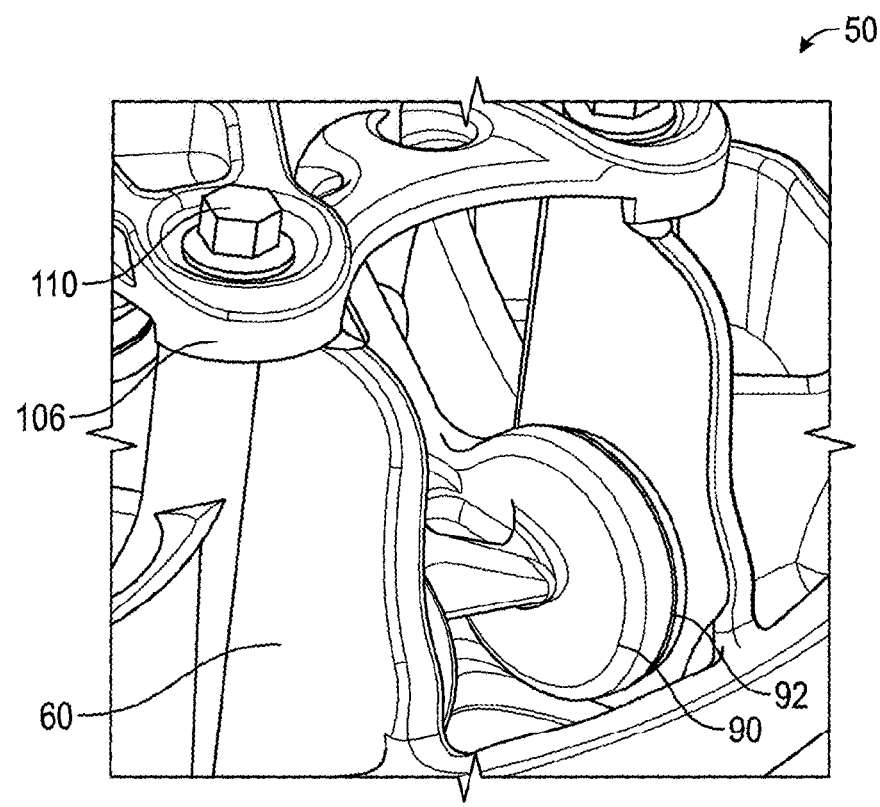
FIG. 23 is a perspective view of the seal and the spider of FIG. 22.
Figure 24:
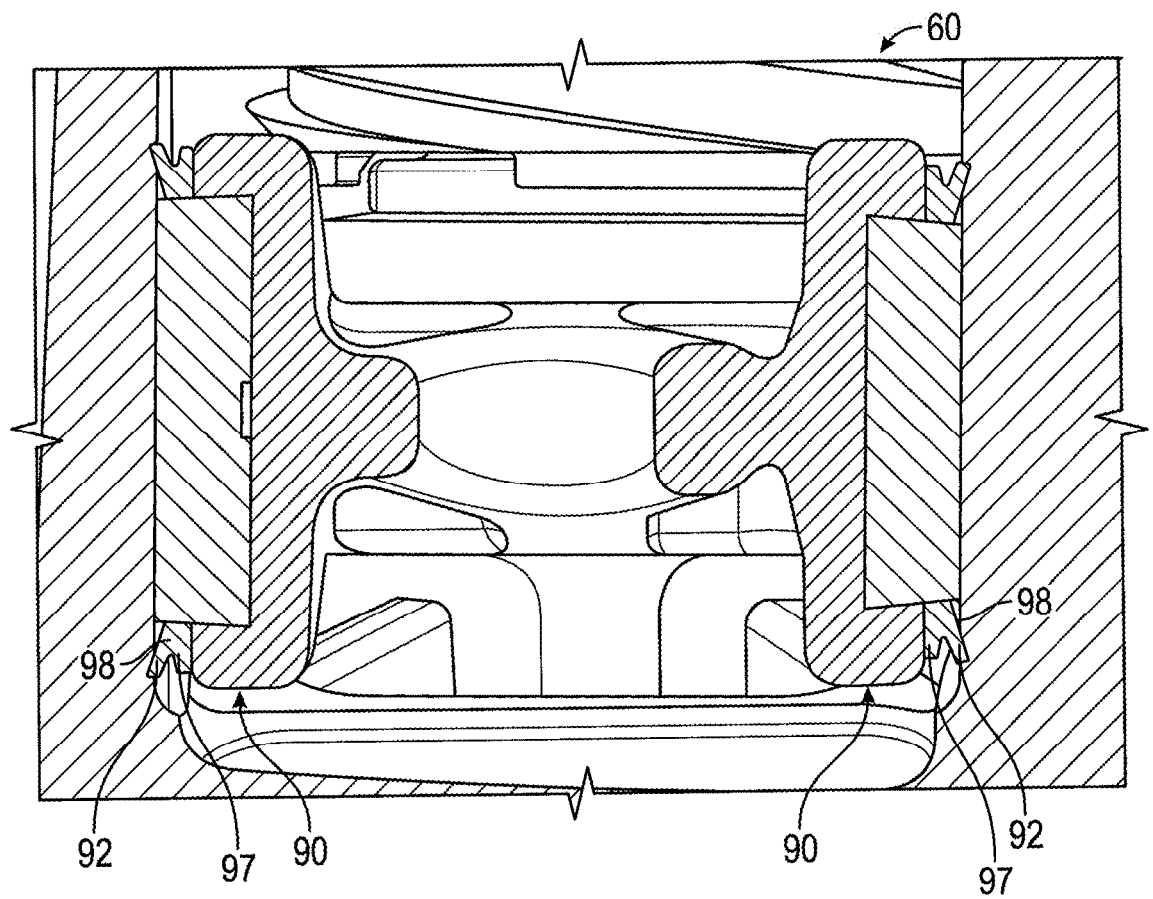
FIG. 24 is a cross-sectional view of the spider and seal of FIG. 23.
Figure 25:
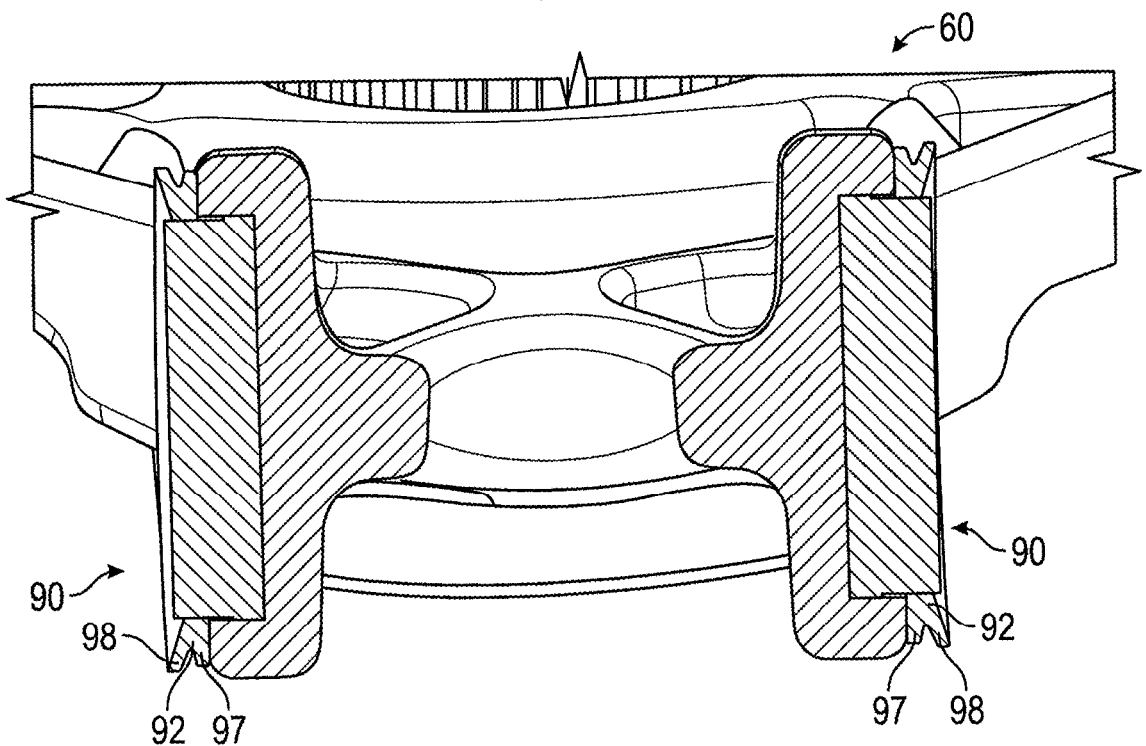
FIG. 25 is a cross-sectional view of the spider and seal of FIG. 23.
Figure 26:
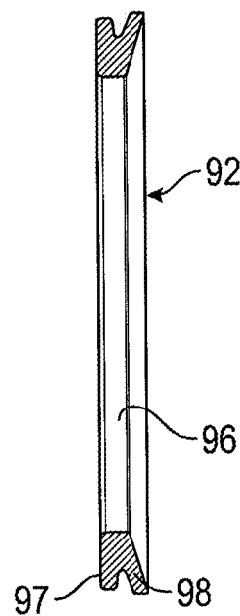
FIG. 26 is a cross-sectional view of the seal of FIG. 23.
Figure 27:
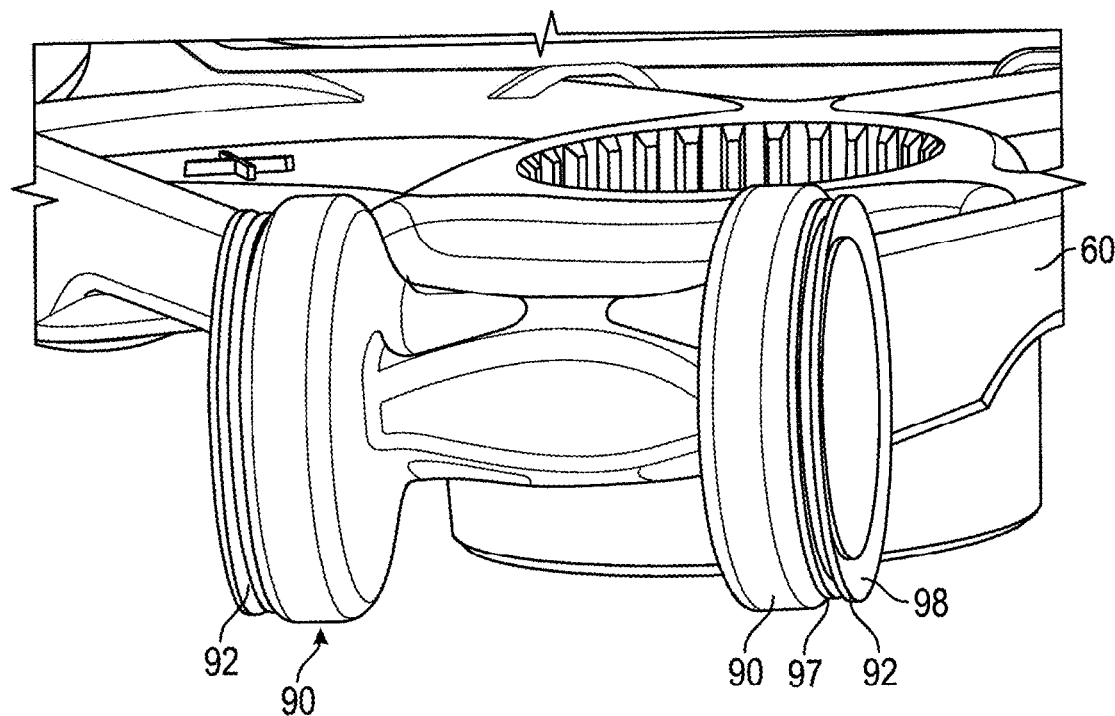
FIG. 27 is a perspective view of the spider and seal of FIG. 23.
Figure 28:
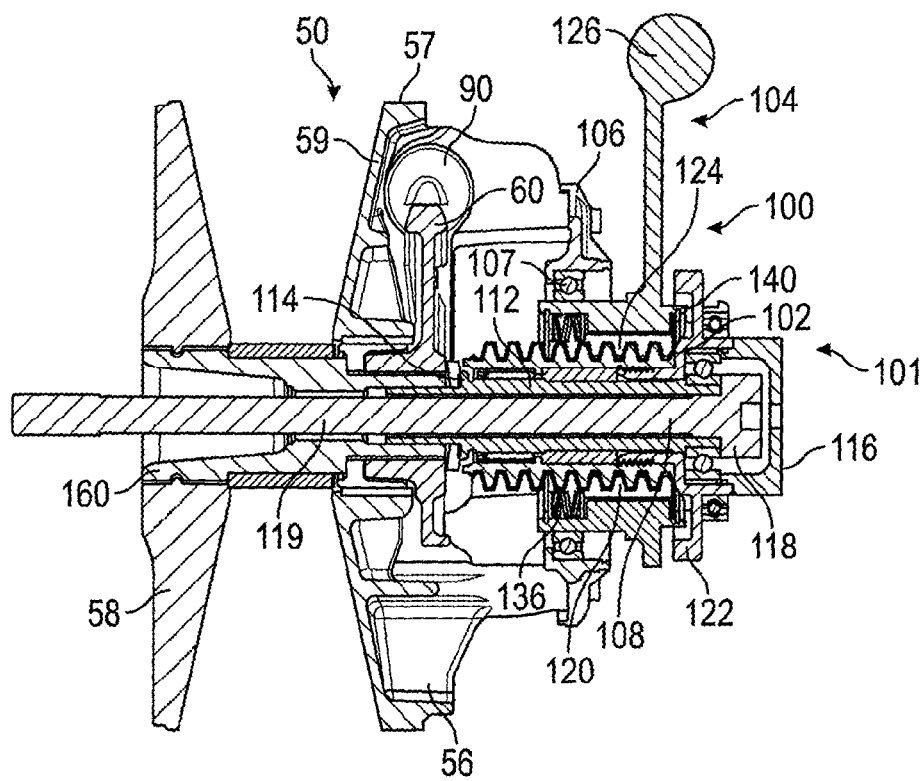
FIG. 28 is a cross-sectional view of a lead screw and slider assembly of the drive clutch.
Figure 29:
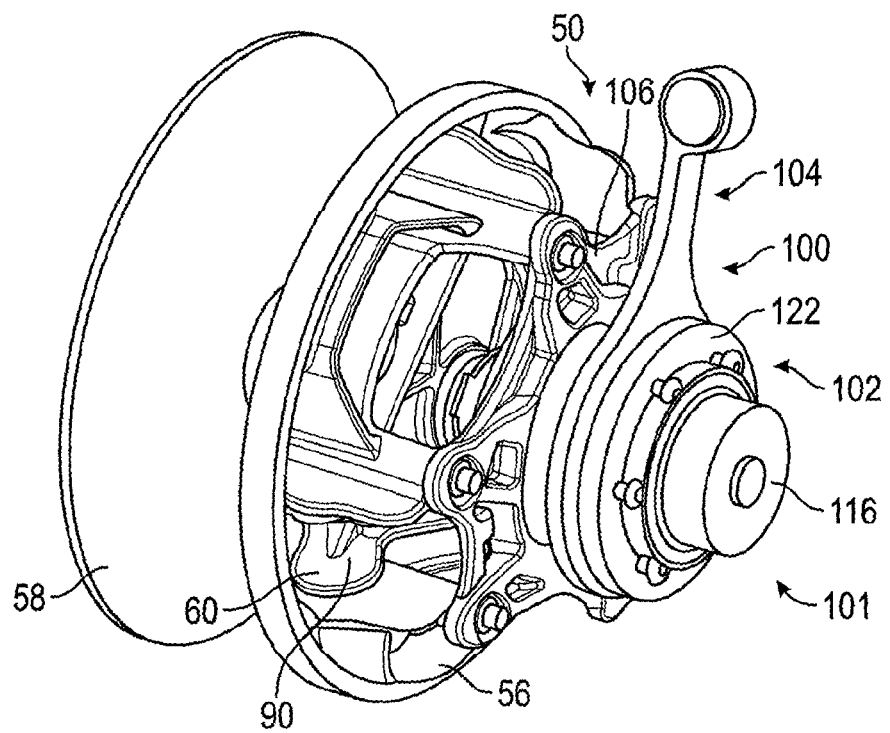
FIG. 29 is a front left perspective view of the lead screw and slider assembly of FIG. 28.
Figure 30:
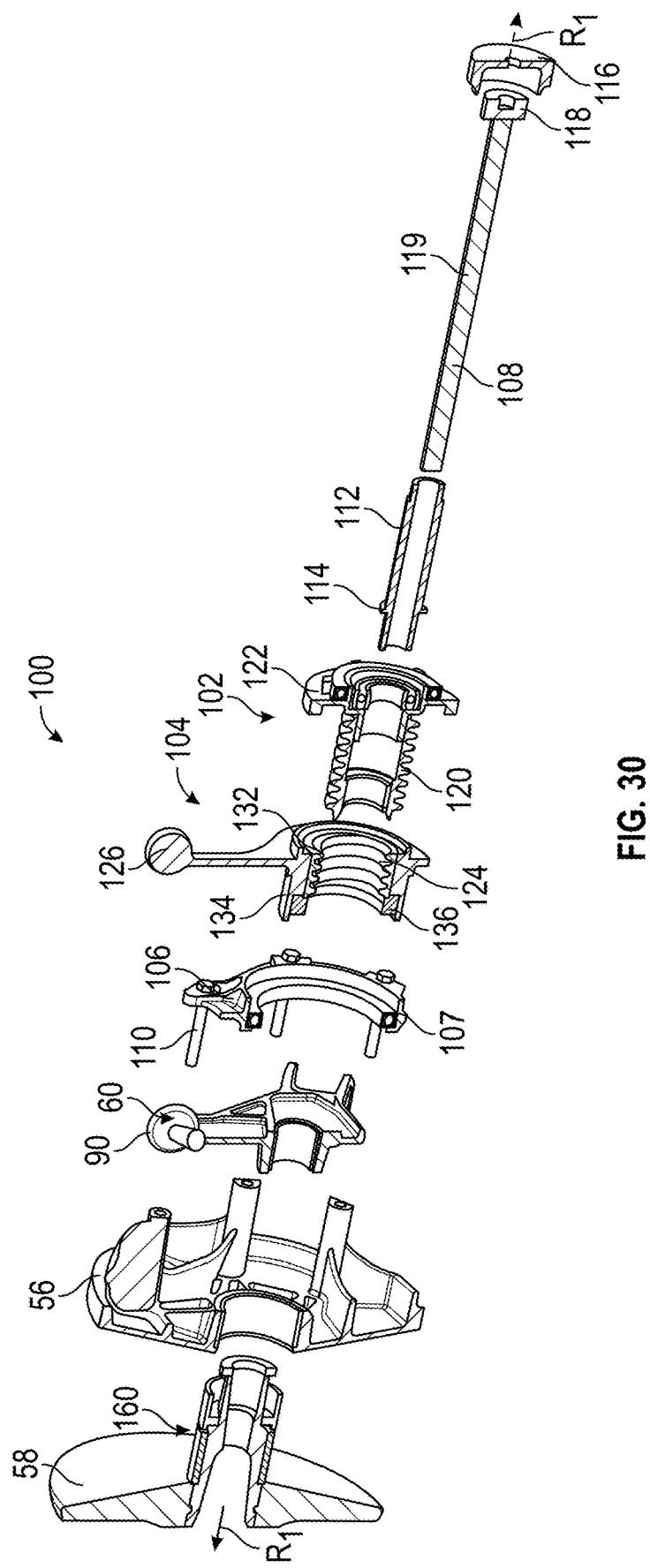
FIG. 30 is an exploded view of the lead screw and slider assembly of FIG. 29.
Figure 31:
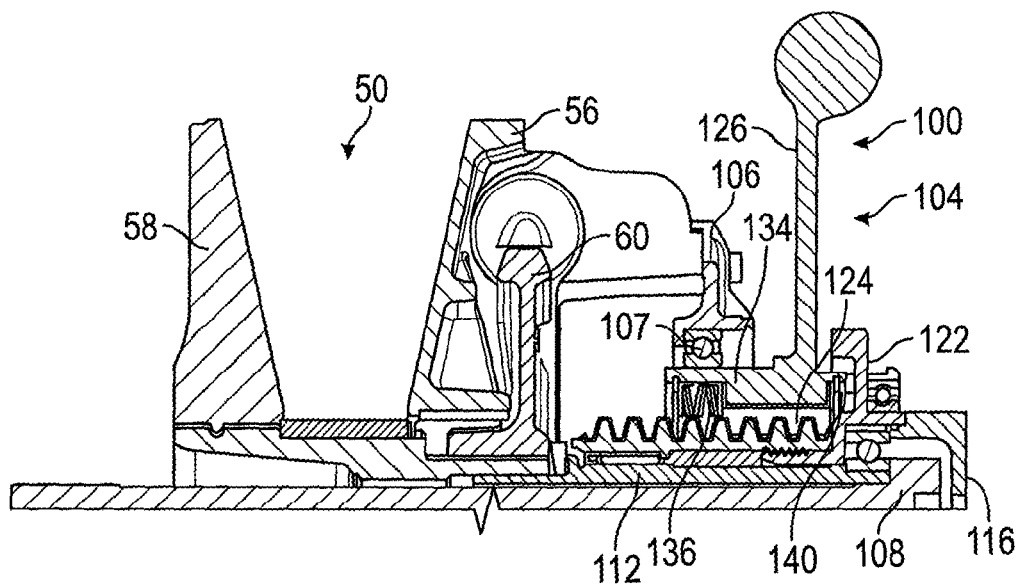
FIG. 31 is a cross-sectional view of the lead screw and slider assembly of FIG. 29.

Referring to FIGS. 19-21, clockwork mechanism 302 includes a piston which pushes on drive clutch 50 to cause movement thereof and belt clamp force reacts through a tension rod. More particularly, clockwork mechanism 302 and, illustratively, first gear 232 includes a tension or thrust rod 248 and a coupler 246. Coupler 246 is configured to receive a portion of tension rod 248 at a first end 266 and is configured to receive a portion of retaining bolt 108 at a second end 268. In this way, clockwork mechanism 302 is operably coupled to drive clutch 50.

Tension rod 248 extends through housing 244 and through a piston 264 and is concealed by a dust cover 258. A plurality of bearings are positioned adjacent piston 264, such as open ball bearings 252, sealed angular contact bearings 256, and open angular contact bearings 260. Other bearings or similar components may be used. Additionally, an engagement spring 254 is positioned adjacent piston 264. Piston 264 extends through a threaded central opening of first gear 232 and is positioned to abut a portion of drive clutch 50. Piston 264, tension rod 248, and coupler 246 are configured to rotate with crankshaft 36 (i.e., rotate at the speed of crankshaft 36).

If it is necessary to change belt 54, dust cover 258 is removed to expose tension rod 248. A wrench or other conventional tool may be used to unscrew tension rod 248 until it is loose from drive clutch 50. Bolt for outer cover 44 may be removed and outer cover 44 and clockwork mechanism 302 may be removed from motor 200 and from vehicle 2. Belt 54 then may be changed. When belt 54 is replaced, outer cover 44 and clockwork mechanism 302 are reassembled and coupled to inner cover 42. Tension rod 248 is tightened on drive clutch 50 and dust cover 258 is reinstalled. Finally, the bolts for outer cover 44 may be tightened.

In operation, piston 264 is configured to press against a thrust hub 269 of drive clutch 50. A wear surface may be provided at the interface of piston 264 and thrust hub 269. The belt load is transferred through the interface between piston 264 and thrust hub 269. When moveable sheave 56 is engaged, posts 62 are configured to move with moveable sheave 56 relative to spider 60. More particularly, as moveable sheave 56 slides axially along axis $R_1$ during operation of CVT 34, posts 62 move therewith and axially within bore 64 of spider 60. The configuration of posts 62 and spider 60 simplifies the design of drive clutch 50 by eliminating several wear surfaces and/or other components, such as sheave bushings, spider buttons, and moveable sheave towers. In general, CVTs may be a dirty environment that can become contaminated with abrasive materials, debris, unfiltered air, etc. Therefore, by reducing wear surfaces and traditional sliding surfaces, the drive clutch 50 of the present disclosure increases the life of CVT 34. Further, bushings 66 may have an increased size, which is possible due to the size of bore 64 of spider 60, to distribute the loads thereon, thereby further reducing wear when posts 62 slide therein.

Figure 9:
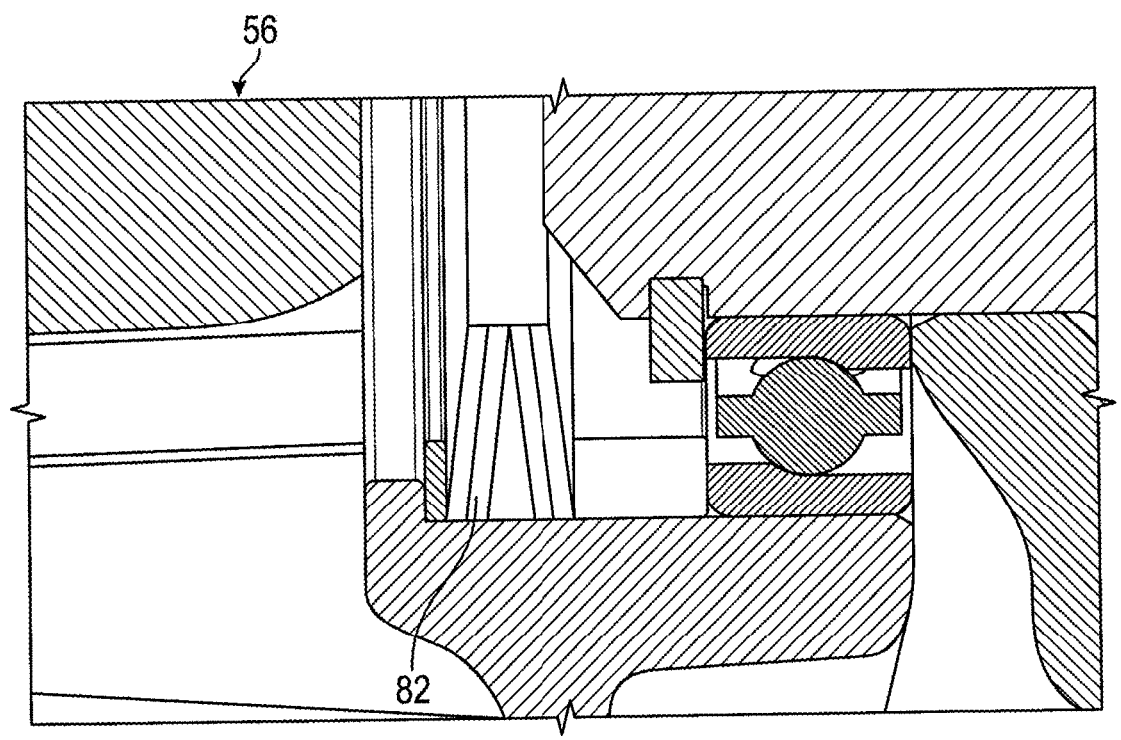
FIG. 9 is a cross-sectional view of the moveable sheave assembly of FIG. 7 and including an anti judder spring.

Referring to FIG. 9, drive clutch 50 may further include a tension member, such as a spring 82, to soften or decrease the axial stiffness of moveable sheave 56 when launching or initiating operation of CVT 34. More particularly, drive clutch 50 is used to disconnect rotational energy and, when drive clutch 50 is engaged, the rotational force or torque is a function of the normal force and the friction characteristics of the two contact surfaces—here, moveable sheave 56 and belt 54. A smooth launch, which may be initiated upon contact between moveable sheave 56 and belt 54 at the start of operation of CVT 34 and/or upon an input to move vehicle 2, occurs when there is a consistent change in acceleration. Conversely, jerk occurs from discontinuous acceleration. Therefore, it is desirable to have continuous acceleration for a smooth launch and this may be accomplished by a consistent change in acceleration. If the initial contact between moveable sheave 56 and belt 54 creates a significant step in the torque, then jerk will occur along the driveline of powertrain assembly 30. The jerk may cause the driveline to wind and unload like a spring and repeated cycles of this jerk may be called judder.

Figure 10:
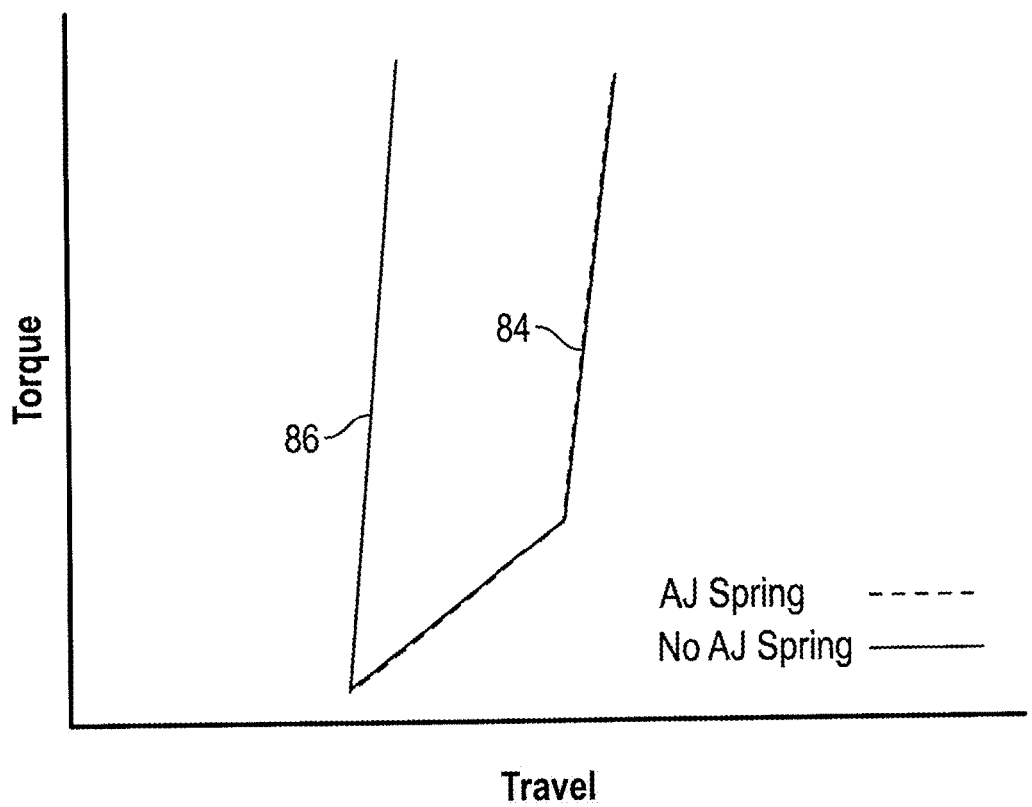
FIG. 10 is a graphical view of the performance of the anti judder spring of FIG. 9.
Figure 11:
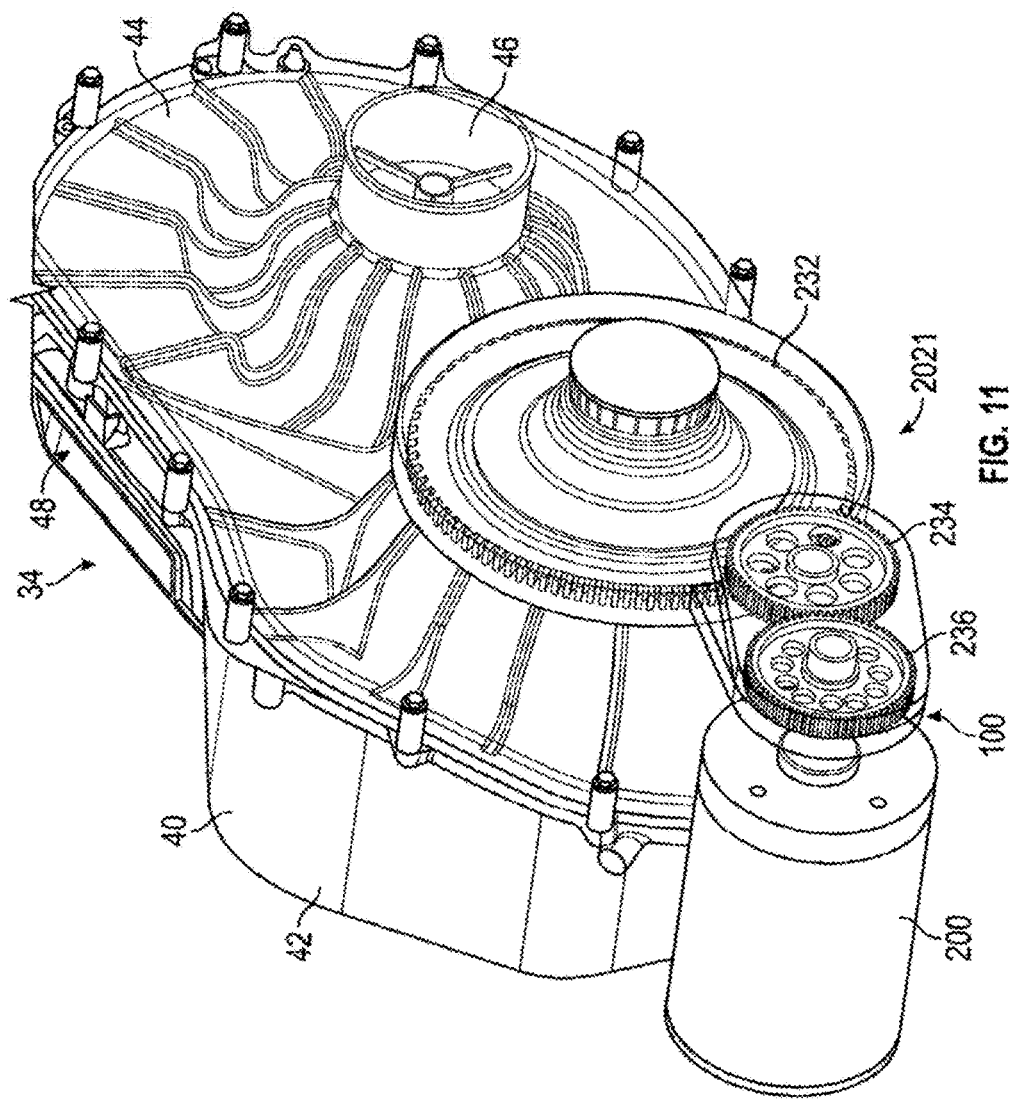
FIG. 11 is a front left perspective view of an actuation assembly for the CVT of FIG. 4.
Figure 12:
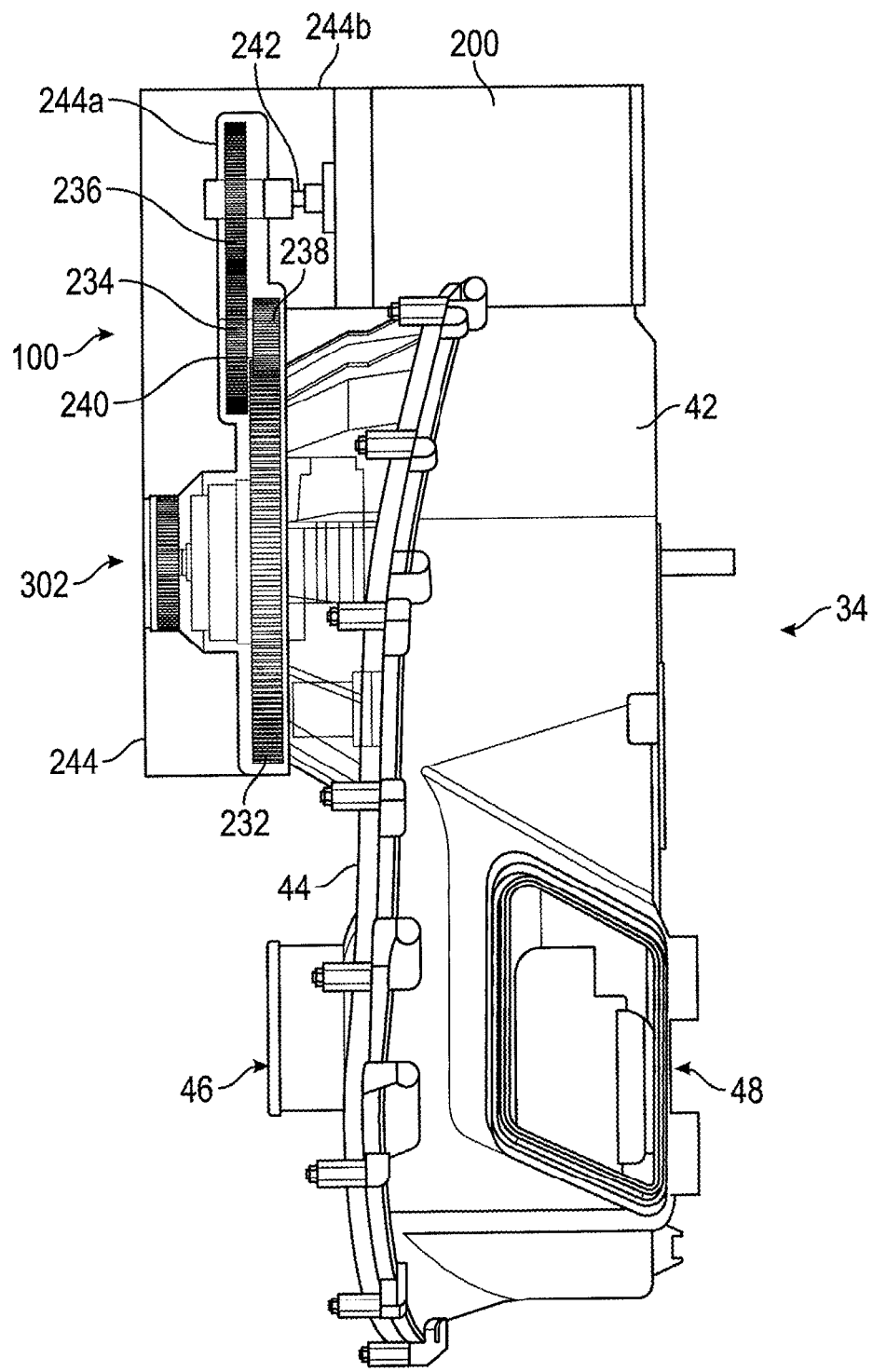
FIG. 12 is a top view of the actuation assembly and CVT of FIG. 11.
Figure 13:
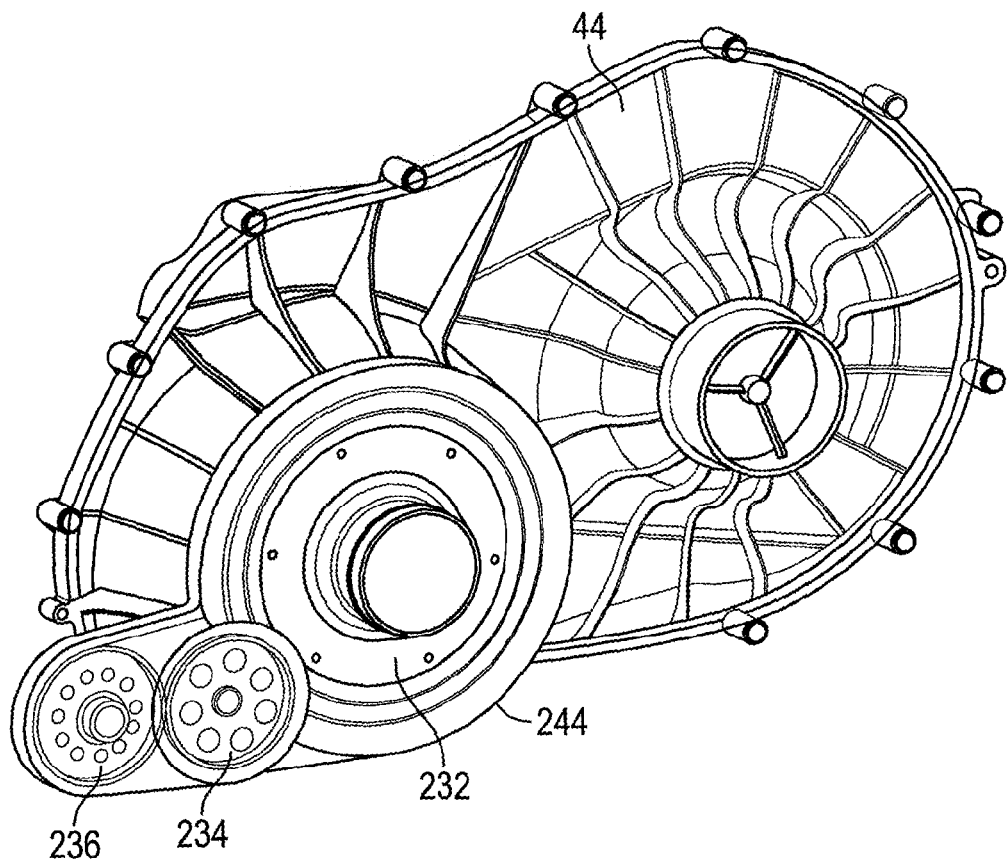
FIG. 13 is a front left perspective view of the actuation assembly of FIG. 11.
Figure 14:
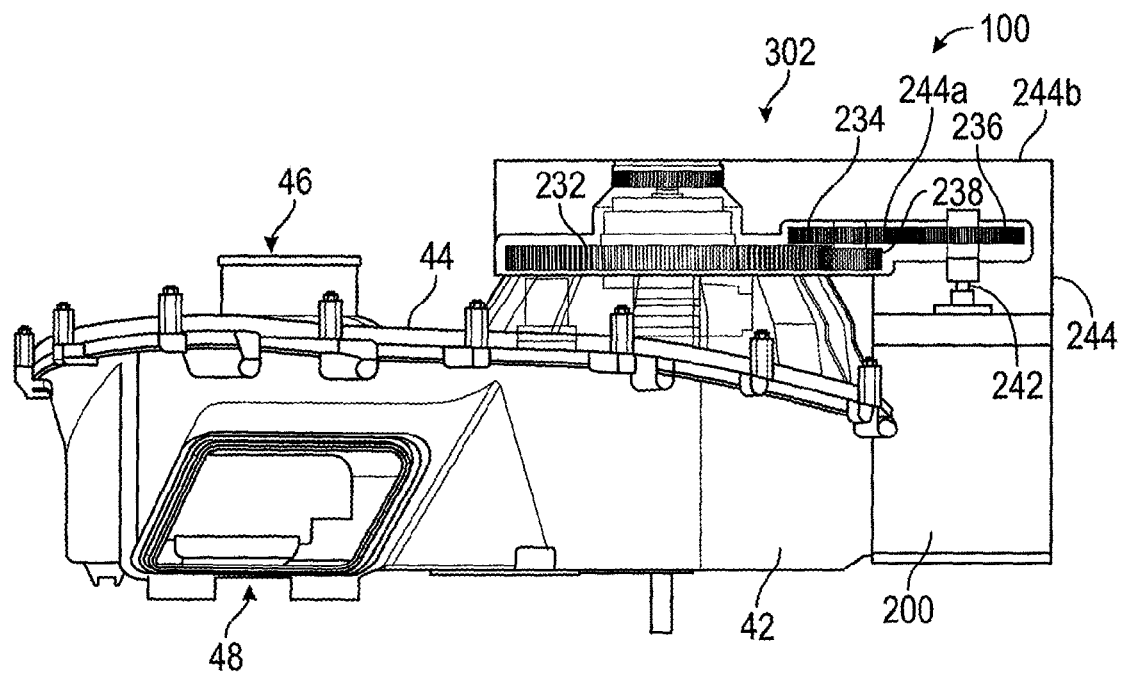
FIG. 14 is a top view of the actuation assembly and CVT of FIG. 12.
Figure 15:
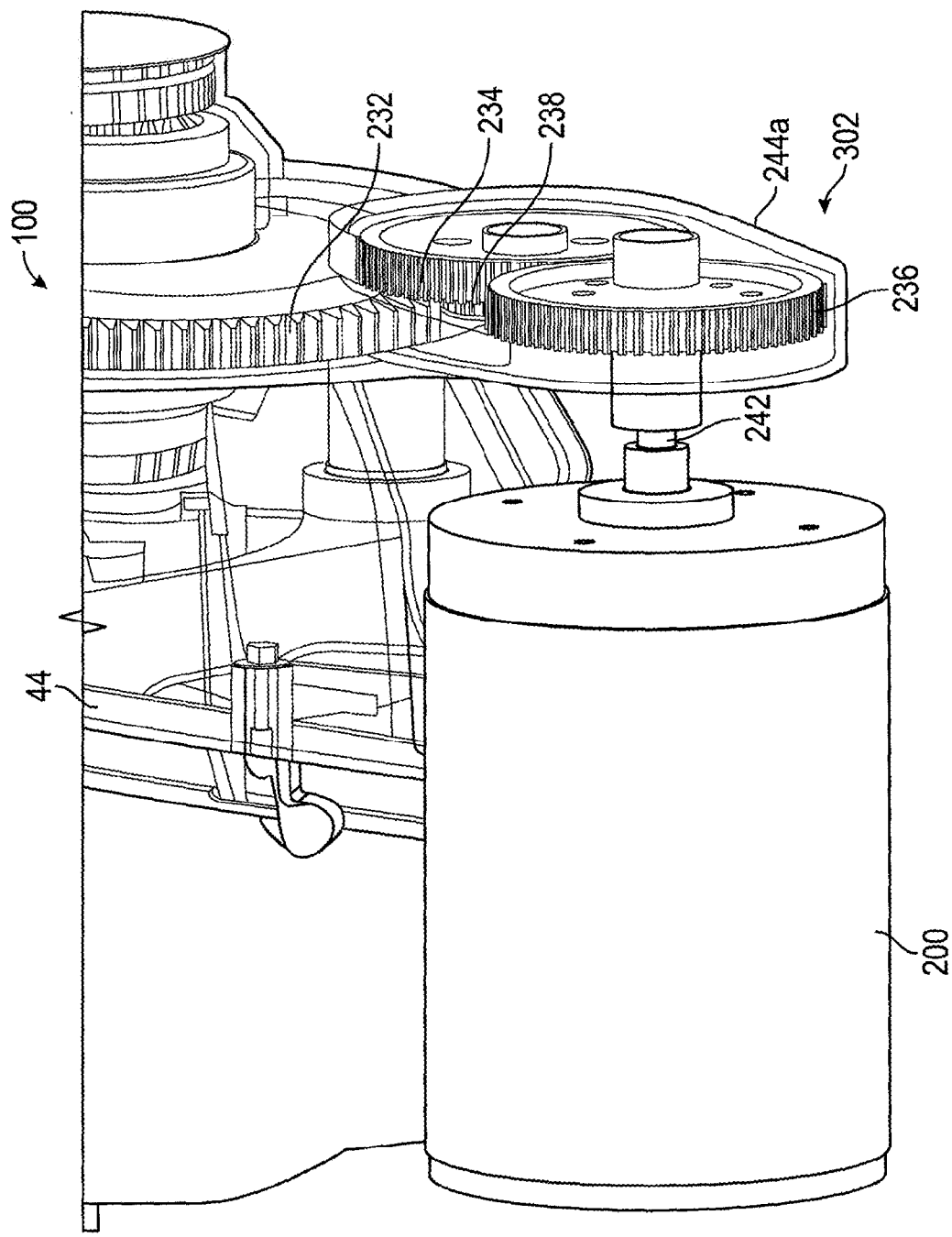
FIG. 15 is a front left perspective view of the actuation assembly of FIG. 11.
Figure 16:
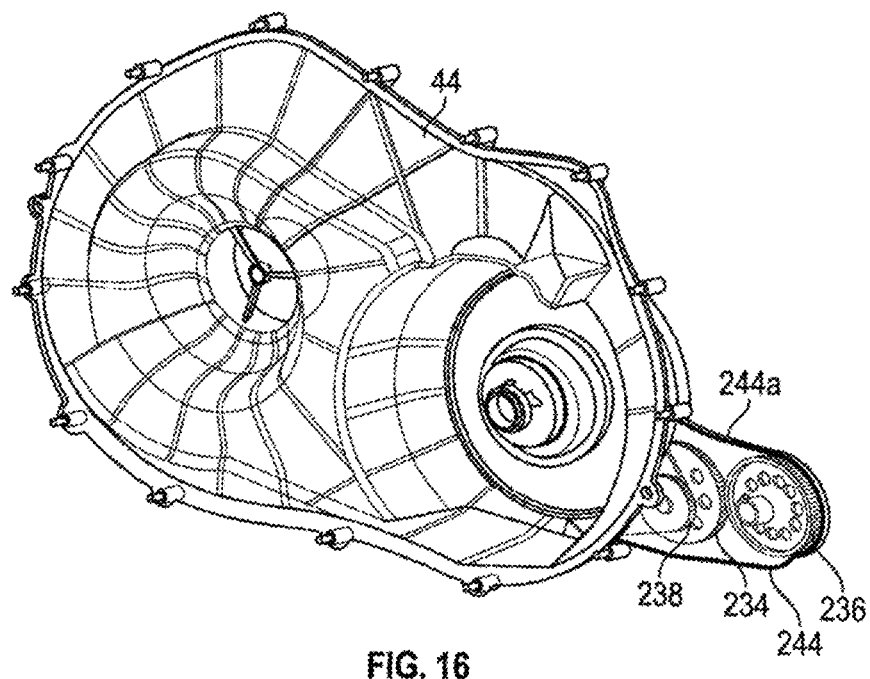
FIG. 16 is a front right perspective view of an outer cover of the CVT and the actuation assembly of FIG. 11.
Figure 17:
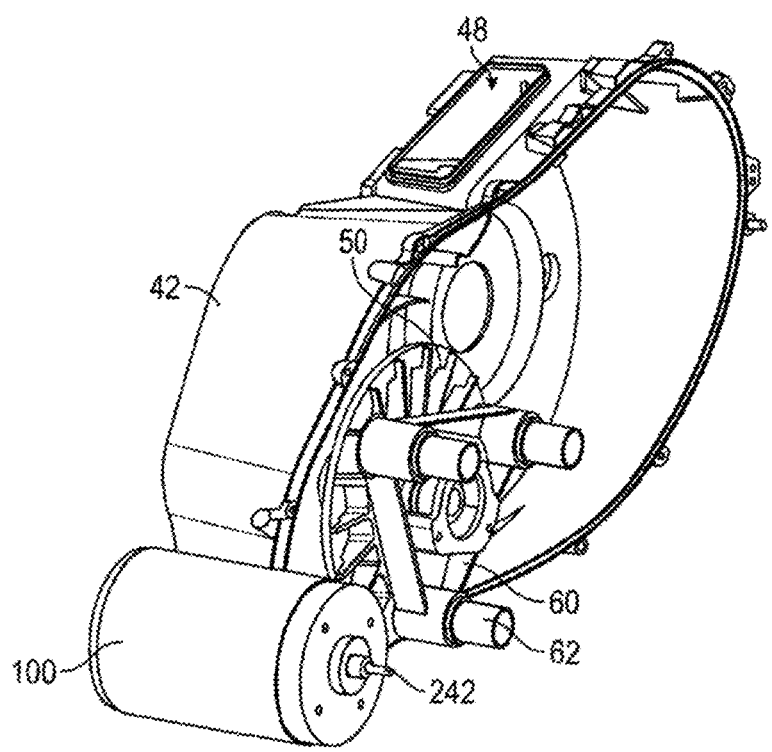
FIG. 17 is a front left perspective view of an inner cover of the CVT and an electric motor of the actuation assembly of FIG. 11.
Figure 18:
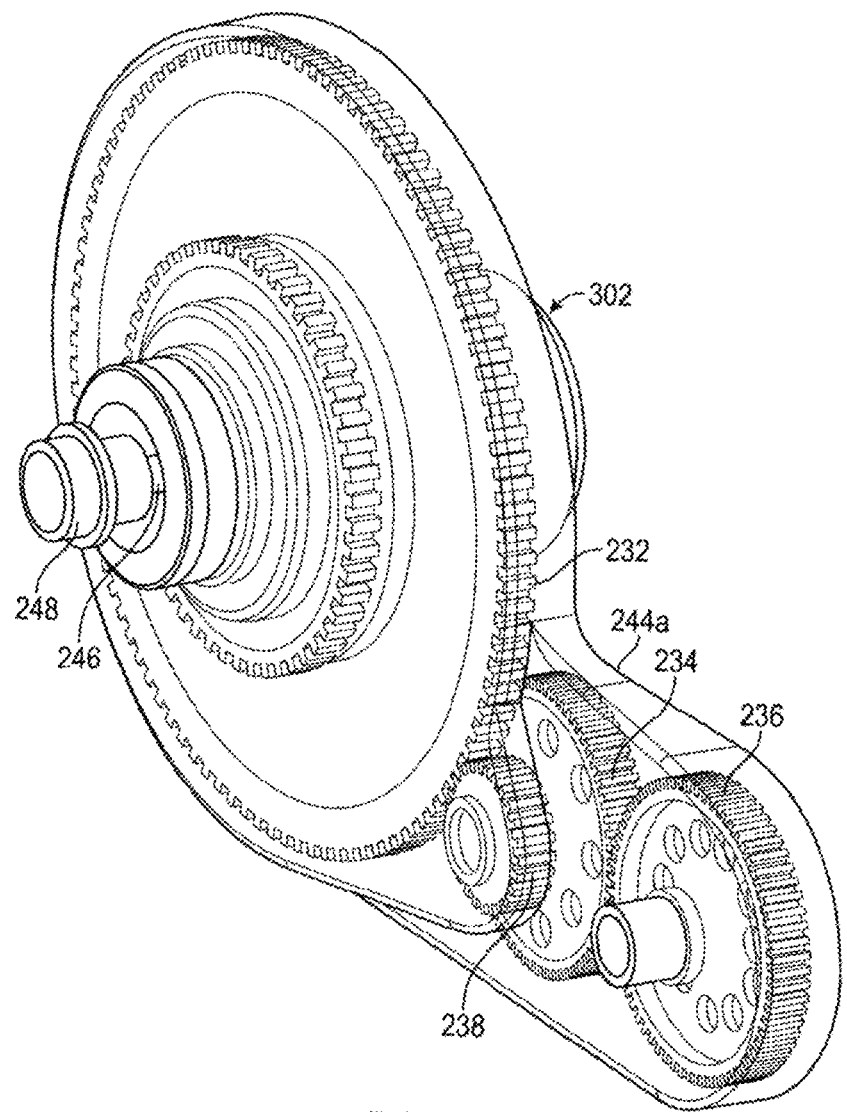
FIG. 18 is a left rear perspective view of the actuation assembly of FIG. 11.

In order to minimize or prevent jerk/judder, spring 82 may be used to make drive clutch 50 softer during the initial engagement phase. Illustratively, spring 82 is an axial spring configured as an anti judder spring and may be linear or have any geometric shape, including curved surfaces. The softer spring 82 is, the more distance moveable sheave 56 must travel to increase the normal force, thereby making drive clutch 50 softer during engagement, as shown best in FIG. 10. More particularly, as shown in FIG. 10, line 86 shows the torque and travel of drive clutch 50 without spring 82 while line 84 shows the torque and travel of drive clutch 50 with spring 82. It is apparent from FIG. 10 that spring 82 increases the travel of moveable sheave 56 needed for the same torque as line 86. As such, spring 82 softens the engagement when moveable sheave 56 engages belt 54. The preload of spring 82 also may affect the softness of the initial engagement. Further, the initial step from no torque to some torque may be dependent on the character of the vehicle, the mass of the vehicle and/or vehicle components, and the stiffness of the driveline of powertrain assembly 30.

Referring now to FIGS. 22-27, drive clutch 50 may include additional seals, in addition to seal 80 disclosed herein. Illustratively, at least a portion of drive clutch (e.g., spider 60 of moveable sheave 56) includes drive clutch buttons 90 which are configured to engage or ride against structures, such as a sheave tower, when drive clutch 50 moves between the open and closed positions. Because buttons 90 experience movement with the tower or other structure, such components are subject to wear and it may be necessary to minimize or prevent debris or other contaminants from contacting buttons 90.

As shown herein, a seal 92 may be positioned on a portion of button 90 to prevent or minimize debris/contaminants from being deposited on buttons 90. Seal 92 may be comprised of a plurality of materials, such as nitrile, rubber, or Viton® depending on the desired wear and stiffness properties. Seal 92 is adapted for sliding motion perpendicular to axis 94 of seal 92. Referring still to FIGS. 22-27, seal 92 includes a central opening 96, through which axis 94 extends, and is configured to be received on an outer surface of button 90. More particularly, a portion of button 90 extends into opening 96 and seal 92 is frictionally retained on the outer surface of button 90 and is positioned intermediate button 90 and the tower. Seal 92 is configured as a wiper seal and includes a first leg 97 and a second leg 98. Second leg 98 may have a length greater than that of first leg 97. Additionally, second leg 98 is positioned axially outward of first leg 97 when seal 92 is retained on button 90.

Referring to FIGS. 28-37, a further embodiment of actuation assembly 100 and lead screw and slider assembly 101 are disclosed. Lead screw and slider assembly 101 may be comprised of a lead screw 102 and a slider 104 to convert angular motion from an electric motor to linear motion of moveable sheave 56. As disclosed further herein, actuation assembly 100 uses the interface of belt 54 and at least moveable sheave 56 as the primary engagement surfaces, which is different from a system utilizing a separate starter clutch. Various features of actuation assembly 100 (e.g., a launch assist spring) may allow for easier and more consistent control of the torque transfer between sheaves 56, 58 and belt 54, which improves low-speed drivability of vehicle 2 and launch experienced by the operator. Additionally, the configuration of actuation assembly 100 and lead screw and slider assembly 101 disclosed in FIGS. 28-37 include a single arm slider 104 and, based on this single-arm configuration, actuation assembly 100 also is able to fit within the overall packaging or envelope of belt 54 to allow for a more compact configuration and improved serviceability.

More particularly, and referring still to FIGS. 28-37, actuation assembly 100 and lead screw and slider assembly 101, including lead screw 102 and slider 104, are operably coupled to spider 60, a spider cover 106 having a bearing 107, and clutch retaining bolt 108. Spider cover 106 is positioned axially outward of spider 60 and is coupled to moveable sheave 56 through a conventional fastener, such as a bolt 110 such that spider 60 is positioned axially intermediate moveable sheave 56 and spider cover 106. Clutch retaining bolt 108 extends through central openings of sheaves 56, 58, spider 60, and spider cover 106. Illustratively, clutch retaining bolt 108 also extends through an outer shaft 112 of drive clutch 50. Outer shaft 112 includes a wall 114 which abuts spider 60 such that outer shaft 112 generally extends axially between spider 60 and a seal cap 116. Seal cap 116 generally seals clutch retaining bolt 108 from debris and contaminants. Clutch retaining bolt 108 includes a head portion 118 which abuts outer shaft 112 and a body portion 119 which is received through outer shaft 112. Clutch retaining bolt 108 is coaxial with axis of rotation $R_1$ of drive clutch 50.

Lead screw 102 includes a threaded spindle 120 and a spindle hub 122. Spindle 120 and hub 122 are coupled to each other through threads or other coupling methods (e.g., bolts, press-fit splines, etc.). Threaded spindle 120 is configured to mesh or otherwise engage with inner threads 124 of slider 104. Inner threads 124 define the inner diameter of a portion of slider assembly 104. A single arm 126 of slider 104 extends radially outward from inner threads 124, thereby defining slider 104 as a single-arm slider or sliding mechanism.

Figure 33:
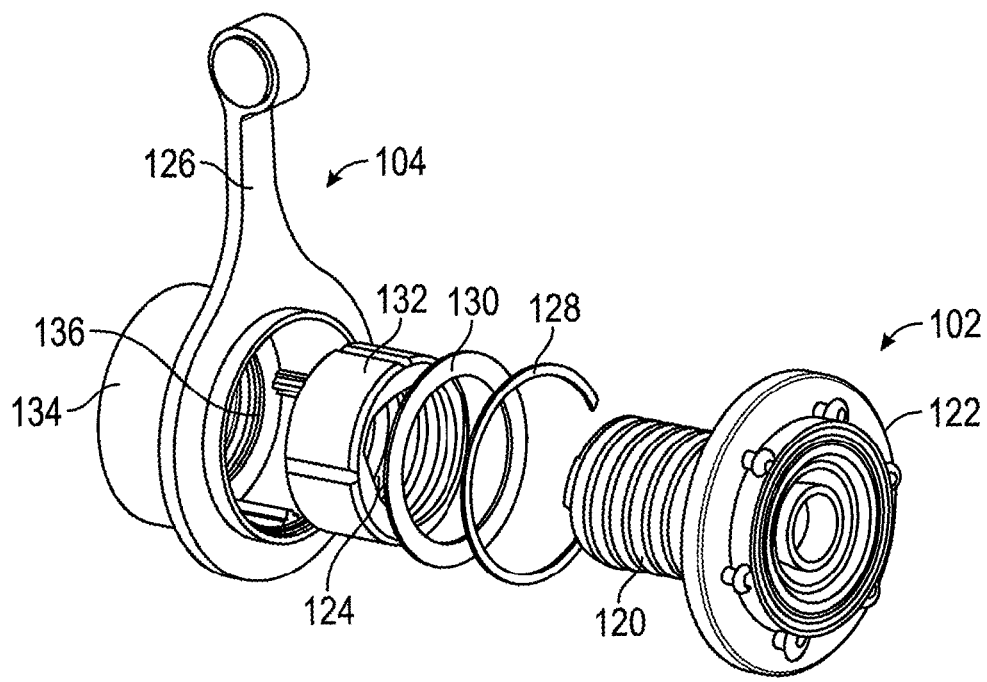
FIG. 33 is an exploded view of the portion of the lead screw and slider assembly of FIG. 32.

As shown best in FIG. 33, slider 104 may further include a spring 128, illustratively a C-spring or a clip spring. Alternatively, spring 128 may be configured as a snap ring. Additionally, slider 104 includes at least one washer 130 and a nut 132. Washer 130 prevents spring 128 from embedding into nut 132. Nut 132, washer 130, and spring 128 are positioned generally adjacent spindle hub 122 of lead screw 102 and radially inward of arm 126. The inner diameter of nut 132 includes inner threads 124 of slider 104 which are configured to engage with threaded spindle 120 of lead screw 102. Slider 104 further includes an axially-inward portion 134 which includes an inner spring 136. Spring 136 is positioned axially intermediate retainer plates 138, 139 within axially-inward portion 134. Nut 132 abuts a portion of retainer plate 139. Nut 132 may be comprised of various materials, such as polymeric materials and/or metallic materials (e.g., bronze, aluminum, etc.).

Figure 32:
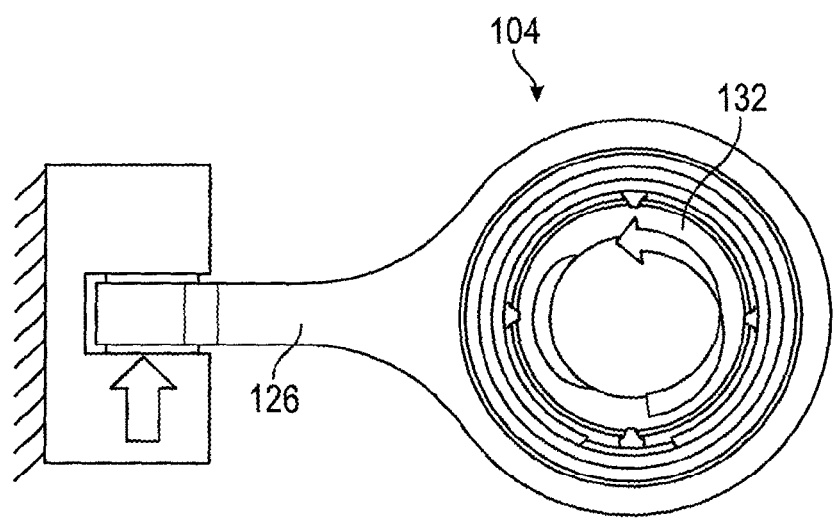
FIG. 32 is an elevational view of a portion of the lead screw and slider assembly of FIG. 29.

With respect to slider 104, and referring to FIG. 32, an electric motor may provide torque through lead screw assembly 102. The splined connection between nut 132 and slider arm 126 allows torque to transfer from lead screw spindle 120 into slider 104 while keeping axial travel between nut 132 and slider 104 independent. As such, this configuration allows nut 132 to compress the launch spring 136, thereby providing a smooth vehicle launch. In other words, the lead screw gear 120, 124 and, specifically the splined connection between nut 132 and arm 126, transfers torque from the lead screw gear 120, 124 into arm 126. More particularly, the reaction torque for the lead screw gear 120, 124 is grounded through arm 126 into the clockwork assembly 302 which is fixed to inner cover 42. When spindle 120, threads 124 and slider 104 translate axially. Buttons (e.g., plastic buttons) may be provided to provide a low friction interface for slider 104 to translate freely. As noted in FIG. 32, the arrow denotes the reaction force in arm 126 for a given input torque direction (see arrow).

Figure 34:
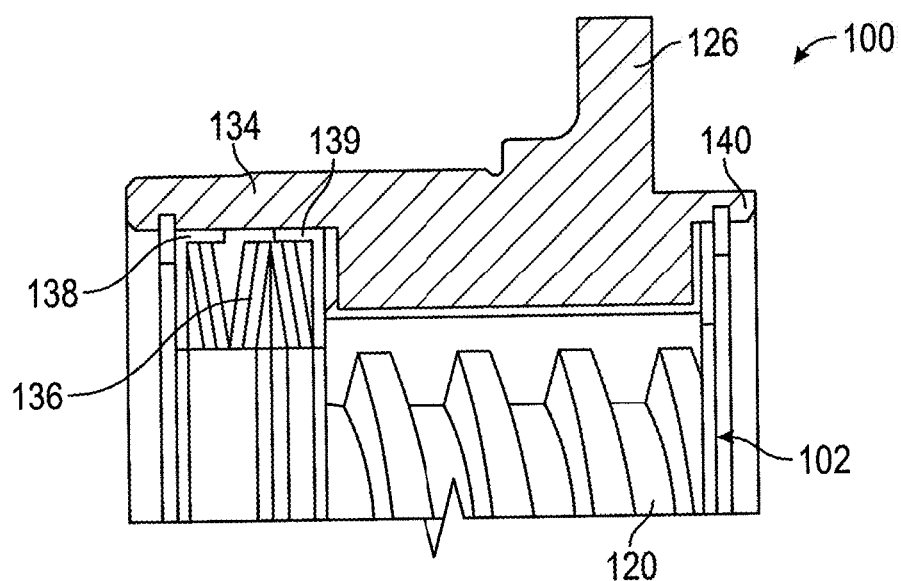
FIG. 34 is a cross-sectional view of the portion of the lead screw and slider assembly of FIG. 33 when the drive clutch is in an open position.
Figure 35:
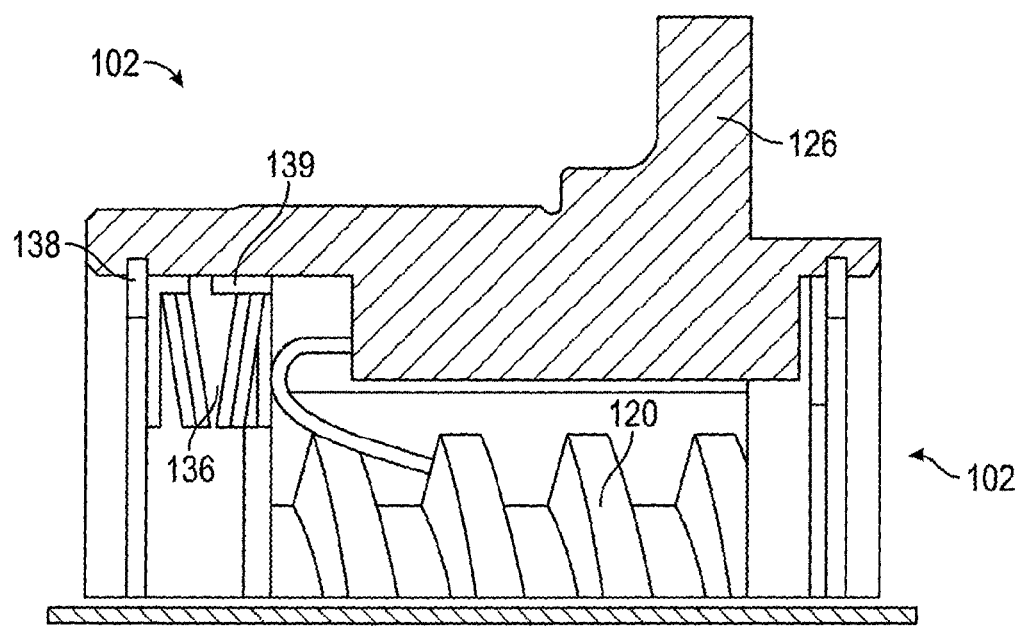
FIG. 35 is a cross-sectional view of the portion of the lead screw and slider assembly of FIG. 34; when the drive clutch is in a closed position.
Figure 36:
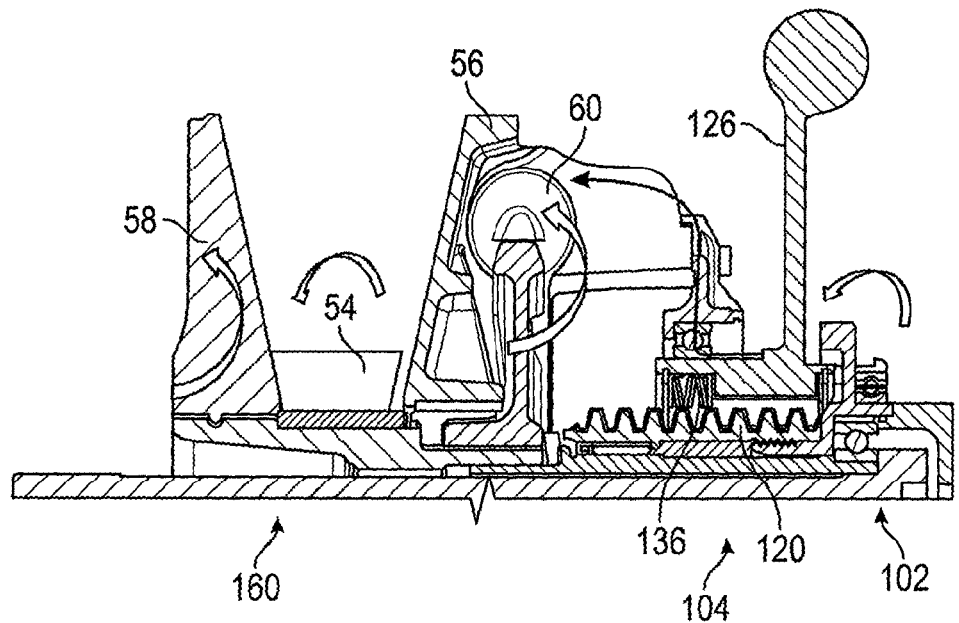
FIG. 36 is a cross-sectional view of the lead screw and slider assembly during operation of the CVT.
Figure 37:
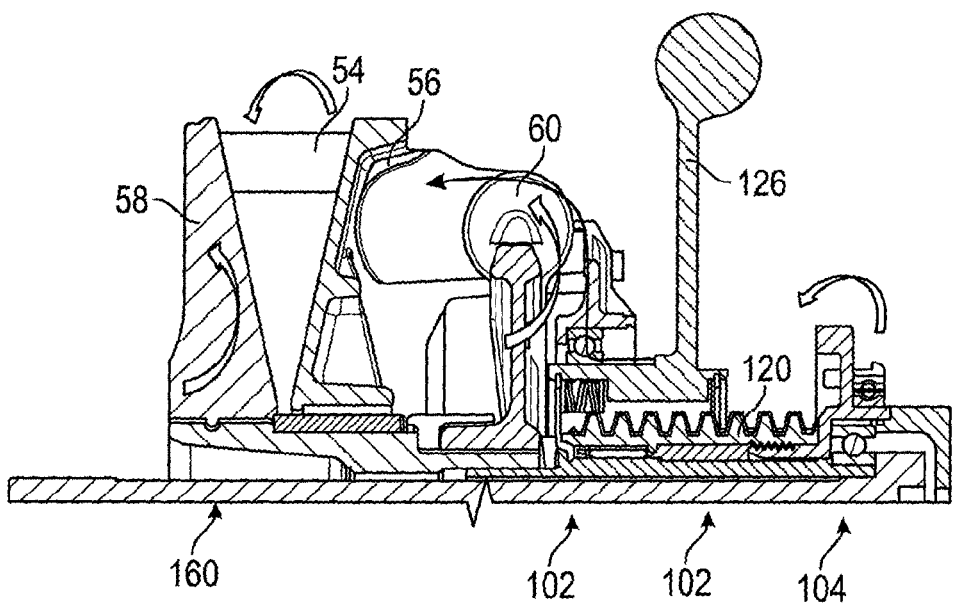
FIG. 37 is a further cross-sectional view of the lead screw and slider assembly during operation of the CVT.
Figure 38:
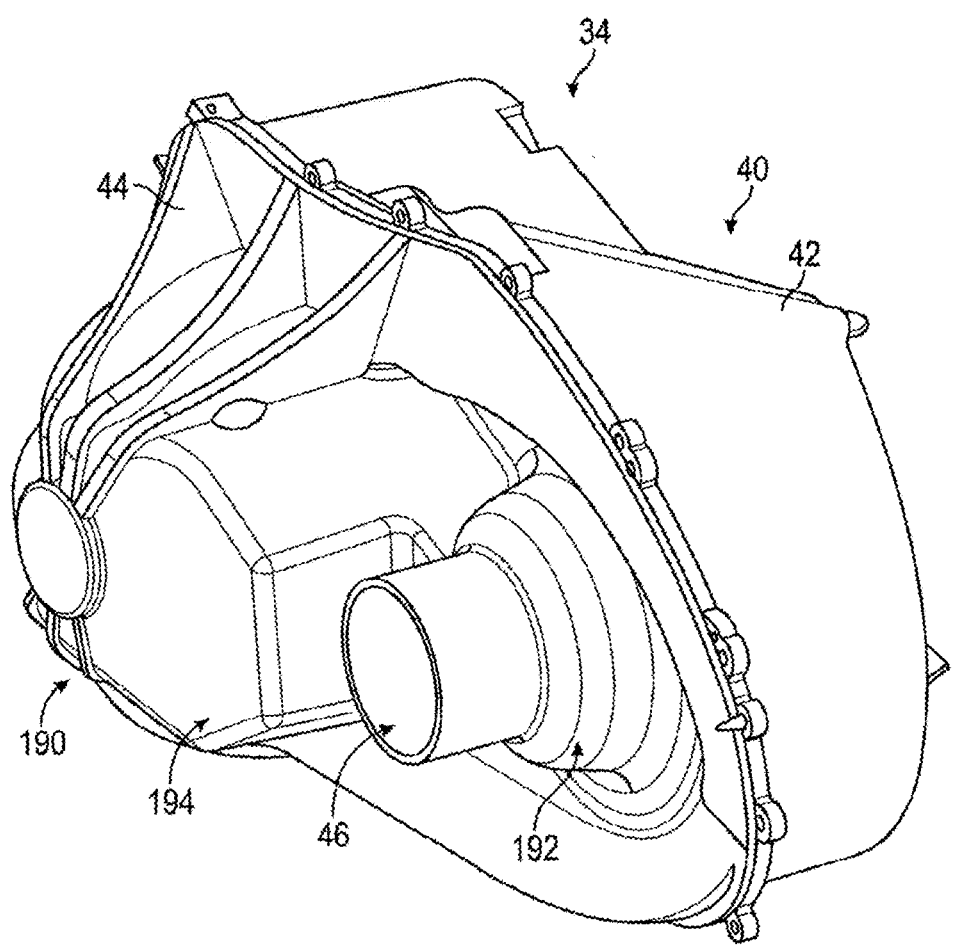
FIG. 38 is a rear left perspective view of the CVT of FIG. 3 and including an internal actuation assembly.
Figure 39:
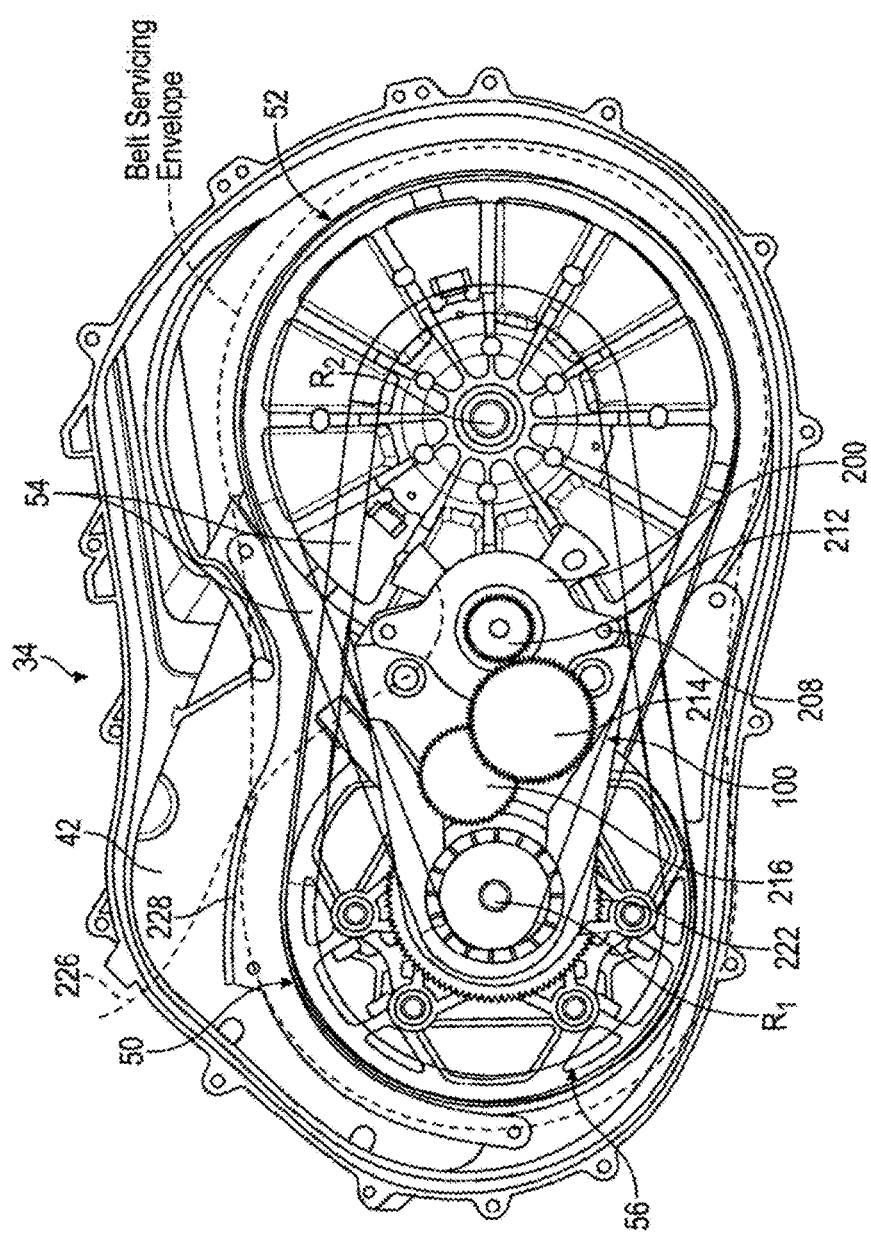
FIG. 39 is an elevational view of the CVT and the internal actuation assembly of FIG. 38.
Figure 40:
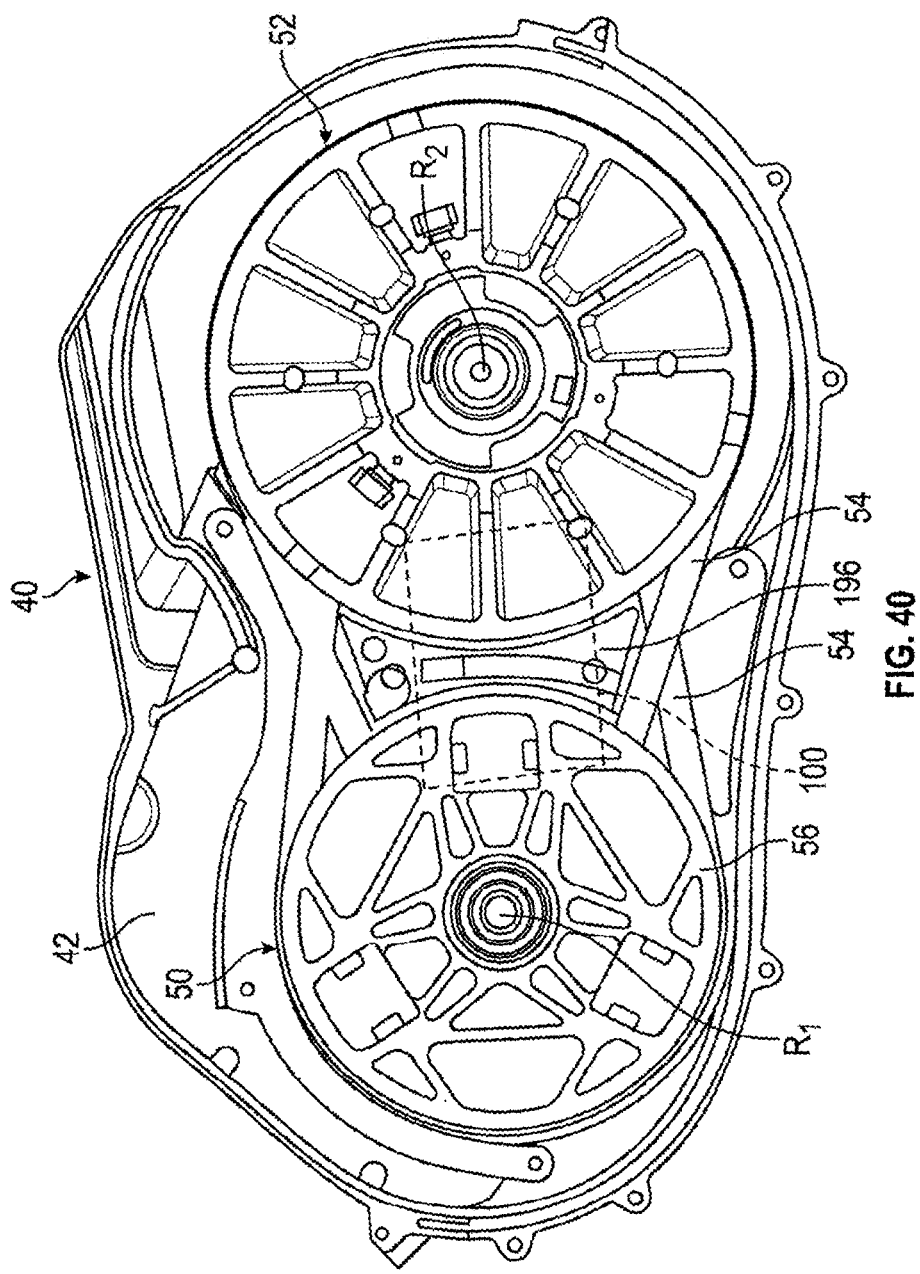
FIG. 40 is a further elevational view of the CVT and the internal actuation assembly of FIG. 39.
Figure 41:
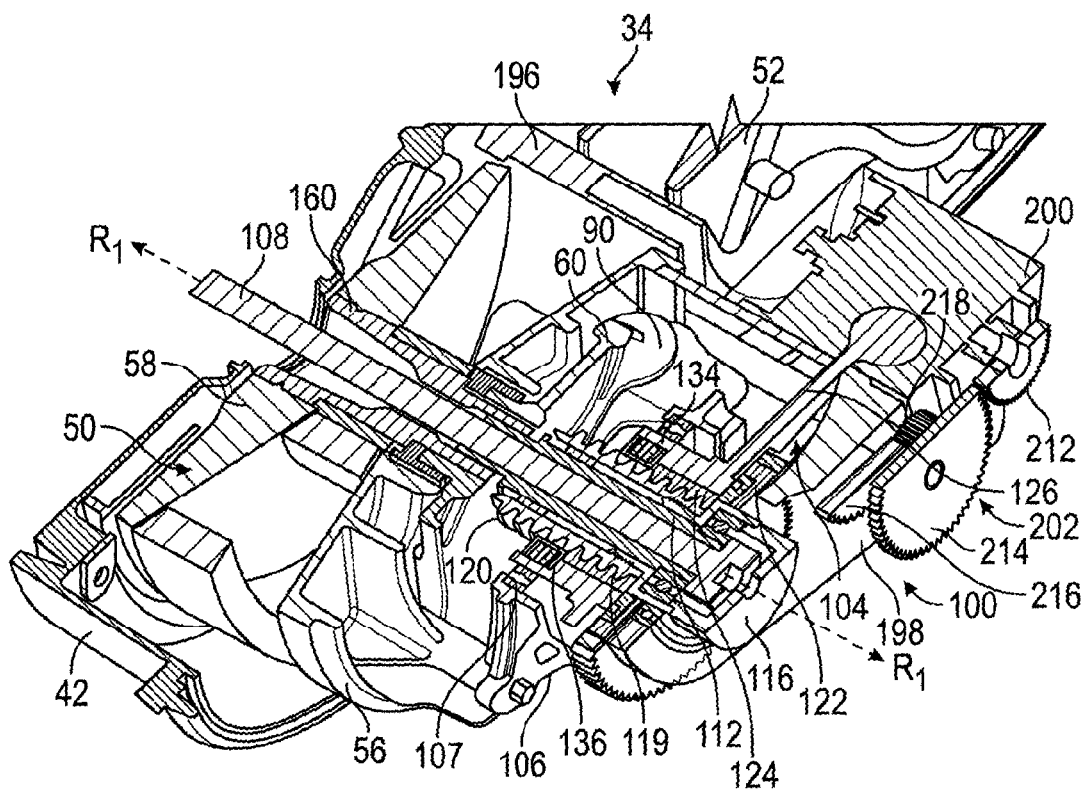
FIG. 41 is a cross-sectional view of the actuation assembly of FIG. 39.
Figure 42:
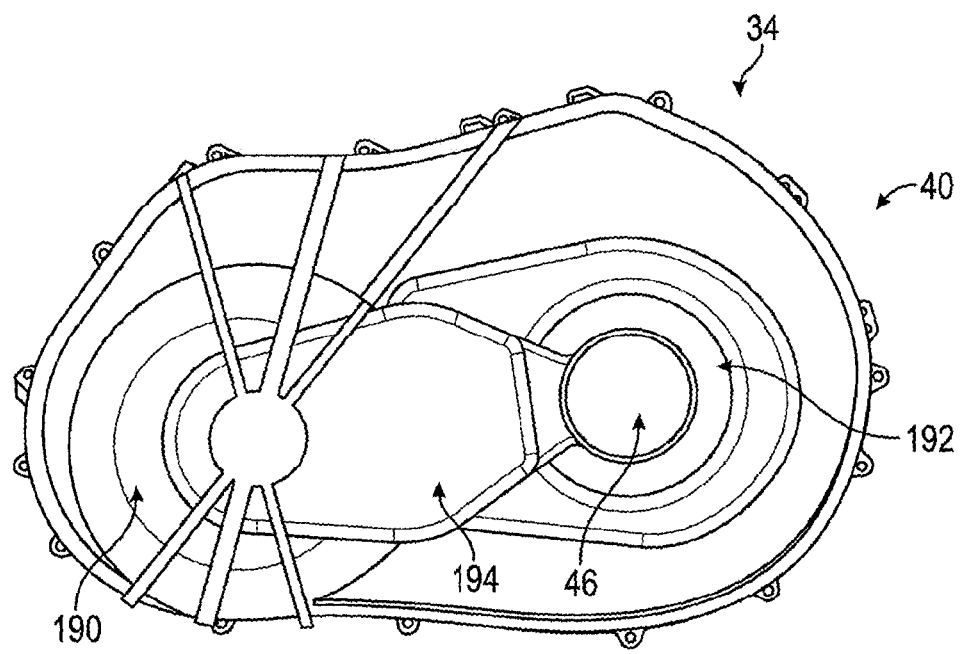
FIG. 42 is an elevational view of the housing of the CVT of FIG. 38.
Figure 43:
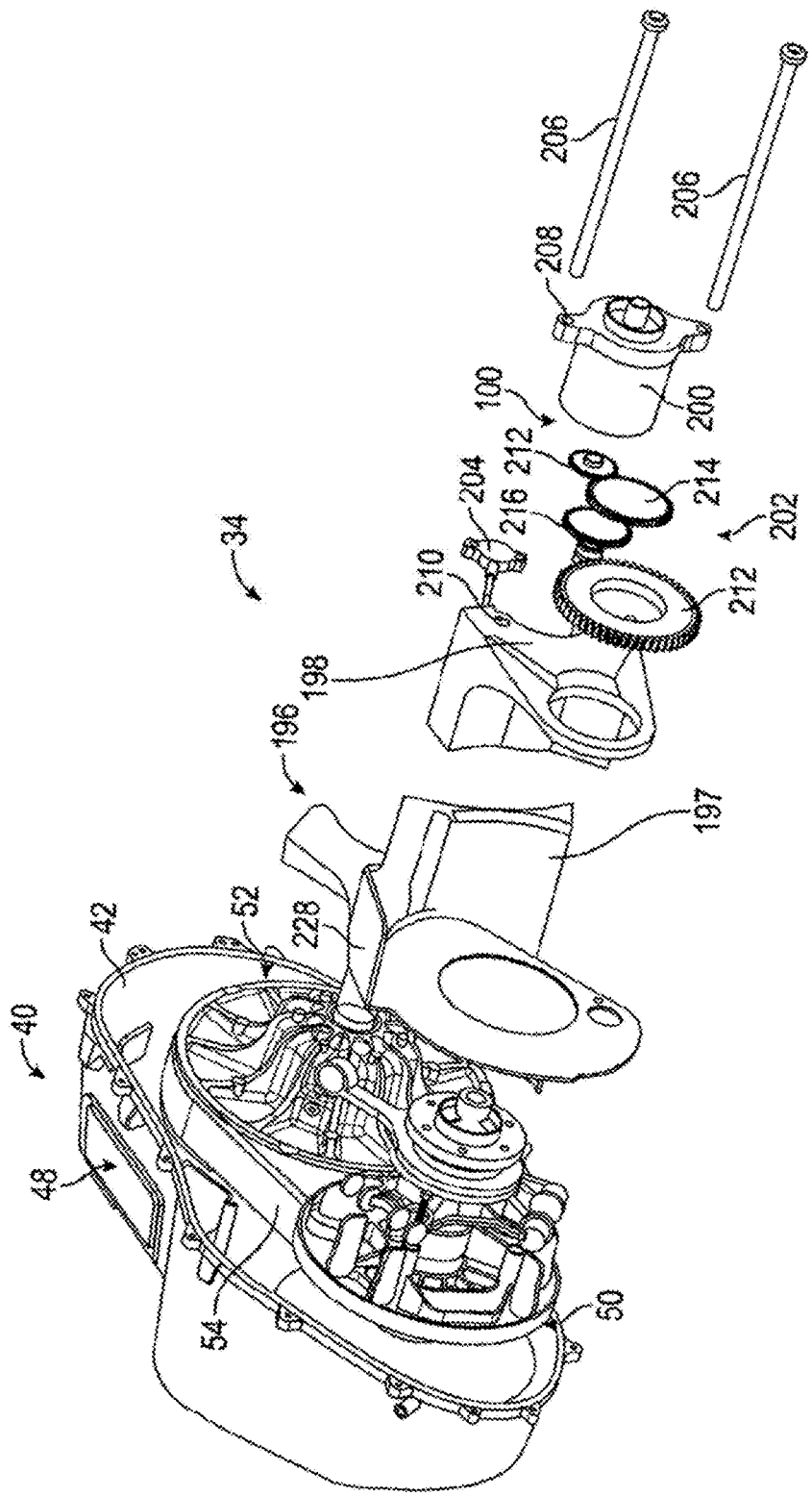
FIG. 43 is an exploded view of the internal actuation assembly of FIG. 39.
Figure 44:
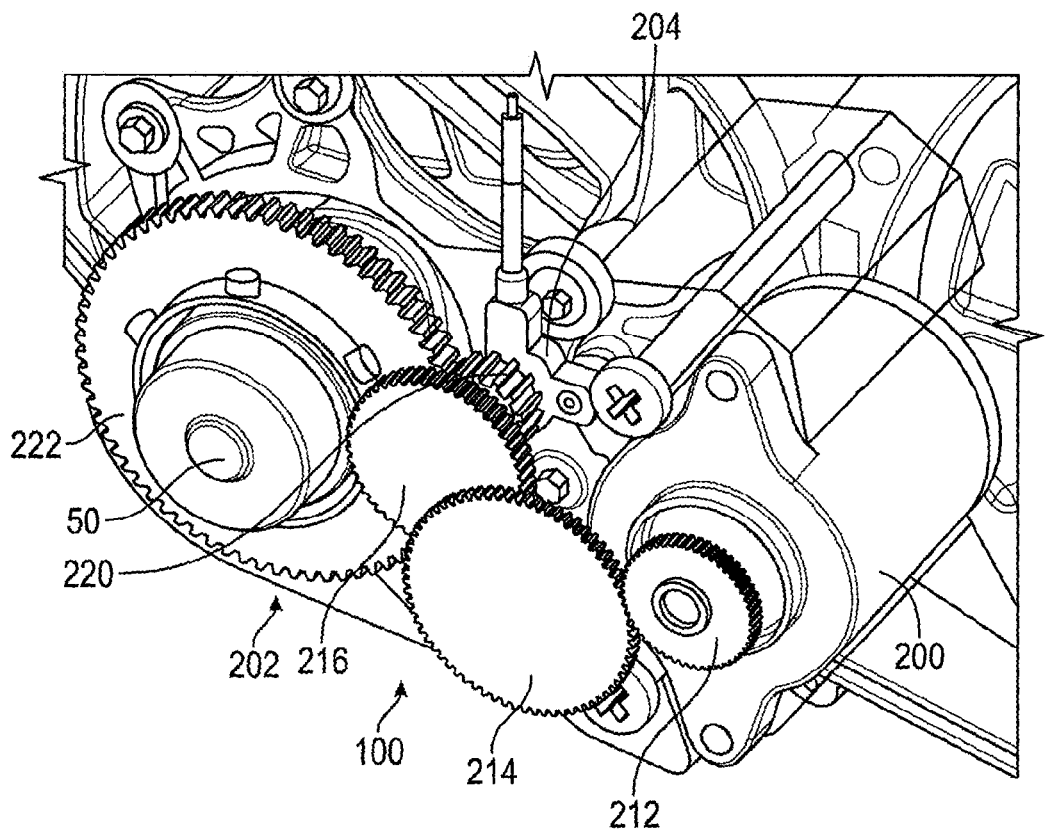
FIG. 44 is a rear left perspective view of the actuation assembly of FIG. 39.

Upon starting operation of CVT 34, if drive clutch 50 is in the open position (i.e., moveable sheave 56 is spaced apart from belt 54, as shown in FIG. 36), when engine 32 is operating, engine 32 drives fixed sheave 58 and spider 60. During rotation of fixed sheave 58 and spider 60, motor 200 transfers torque through the gearset of clockwork assembly 302 into lead screw hub 122 through a splined connection. The rotation of spindle 120 into the grounded threads 124 of nut 132 generates axial motion of nut 132 inwardly. The splined connection between nut 132 and slider 104 allows nut 132 to travel independently of slider 104 in order to compress spring 136. As nut 132 moves axially inward, the axial motion pushes nut 132 against retainer plate 139 to compress spring 136. However, before spring 136 becomes solid (i.e., spring 136 does not have any compression available), retainer plate 139 contacts retainer plate 138 to prevent further axial motion of nut 132. More particularly, as shown in FIGS. 34 and 36, spring 136 is preloaded to prevent rattling and provide consistent load points. As shown in FIGS. 35 and 37, in a full-stroke force path, retainer plates 138, 139 are in contact with each other to avoid spring 136 becoming solid. When retainer plate 139 is in contact with retainer plate 138, force is transferred through slider 60 into bearing 107 of spider cover 106 which causes axial motion of moveable sheave 56. Moveable sheave 56 moves axially and makes contact with belt 54. Once belt 54 is clamped, torque from friction starts spinning belt 54. FIGS. 34-37 show the assembled force path during operation of CVT 34.

Referring to FIG. 37, the axial force and torque transfer path is shown when CVT 34 is in a closed position (i.e., drive clutch 50 is in a closed position where moveable sheave 56 is in contact with belt 54).

Referring still to FIGS. 28-37, a press fit between bearing 107, spider cover 106, and slider 104 allows actuation assembly 100 to bring moveable sheave 56 back to the home position, as shown therein. This provides proper belt clearance which prevents vehicle creep. A pin stop feature 140, shown in FIG. 34 as the interface between nut 132 and lead screw hub 122, provides a rotational hard stop for slider 60 relative to lead screw 102, limiting the outboard axial position of lead screw 102. Pin stop feature 140 provides a home position, which allows motor 200 to learn the full axial travel.

As shown best in FIGS. 38-47, actuation assembly 100 may be internally mounted within housing 40. More particularly, outer cover 44 includes a nose portion 190 configured to receive at least a portion of moveable sheave 56 of drive clutch 50. Inlet port 46 is positioned adjacent a driven clutch portion 192 of outer cover 44. Outer cover 44 further includes an actuation portion 194 configured to receive actuation assembly 100. Referring to FIGS. 38-42, illustratively, actuation portion 194 is positioned intermediate nose portion 190 and driven clutch portion 192 such that actuation assembly 100 is positioned intermediate axis of rotation $R_1$ of drive clutch 50 and axis of rotation $R_2$ of driven clutch 52. It may be apparent that actuation assembly 100 is positioned within the envelope of belt 54 between drive and driven clutches 50, 52 such that irrespective of the positions of belt 54 shown in FIG. 32, actuation assembly 100 is generally positioned above a lower run of belt 54 and is generally positioned below an upper run of belt 54. In this position, actuation assembly 100 may overlap a portion of drive and driven clutches 50, 52 but is positioned axially outward of clutches 50, 52 so as to not interfere with movement of clutches 50, 52. By packaging actuation assembly 100 within the envelope of belt 54, serviceability is improved when belt 54 needs to be replaced (see the belt servicing envelope of FIG. 39 defining the space needed to service and/or replace belt 54). Additionally, this compact arrangement allows CVT 34 to more easily fit within compact areas of vehicle 2. Further, this internal mounting of actuation assembly 100 may facilitate cooling of actuation assembly 100 because the cooling air flowing into housing 40 to cool clutches 50, 52 and belt 54 also cools actuation assembly 100.

Actuation assembly 100 is supported within housing 40 by a support plate 196 positioned intermediate drive and driven clutches 50, 52. Actuation assembly 100 may be defined as the actuation assembly 100 for drive clutch 50 which includes both lead screw assembly 102 and slider assembly 101 and is supported on crankshaft 36. Alternatively or additionally, actuation assembly 100 may be defined as or further include motor 200 and clockwork assembly 302 which are supported by supported structure 196 (e.g., tower 196). Support plate 196 is supported on inner cover 42 and may be positioned axially inward of drive and driven clutches 50, 52 but extends axially outward to couple with a motor mount 198. More particularly, support plate 196 includes a post 197 configured to receive a portion of motor mount 198. Support plate 196 and the corresponding portion of motor mount 198 are positioned intermediate clutches 50, 52.

Actuation assembly 100 of FIGS. 38-47 is comprised of electric motor 200, a clockwork mechanism 202, and a position sensor 204. Motor 200 is mounted to motor mount 198 through conventional couplers, such as bolts 206 which extend through bores 208 of motor 200 and into bores 210 of motor mount 198. Clockwork mechanism 202 includes a plurality of gears including a first gear 212 operably coupled to motor 200, a second gear 214 configured to mesh with first gear 212, a threaded post 218 of second gear 214 configured to mesh with a third gear 216, a fourth gear 220 positioned axially inward of third gear 216, and a fifth gear 222 configured to mesh with fourth gear 220. Fifth gear 222 is coupled to drive clutch 50 through a splined connection with lead screw hub 122. In this way, when motor 200 initiates rotational motion of first gear, the motion ultimately provides rotation to fifth gear 222, thereby providing rotational motion to drive clutch 50, as disclosed further herein.

Figure 46:
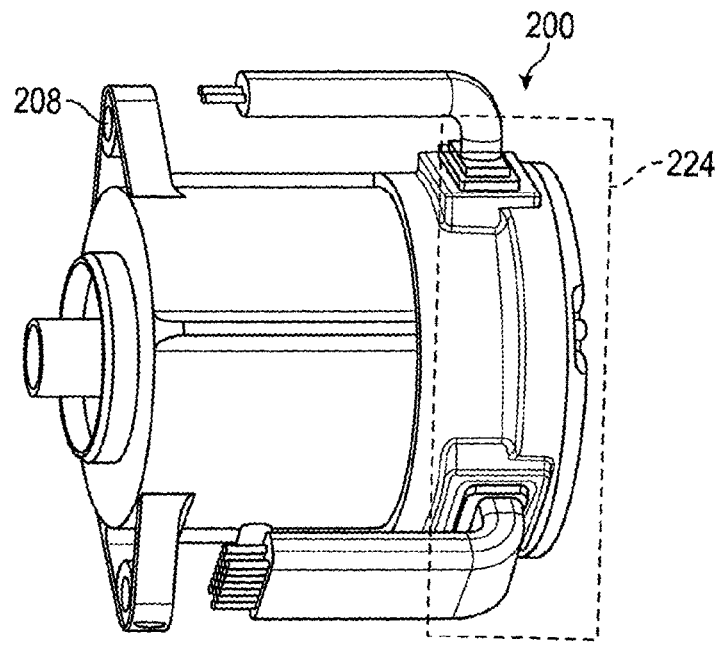
FIG. 46 is a perspective view of an electric motor of the actuation assembly of FIG. 39.
Figure 47:
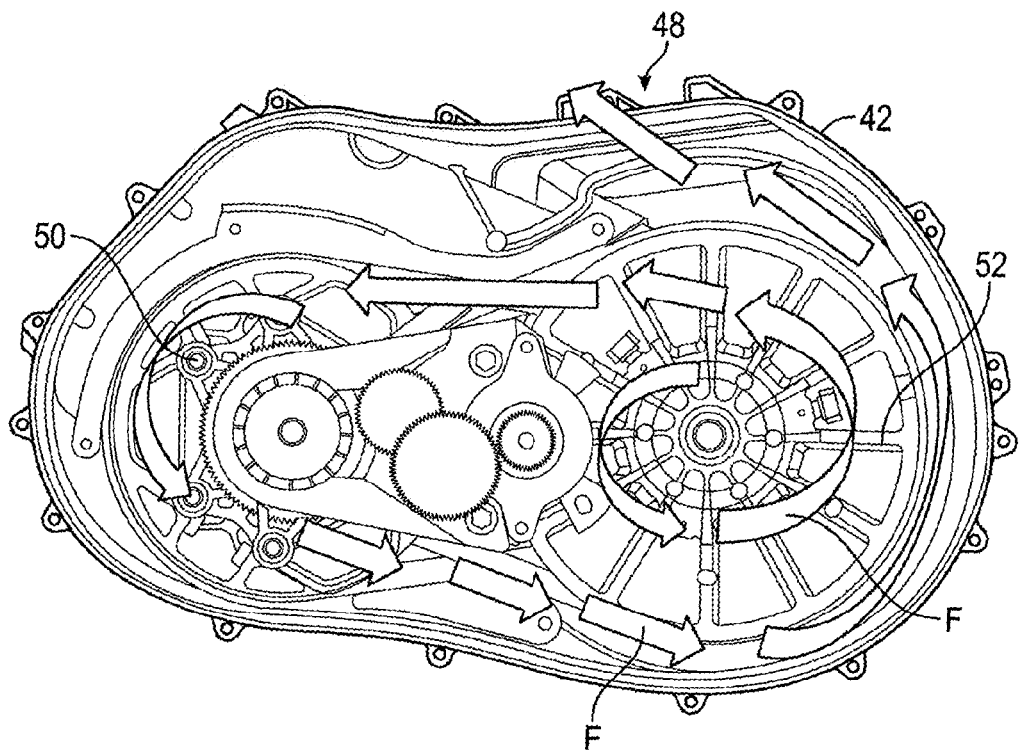
FIG. 47 is an elevational view of the CVT and the internal actuation assembly of FIG. 39 and showing an air flow path through the housing of the CVT.
Figure 48:
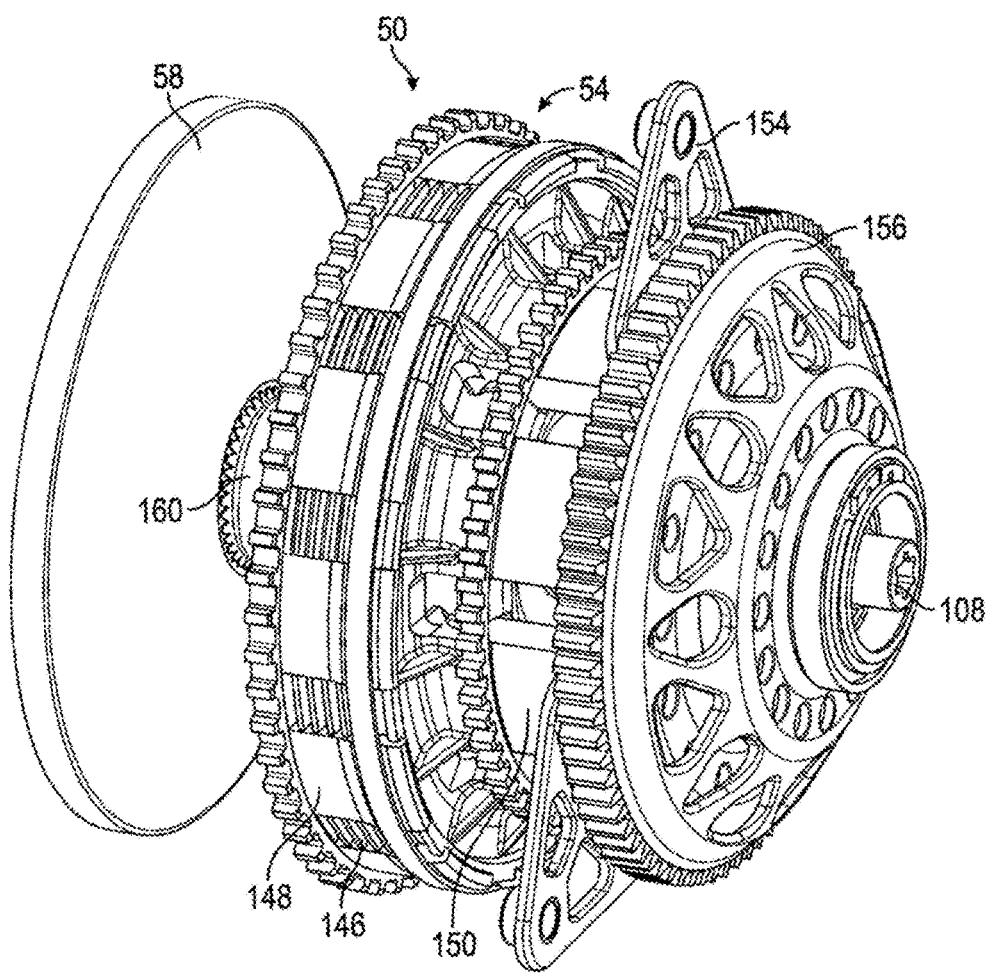
FIG. 48 is a front left perspective view of a drive clutch of the CVT of FIG. 3 and including a dual or nested spider configuration.

With respect to FIG. 46, electric motor 200 is shown in more detail. Motor 200 and all associated power electronics and transmission control unit ("TCU") 284 (FIGS. 58 and 58A) are packaged within housing 40 which allows for a reduction in the number of components and the overall size of actuation assembly 100 and also reduces the amount of wiring integration needed with other components of vehicle 2. More particularly, the housing of motor 200 includes an electronics portion 224 which supports and houses various electrical connections and wires for motor 200 and also supports the TCU. Illustratively, motor 200 is electronically coupled to the vehicle harness of vehicle 2 through a wire or cable 226 which is positioned within housing 40 and extends over a portion of drive clutch 50. The wiring path for wire 226 extends within inner cover 42 through a bulkhead connector or grommet and along inner cover 42 under belt 54 and through a post or channel to lead wire connectors at motor 200 and position sensor 204. Within inner cover 42, wire 226 may be positioned on a tab or shelf 228 of support plate 196.

With respect to FIGS. 39-43, position sensor 204 may be a rotational sensor configured to track the position of moveable sheave 56 through rotation of a gear within clockwork mechanism 202 (e.g., tooth count or magnet rotation). Position sensor 204 also may be a linear sensor configured to determine the linear distance between lead screw 102 and slider 104 relative to position sensor 204. Position sensor 204 also may be configured as a speed sensor or a speed sensor may be provided with position sensor 204 to determine the rotational speed of either drive clutch 50 and/or driven clutch 52.

Figure 45:
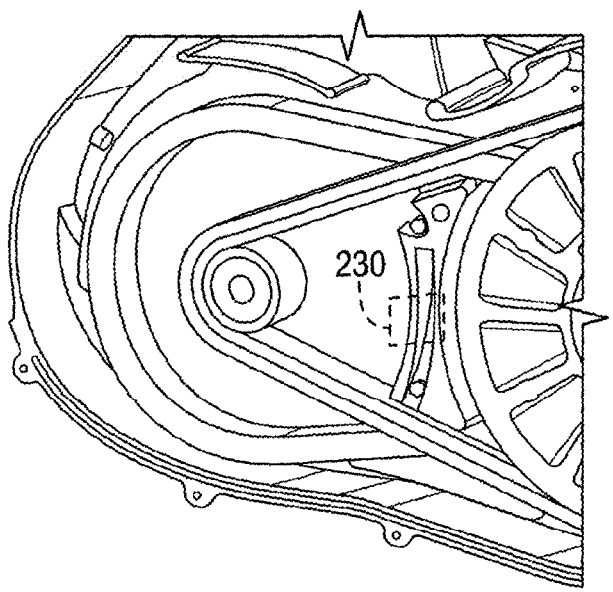
FIG. 45 is a rear left perspective view of a location of a sensor of the actuation assembly of FIG. 39.

Additionally, at least one temperature sensor 230 may be included on CVT 34 to monitor the temperature of various components within housing 40 (e.g., belt 54, clutches 50, 52, motor 200, etc.), as shown in FIG. 45. In order to reduce the temperature within housing 40 experienced by these various components, the air flow path for cooling air introduced into housing 40 may be intentionally configured to position at least motor 200 within the air path. More particularly, the cooling air flow is shown with arrows F, where the air flows into housing 40 adjacent driven clutch 52 through inlet port 46 (FIG. 47) and rotates about driven clutch 52 before flowing towards drive clutch 50 along the upper run of belt 54. Therefore, the cooling air cools driven clutch 52 and a portion of belt 54. The cooling air flowing along the upper run of belt 54 flows about drive clutch 50 to cool drive clutch 50. From drive clutch 50, the cooling air flow over actuation assembly 100 and adjacent the lower run of belt 54. In this way, both belt 54 and actuation assembly 100 are within the cooling air flow path F. From actuation assembly 100, the cooling air flows about driven clutch 52 and exits housing 40 through air outlet port 48.

Referring now to FIGS. 48-54C, drive clutch 50 may further include a dual spider configuration and a launch clutch. More particularly, when CVT 34 is electronically controlled or operated and belt 54 is a rubber belt, where CVT 34 includes a launch clutch which is simultaneously driven with belt 54 by actuation assembly 100. Drive clutch 50 includes a dual or nested spider assembly which gives low friction and low backlash (to decrease noise and increase durability) while allowing moveable sheave 56 to translate to effect the ratio change. In this way, the dual or nested spider assembly ensures a compact configuration for an electronically-controlled, rubber-belt CVT and operates both a launch clutch and causes the CVT ratio change with the same actuation assembly.

As disclosed further herein, the dual or nested spider assembly is configured for sliding movement along an interface. The interface may be comprised of plastic such that the metallic material (e.g., aluminum). As may be apparent, with this configuration, there is no translation of splines and, instead, the splines only handle the torque transfer. The sliding motion happens only between the plastic interface and the metallic (e.g., aluminum) components of the dual spider assembly. The dual spider configuration allows for application of a launch clutch before affecting CVT belt ratio changes. Clamping and actuation loads are self-contained and there are no external loads applied to the mating components.

Illustratively, drive clutch 50 is comprised of the dual spider assembly, which includes a first or input spider 142, a secondary spider 144, a plurality of clutch plates 146, a clutch basket 148, a clutch carrier 150, a retaining ring 152, a lead screw carrier 154, an actuator gear 156, and a retaining ring 158. Secondary spider 144 is configured to receive a portion of input shaft 160 and extends through a central opening of clutch basket 148. Clutch basket 148 also receives clutch plates 146 which are positioned radially outward of secondary spider 144. First spider 142 abuts secondary spider 144 is positioned axially outward of secondary spider 144. First spider 142 is received within a portion of clutch carrier 150. Retaining ring 152 abuts a flange 162 of clutch carrier 150. Both lead screw carrier 154 and actuator gear 156 are positioned axially outward of clutch carrier 150. More particularly, lead screw carrier 154 abuts an axially outer surface of clutch carrier 150. Actuator gear 156 is positioned axially outward of lead screw carrier 154. Clutch retaining bolt 108 is received through retaining ring, actuator gear 156, lead screw carrier 154, clutch carrier 150, clutch plates 146, first spider 142, secondary spider 144, clutch basket 148, and fixed sheave 58, and extends through input shaft 160.

As shown best in FIG. 52, first spider 142 includes a body portion 142a and extensions or pucks 142b. Extensions 142b may be comprised of plastic. Body portion 142a includes a splined central opening 164. Clutch carrier 150 includes internal grooves or recesses 166 configured to receive extensions 142b such that first spider 142 nests within clutch carrier 150. Splined central opening 164 is configured to receive a splined portion of input shaft 160 such that first spider 142 is configured to rotate with input shaft 160.

With respect to FIG. 53, secondary spider 144 includes a body portion 144a and extensions or pucks 144b. Extensions 144b may be comprised of plastic. Body portion 144a includes external splines 170 on the axially-inward extent thereof which are configured to mesh with internal splines 172 on fixed sheave 58 such that fixed sheave 58 is fixed with secondary spider 144. Clutch basket 148 includes axially-extending posts 174 which define a recess 176 therebetween. Recesses 176 are configured to receive extensions 144b of secondary spider 144 such that a portion of secondary spider 144 nests within a portion of clutch basket 148. Clutch basket 148 also includes axially-extending walls 178 which are configured to receive clutch plates 146 (FIG. 49) at a position radially outward of extensions 144b.

Figure 49:
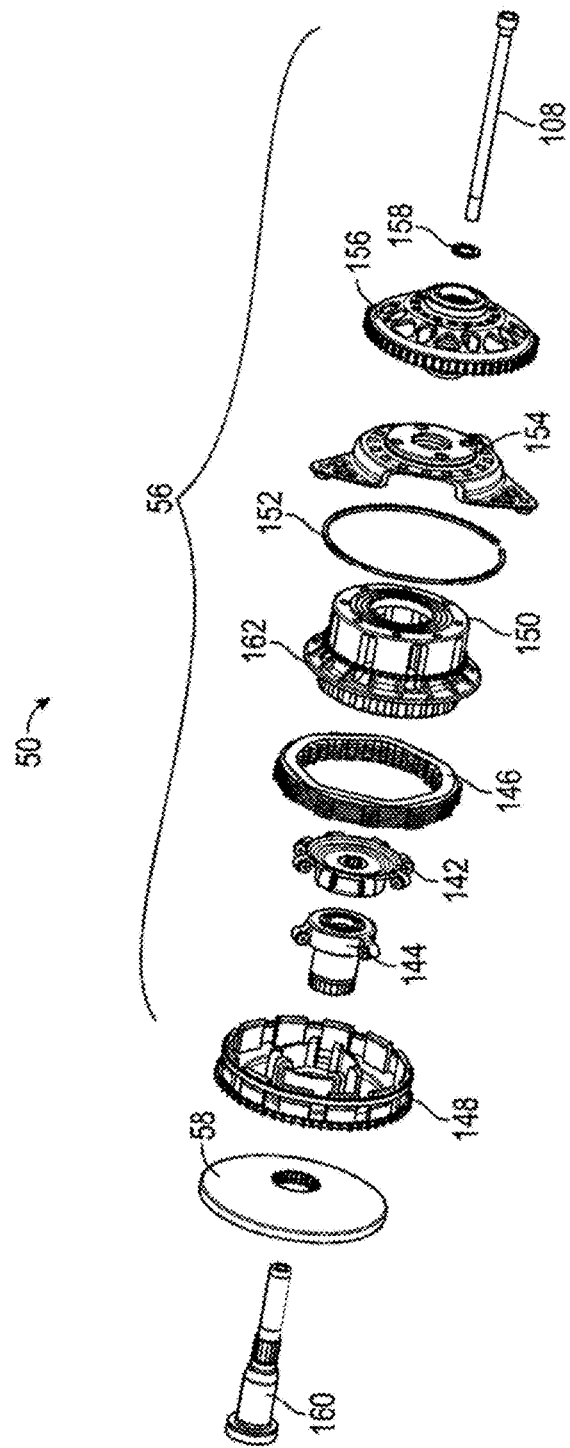
FIG. 49 is an exploded view of the dual spider configuration of FIG. 48.
Figure 51A:
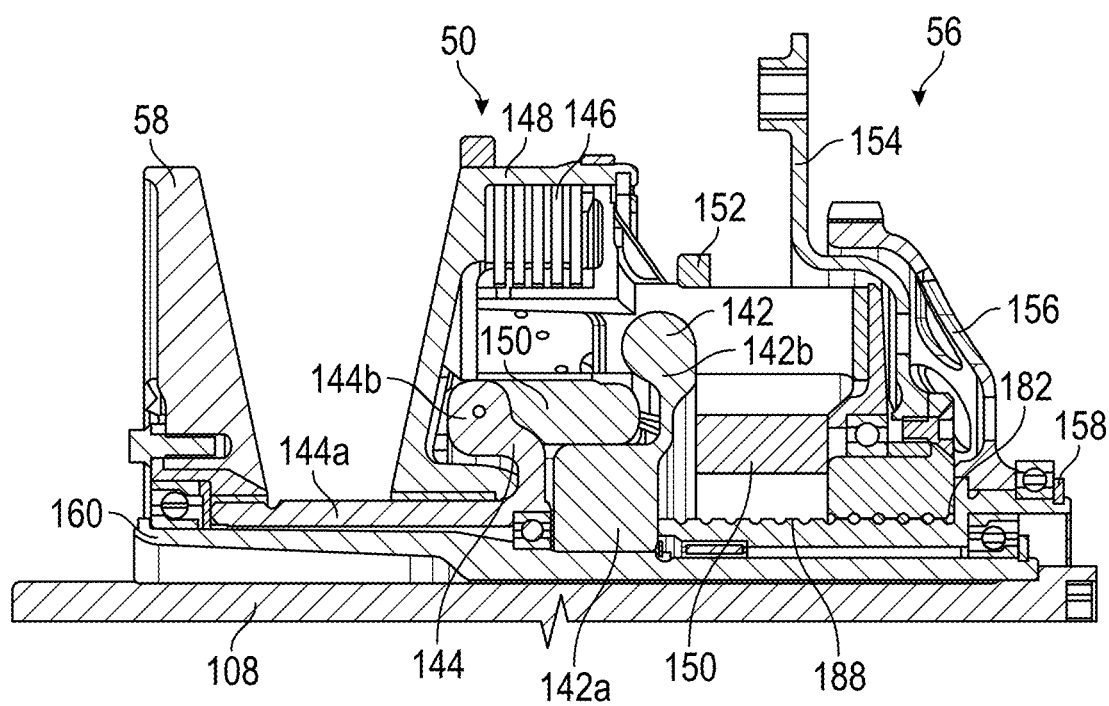
FIG. 51A is a cross-sectional view of a portion of the drive clutch of FIG. 48.
Figure 51B:
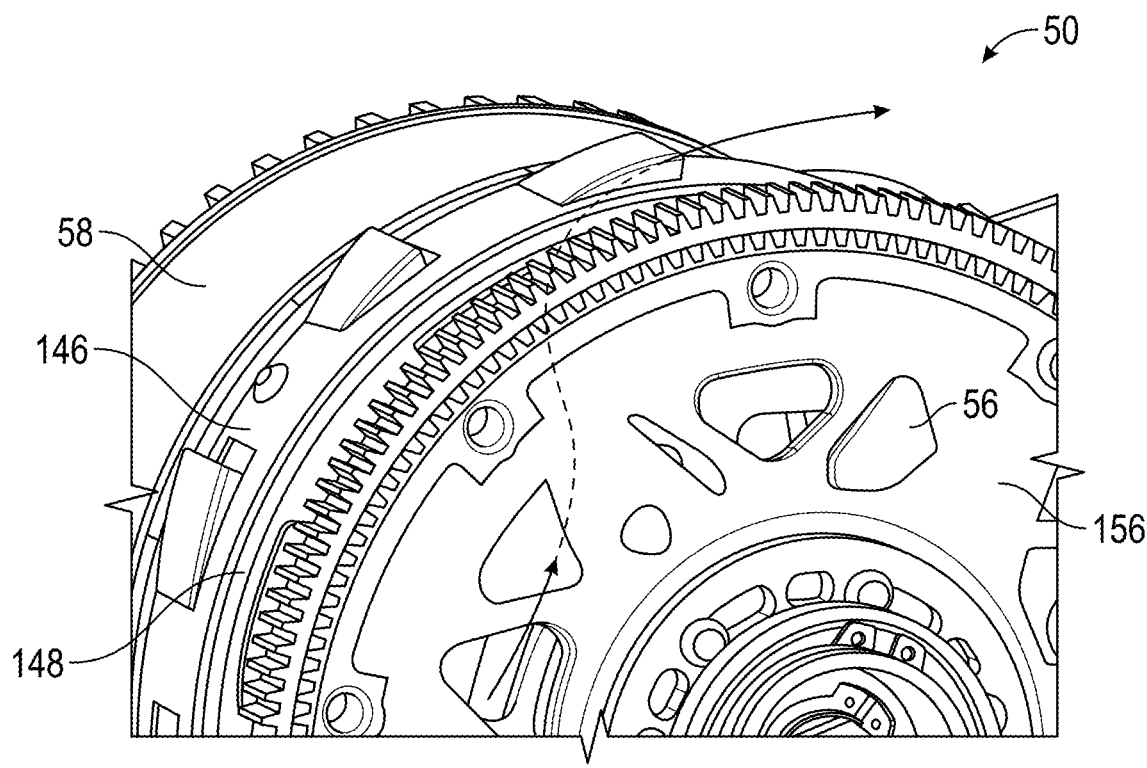
FIG. 51B is a perspective view of the portion of the drive clutch of FIG. 51A.

As shown best in FIGS. 51A-52, carrier 150 includes channels or pockets 314 integrally formed therein for use as a centrifugal pump to bring air into the clutch chamber and increase cooling within housing 40. More particularly, channels 314 may be cast with carrier 150 and include an air inlet passage defined by an inlet (e.g., a hole) 316 and an outlet 318. Inlet 316 and outlet 318 are axially aligned along an entire axial length of channel 314 and are positioned below a recess 320 configured to receive clutch plates 146 of drive clutch 50. In this way, as shown by the direction of arrows in FIG. 51, air within housing 40 enters inlet 316 and flows along channel 314 towards outlet 318. At outlet 318, the air travels upwardly towards and through clutch plates 146 to provide cooling thereto and ultimately exits drive clutch 50 into housing 40 at a position above clutch plates 146. As shown in FIG. 49, clutch plates 146 have radial grooves 322 for the air to exit into housing 40.

It may be appreciated that, because clutch plates 146 are on a larger outer diameter radius than channel 314, specifically inlet 316, the surface speed is greater on this larger outer diameter (defined by recess 320). This assists in creating a centripetal pump for air to flow into inlet 316. As such, by using different radii on a rotating mechanism, air is routed into and out of drive clutch 50 without the use of external pumps.

With respect to FIGS. 52A-53B, an embodiment of drive clutch 50 may include deformable, pre-loaded pins 330 with rollers 332. More particularly, various prior art embodiments of a CVT may use a spider and plastic drive pucks or rollers to transfer torque while allowing axial sliding motion. If any clearance develops between the aluminum slots and rollers/pucks, the CVT may develop a noise from the impact. However, with respect to the embodiment of FIGS. 52A-53B, the fixed rollers/pucks may be replaced with pins 330 with rollers 332, which may be isolated with a rubber material or a similar material.

Figure 53A:
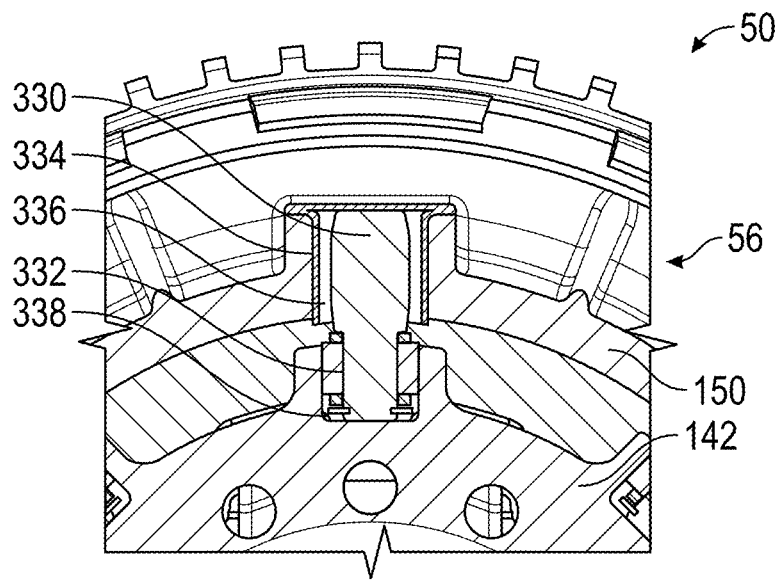
FIG. 53A is a side view of a portion of the drive clutch of FIG. 52A.
Figure 53B:
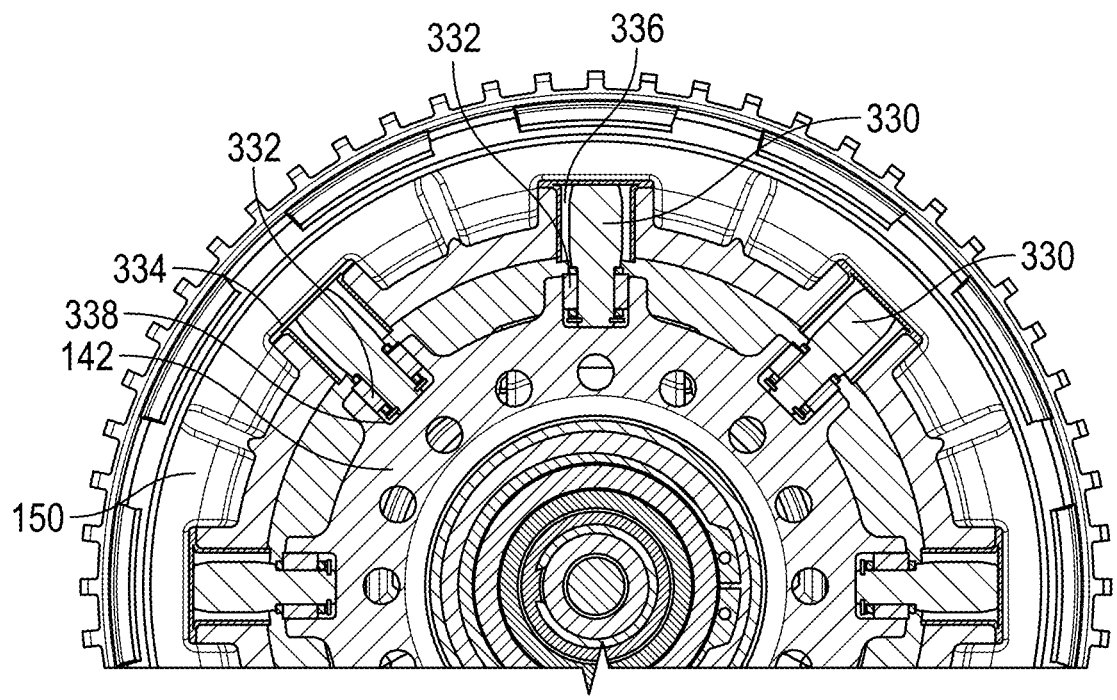
FIG. 53B is a further side view of a portion of the drive clutch of FIG. 52A.

More particularly, and as shown best in FIGS. 53A and 53B, pin 330 is positioned within an outer sleeve 334 which also supports a bushing 336. In one embodiment, bushing 336 is comprised of rubber or a similar material. Illustratively, pin 330 is positioned inwardly of bushing 336 and outer sleeve 334. Outer sleeve 334 is supported by a portion of carrier 150 or may an integral portion of carrier 150. Outer sleeve 334 may be comprised of a metallic material. Pin 330 extends radially within carrier 150 and extends radially inward from outer sleeve 336 to couple with roller 332. In various embodiments, roller 332 may be a spherical roller positioned within a portion 338 of input spider 142. Roller 332 may be supported on input spider 142 through an interference fit.

Bushing 336 isolates small torque oscillations from reaching the downstream components of drive clutch 50. In various embodiments, drive clutch 50 includes a plurality of pins 330 and rollers 332. Rollers 332 may be preloaded by machining the bores at portion 338 of input spider 142 with a predetermined offset to minimize or eliminate clearance, reduce noise, and increase durability with respect to impact forces. The configuration of FIGS. 52A-53B with pins 330 may reduce torque peaks from combustion engines or torque ripples from electric propulsion motors.

Figure 54A:
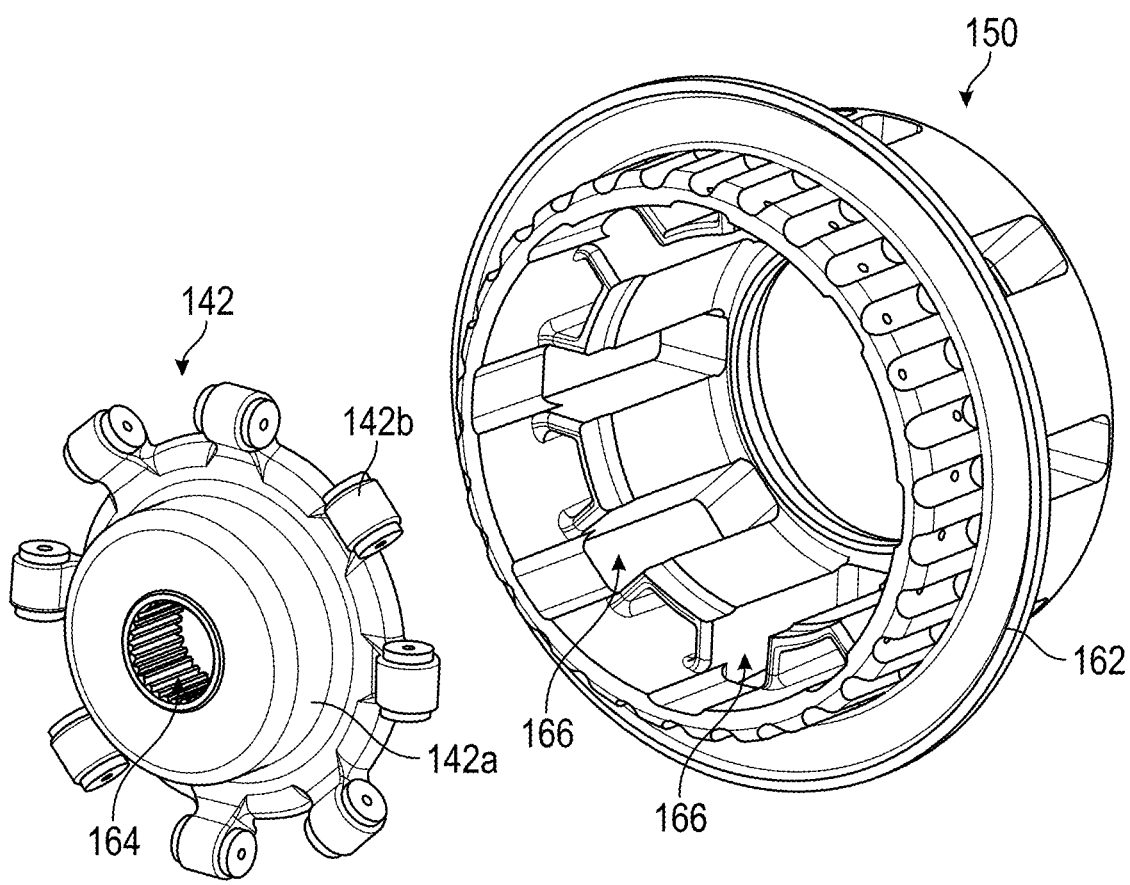
FIG. 54A is an exploded view of a portion of the dual spider configuration of FIG. 48.
Figure 54B:
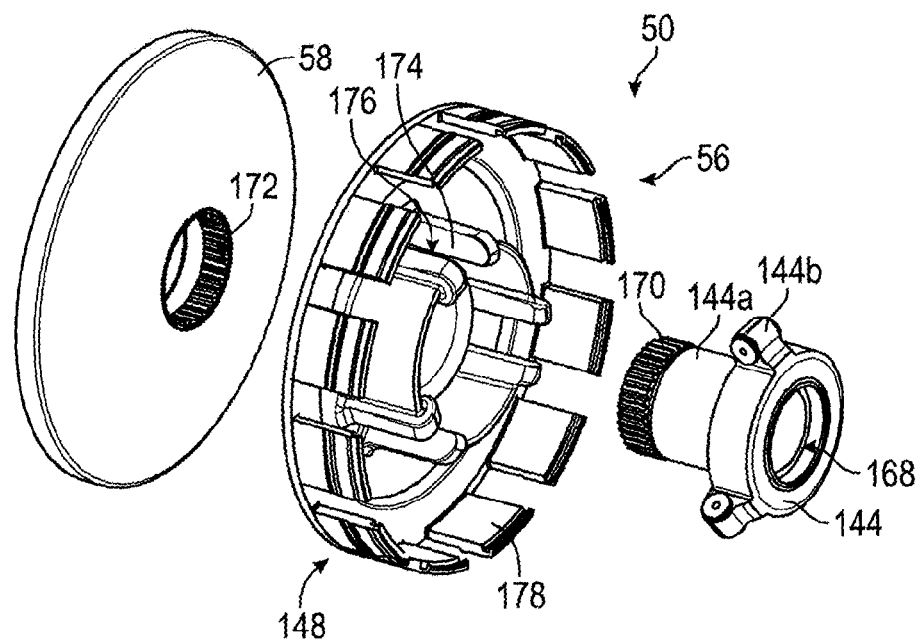
FIG. 54B is an exploded view of another portion of the dual spider configuration of FIG. 48.
Figure 54C:
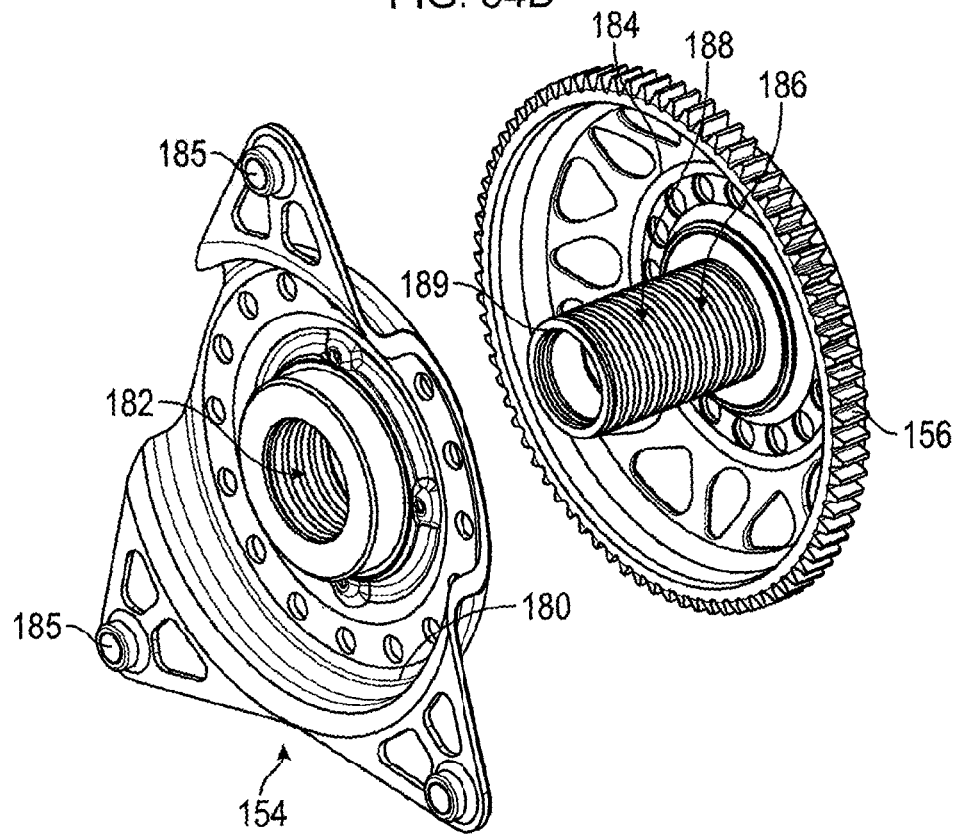
FIG. 54C is an exploded view of a further portion of the dual spider configuration of FIG. 48.

Referring to FIG. 54C, the coupling between actuator gear 156 and lead screw carrier 154 is shown. Lead screw carrier 154 includes a body portion 180 and a central opening having internal splines 182. Lead screw carrier 154 further includes guide rails 185 which grounds carrier 154 with a fixed object (e.g., the CVT housing) and allows for translational movement along axis of rotation $R_1$ (FIG. 2). Actuator gear 156 includes a body portion 184 and an axially-extending lead screw or post 186. Lead screw 186 includes external threads 188. Lead screw 186 is configured to be received through the central opening of lead screw carrier 154 and splines 182 and threads 188 are meshed together. Post 189 truncates at a distal end 189 which abuts first spider 142. When lead screw 186 rotates, lead screw carrier 154 translates axially on guide rails 185.

Figure 50:
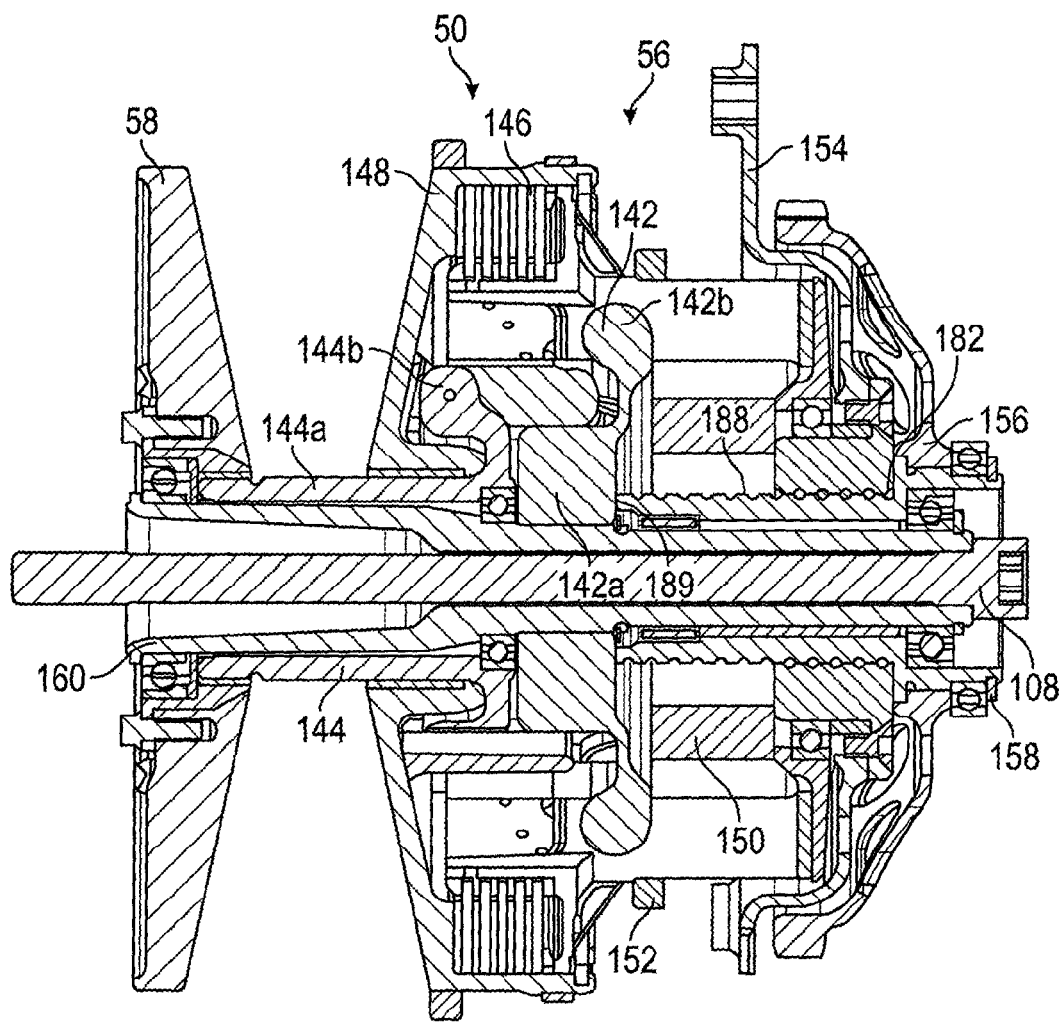
FIG. 50 is a cross-sectional view of the drive clutch of FIG. 48.

During operation of CVT 34 having the dual spider configuration of FIGS. 48-54C, and referring to FIGS. 50 and 51A, when engine 32 is operating, engine 32 drives first spider 142. First spider 142 is locked to clutch carrier 150 through extensions 142b and grooves 166. An actuator begins to turn actuator gear 156. The rotation of actuator gear 156 generates axial motion of clutch carrier 150. The axial motion pushes through a bearing on clutch carrier 150 to transfer the load to clutch plates 146. Once clutch plates 146 are loaded, torque (from friction) starts rotating clutch basket 148. Secondary spider 144 is connected to clutch basket 148 through extensions 144b and recesses 176. Secondary spider 144 also is connected to fixed sheave 58 through splines 170, 172 which keeps moveable sheave 56 and fixed sheave 58 in sync with each other.

Figure 55:
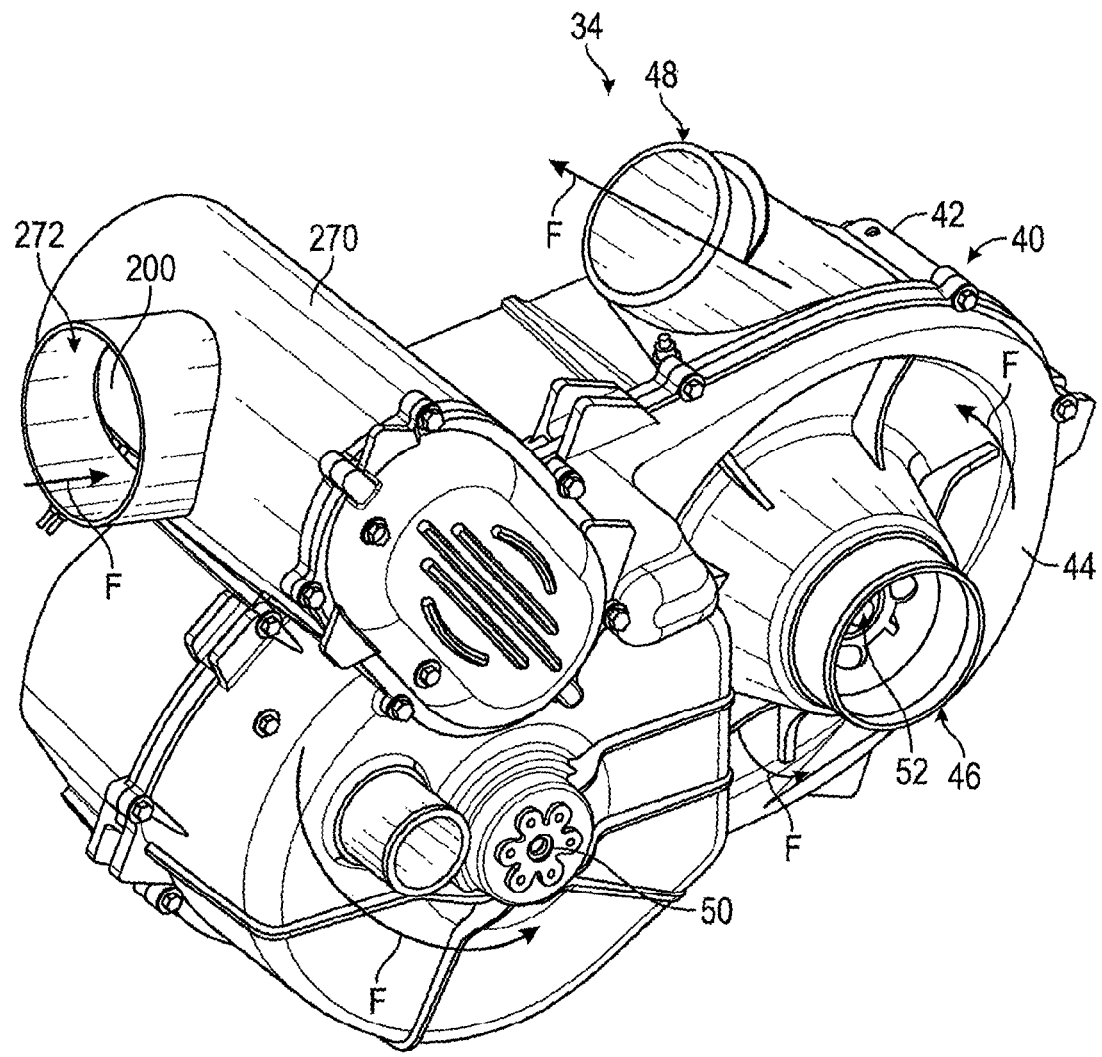
FIG. 55 is a front left perspective view of the CVT of FIG. 3 and including a cooling air inlet for providing cooling air to the electric motor of the actuation assemblies disclosed herein.
Figure 56:
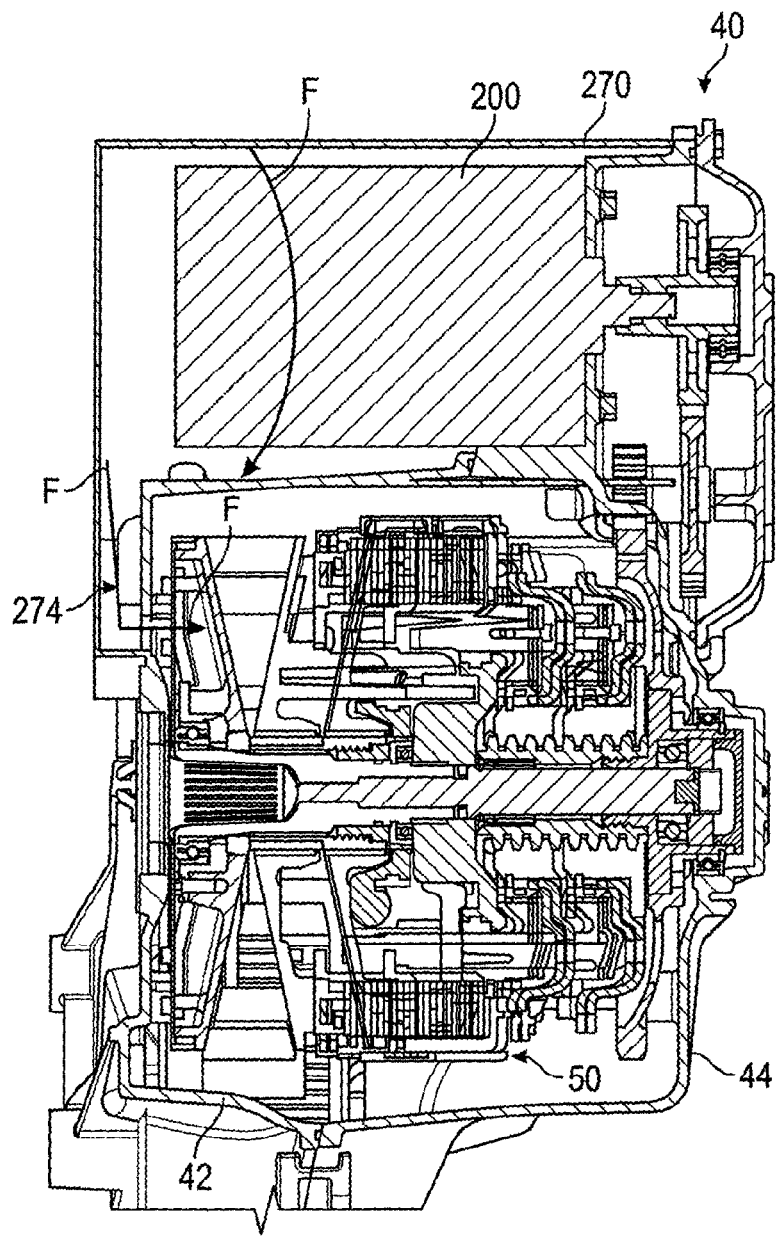
FIG. 56 is a cross-sectional view of the CVT of FIG. 55.
Figure 57:
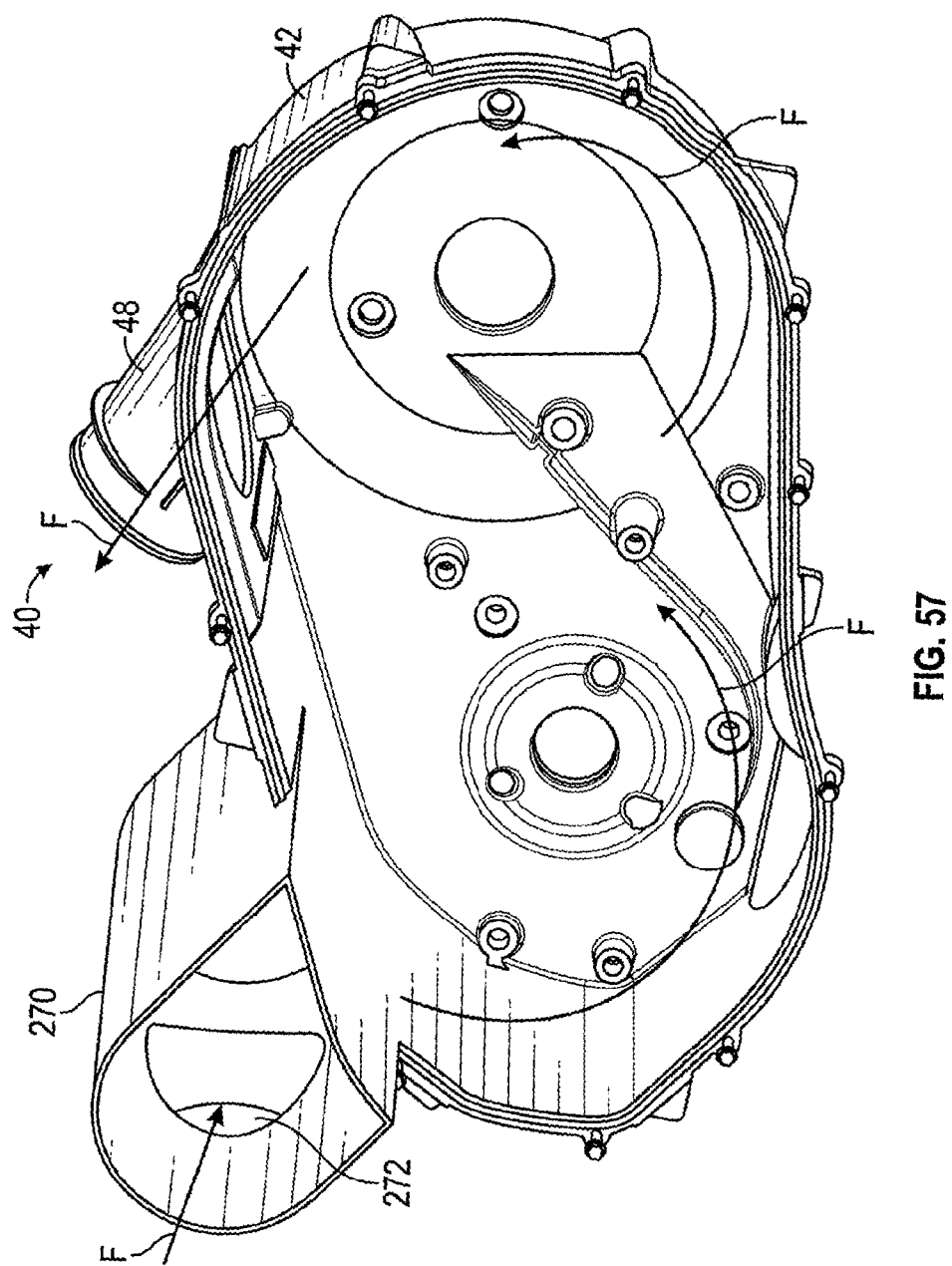
FIG. 57 is a rear left perspective view of an inner cover of the CVT of FIG. 55.

Referring now to FIGS. 55-57, it is necessary to cool CVT 34 during operation thereof. As noted herein, CVT 34 includes at least one inlet port 46 which provides cooling air within housing 40. However, inner cover 42 also may be designed to cool components of CVT 34, including motor 200. Illustratively, motor 200 may be positioned generally adjacent drive clutch 50, as disclosed herein and further disclosed in FIG. 56. Motor 200 may be supported in a separate yet integrated compartment or portion of inner cover 42. Such a compartment may receive fresh ambient air fed by stationary sheave 58 of drive clutch 50. Not only does such air cool motor 200 but the air also may cool other components of CVT 34.

Illustratively, as shown in FIGS. 55-57, motor 200 is supported in a compartment 270. Again, compartment 270 may be a portion of housing 40 which is integrated therewith but separates motor 200 from other components of CVT 34. In this way, hot air generated by drive and driven clutches 50, 52 is kept away from motor 200. Compartment 270 includes an inlet duct 272 configured to feed air towards motor 200, as denoted by arrow F. The incoming air (arrow F) moves around motor 200 to cool it. The air then moves down a channel 274 to the backside of stationary sheave 58 of drive clutch 50. Fins on the backside of drive clutch 50 act as a pump to draw air through housing 40. After the air reaches the backside of drive clutch 50, it circulates through the remainder of housing 40 and exits at outlet port 48. Illustratively, inner cover 42 may include a ramp 276 configured to flow air circulating about drive clutch 50 towards driven clutch 52. It may be appreciated that motor 200 experiences the air first and, therefore, experiences the coolest air, before the air moves into the hotter clutch housing 40. However, even after flowing over motor 200, the air is sufficiently cool to benefit clutches 50, 52 and belt 54.

As shown best in FIG. 4, the location of motor 200 and compartment 270 (illustratively, a portion of compartment 270 has been removed to best show motor 200 and channel 274) is laterally outward of engine 32 and motor 200, specifically, abuts an enclosure 278 which defines channel 274 therethrough. Enclosure 278 is positioned laterally intermediate engine 32 and motor 200 and is an open enclosure configured to receive the cooling air from compartment 270 to flow into channel 274 and into housing 40. Enclosure 278 is concealed by the entirety of compartment 270.

As noted herein, CVT 34 may be electronically controlled. As such, CVT 34 is electronically coupled to electrical assembly 280 of vehicle 2. Electrical assembly 280 may include various components, for example a plurality of sensors, controllers or control modules/units, and communication conduits (e.g., wires, cables, wireless connections, etc.). Regardless of the configurations of drive clutch 50 and actuation assembly 100 disclosed herein, electrical assembly 280 is configured to control the ratio of CVT 34.

Figure 58:
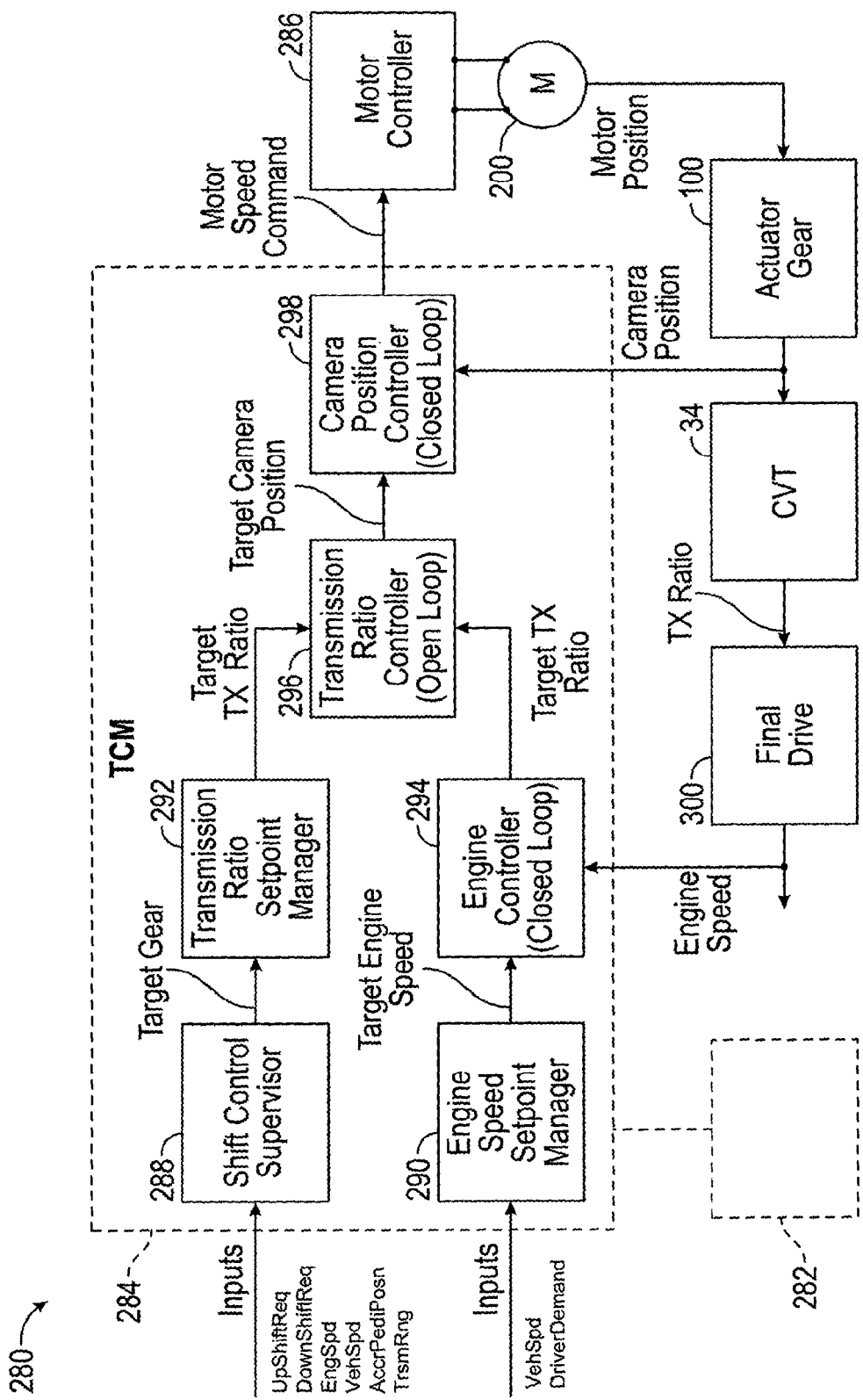
FIG. 58 is a schematic view of an electrical assembly of the vehicle of FIG. 1 and disclosing operation and control of CVT ratios.
Figure 58A:
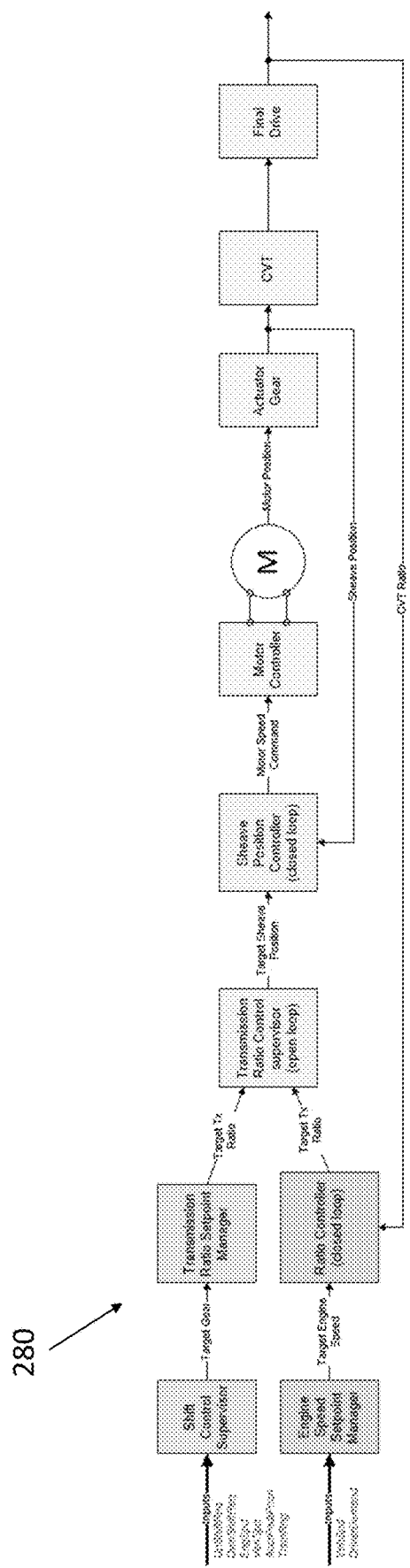
FIG. 58A is a further schematic of the electrical assembly of the vehicle of FIG. 1 and disclosing operation and control of CVT ratios.

Referring to FIG. 58, electrical assembly 280 may monitor driver demand and vehicle information to determine a target ratio for CVT 34. Such a procedure or control system may include manual and automatic mode operations of vehicle 2, as well as procedures for vehicle launch and various vehicle drive modes. The control system may allow CVT 34 to generally mimic or match the performance of a mechanical CVT with decreased noise and vibration and improves control of vehicle 2 upon launch. From an operator perspective, the control system allows powertrain assembly 30 and, specifically, CVT 34 to replicate the behavior of a discrete ratio transmission which enhances operator control.

Illustratively, electrical assembly 280 may include an engine control unit/module ("ECU") 282 and a transmission control unit/module ("TCM" or "TCU") 284. ECU 282 is operably coupled to engine 32 and TCM 284 is operably coupled to CVT 34. Electrical assembly 280 further includes a motor controller 286 operably coupled to motor 200. TCM 284 may include a shift control supervisor 288, an engine speed setpoint manage 290, a transmission ratio setpoint manager 292, an engine speed controller 294, a transmission ratio controller 296, and a sheave or carrier position controller 298. Engine speed controller 294 and sheave/carrier position controller 298 may be closed loop controllers while transmission ratio controller 296 may be an open loop controller.

TCM 284 is configured to receive a plurality of inputs, such as engine speed, vehicle speed, accelerator pedal position, etc. For example, vehicle speed and accelerator pedal position inputs may be provided to shift control supervisor 288 and/or engine speed setpoint manager 290. With such inputs, shift control supervisor 288 provides a target gear input to transmission ratio setpoint manager 292 and engine speed setpoint manager 290 provides a target engine speed input to engine speed controller 294. Both ratio setpoint manager 292 and controller 294 provide a target transmission ratio to transmission ratio controller 296.

Transmission ratio controller 296 then provides a target carrier or sheave position input to sheave/carrier position controller 298. The zero point of moveable sheave 56 is at the mechanical hard stop of lead screw 102 when sheaves 56, 58 are fully opened. The angle from the zero point is measured with a position sensor (e.g., a multi-turn position sensor). The axial position of moveable sheave 56 is calculated from the angle and a known pitch of lead screw 102. Calculating the target carrier position provides an estimate of the CVT ratio as it eliminates disturbances due to belt slip, engine dynamics, and efficiency differences which may be caused by production variability, clutch wear, and lead screw, clockwork, and sliding efficiency changes over time. However, if the target carrier position can be achieved from the control system, performance and vehicle behavior will not be reduced.

For CVT 34, there is a known relationship between moveable sheave 56 and approximate CVT ratio and there is a known starting ratio at the kiss-point between belt 54 and moveable sheave 56. The control system determines the zero point of the lead screw 102 by locating the mechanical stop through a learning process which includes the torque and speed of motor 200 to determine sensor voltage at the mechanical stop of lead screw 102. From the zero point, the belt kiss-point is expected to be within an assembled range of axial travel. Any variability due to production variation or a new belt 54 will only be reflected in engagement RPM differences until the control system learns the kiss-point of belt 54. The exact kiss-point of belt 54 is actively determined by monitoring motor torque an speed as belt 54 is engaged. A reduction in motor speed at a constant torque indicates when moveable sheave 56 contacts belt 54. There is a calibratable limit of the allowed kiss-point change for each launch cycle. When the launch ratio is known, the axial position of kiss-point is used to populate the clutch ratio vs. the moveable sheave travel line map. This relationship holds true for the ratio management strategies in all modes and operations disclosed herein. The ratio target is inputted to this look-up table and the output is used for the closed-loop position control. Corrections may be based on calculating the CVT ratio from the relationship between the speed of engine 32 and the speed of driven clutch 52.

Sheave/carrier position controller 298 is in communication with motor controller 286 to provide a motor speed command thereto. Because motor controller 286 is operably coupled to motor 200, the motor speed command ultimately controls the speed of motor 200. Based on the speed of motor 200, a motor position input is provided to actuation assembly 100 of CVT 34. The transmission ratio is finally provided to a final drive or differential 300 of powertrain assembly 30. It may be appreciated that engine speed controller 294 monitors and receives inputs of the engine speed based on the output of final drive 300 (e.g., the speed at rear ground-engaging member 8 which is operably coupled to final drive 300). Additionally, carrier position controller 298 monitors and receives inputs of the carrier position of CVT 34 based on the output of actuation assembly 100.

The output of the control system is a command by actuation assembly 100 to drive moveable sheave 56 of drive clutch 50 to a desired position. The control system is configured with a plurality of control strategies that set the ratio target depending on the mode or driver operation selected. For example, powertrain assembly 30 of vehicle 2 may be configured to operate in any of the following modes: (1) Launch Mode; (2) Automatic Mode; (3) Manual Mimic Mode; and (4) Off. Additionally, a plurality of user-selected drive operations or modes when in any of the above modes are possible: (i) Sport; (ii) Normal; and (iii) Quiet. The control system also may be configured with functionality for active descent control, braking, hard acceleration, vehicle behavior, and engine behavior to adjust the CVT ratio.

(1) Launch Mode

The Launch Mode is entered when the speed of engine 32 exceeds a threshold value when the shift lever of vehicle 2 in a directional gear (e.g., high, low, reverse). A launch control strategy is used in the mode. The mode is exited when the vehicle speed and driver demand exit conditions are met. The Launch Mode may be re-entered from other modes when the vehicle speed and the driver demand entry conditions are met.

The Launch Mode includes inputs such as engine speed, driver demand, engine load percentage, vehicle speed, brake pressure, transmission range, etc. The output of the Launch Mode is a launch ratio target value. A base map may plot drive demand torque along the X-axis and engine speed along the Y-axis to output target ratio values along the Z-axis. Such mapping allows increases in engine speed to change the target ratio which prevents lurch and disengagement when the engine speed decreases when contacting belt 54. However, increases or decreases in driver demand also can change the target ratio to ensure vehicle 2 returns to the idle state with no driver demand and further clamps belt 54 with an increase in driver demand.

The base map also is dependent on vehicle speed. With no driver demand but when vehicle 2 is moving (e.g., vehicle 2 is rolling), the control system is configured to engage belt 54 to slow vehicle 2 with engine braking. In this way, the control system behaves as an active descent control feature would behave when vehicle 2 is rolling in the direction of a selected gear. Additionally, the control system may behave as an anti-rollback feature would behave when vehicle 2 is rolling in a direction opposite of the selected gear. The control system disengages belt 54 as vehicle 2 slows and increases the brake pressure.

The base map also is dependent on engine load which allows for increased belt clamping force as the engine speed decreases and the load increases (e.g., when vehicle 2 has an increased load from towing, traversing a hill, encountering an obstacle, etc.). Under increased load conditions, the control system is configured to increase the clamping force on belt 54 with constant driver demand to prevent belt slip and allow a positive torque on ground-engaging members 4.

Figure 59:
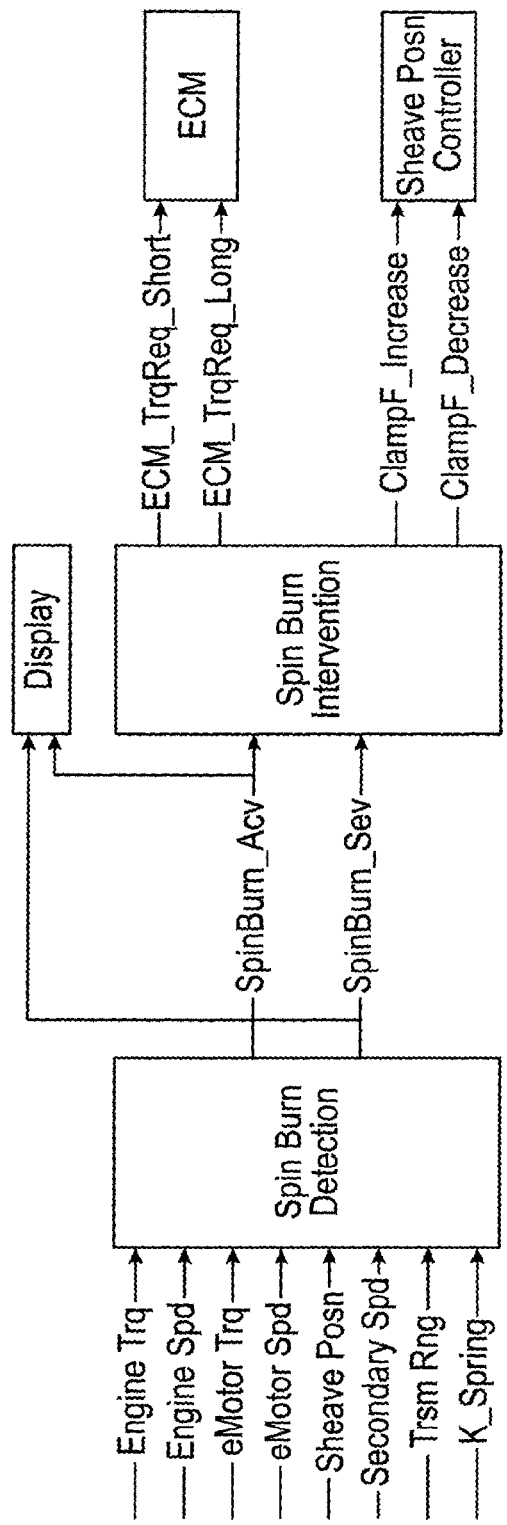
FIG. 59 is a schematic view of a control system and disclosing a method of identifying spin burn on a rubber belt of the CVT of FIG. 3.
Figure 59A:
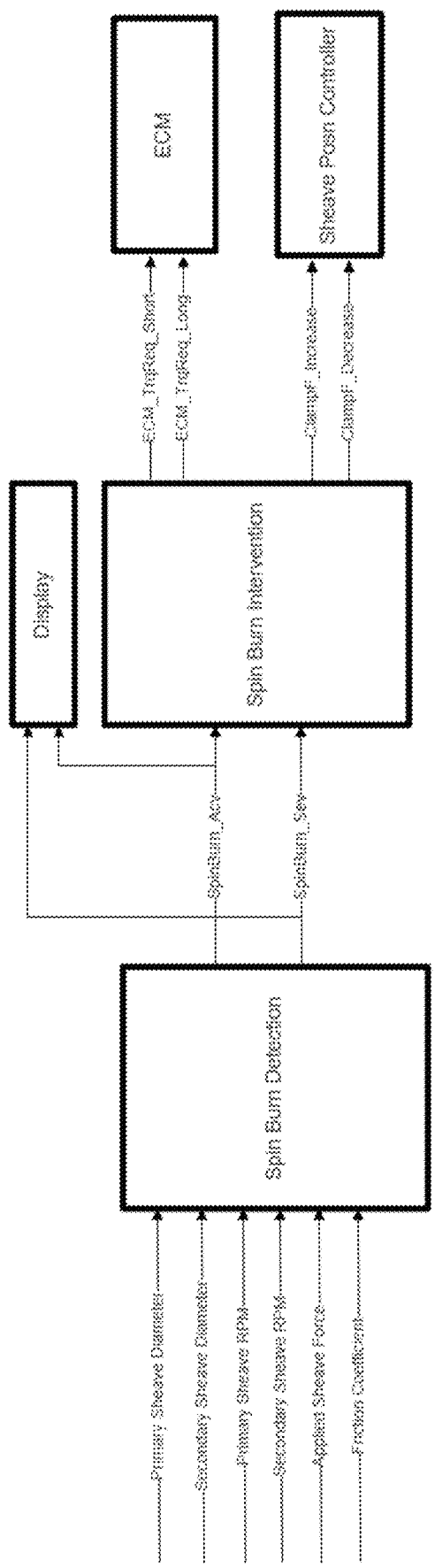
FIG. 59A is a further schematic of the control system and disclosing a method of identifying spin burn on a rubber belt of the CVT of FIG. 3.
Figure 59B:
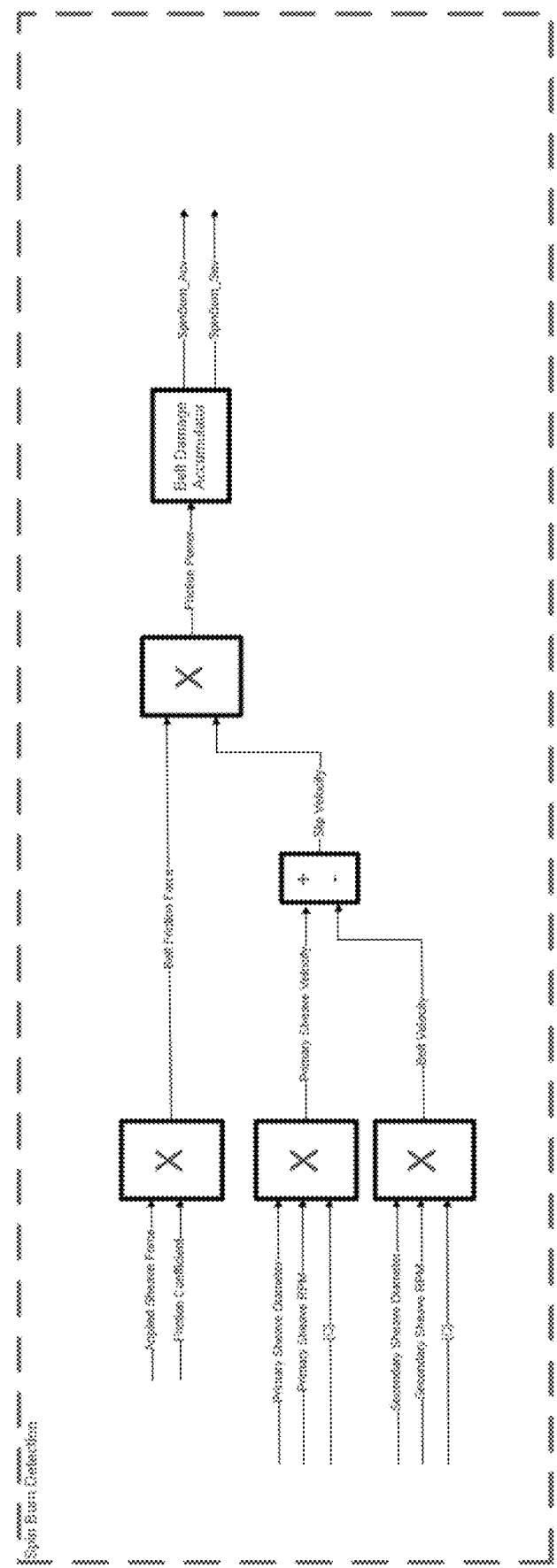
FIG. 59B is another schematic of the control system and disclosing a method of identifying spin burn on a rubber belt of the CVT of FIG. 3.

This configuration of the control system prevents spin burn, as shown in FIGS. 59-59B. All rubber belt CVT vehicles which launch directly on belt 54 have the potential for spin burn when there is relative motion between moveable sheave 56 and belt 54. Spin burn is an issue that results in increased maintenance, premature belt failure, and false misfire triggers. Electronic control of moveable sheave 56 has the potential to prevent spin burn by providing increasing belt clamp independent of engine speed. A spin burn event may be detected and the severity determined by various inputs available from CVT 34. With the detection and the severity of the spin burn known, intervention can occur.

More particularly, the control system is configured to provide belt clamp force independent of engine speed to lower the occurrence of spin burn. Spin burn may be detected, along with a severity estimation, from known system inputs. With the spin burn and the severity thereof detected, intervention can occur via ECU 282 or the operator to control the position of moveable sheave 56. In order for such detection and intervention to occur, the control system has control over vehicle launch and the position of moveable sheave 56. The sensors of electrical assembly 280 and motor 200 also must allow for accurate feedback for electric motor torque, motor speed, and the position of moveable sheave 56. With such information, ECU 282 calculates and reports engine torque, engine speed, transmission output speed, and the transmission range and a controller may request an engine torque change. With the position of moveable sheave 56, engine torque, and the torque of motor 200 known, the approximate force applied on belt 54 and, ultimately to ground-engaging members 4, may be determined. With a known torque and no rotational speed measured at driven clutch 52, it can be assumed that there is relative motion between belt 54 and moveable sheave 56 under clamping force. This torque, time, and velocity may be used to approximate a belt temperature to ultimately determine if a spin burn event is active and approximate the severity of the spin burn.

Figure 60:
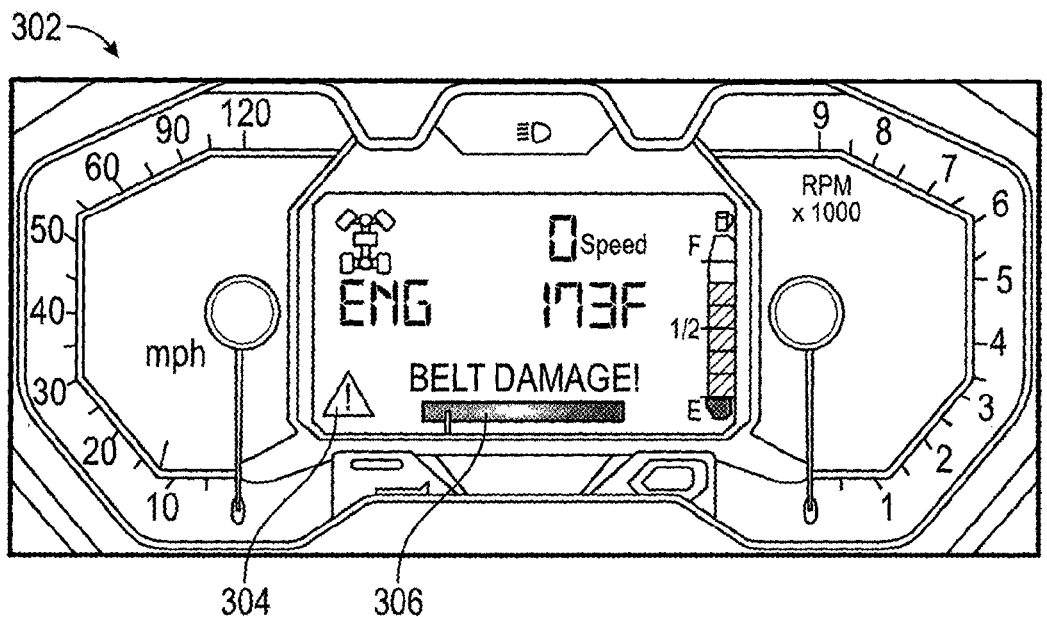
FIG. 60 is a rear view of a gauge of the vehicle of FIG. 1 and disclosing a notification to the operator related to the spin burn identified in FIGS. 59-59B.
Figure 61:
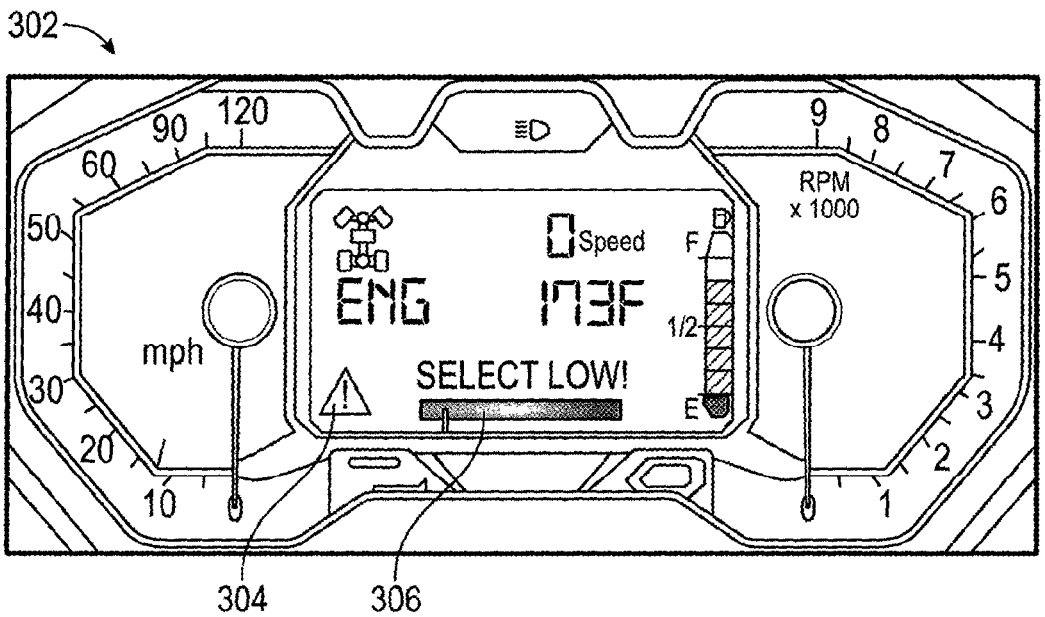
FIG. 61 is a rear view of the gauge of FIG. 60 disclosing a further notification to the operator related to spin burn.

The detection of a spin burn event may be used to notify the operator that belt damage is occurring, as shown in FIGS. 59-61. Such a notification may be displayed to the operator on gauge 302 to prompt the operator to move the transmission range to low gear. This can be combined with intervention measures to prevent damage to belt 54. Such notifications to the operator may appears as flashing, interchangeable messages, or any other visual, tactile, or auditory signal or message, as shown in section 304 of gauge 302. Additionally, gauge 302 may include section 306 to denote a gradient or other indicator of damage accumulation/severity.

Where the control system intervenes to prevent spin burn, several strategies may be used. For example, the belt clamp force may be increased at moveable sheave 56 to increase drive clutch torque to overcome an obstacle, the belt clamp force may be recued to lower the torque through driven clutch 52 or release belt 54, the position of moveable sheave 56 may be pulsed to reduce belt slip along with a warning to the operator at gauge 302, the engine torque may be decreased to reduce heat at belt 54, torque may be increased to put more torque through moveable sheave 56 to overcome an obstacle, etc. In one embodiment, the estimated severity of the belt damage may dictate increasing levels of intervention. For example, as the severity accumulates or increases, the level of intervention may increase such that when the severity is relatively low, the operator may be warned that spin burn is occurring and the belt clamp force may be increased to increase torque at moveable sheave 56 to prevent slip. At further increased severity levels, the operator may continue to be warned at gauge 302 but engine torque may be increased, as well as belt clamp force to increase torque at moveable sheave 56 to prevent slip. As the severity increases, the operator continues to be warned and the engine torque may be pulsed to further warn the operator of damage at belt 54. When the severity reaches a maximum threshold level, the operator continues to be warned and engine torque may be reduced. Belt 54 also may be released.

(2) Automatic Mode

The user selects the Automatic Mode input. The Automatic Mode is entered from the Launch Mode when the vehicle speed and driver demand entry conditions are met. The Automatic Mode is exited, and possibly transitioned to the Launch Mode, when the vehicle speed and driver demand exit conditions are met. Additionally, the Automatic Mode may be exited and transitioned to the Off Mode when the engine speed falls below a predetermined threshold.

When the Launch Mode exit conditions are met, a transmission mode handoff manager of electrical assembly 280 is engaged/entered. The handoff manager holds until the sheave position target for entering the Automatic Mode exceeds the sheave position target for the Launch Mode, at which point the ratio for the Automatic Mode takes over. In this way, there is not a numerical increase in the ratio during a smooth drive away or a hard launch. Without such feature of the control system and electrical assembly 280, lurch or deceleration of the vehicle at a constant driver demand may occur.

The Automatic Mode includes inputs such as engine speed, driver demand, engine load percentage, vehicle speed, brake pressure, transmission range, modes, etc. The output of the Automatic Mode is a ratio target and/or an engine speed target. A base map may plot drive demand torque along the X-axis and vehicle speed along the Y-axis to output engine speed target values along the Z-axis. The base map is dependent on the mode selected such that different mode-dependent base maps may be used. Different base maps also may be used for the transmission range selected (e.g., high, low, reverse, neutral). The engine speed target shown on the Z-axis of the base map ensures automatic adjustment to changes in the engine power output (e.g., temperature, altitude, wear, etc.) and automatic response to changes in the tractive effort due to the terrain (e.g., pavement, sand, snow, grade, etc.).

The control system may be configured for a feed-forward control which is the main feature for ratio scheduling in the Automatic Mode. The feed-forward ratio is calculated from the engine speed target (of the base map) and the measured speed of driven clutch 52. The feed-forward control allows for quick ratio response to drive inputs or changes in the tractive effort while also limiting the ratio adjustments during dynamic CVT events such as belt slip.

The control system may be configured for feedback control in which a controller adjusts the CVT ratio based on an engine speed error (e.g., a discrepancy between a target speed and a measured speed). The feedback control adjusts the ratio to achieve the desired engine speed.

The base map also may be dependent on engine load and, specifically acceleration, to improve a hard acceleration ratio from a stop, thereby improving backshift during a hard acceleration while vehicle 2 is rolling. Additionally, the base map may be dependent on other engine loads, such as low speed driving in order to increase the belt clamp force during such speed conditions and while vehicle 2 is experiencing increased vehicle loads (e.g., towing, ascents, etc.) to prevent belt slip.

The base map also is dependent on brake pressure. This feature allows the operator have a similar feel to a mechanical system for two foot driving (backshift with brake pressure) and ensures that moveable sheave 56 releases belt 54 during hard braking events. By having the base map dependent on brake pressure, smooth transitions when engaging or disengaging the brakes during normal driving occurs and also eliminates the need for a separate mode that addresses braking conditions.

It may be appreciated that, for each transmission driving mode, the transmission ratio behavior is characterized by determining the engine speed target for varying driver torque requests and differing vehicle speeds. From here, engine speed target maps may be populated. As noted herein, further mode differentiation may be calibrated in the Automatic Mode dependencies for engine load and brake pressure. Calibratable engine speed target rate limiters (increasing and decreasing) are established for each mode and may be adjustable to increase or decrease the speed of a backshift or upshift response.

When in the Automatic Mode, the transmission modes (e.g., high, low, reverse) may be changed on the fly by the operator. The transition between transmission modes may be managed by entering a hand-off state if the engine speed error is greater than a calibratable threshold. The hand-off manager sets a calibratable engine speed rate limit to ensure a smooth transition between the transmission modes.

(3) Manual Mode

The user selects the Manual Mode input which is a manual mimic mode. The Manual Mode is entered from the Launch Mode when the vehicle speed and the driver demand entry conditions are met and/or when an upshift request is selected and satisfies conditions in shift control supervisor 288. The Manual Mode may be exited and transitioned to the Launch Mode when the vehicle speed and driver demand exit conditions are met. Additionally, the Manual Mode may be exited and transitioned to the Off Mode when the engine speed is below a predetermined threshold value.

The Manual Mode includes inputs such as engine speed, driver demand, engine load percentage, vehicle speed, transmission range, modes, upshift/downshift requests, etc. The output of the Manual Mode is a discrete ratio target. The Manual Mode mimics gear change behavior of a discrete ratio transmission using paddle shifters. In one embodiment, the Manual Mode includes six calibratable ratio targets, however, the Manual Mode is only active in the forward gears (high and low). The Manual Mode responses to operator paddle shifter inputs for ratio selection, however, automatic downshifting occurs to avoid a stall condition.

A base map may plot gear target and ratio target to calibrate target ratios for each gear position. The base map is dependent on engine load which is critical to prevent belt slip when tractive effort is increased at ground-engaging members 4. For example, the first gear ratio target may not provide sufficient belt clamp force to prevent slip. When the engine load increases, the ratio is numerically decreased to provide more clamp force. The operator expectation is to be able to use the first gear ratio for pulling or ascending hills and, therefore, the Manual Mode allows for the operator to select the first gear ratio but also ensures that belt 54 is under sufficient clamp force to achieve the desired action by the operator.

The control system is configured to deny a particular upshift request if it is determined that a calibratable minimum engine speed will be crossed with an upshift request. Additionally, the control system is configured to deny a particular downshift request if it is determined that a calibratable maximum engine speed will be exceed with a downshift request. The control system will automatically downshift in each gear to prevent vehicle 2 from stalling and this feature is dependent on engine speed, vehicle speed, and driver demand.

The shift speed may be calibrated by setting a ratio target rate limiter. This can be changed based on the drive mode or may be set to a single value for the Manual Mode.

The operator can switch between the Automatic Mode and the Manual Mode on the fly. When vehicle 2 is operating in the Automatic mode, the closest manual gear is tracked by an active CVT ratio calculation. When switched the Manual Mode, that tracked gear is targeted/selected. Additionally, the operator can switch to the Automatic Mode from the Manual Mode. When switching to the Automatic Mode, the engine speed target controller sets the ratio target dependent on the drive mode selected. It is possible to transition from the Launch Mode to the Manual Mode. The launch functionality works the same as disclosed here to ensure a smooth launch regardless of whether the Manual Mode is selected (e.g., when the first gear ratio is reached during launch of the user requests an upshift above a vehicle speed threshold, the control system switches to the Manual Mode). To mitigate concerns with wear on moveable sheave 56 when a ratio is held, the control system may make small adjustments in the ratio to prevent heat concentration on moveable sheave 56.

(4) Off Mode

The Off Mode occurs when engine 32 is off or vehicle 2 is in a non-directional gear (e.g., park, neutral). When in the Off Mode, the controls system brings moveable sheave 56 to the home position. It may be appreciated that the home position is different from the zero point position disclosed herein and is a consistent position from a specified location (e.g., 0.5 mm from a hard stop). When in the Off Mode, moveable sheave 56 may be positioned farther away from belt 54 than typical idle conditions to ensure a smooth shift out of park or neutral.

Figure 62:
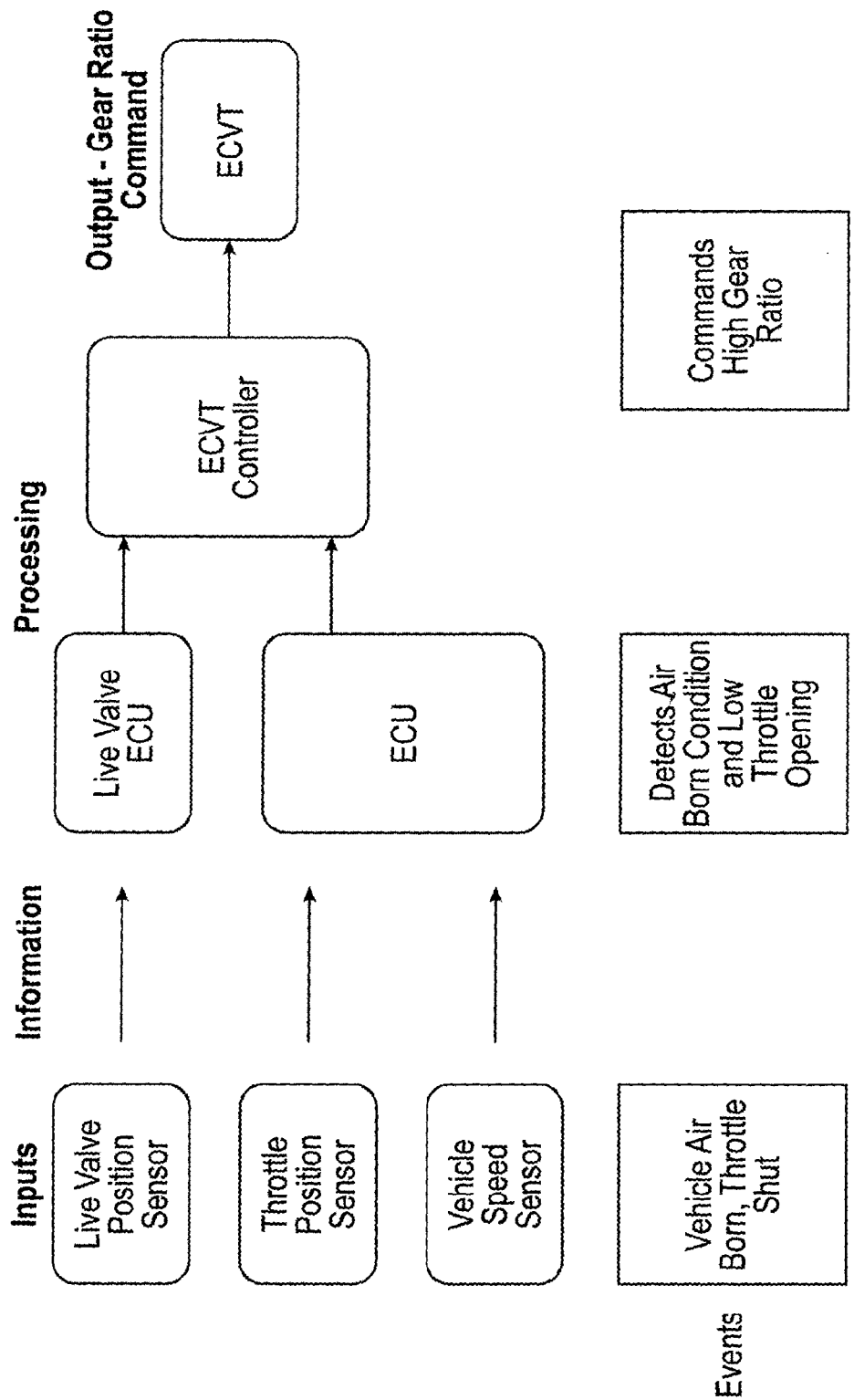
FIG. 62 is a schematic view of the control system configured to determine if the vehicle of FIG. 1 is airborne and how to adjust the position of the CVT of FIG. 3 accordingly.

Referring now to FIG. 62, electrical assembly 280 may be used to protect vehicle components from an inertial load due to power off landing when CVT 34 is electronically controlled. More particularly, electrical assembly 280 is configured to protect half shafts 310 (FIG. 1) and CVT 34 from the inertial load. Sensors may be used in shock absorbers 312 of rear suspension assembly 18 (FIG. 1) to detect a situation where vehicle 2 is airborne. As such, shock absorbers 312 may be live-valve shocks. ECU 282 also may use a throttle position sensor ("TPS") to detect the throttle position of engine 32 during an airborne event. In the event that vehicle 2 is airborne and the throttle is closed or at a low opening position, CVT 34 could shift into high gear to reduce the inertial load on CVT 34 and half shafts 310 due to engine acceleration. This protection occurs because the higher gear ratio results in engine 32 being accelerated to a lower RPM than it would be if CVT 34 was allowed to shift to a lower gear ratio. As such, the components of powertrain assembly 30 may be decreased in size which decreases the weight of vehicle 2.

Figure 63:
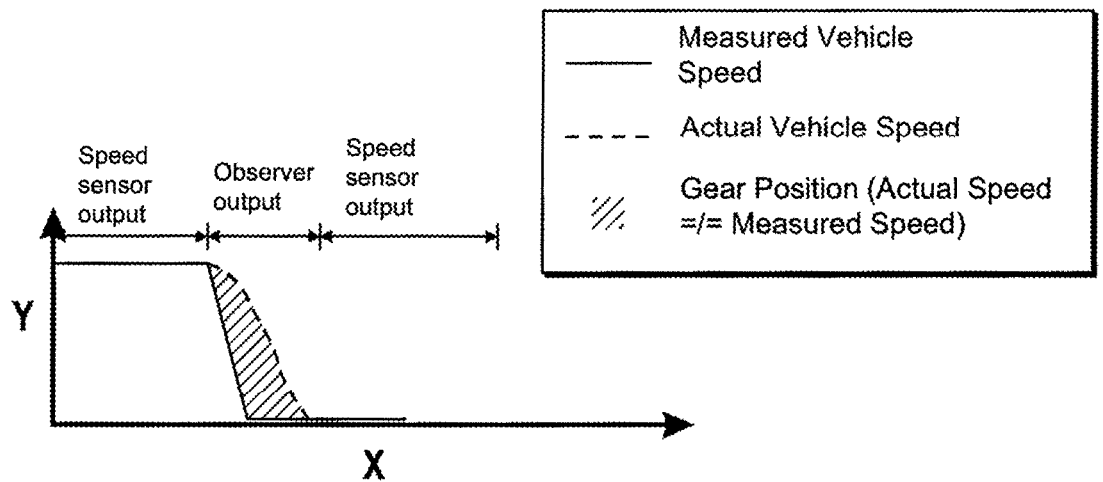
FIG. 63 is a graphical view of estimating vehicle speed over ground.
Figure 64:
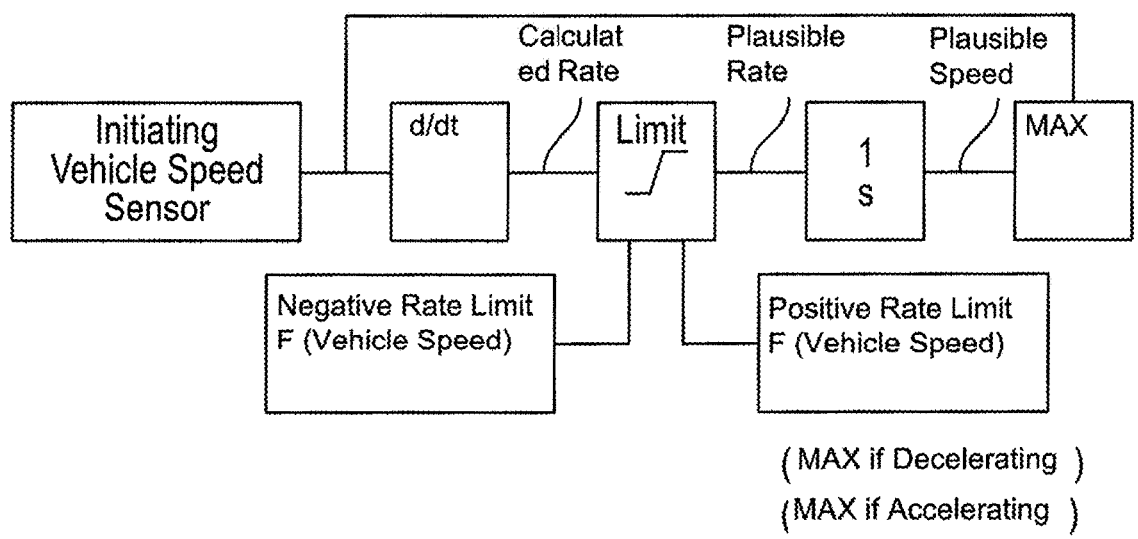
FIG. 64 is a schematic view of a first embodiment of the control system configured to improve estimations of vehicle speed over ground.
Figure 65:
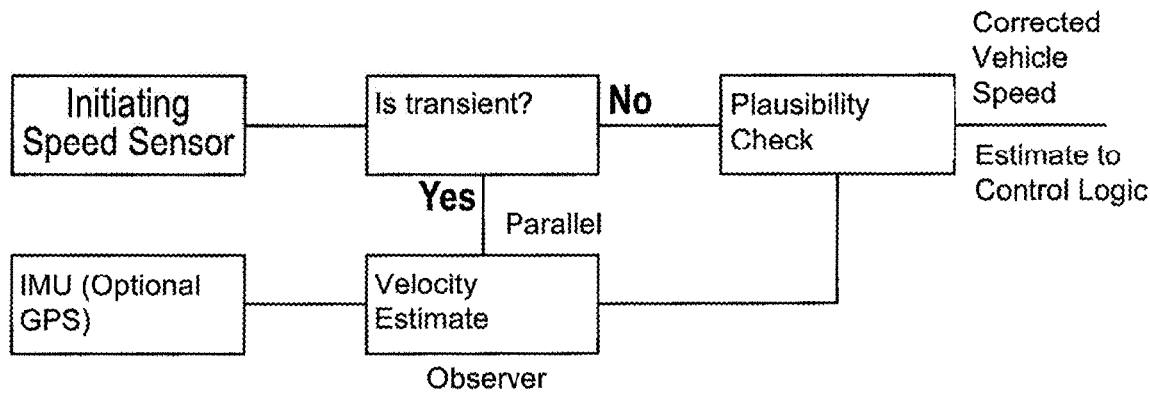
FIG. 65 is a schematic view of a second embodiment of the control system configured to improve estimations of vehicle speed over ground.
Figure 66:
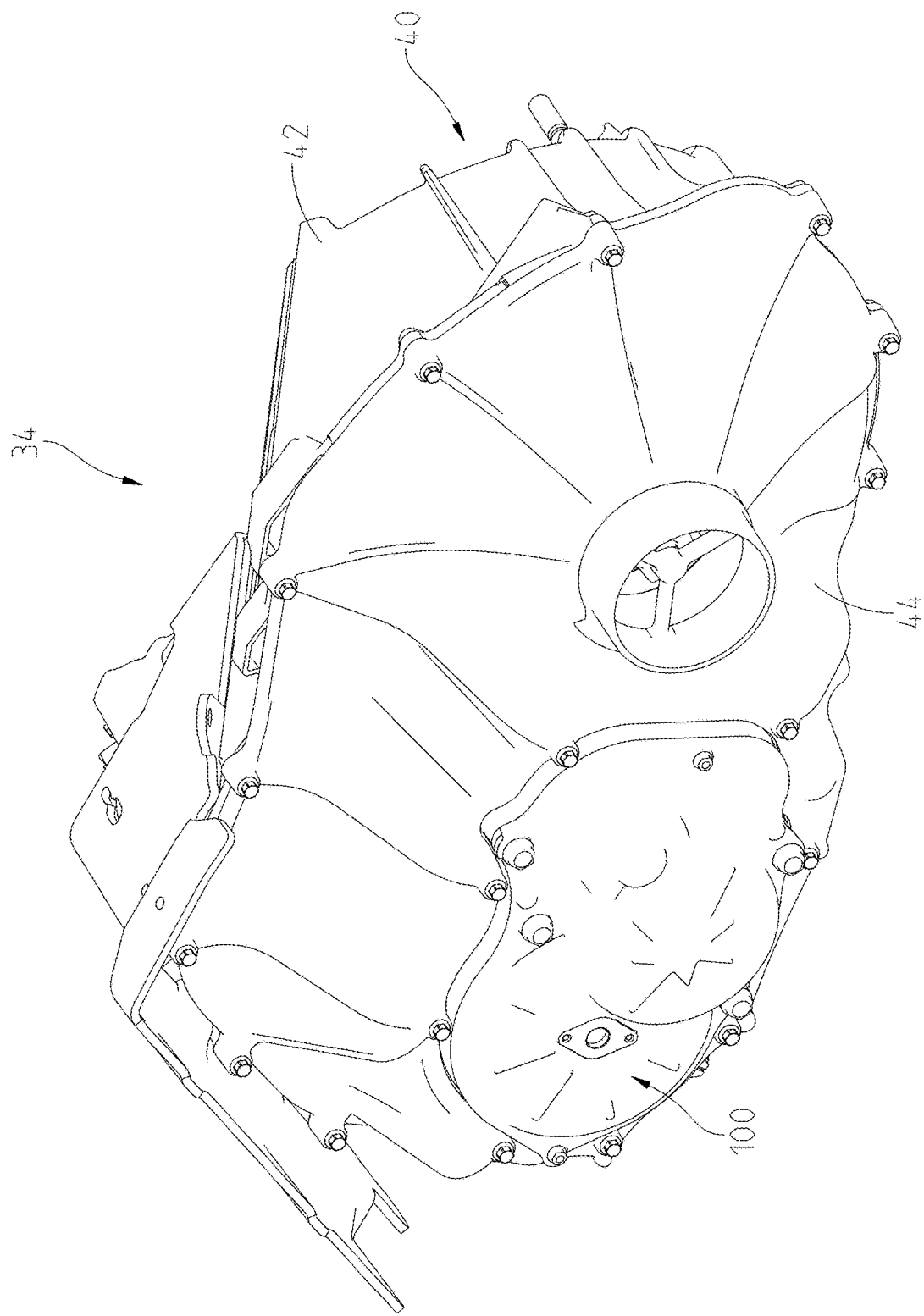
FIG. 66 is a rear left perspective view of an alternative embodiment of the CVT of FIG. 3.
Figure 67:
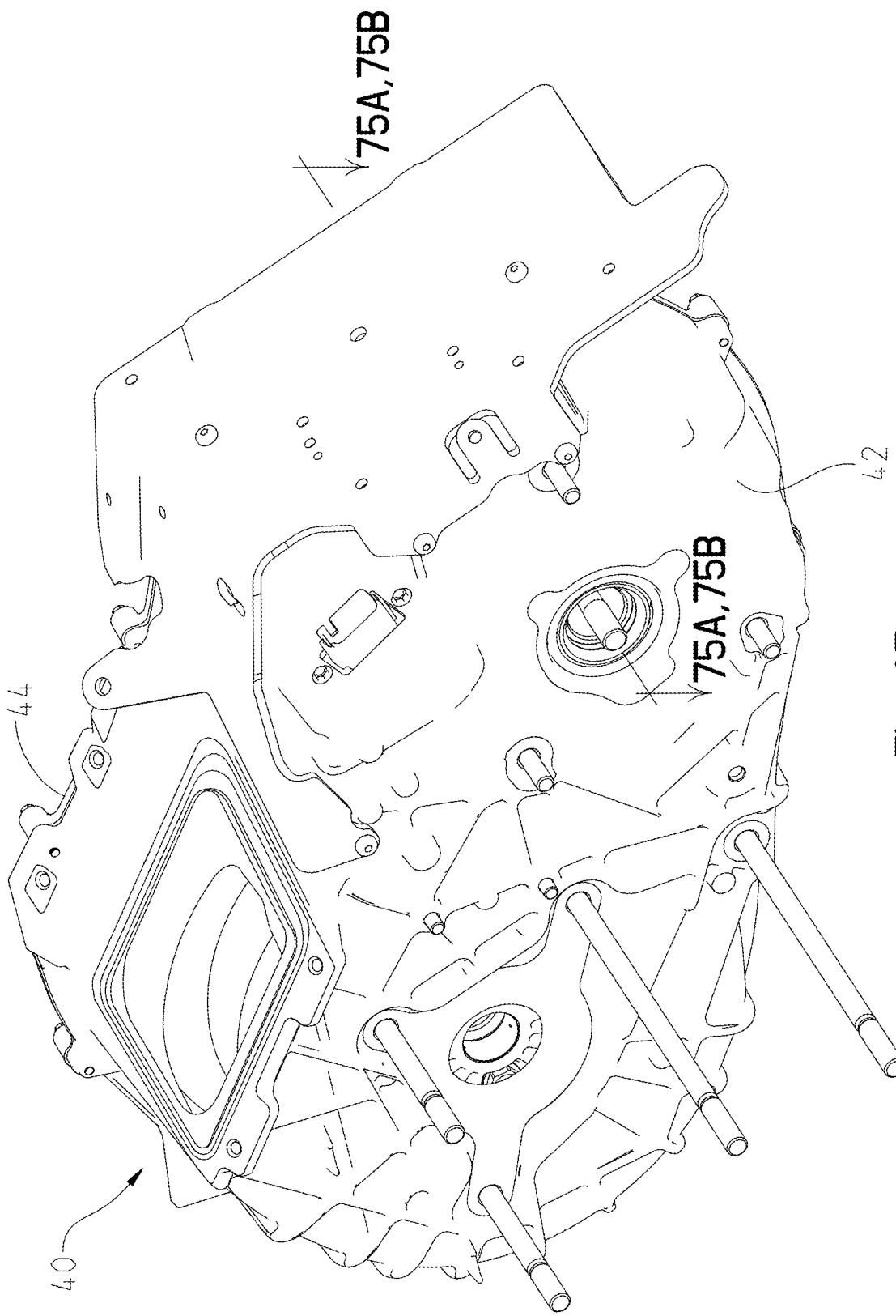
FIG. 67 is a front right perspective view of the CVT of FIG. 66.
Figure 68:
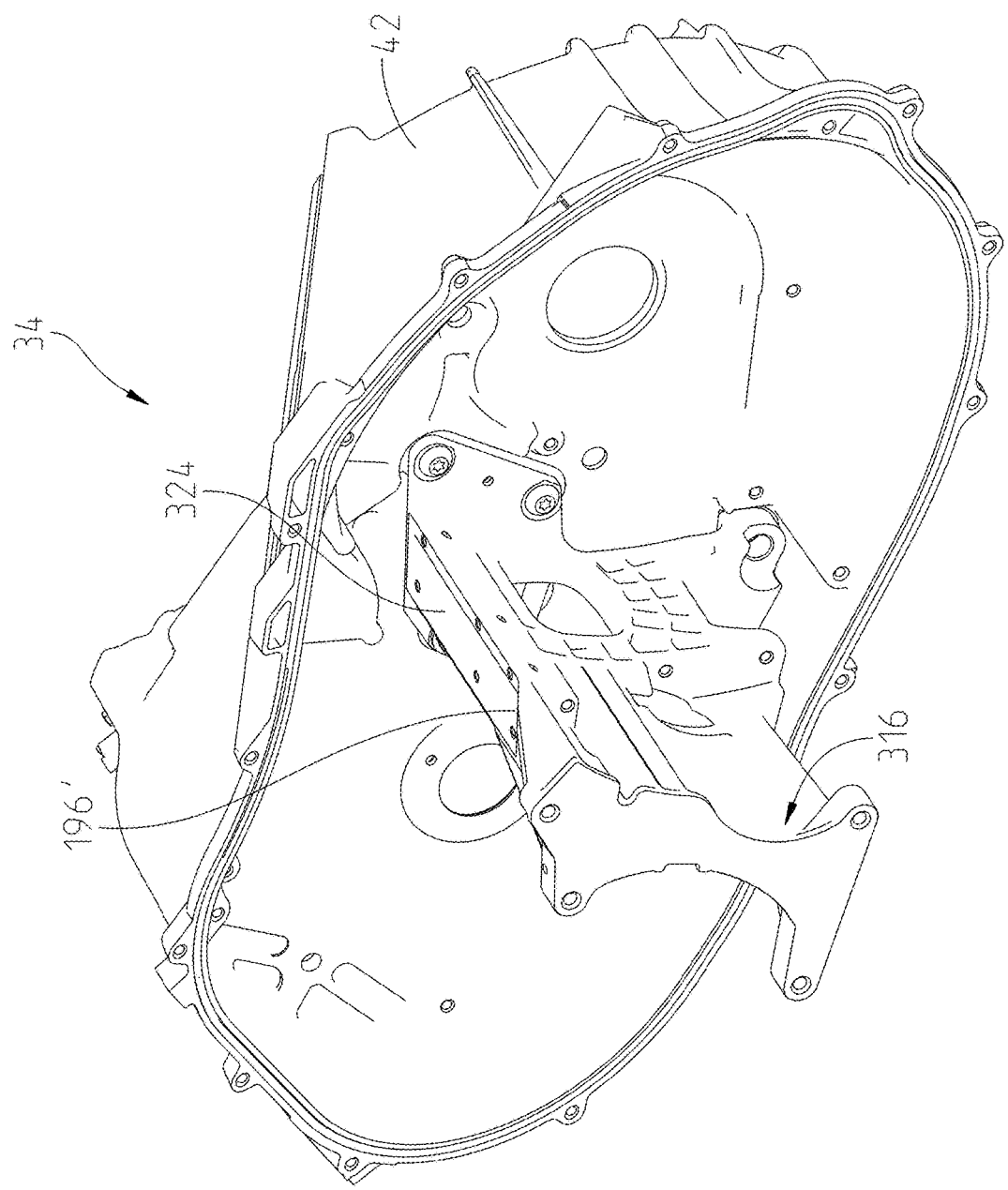
FIG. 68 is a rear left perspective view of a tower of the CVTs of the present disclosure.
Figure 69:
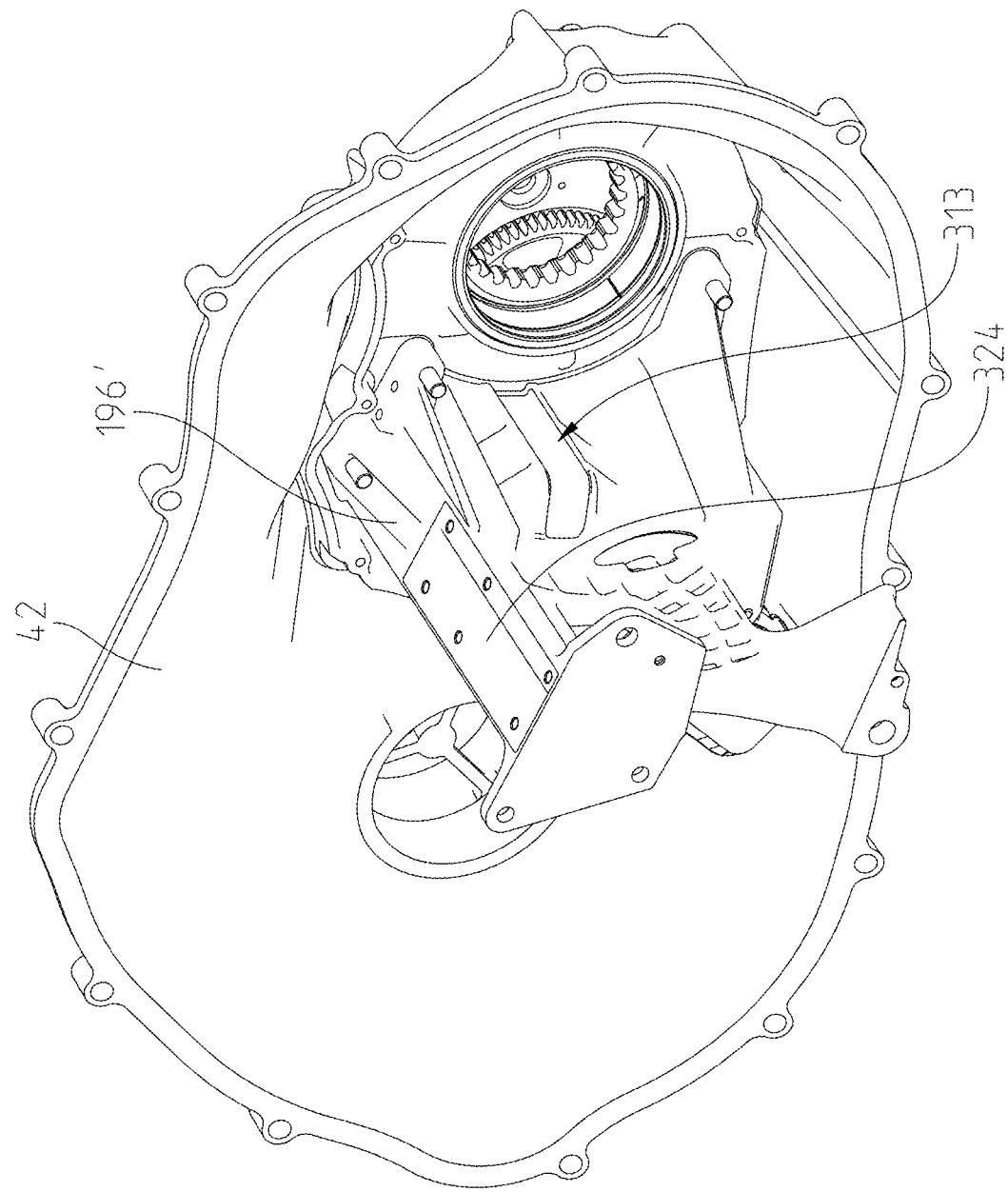
FIG. 69 is a front right perspective view of the tower of FIG. 68.
Figure 70:
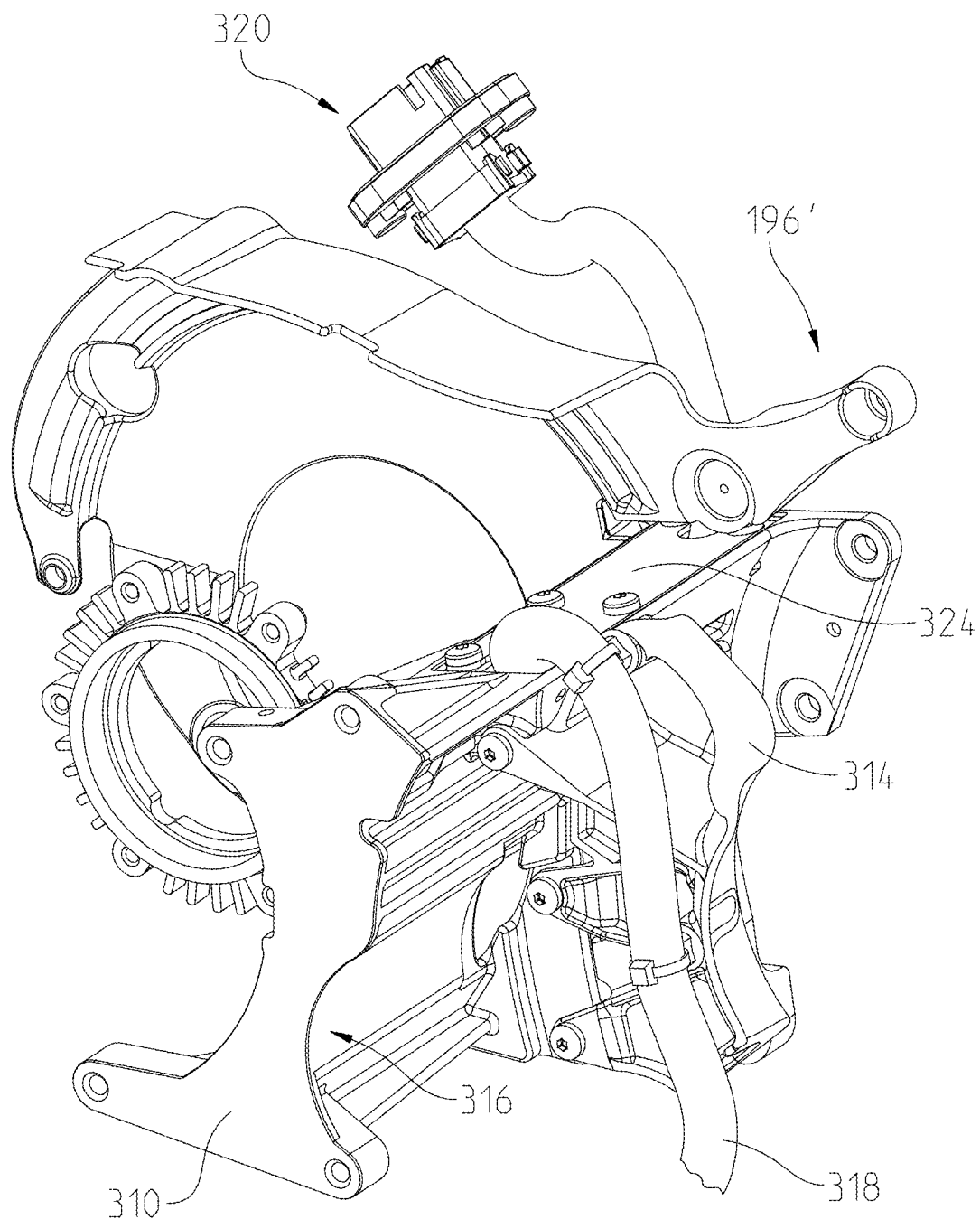
FIG. 70 is a perspective view of the tower of FIG. 68.
Figure 71:
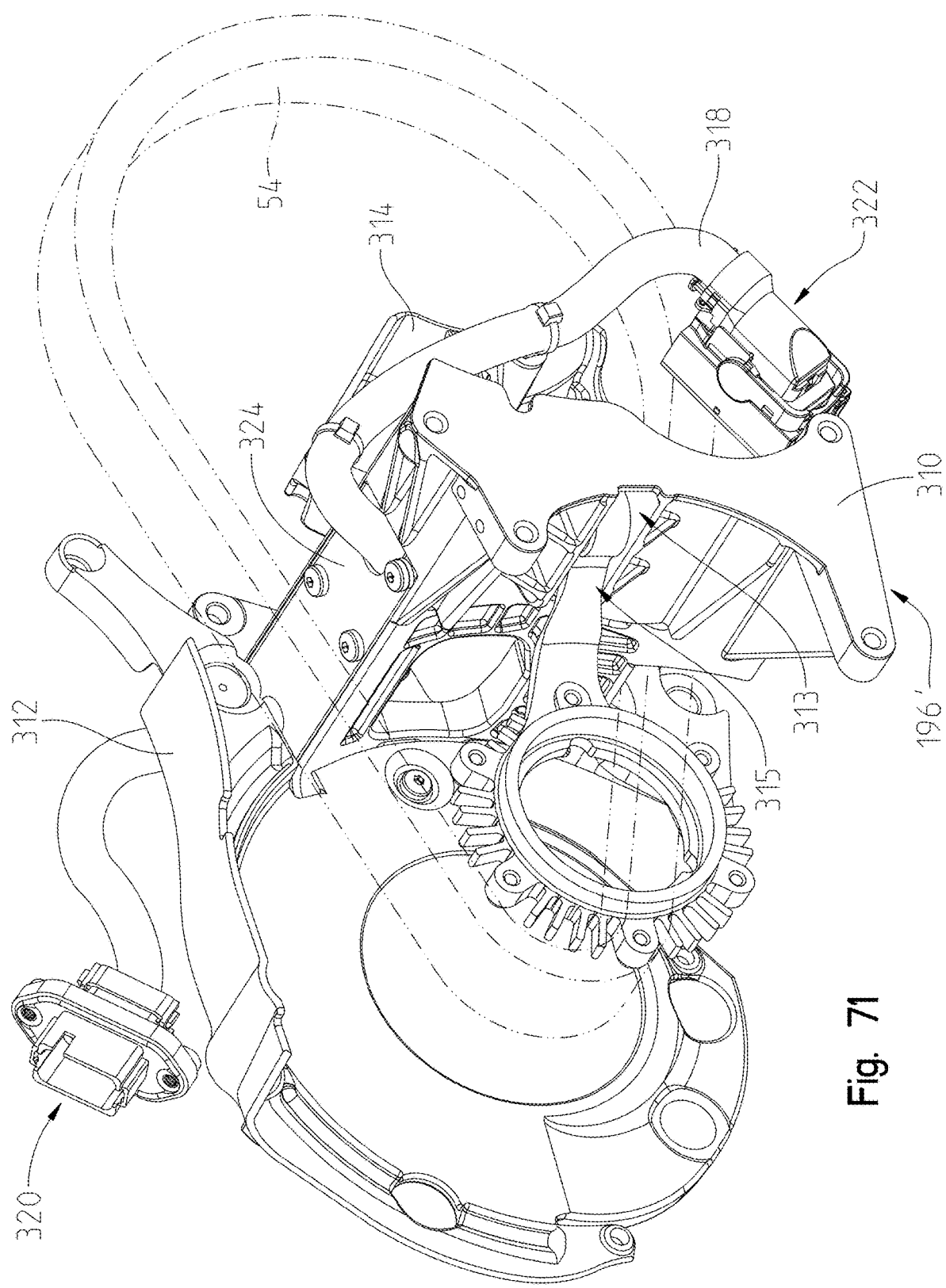
FIG. 71 is a further perspective view of the tower of FIG. 68.
Figure 72:
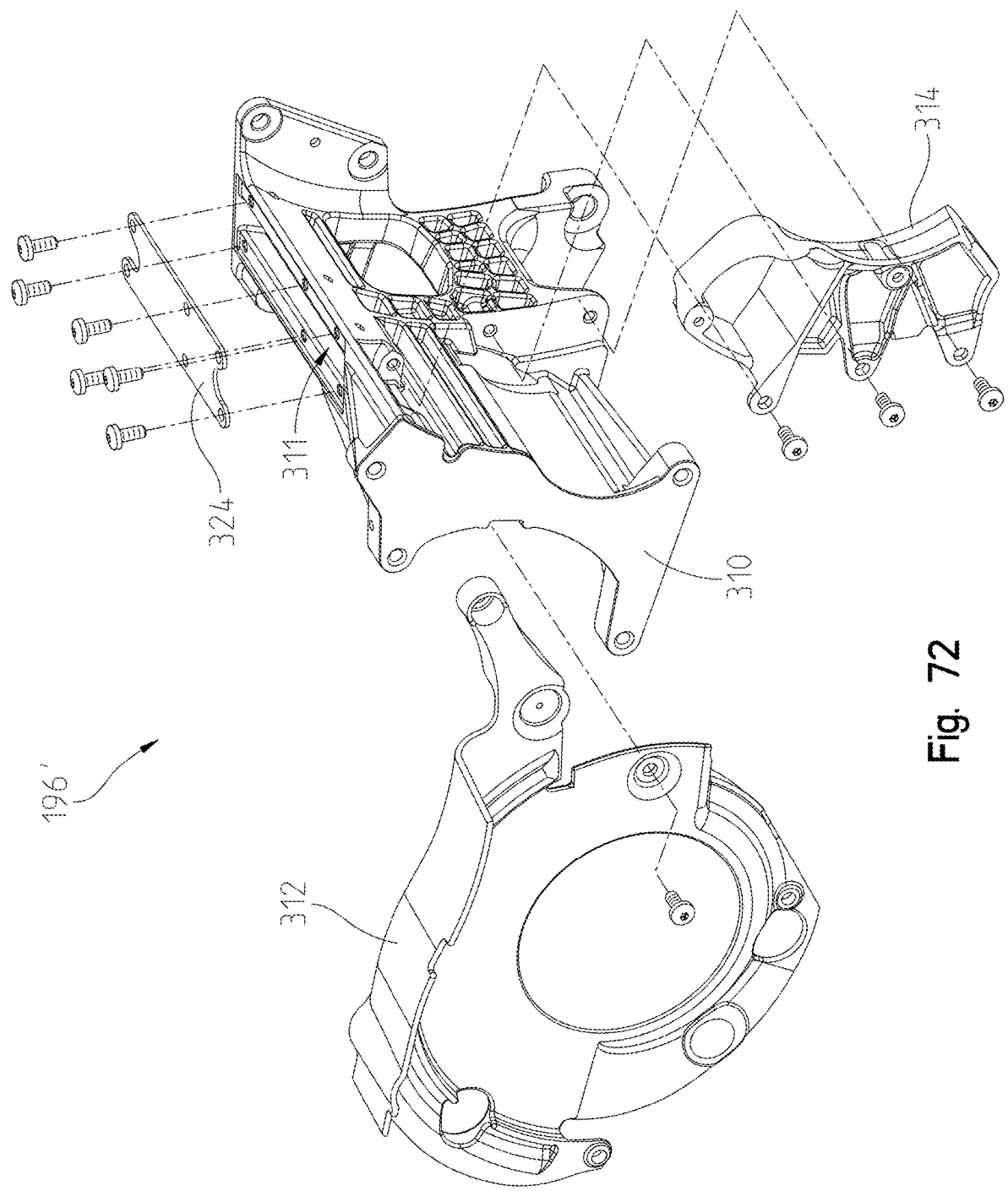
FIG. 72 is an exploded view of the tower of FIG. 68.
Figure 73:
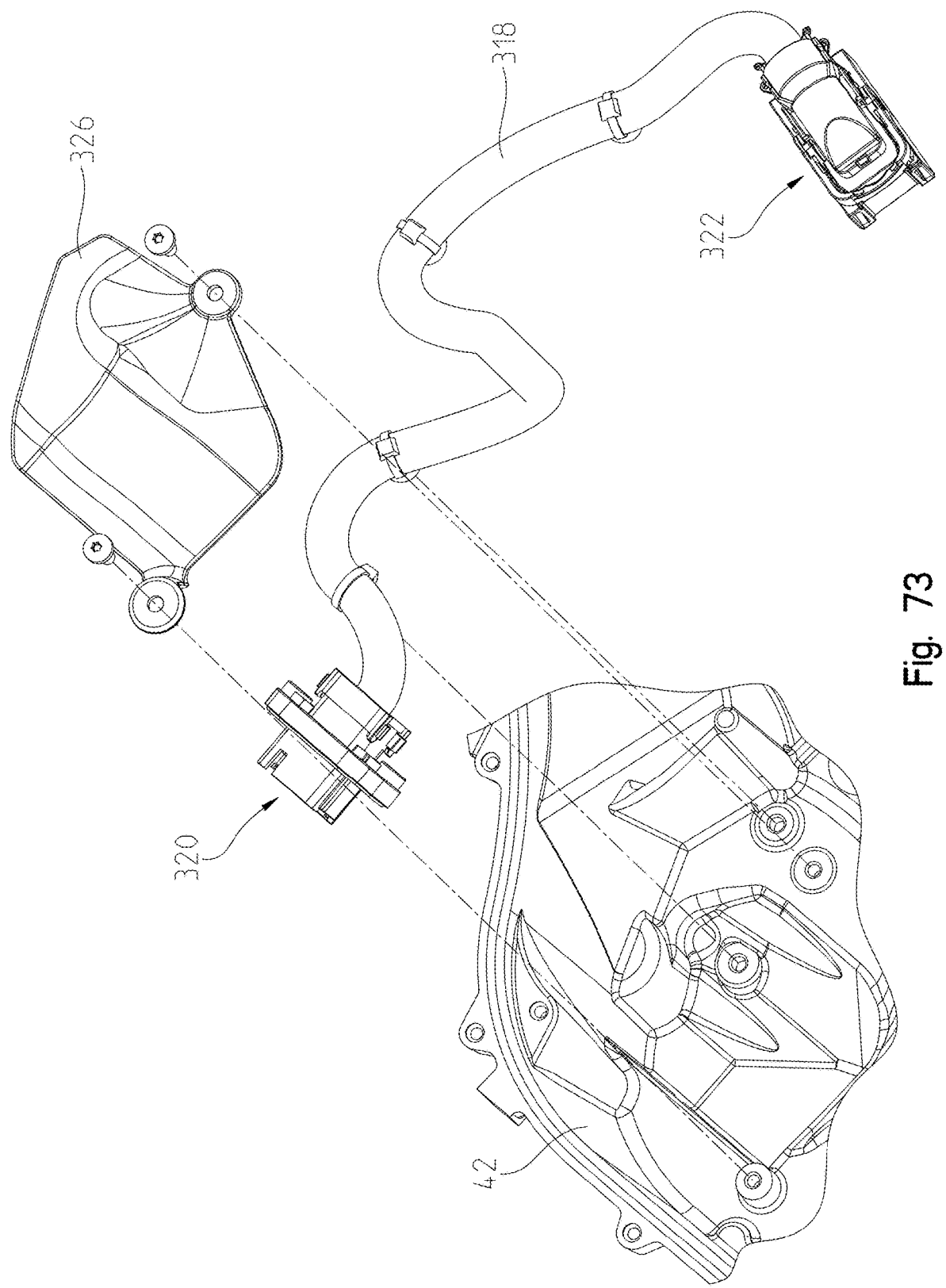
FIG. 73 is an exploded view of a portion of the tower of FIG. 68 and a portion of an electrical assembly.

Referring to FIGS. 63-65, the control system disclosed herein is configured to improve an estimated vehicle speed over ground value compared to convention systems which merely measure the driven wheel speed. More particularly, and referring to FIG. 63, many conventional, high-performance, off-road vehicles over power all four wheels under a maximum acceleration and, when such vehicles do not include anti-lock braking systems, the wheels may lock at high speeds. Under such conditions, the actual vehicle speed over ground may be significantly different than the wheels speed as measured by a speed sensor located in the vehicle's driveline.

The present disclosure uses the existing sensors on vehicle 2 to improve the estimate of the actual vehicle speed over ground using a plurality of methods. For example, in one embodiment, the estimate of the actual vehicle speed over ground may be improved by setting both variable tractive and braking deceleration rate limits, thereby passing an improved calculation of vehicle speed on to dependent subsystems or other components of vehicle 2. In a second embodiment, using brake system pressure, engine torque, and the clutch ratio, improved fidelity of the estimated vehicle speed over ground can be provided to dependent controllers. In a third embodiment, an IMU may be used to obtain vehicle inertial movement or a GPS signal may be used, both of which can augment and improve the fidelity of a calculated vehicle speed over the ground that can then be provided to dependent controllers.

More particularly, various embodiments use a transmission speed sensor on rear ground-engaging members 8. When vehicle 2 is traveling at a speed denoted by Y and maximum braking force is applied, rear ground-engaging members 8 may lock and the vehicle speed sensor reads zero speed. With full locking of rear ground-engaging members 8, a maximum plausible deceleration rate is known and can be quantified. A rate limit is imposed on the outgoing speed signal such that the estimated vehicle deceleration can be no more than what is physically possible to achieve (except for when vehicle 2 may experience an impact). Additionally, plausible rates may be established by measured brake system pressure, with vehicle weight as an input. Refer to FIG. 64.

In other embodiments, incoming vehicle speed sensor information is plausibly checked against inertial measurements. The inertial measurements are used for transients and synchronized during steady-state operation. Refer to FIG. 65.

Referring now to FIGS. 66-93B, additional embodiments of CVT 34 and/or components thereof are shown. Note that various components disclosed throughout the entirety of the present disclosure may be used in combination with each other and are not limited to any specific embodiment of CVT 34.

Referring now to FIGS. 66-73, CVT includes a tower 196', slider and lead screw assembly 101 (also shown in FIG. 28), and actuation assembly 100. Actuation assembly 100 includes gears and electric motor 200 (see, e.g., FIG. 43). In one embodiment, tower 196' may be configured as a single-piece die cast body 1310. Tower 196' is configured to increase the structural integrity of housing 40 of CVT 34 by providing the actuation shift counter force for drive clutch 50 (also see FIG. 29) and provides stiffness to inner and outer housing members 42, 44 and actuation assembly 100. More particularly, tower 196' increases the structural integrity by countering the leadscrew actuation torque by providing a slot 1313 for the drive clutch torque arm 1315 to interface with. More particularly, and as shown best in FIG. 71, drive clutch torque arm 315 slides linearly into slot 1313 and reacts with torque from motor 200. Additionally, tower 196' supports the gears and motor 200 of actuation assembly 100 which increases the strength of the connection to housing 40 and also allows actuation assembly 100 to remain with vehicle 2 during service of belt 54. Also, tower 196' provides a routing slot to protect interior electrical routines, as disclosed further herein. Tower 196' further includes a baffle channel 1317 configured to allow air to flow in the direction of arrow 1319 (i.e., air flows in the direction of drive clutch 50) such that air flows through channel 1317 at the lower extent of tower 196'. Tower 196' also includes a tower baffle 1314 removably coupled to tower body 1310. Tower baffle 1314 is configured to be positioned adjacent a portion of motor 200. Tower body 1310 also includes a recessed portion 1316 for receiving a portion of motor 200. In this way, motor 200 may be positioned adjacent and/or received or supported by a portion of tower 196'.

Referring still to FIGS. 66-73, an electrical assembly 1318 for motor 200 is supported by a portion of tower 196'. Electrical assembly 1318 includes a bulkhead connector 320 and a motor connector 1322 for operably coupling motor 200 to the electrical bulkhead. Illustratively, tower body 1310 includes a channel 1311 for receiving wires, cables, and/or other routings of electrical assembly 1318. Channel 1311 may be concealed by a plate 1324 which is removably coupled to tower body 1310. In this way, tower body 1310 supports and protects at least a portion of electrical assembly 1318 when coupled between motor 200 and the bulkhead. As shown best in FIG. 73, a harness baffle 1326 is removably coupled to a portion of inner cover 42. A portion of electrical assembly 1318 (e.g., a portion adjacent bulkhead connector 1320) is positioned intermediate harness baffle 1326 and inner cover 42 such that baffle 1326 conceals and protects such portion of electrical assembly 1318 and secures such portion to inner cover 42.

Figure 74:
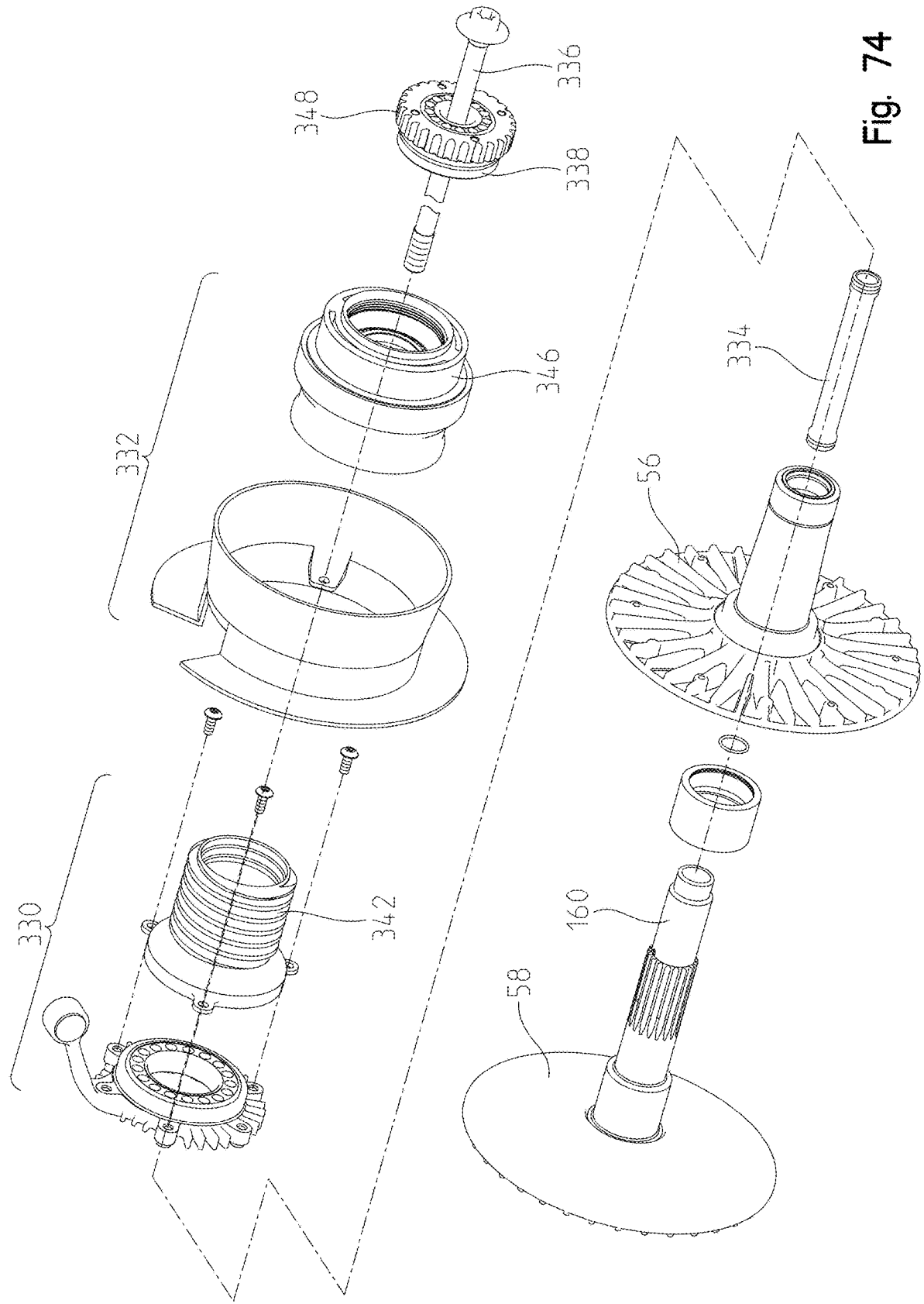
FIG. 74 is an exploded view of an alternative lead screw and slider assembly of the CVTs of the present disclosure.
Figure 75A:
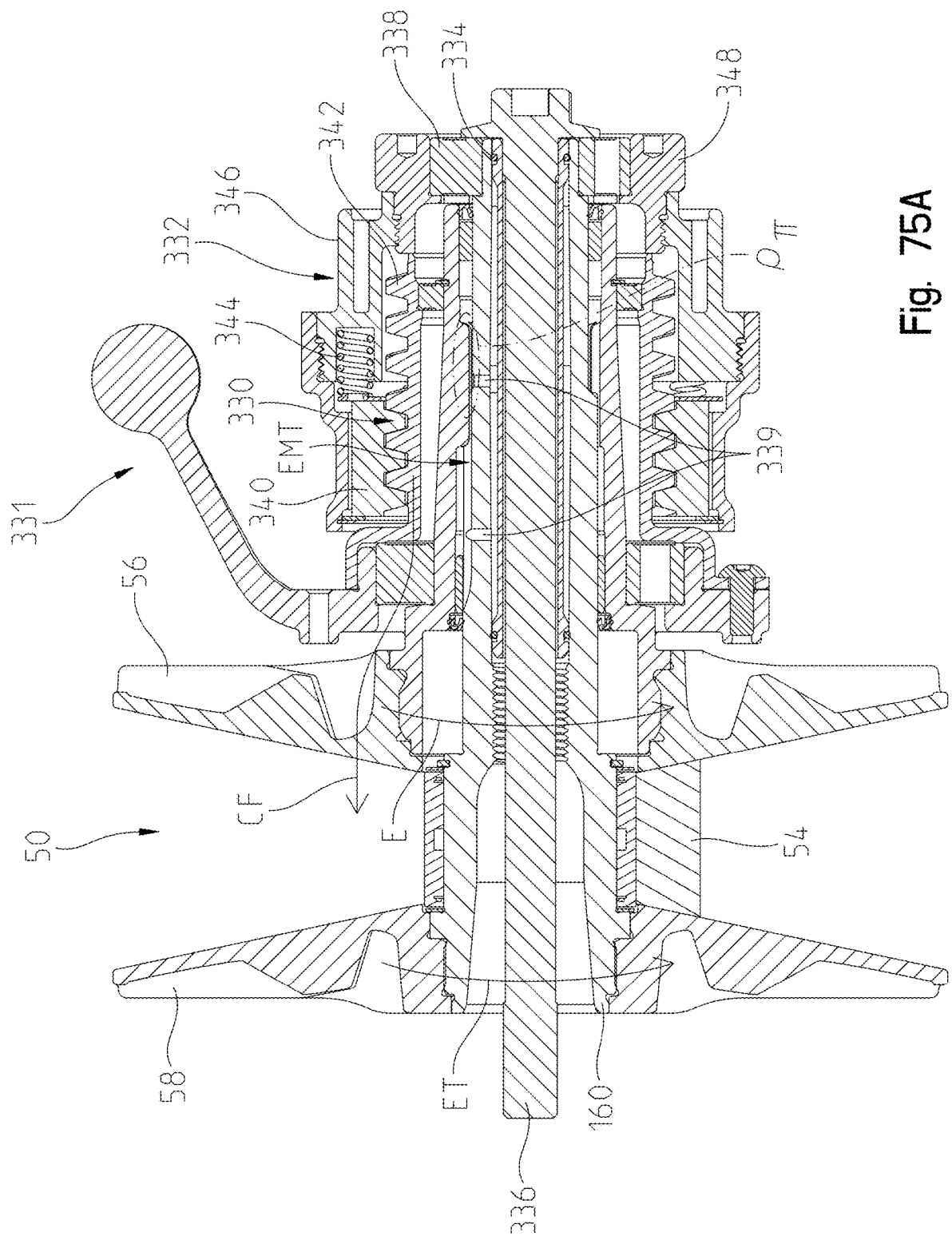
FIG. 75A is a cross-sectional view of the lead screw and slider assembly of FIG. 74, taken along line 75A-75A of FIG. 67.
Figure 75B:
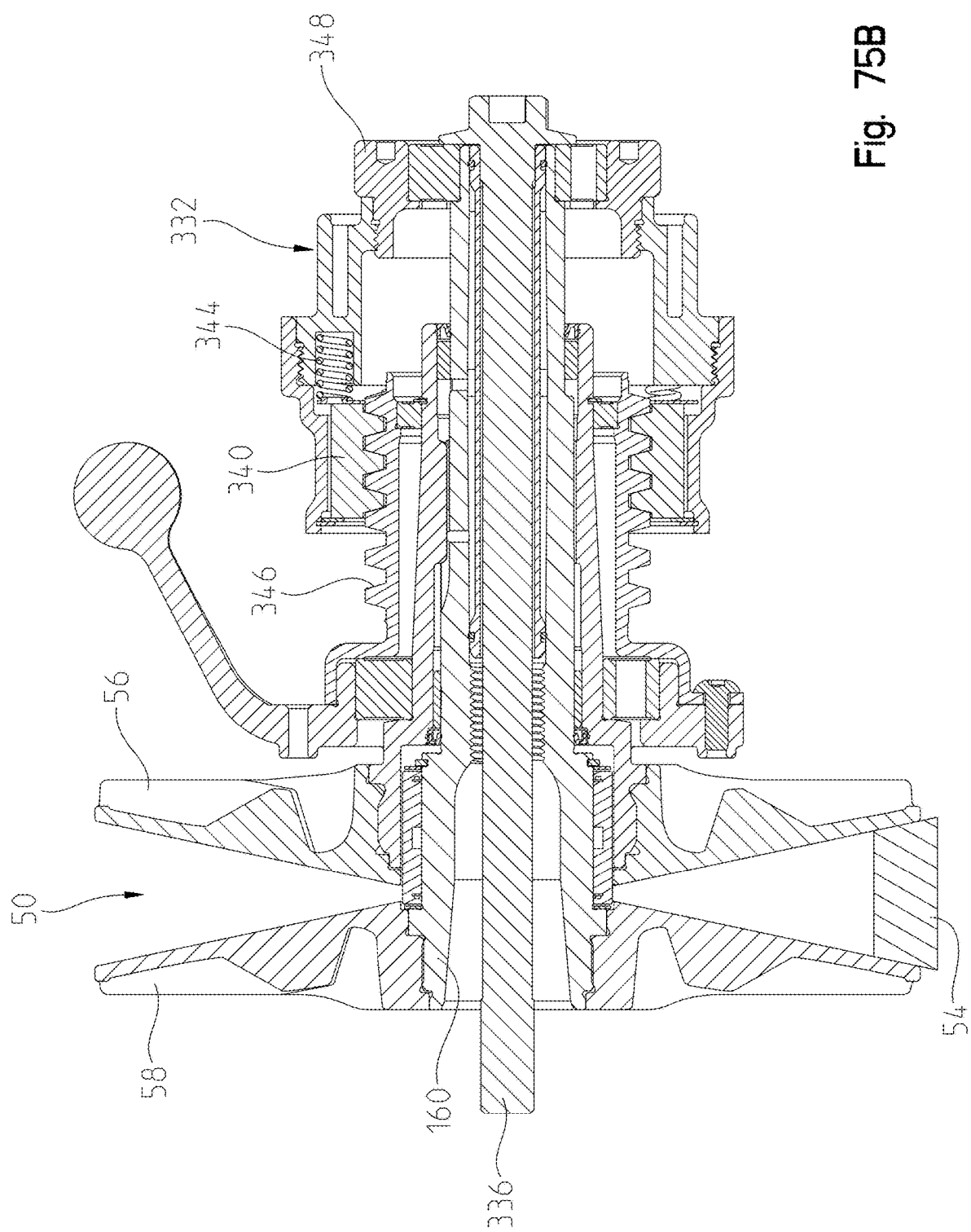
FIG. 75B is a cross-sectional view of the lead screw and slider assembly of FIG. 74, taken along line 75B-75B of FIG. 67.

Referring now to FIGS. 74-81, an alternative embodiment of spider assembly 60 (see also FIGS. 23-37) includes a sliding spline 1330 and a lead screw assembly 1331. Sliding spline 1330 may be used as a torque transfer mechanism from prime mover 32 (e.g., engine 32 of FIG. 4) to moveable sheave 56 and belt 54 of CVT 34. More particularly, while splines may be commonly used to transfer torque in driveline systems, sliding spline 1330, as shown in FIGS. 74-75B, allows drive clutch 50 to transfer torque and change its axial position, which is required for CVT 34 to vary the ratio. Illustratively, an input shaft 160 is operably coupled to prime mover 32 and also coupled to shaft 1337 which is coupled to sheave 56. Shaft 1336 and post 160 define the sliding spline 1330 such that splines 1330 on post 160 are received within shaft 1336. A sleeve 1334 may be positioned radially intermediate a portion of bolt 108 and post 160.

Figure 81:
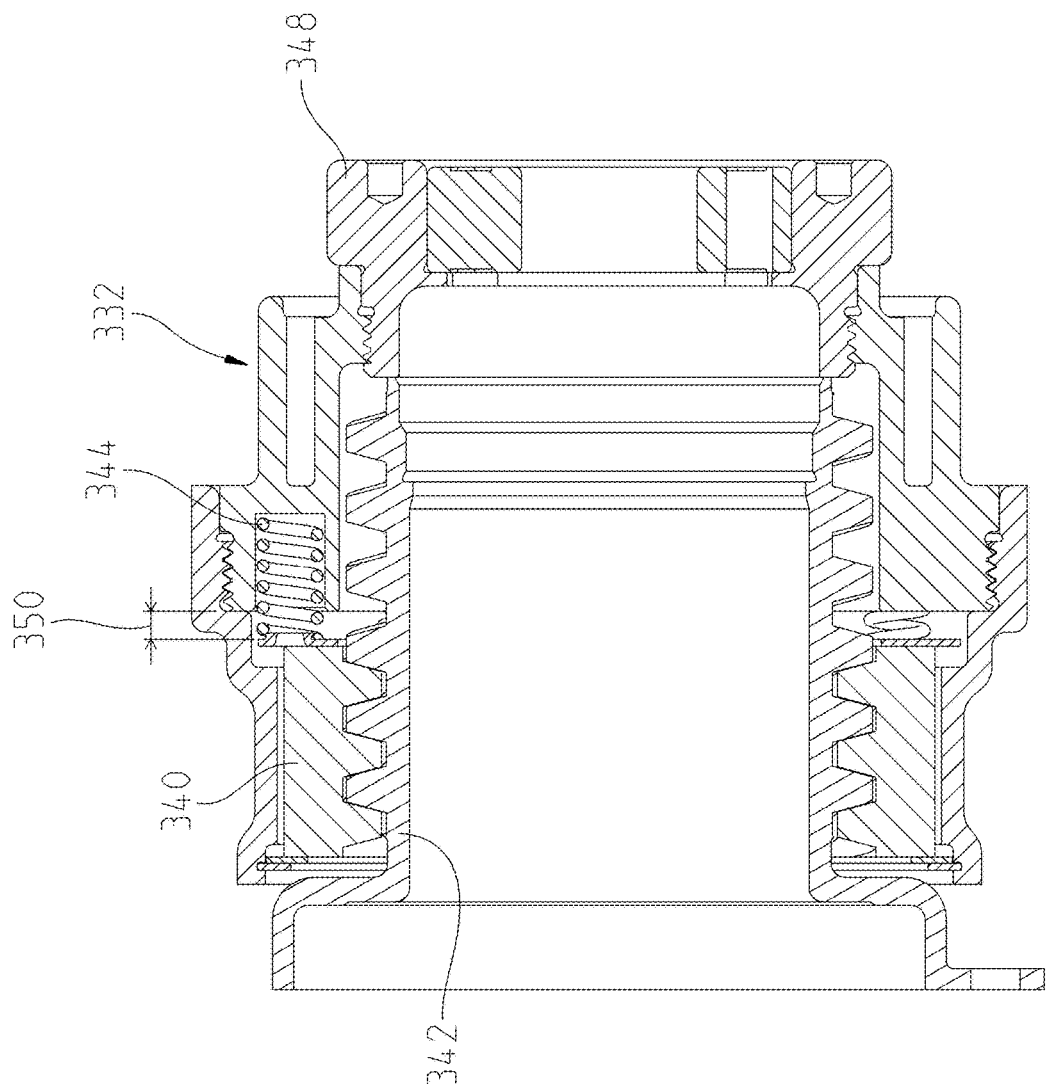
FIG. 81 is a cross-sectional view of a launch spring of the CVTs of the present disclosure.

Spline 1330 is contained within a sealed cavity 1332 and bushings 1338 may be used to pilot shaft 1336 onto post 160. In conventional CVT systems, plastic clutch buttons may be used to transfer torque from the engine to the belt of the CVT. These components are exposed to debris in the CVT housing and, as such, may have a reduced lifespan. However, as shown in FIGS. 75A, 75B, and 81, sealed cavity 1332 may keep spline 1330 lubricated and prevents debris from reaching the components of spline 1330, thereby increasing the useful lifespan of such components that support moveable sheave 56. Holes 1339 in post 160 allow for grease expansion and recirculation when drive clutch 50 is shifted which prevents pressure build up. An electric motor torque input 1348 is positioned adjacent a portion of bolt 108.

Referring to FIGS. 75A and 75B, it may be apparent that FIG. 75A illustrates drive clutch 50 in an open position while FIG. 75B illustrates drive clutch 50 in a closed position. In looking to FIG. 75A, strategies may be used for drive-away control of a start-on-belt electronically-controlled CVT (e.g., CVT 34). A control system of powertrain assembly 30 and/or vehicle 2 must account for unique hardware configurations because the launch mechanism is the friction between belt 54 and sheaves 56, 58. Such friction can be damaging to components of CVT 34 if there is excessive slip. The present disclosure allows for getting vehicle 2 to consistently and reliably leave a stationary position to a rolling condition of vehicle 2 under all conditions. Coordination between engine 32 and transmission(s) 33 and/or 34 are necessary as there is no mechanical relationship of engine input speed or torque to the amount of clamp force that is applied to the belt. The clamp force is electromechanically controlled based on inputs from the electronic control module ("ECM") and transmission(s) 33 and/or 34. As disclosed further herein, a single electronic actuator controls the vehicle drive-away as well as the overall the ratio of CVT 34.

More particularly, mechanical clamp force (CF) from sheaves 56, 58 to belt 54 needs to be applied for engine 32 to transfer torque through belt 54. This clamp force (CF) is achieved by applying torque and rotating a lead screw nut 1340 of lead screw assembly 1331, which applies force from a lead screw 1342 of lead screw assembly 1331 to moveable sheave 56 and belt 54. In this way, the combination of lead screw nut 1340 and lead screw 1342 define a second sliding spline and the torque transfer is through the splines on post 160 generally at location PTT, rather than through lead screw 1342. Belt 54 may be comprised of Kevlar or other similar materials and offers minimal compliance for the control system. As such, a launch spring 1344 positioned within a spring carrier 1346 is used to vary the clamp force (CF) applied to belt 54 based on the overall spring travel. Launch spring 1344 is sized such that it cannot overcome the force applied by the secondary spring (ratio will not change when launch spring is compressing), so it can be assumed drive clutch 50 remains at its maximum numeric ratio and moveable sheave 56 itself is not traveling linearly while spring 1344 is being compressed. There is a theoretical and empirically confirmed relationship between the force that is applied by launch spring 1344 and the torque transmissibility of the clutch. This relationship is used as the basis for control of the vehicle drive-away.

FIG. 75A illustrates several torque and force pathways. Illustratively, arrows ET indicate the engine torque pathway at drive clutch 50, while arrow CF indicates the clamp force disclosed above. Additionally, arrow EMT indicates the electric motor torque.

Figure 76:
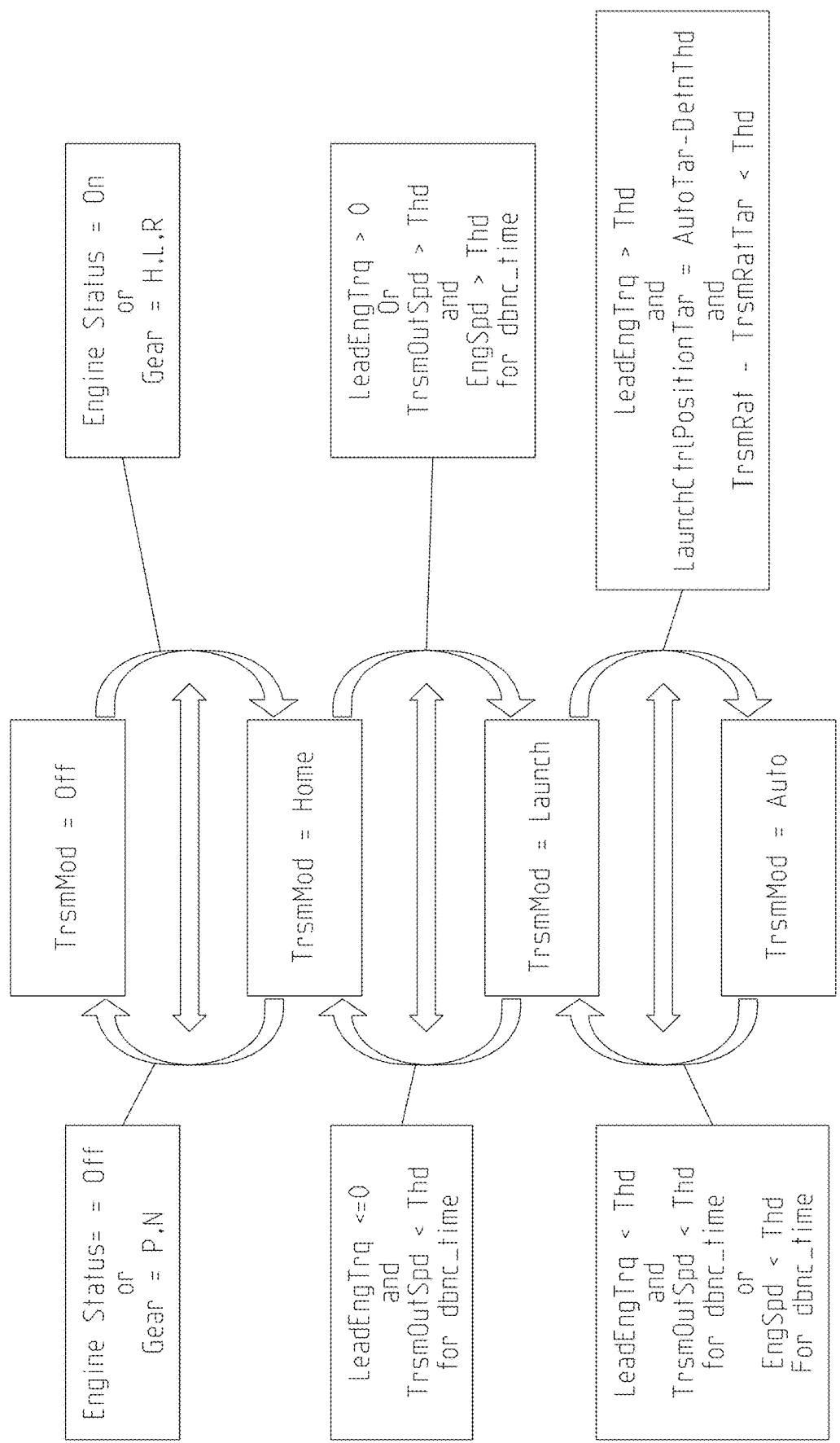
FIG. 76 is a schematic view of the mode management for differing transmission modes for the CVTs of the present disclosure.

Referring to FIG. 76, the mode management for differing transmission modes is shown. More particularly, the TrsmMod=Launch mode is shown. The most typical entry condition is based on a driver demanded clutch torque that is greater than zero, which indicates the driver intends to move. Another potential enable condition is when there is transmission output speed feedback for an amount of time that indicates the vehicle is rolling away. This will allow some engagement of drive clutch 50 to slow vehicle 2 in a downhill condition. Logic is included that allows only increases in clamp force (CF) while the actual engine brake torque is negative to cause a slow-down of vehicle 2. Additionally, to ensure there is some driveline engagement while coasting to a stop and minimal delay for time-to-torque should the driver provide an input, launch control will always be entered when exiting an automatic ("auto") mode.

Figure 77:
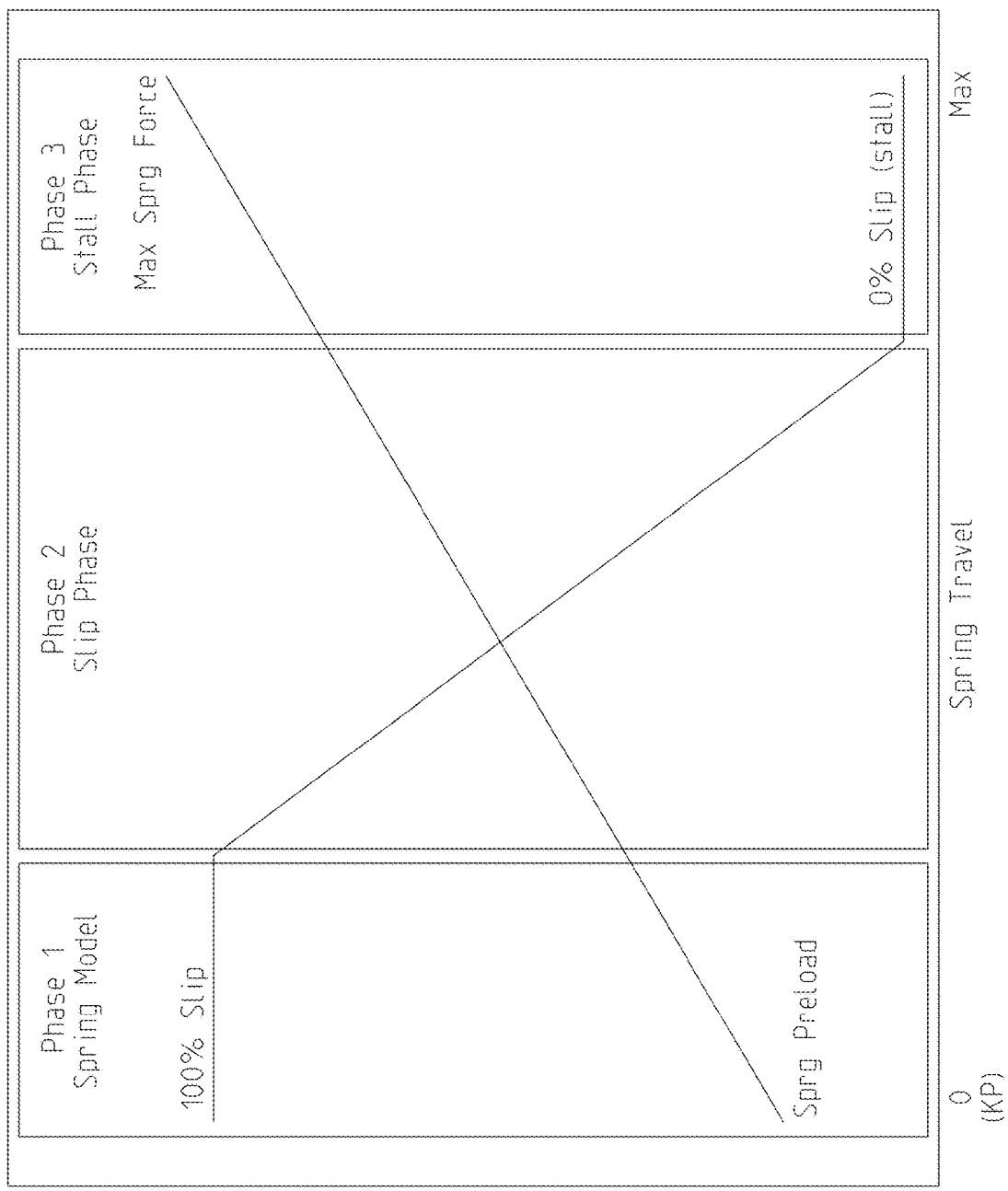
FIG. 77 is a graphical representation of the phases of launch control for the CVTs of the present disclosure.

Referring to FIG. 77, the phases of launch control are discussed. The primary goal of this function is to provide a consistent drive-away response of vehicle 2. The secondary goal is limit the damaging effects of belt slip during a given drive-away. The launch device of drive clutch 50 is the friction interface between drive belt 54 and sheaves 56, 58. As discussed hereinafter, the spring preload is shown in dashed line and slip is shown in solid line.

Phase 1—Spring Model: The first phase of launch control is the point at which there is 100% belt slip. This means that clutch sheaves 56, 58 are spinning but there is no motion of drive belt 58 with vehicle 2 at a stop. In this condition, the control system needs to apply the correct amount of clamp force (CF) (FIG. 75A) that will overcome the static friction force required to get vehicle 2 in motion while balancing the clutch torque desired from the ECM and the engine speed response.

Phase 2—Slip: Through the slip phase, the vehicle speed will be increasing until stall between belt 54 and sheaves 56, 58 at which point vehicle speed will have a direct relationship to engine speed at minimum ratio. This phase needs to balance driver demand, engine speed response, and clamp force (CF) with the goal of traveling through the slip region as quickly as possible but with no objectionable vehicle feedback to the operator.

Phase 3—Stall: The stall phase is when the feedback sensors indicate that belt 54 is no longer slipping against the surfaces of sheaves 56, 58. This is considered belt stall because there is no relative motion between belt 54 and sheave 56, 58. In this condition, the remainder of spring travel will not cause any vehicle acceleration because launch spring 344 cannot overcome the driven clutch spring to change the ratio.

Figure 78:
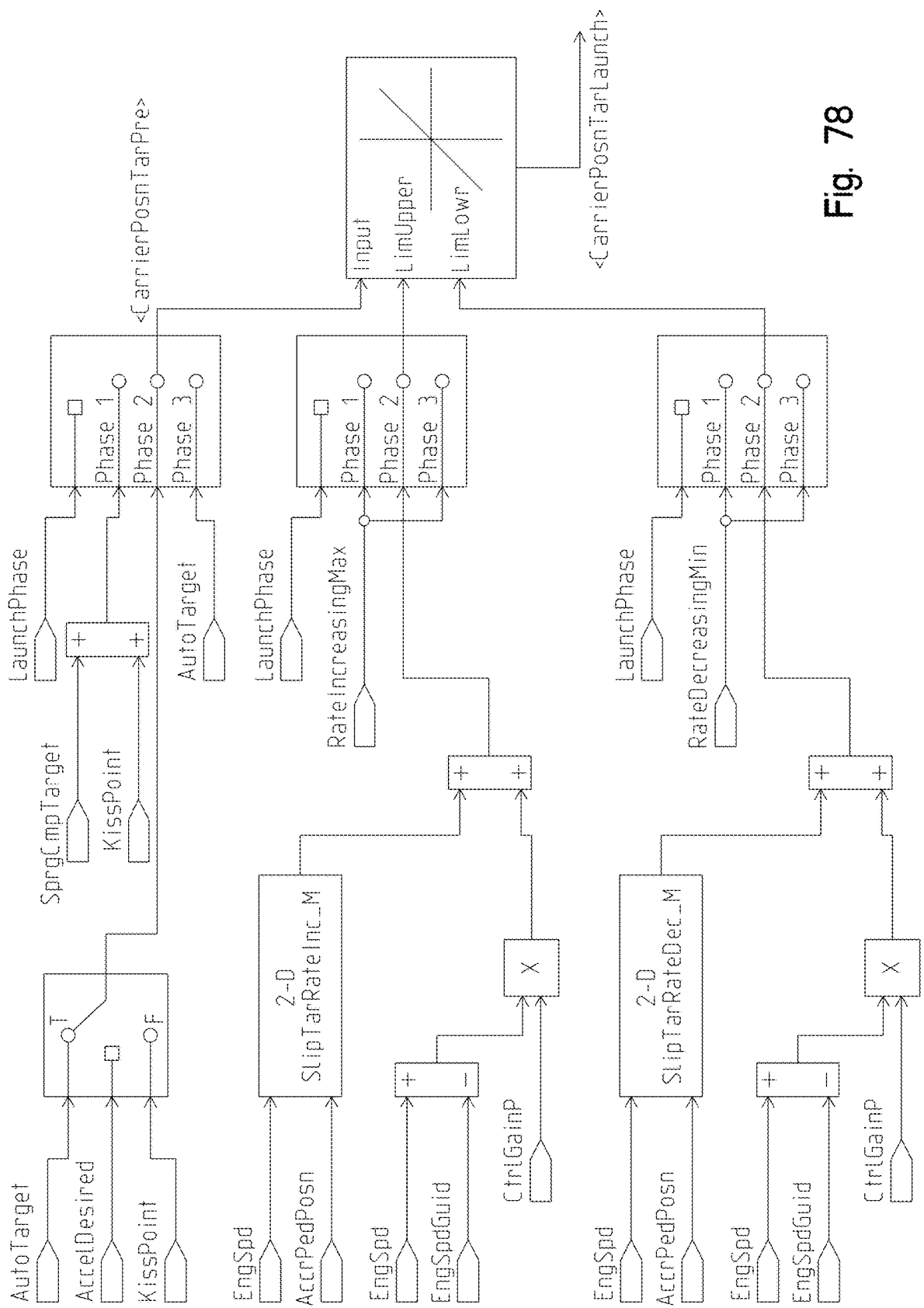
FIGS. 78-80 are schematics of the launch position targets and rate limits for the CVTs of the present disclosure.
Figure 79:
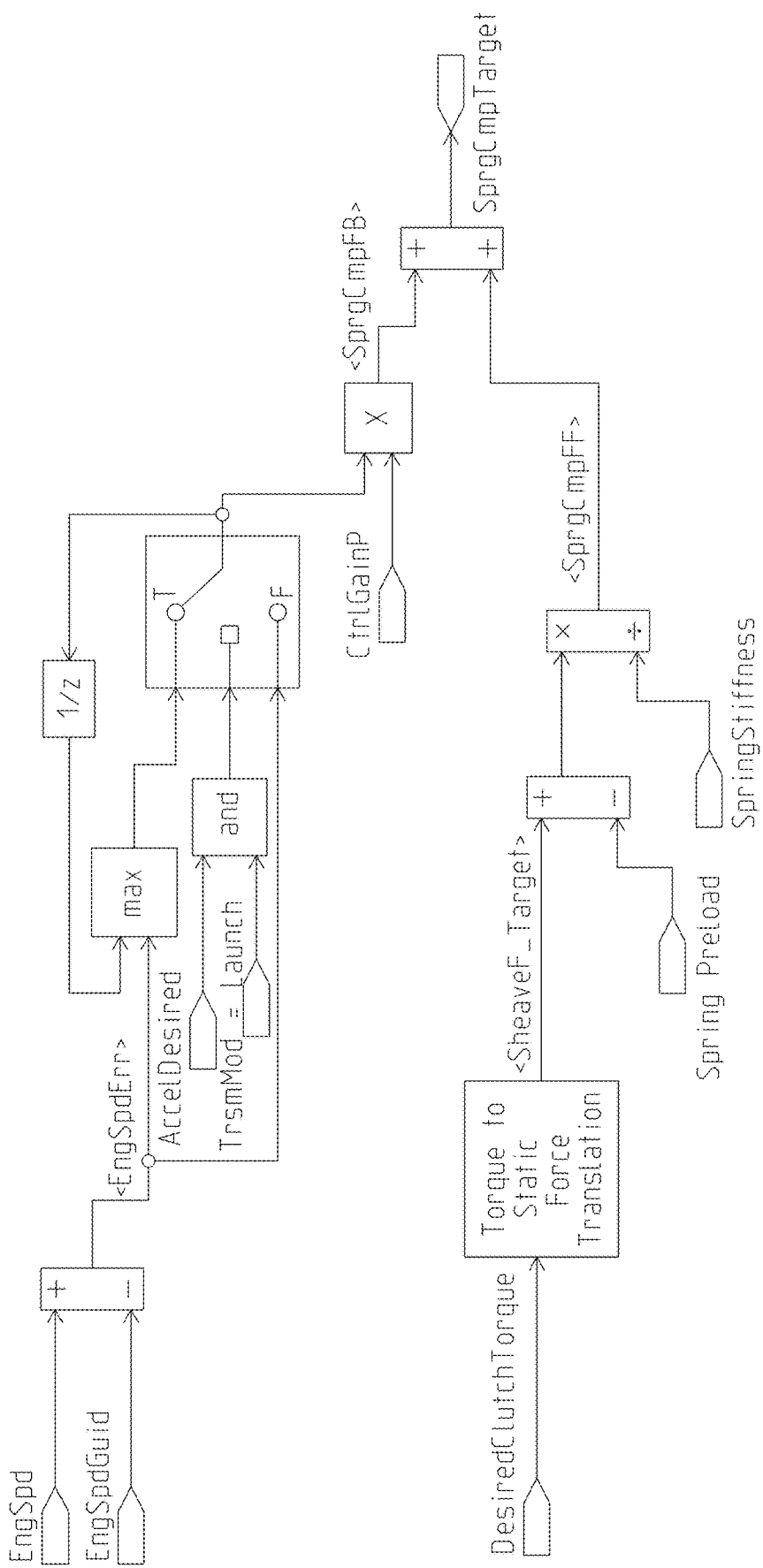
Figure 80:
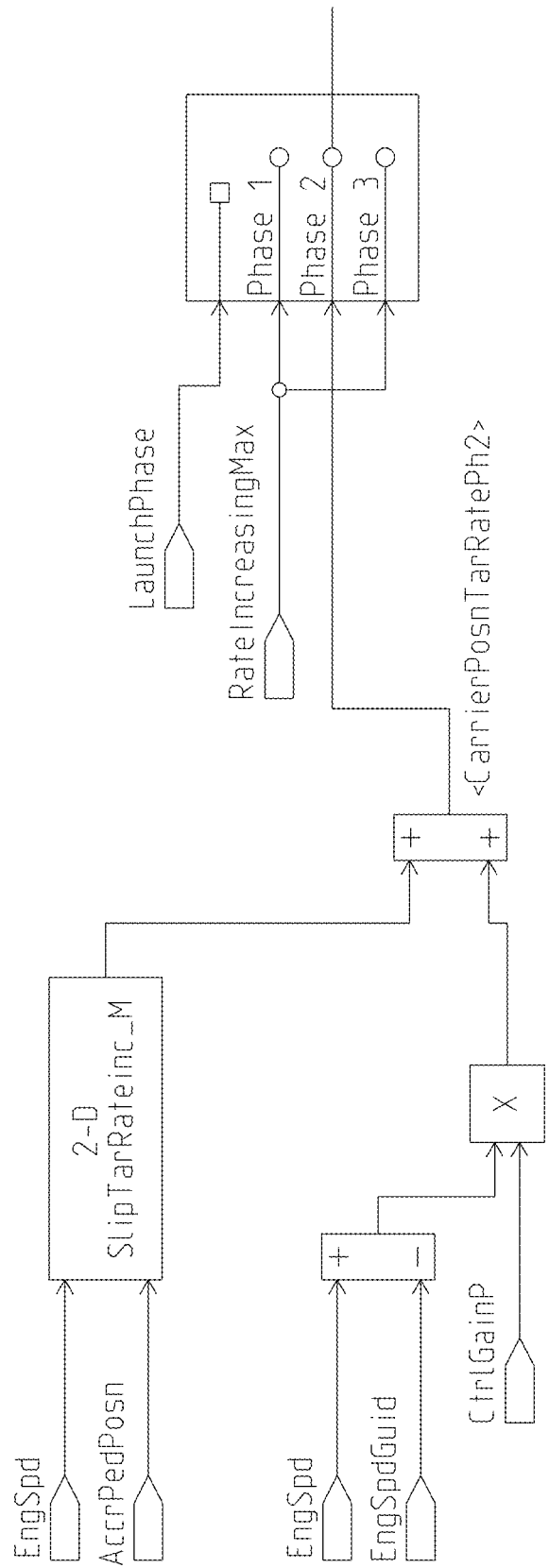

Referring to FIGS. 78-80, an overview of the launch position targets and rate limits is shown (FIG. 78) and more detail is provided for Phases 1 and 2. More particularly, and with respect to FIG. 79, in Phase 1, there is a theoretical and empirically confirmed relationship of the force applied by sheaves 56, 58 and the torque transmissibility. The transmissible torque capability is a function of belt temperature, friction coefficient, and applied sheave force. The belt temperature and friction coefficient are modeled and the control system controls the applied sheave force.

The feedforward spring compression is determined from the desired clutch torque and target sheave force. The engine speed feedback controller monitors the desired engine speed for drive-away (EngSpdGuid) with the current engine speed (EngSpd). This is to account for under- or over-clamping of the feedforward term caused by inaccuracies in indicated clutch torque or the modeled torque transmissibility. Note that the error term is set at the maximum value during a given drive-away event and if it is determined the driver intends to accelerate. This is to ensure that the control system does not release the clamp force provided as feedback error goes to zero, as they directly affect each other and it will cause instability during a given acceleration. This is used as opposed to an integral controller to improve system response on a given drive-away.

Referring to FIG. 80, in Phase 2, the control system transitions to the slip phase when the speed feedback indicates that belt 54 is rotating at a consistent speed. This indicates that the primary goal of vehicle drive-away is complete and it must transition through the belt-slip region as quickly and unobjectionably as possible. As belt slip is decreasing to 0, vehicle 2 is accelerating. Closing drive clutch 50 (FIG. 75B) quickly can cause an unintended lurch of vehicle 2; however, this is mitigated by implementing an active ramp rate to the position target. The position target in this condition is the value determined from TrsmMod=Auto. The active ramp rate is based on a feedforward look-up map for engine speed and accelerator position with a feedback P controller used to adjust the ramp rate should error exist between current engine speed and the desired drive-away engine speed (EngSpdGuid) (e.g., increase the ramp rate should positive error exist between current engine speed and the desired drive-away engine speed).

Regarding Phase 3, the stall phase is defined as when there is no relative motion between belt 54 and sheave 56, 58, but spring travel remains. In this condition, the control system can ramp to the end of spring travel quickly and enter automatic mode because launch spring 344 is unable to overcome the driven spring.

Regarding spin burn, spin burn may be shown or modeled as spin burn damage=f (Slip Velocity, Friction Coefficient, Clamp Force). In a typical CVT, Clamp Force=f (Engine RPM), so when vehicle 2 is at a stop, it inherently forces the slip velocity to increase to provide enough clamp force for vehicle 2 to drive-away. With an electronically-controlled CVT, such as CVT 34 of the present disclosure, clamp force is independent of engine RPM. With this control, much lower target engine speeds for drive-away are possible which mitigates the risk of spin burn. This functionality may improve belt life and limit the likelihood of spin burn belt damage.

Referring still to FIGS. 75A and 75B, and also shown in FIG. 81, lead screw 1342 is configured to convert angular motion from electric motor 200 to linear motion of moveable sheave 56 of drive clutch 50. Lead screw assembly 1330 is connected to electric motor 200 through the splined connection of sliding spline 1330. Angular motion from motor 200 is converted to linear motion by lead screw nut 1340 and lead screw 1342 of lead screw 1331. The torque arm is grounded to a rigid structure (e.g., tower 196' (FIG. 68) which provides a reaction torque for lead screw 1342. The sliding splined engagement of lead screw nut 1340 on a lead screw nut tube 1343 allows for compression of launch assist spring 1344 without axial movement of moveable sheave 56. As shown in FIG. 81, launch assist spring 1344 may compress a distance 1350 based on the position of lead screw nut 1340 relative to lead screw 1342. For example, FIGS. 75A and 75B disclose the open and closed positions of drive clutch 50 and the corresponding positions of lead screw nut 1340 relative to lead screw 1342 to achieve such sheave positions.

Actuation assembly 100 is sized to allow the torque transfer device to nest inside of it, thereby saving space on vehicle 2 and reducing the overall width of CVT 34. More particularly, packaging drive clutch 50 with a single torque arm allows actuation assembly 100 to fit within the envelope of belt 54, thereby making serviceability of CVT 34 easier. Launch assist spring 344 allows for easier and more consistent control of the torque transfer between sheaves 56, 58 and belt 54, thereby improving low speed drivability and launch of vehicle 2.

Figure 82:
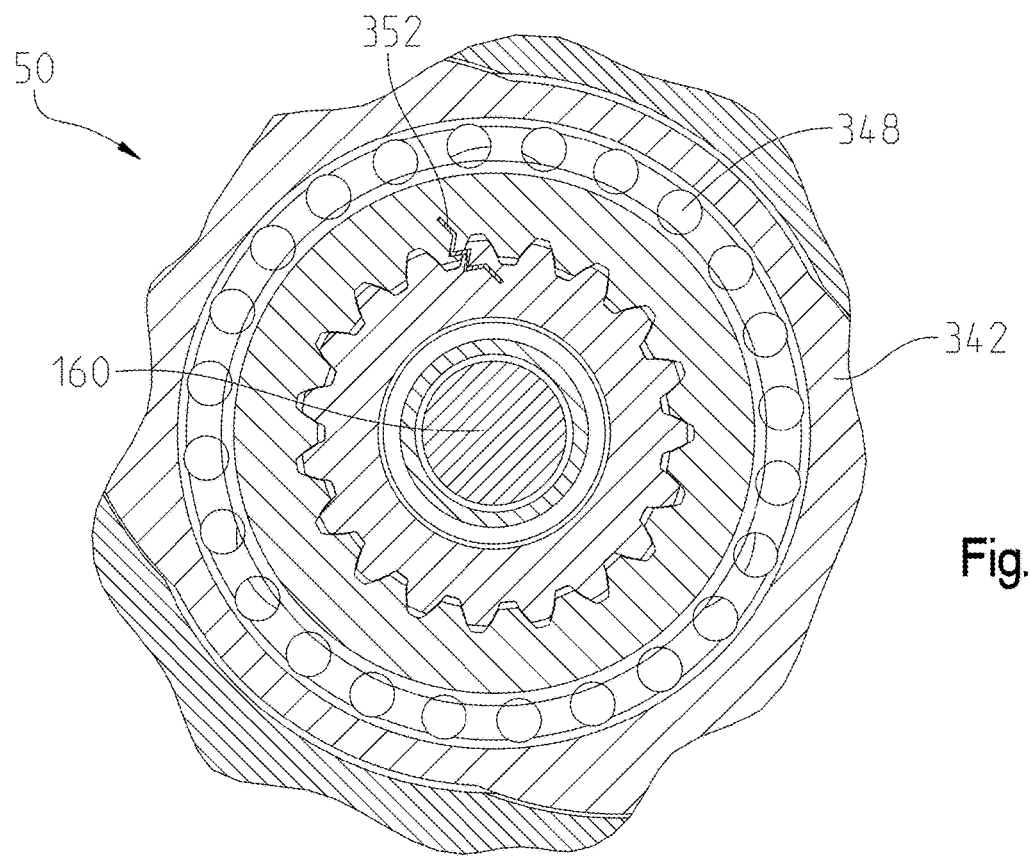
FIG. 82 is a cross-sectional view of a first backlash feature of the CVTs of the present disclosure.
Figure 83:
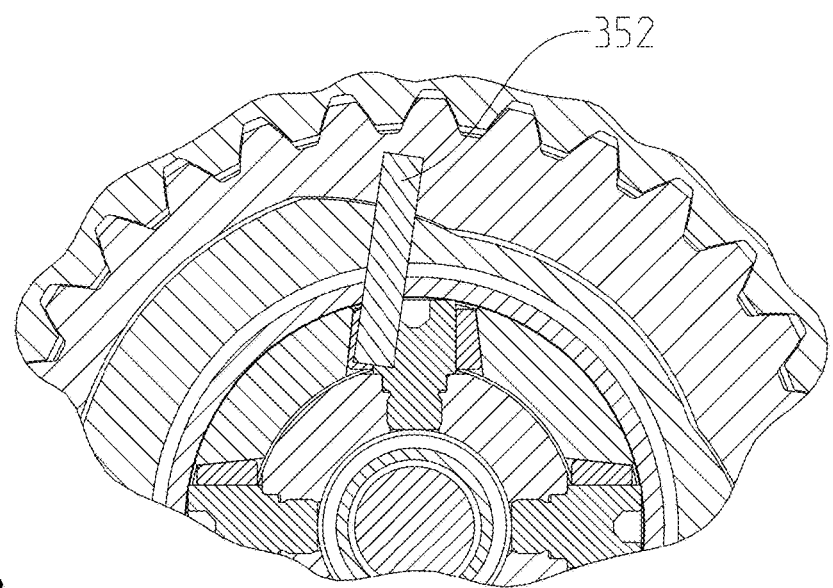
FIG. 83 is a cross-sectional view of a second backlash feature of the CVTs of the present disclosure.

Referring to FIGS. 82 and 83, drive clutch 50 may include a feature 1352 to reduce or eliminate the backlash in the torque transfer mechanism of CVT 34. Drive clutches typically have at least one flexible joint for transferring torque to allow the moveable sheave to translate axially in order to change the ratio of the CVT. This joint (e.g., splines, pins, buttons) may have some amount of backlash in order to assemble the parts. However, if backlash can be reduced, noise, vibration, and harshness also may be reduced and durability of the torque transfer mechanism may be increased.

As shown in FIG. 82, backlash feature 1352 may be centrifugally activated which would reduce the backlash once the engine is running. Illustratively, backlash feature 1352 engages with input shaft 160 and shaft 1336 and is positioned generally at the splined interface of shaft 160 and shaft 1336 and, more particularly, is positioned along first sliding splines 1330. Backlash feature 1352 also may be engaged by a torsion member with varying stiffness (e.g., a spring or rubber coupler).

As shown in FIG. 83, backlash feature 1352 may be configured as a wedge roller. Backlash feature 1352 has an angular surface relative to shaft 1336. Radial motion of backlash feature 1352 reduces the clearance or backlash between input shaft 160 and shaft 1336 such that the radial motion of backlash feature 1352 presses shaft 160 against shaft 1336 to reduce the clearance therebetween.

In this way, both backlash features 352 of FIGS. 82 and 83 are positioned adjacent to or at the interface between shafts 160, 1336 to reduce the clearance or backlash therebetween.

Figure 84:
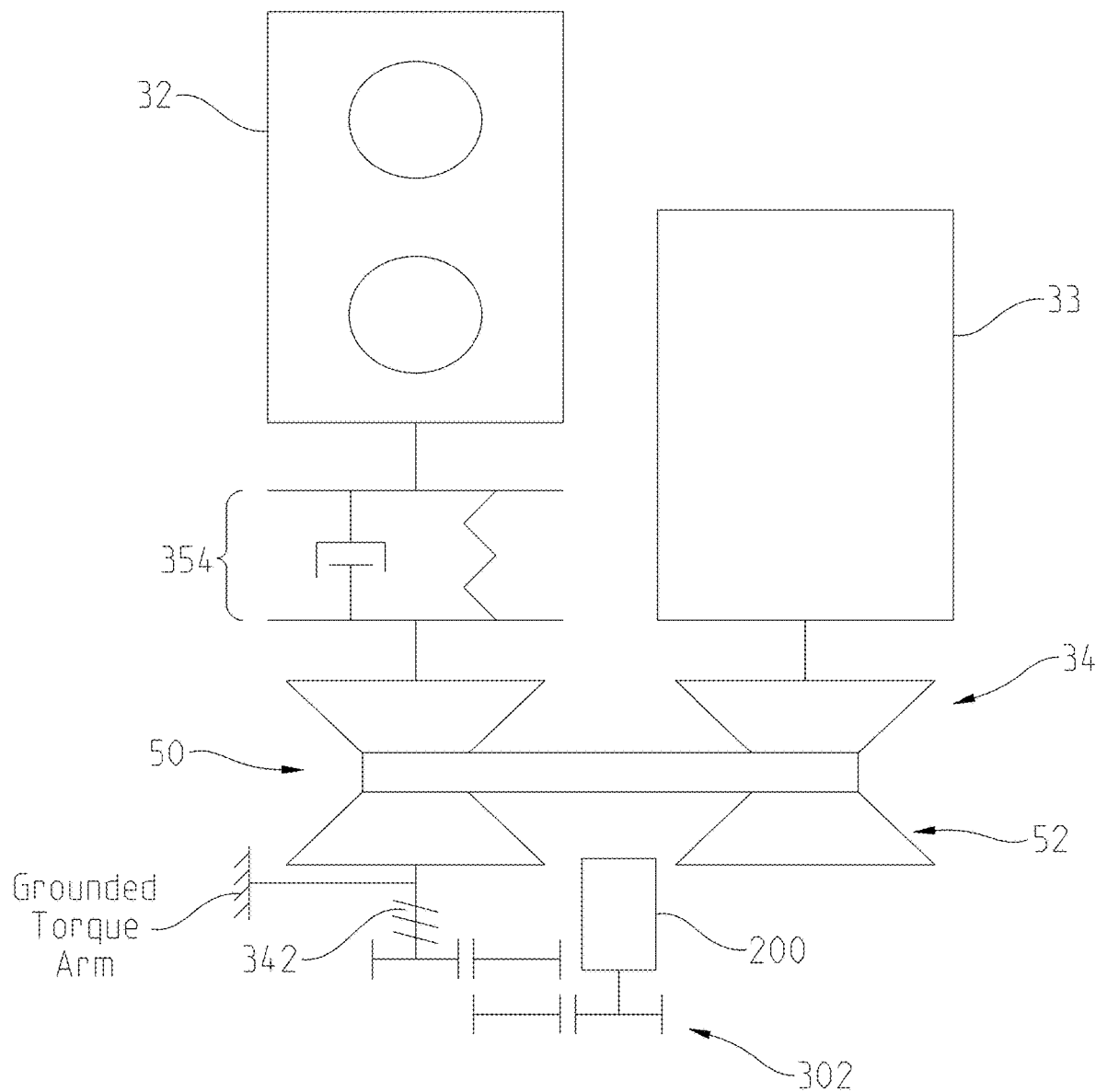
FIG. 84 is a schematic view of a powertrain assembly of the present disclosure and including a torsional damper.

Referring now to FIG. 84, a torsional damper 1354 may be included between engine 32 and drive clutch 50 of CVT 34. Torsional damper 1354 may comprise various architectures, such as a rubber coupler, an arc spring, etc. Powersport engines tend to have lightweight crankshafts to allow the vehicles to accelerate faster. An undesirable effect from this is high alternating torque loads from the acceleration changes of the crankshaft from firing pulses. However, torsional damper 1354 may reduce the magnitude of the alternating loads. Reducing the alternating loads from engine 32 increases the lifespan of components and may reduce noise, vibration, and harshness in systems with backlash.

Figure 85:
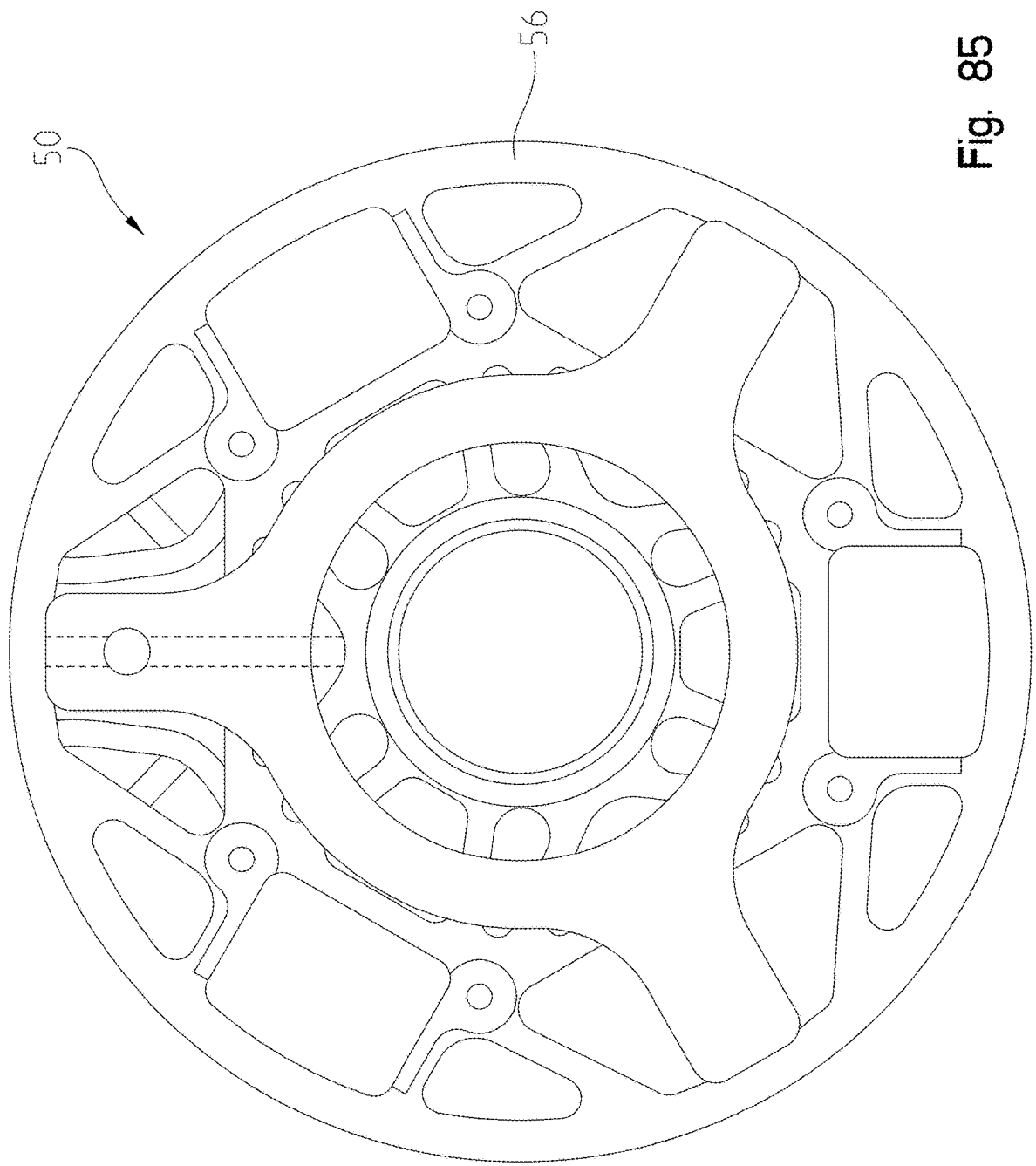
FIGS. 85-88 illustrate a cooling mechanism for a moveable sheave of the drive clutch.

Referring to FIGS. 85-88, moveable sheave 56 typically is the component with the highest temperature in CVT 34. Moveable sheave 56 may include various components or features to increase cooling thereof. For example, as shown in FIG. 85, a first windage plate 1355 may be shown with ribbing 1353 which would create a pumping action to move air across moveable sheave 56 to increase cooling thereof. Similarly, and ss shown in FIGS. 87 and 88, a second windage plate 1356 and ribs 1357 may be used to create a pumping action to move air across the back side of moveable sheave 56 in order to cool moveable sheave 56. In both embodiments, air moves from the inner diameter of sheave 56, under windage plate 1355, 1356 and exits the outside of sheave 56.

Figure 86:
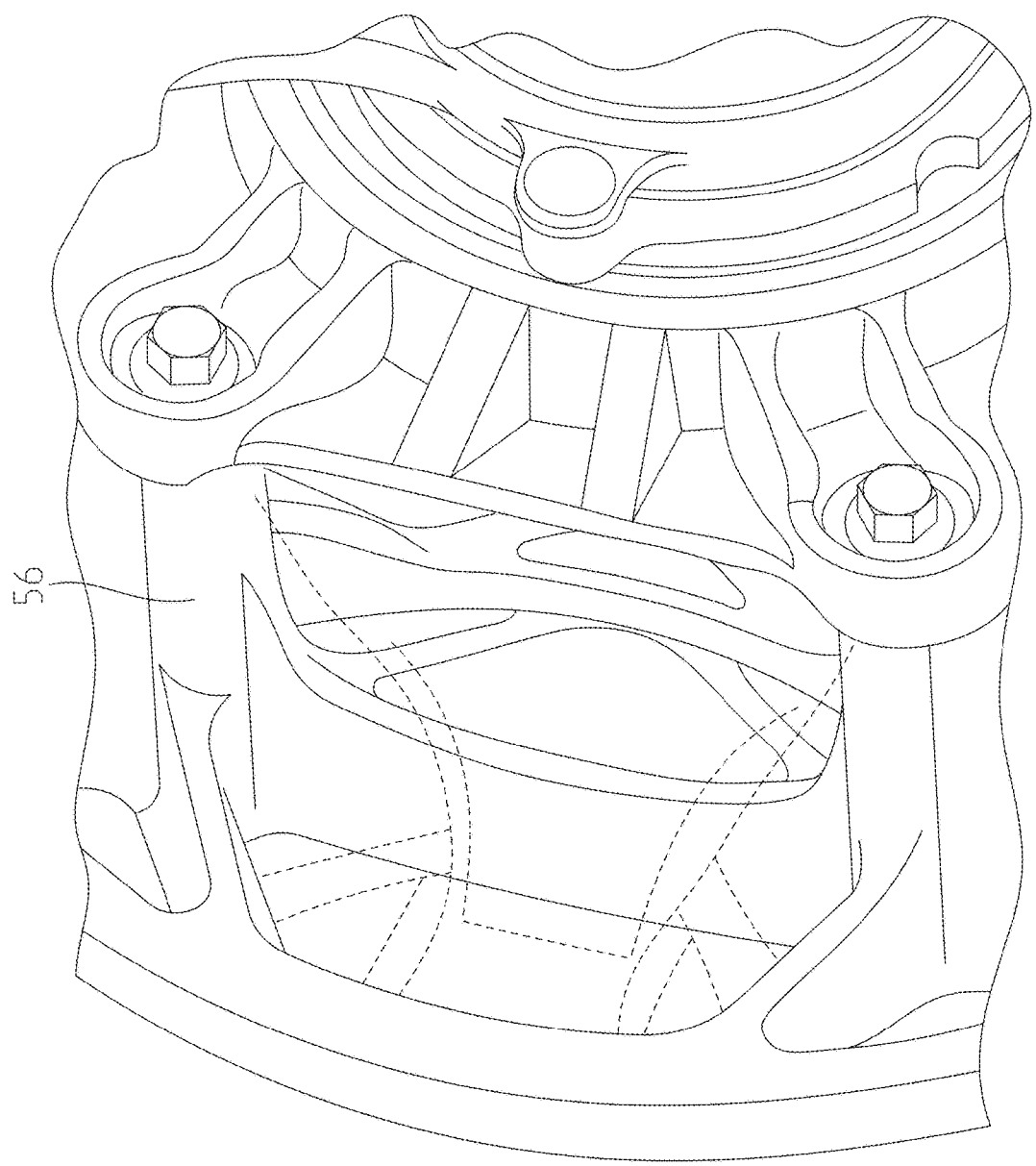
Figure 87:
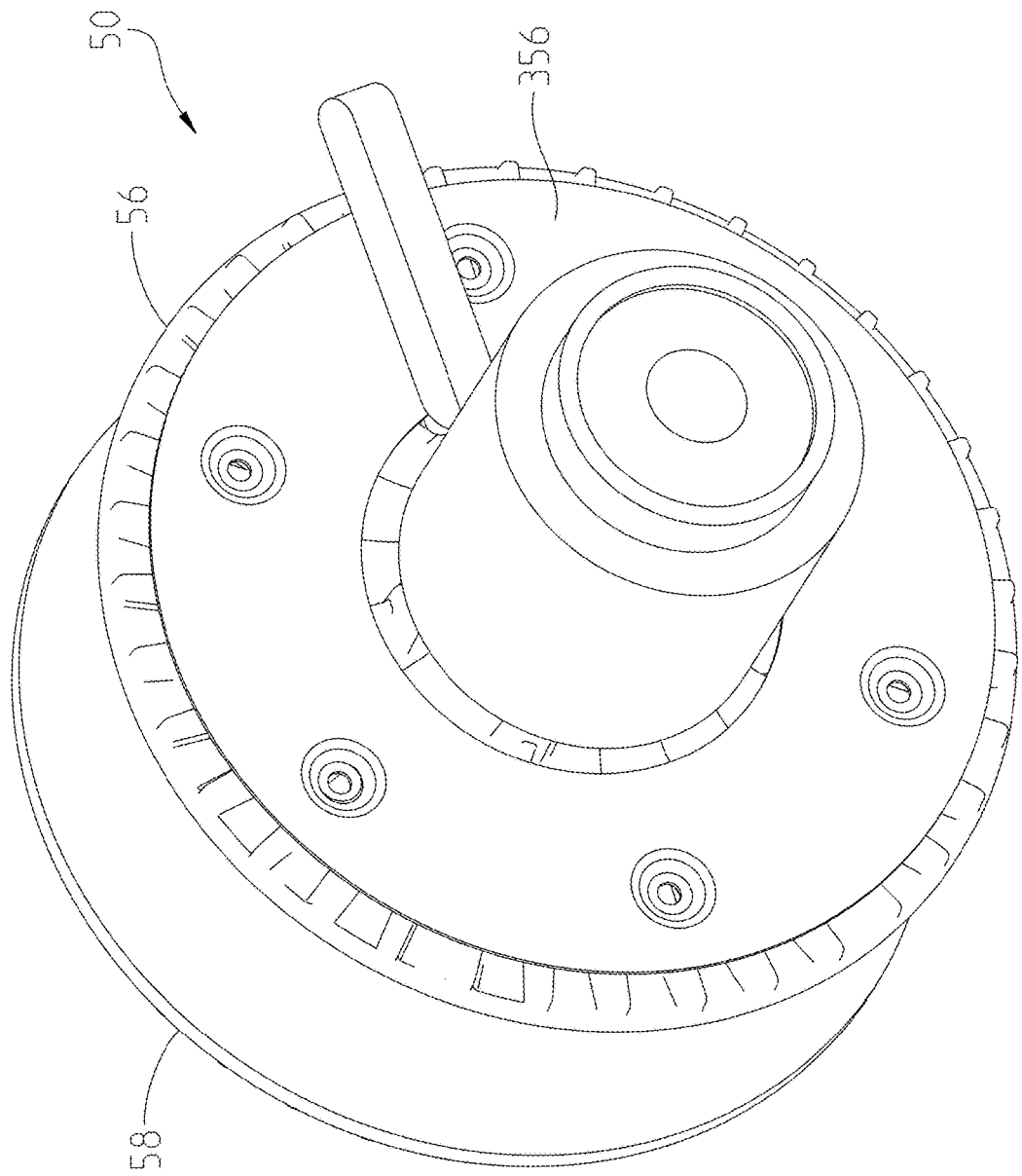
Figure 88:
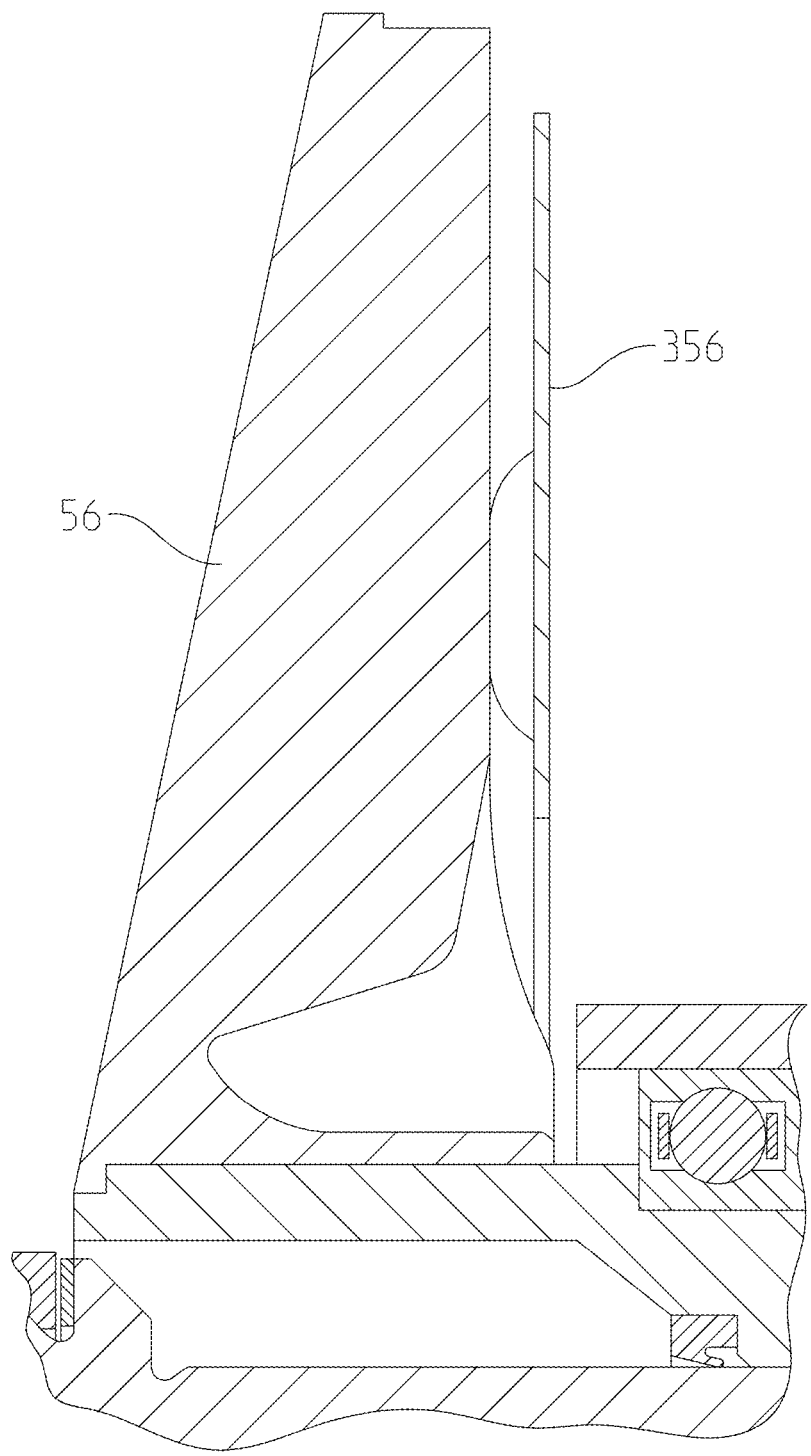

Referring to FIG. 86, moveable sheave 56 may include ribs 1360. Ribs 1362 also may be included on a clutch cover 1364 of drive clutch 50. Both ribs 1360, 1362 may add heat rejection (i.e., promote cooling) through radiation or convection similar to how fins on a radiator promote cooling. Ribs 1360, 1362 may be die cast and integrally formed with moveable sheave 56, clutch cover 1364, and/or other components of drive clutch 50.

Figure 89:
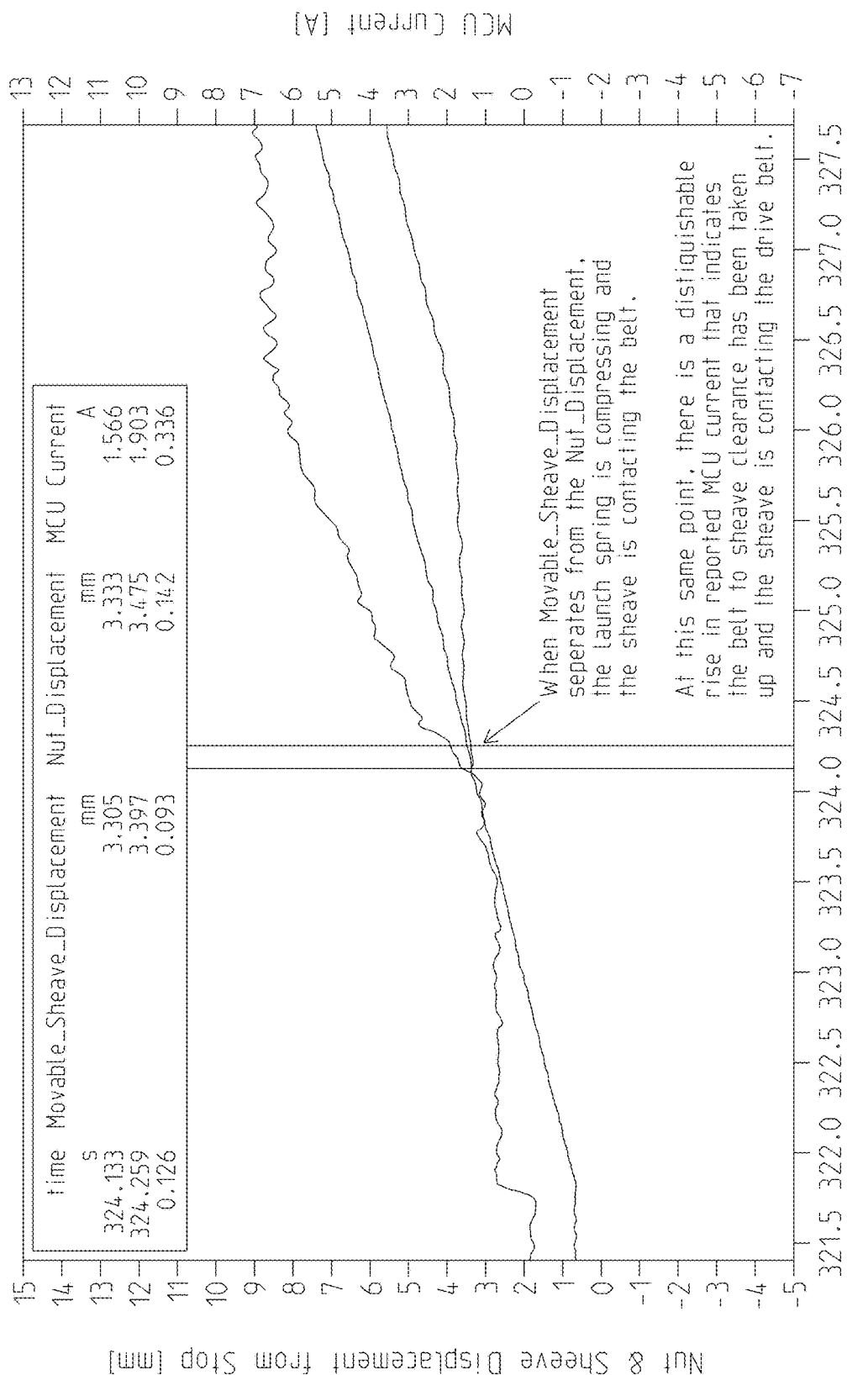
FIGS. 89 and 90 are graphical representations of a method of determining the kiss-point of the belt and moveable sheave of the drive clutch.
Figure 90:
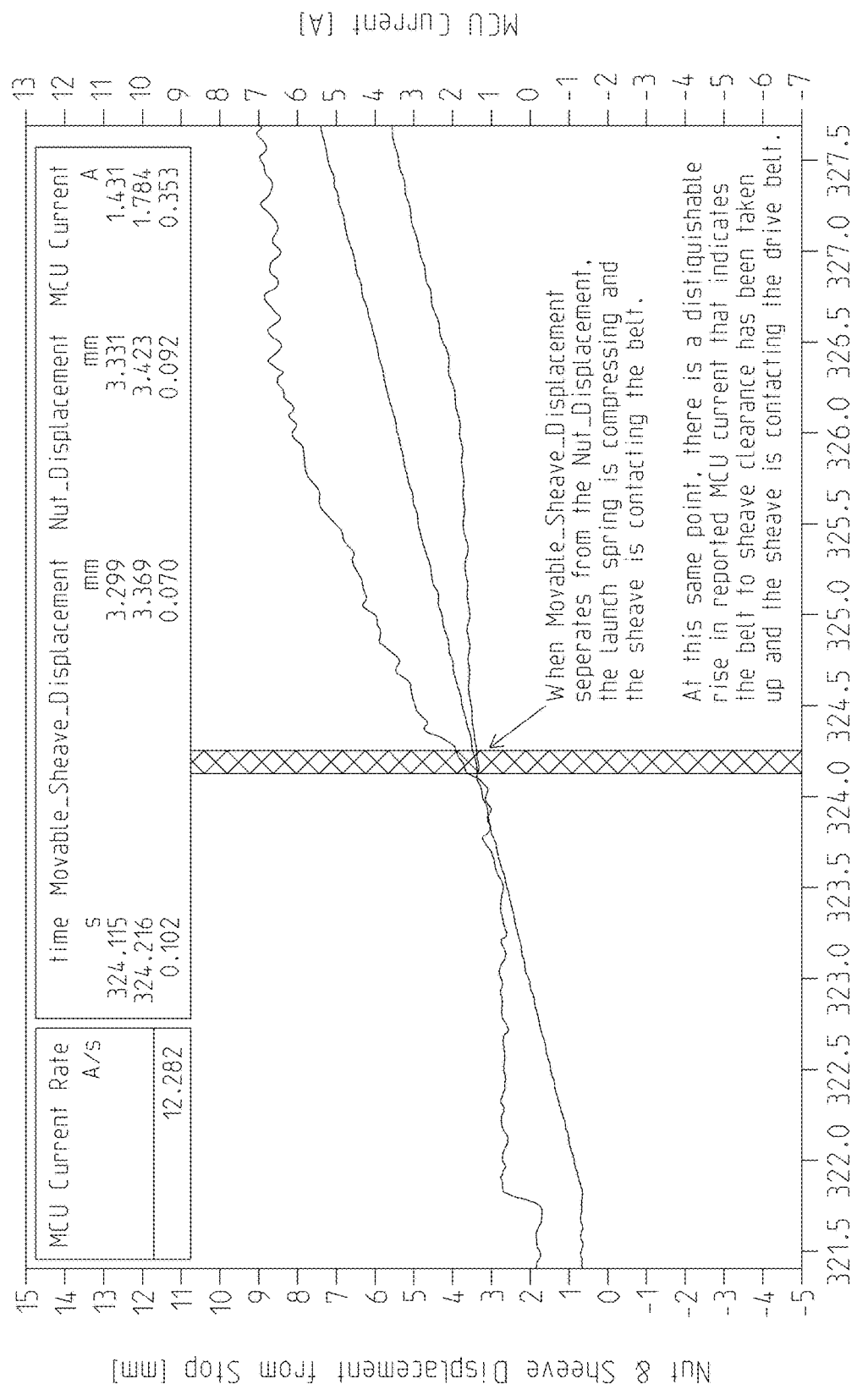
Figure 91A:
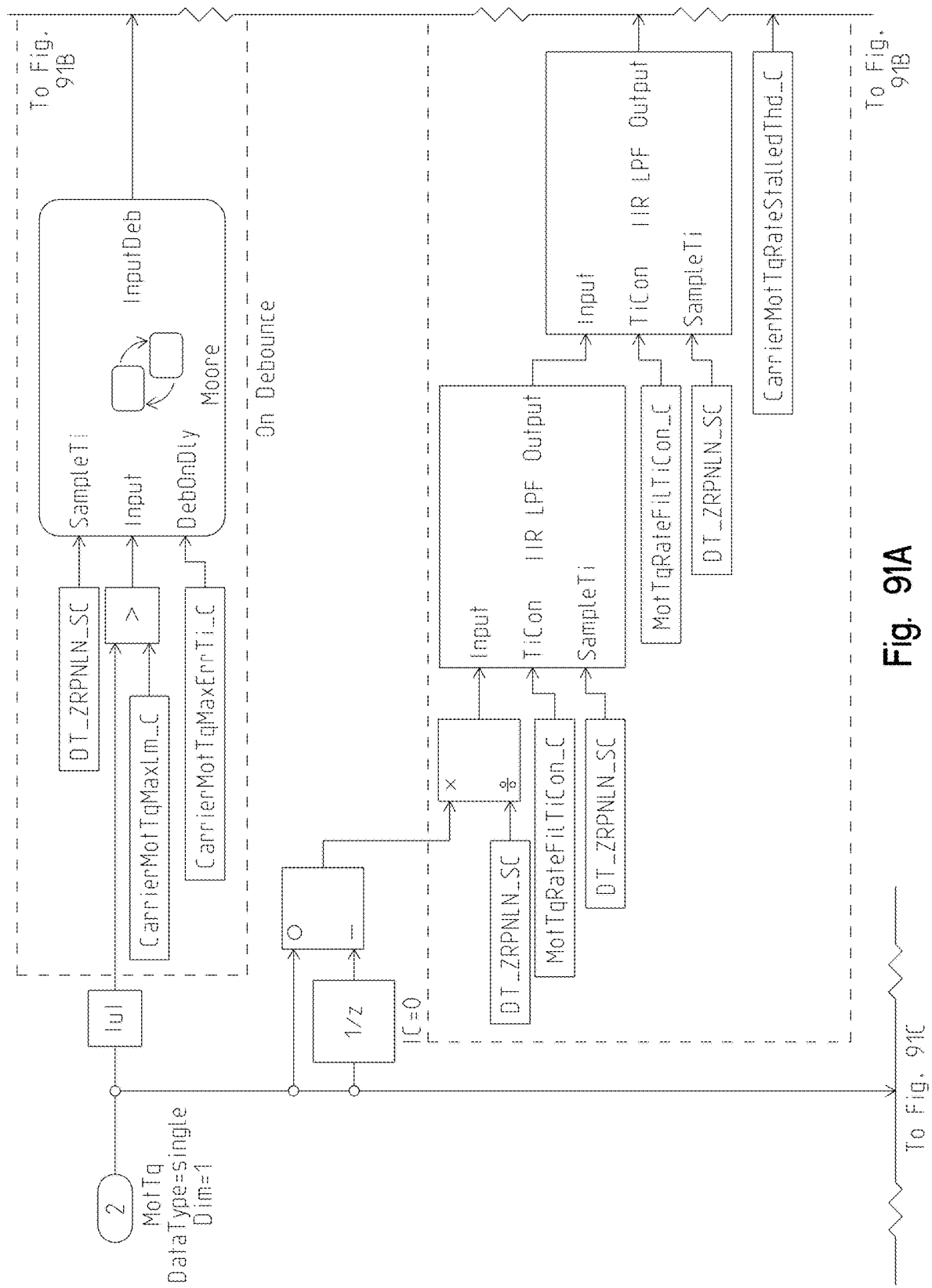
FIGS. 91-93B are schematic representations for learning the "home" or "zero" position of a clutch of the present disclosure.
Figure 91C:
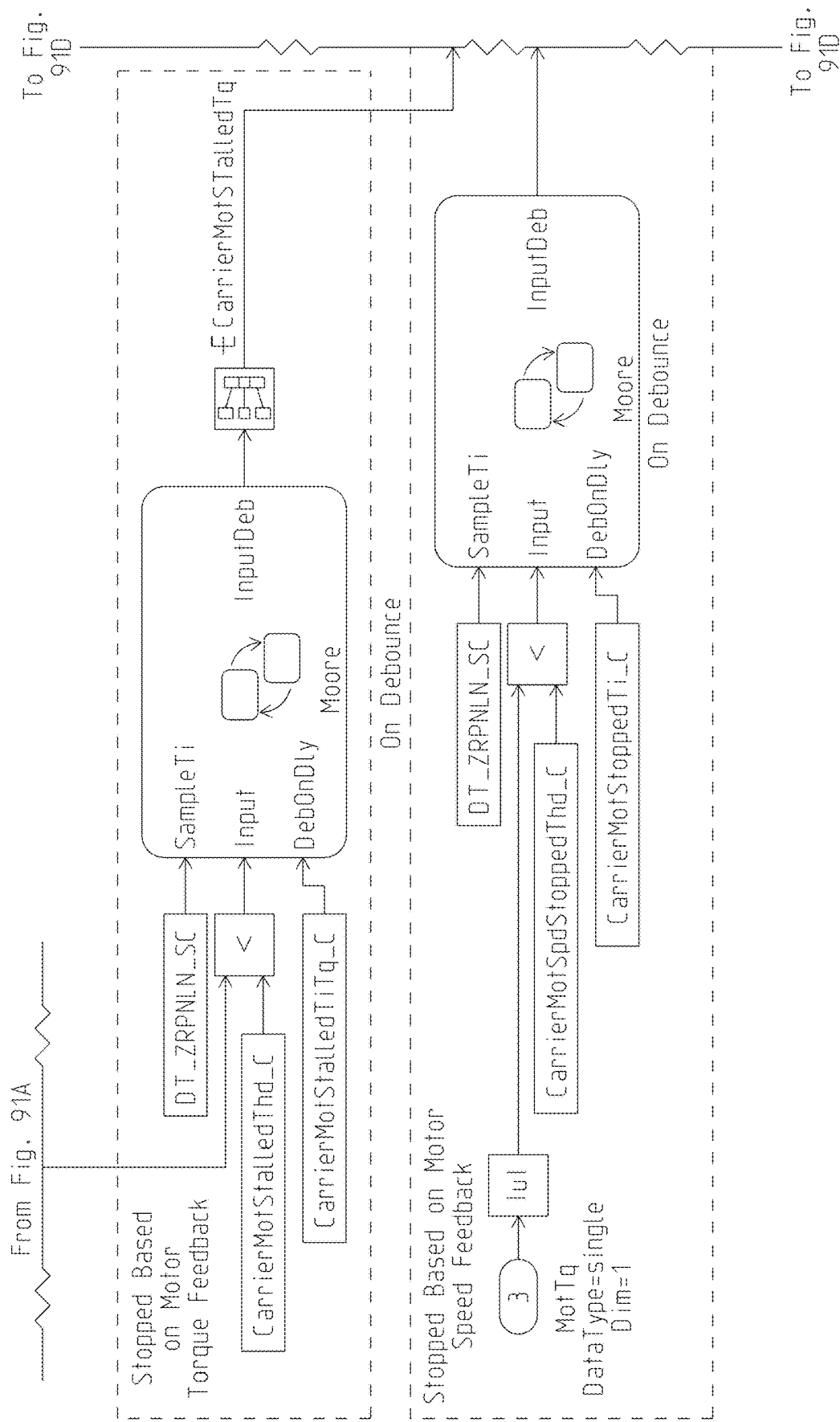
Figure 91D:
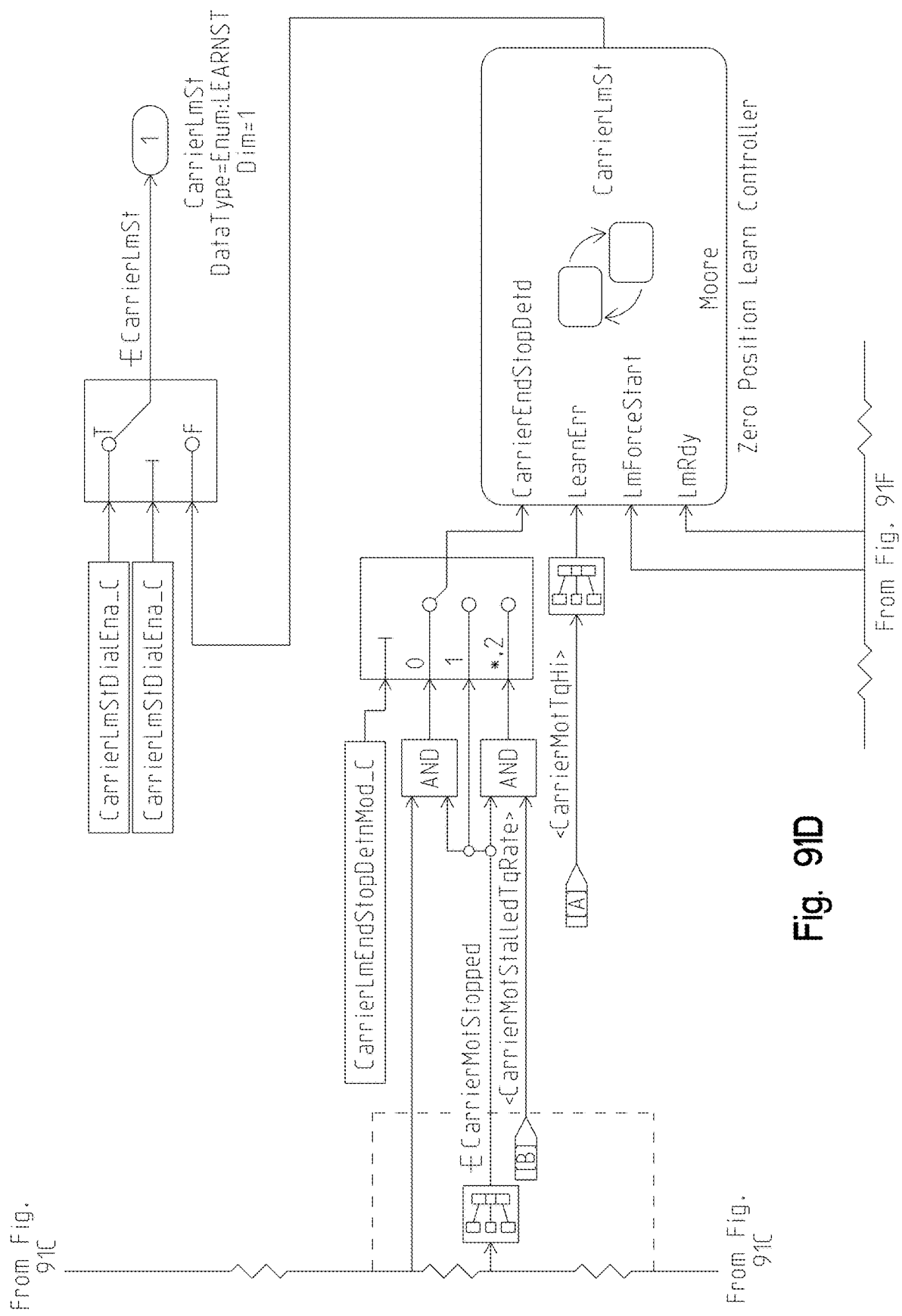
Figure 91E:
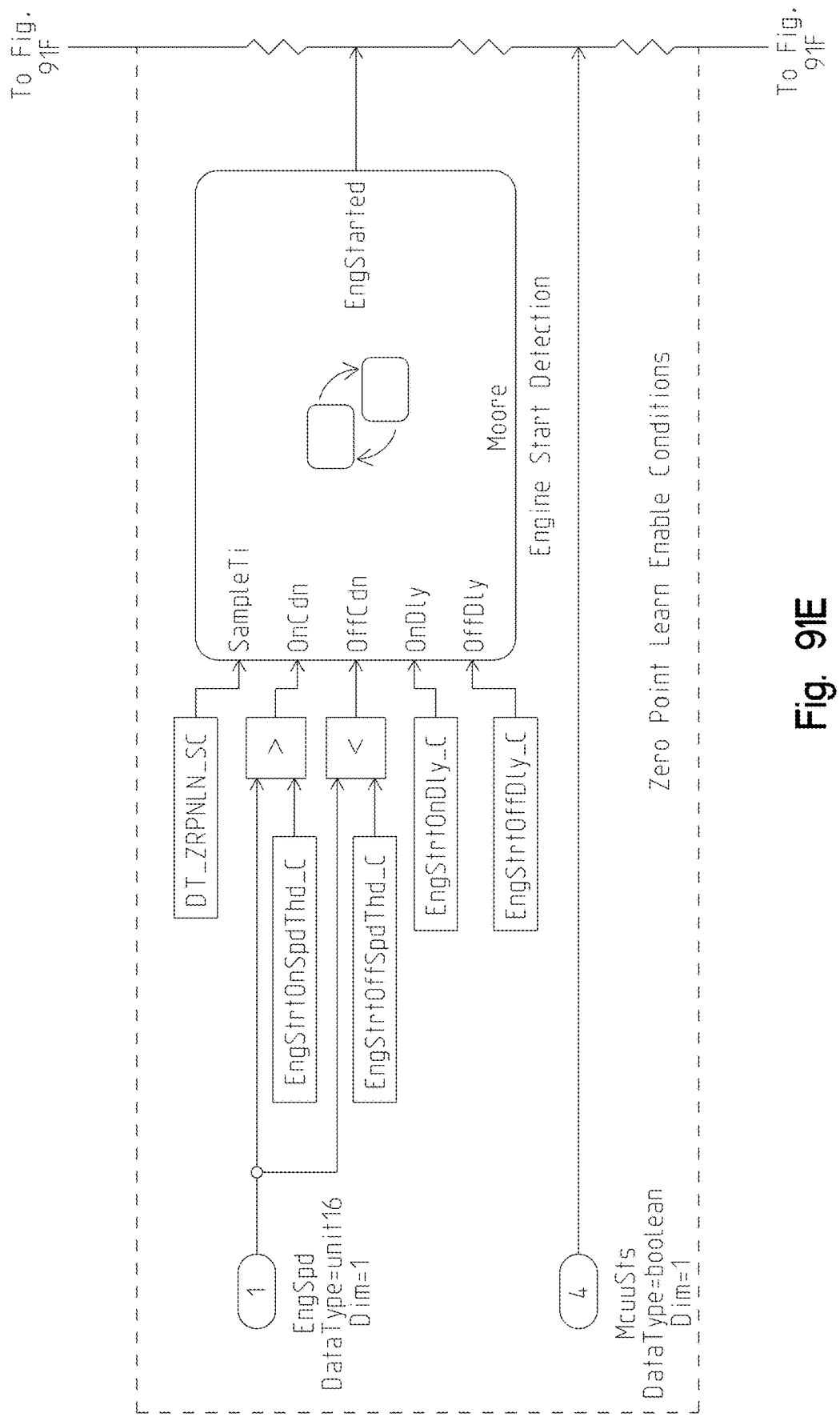
Figure 91F:
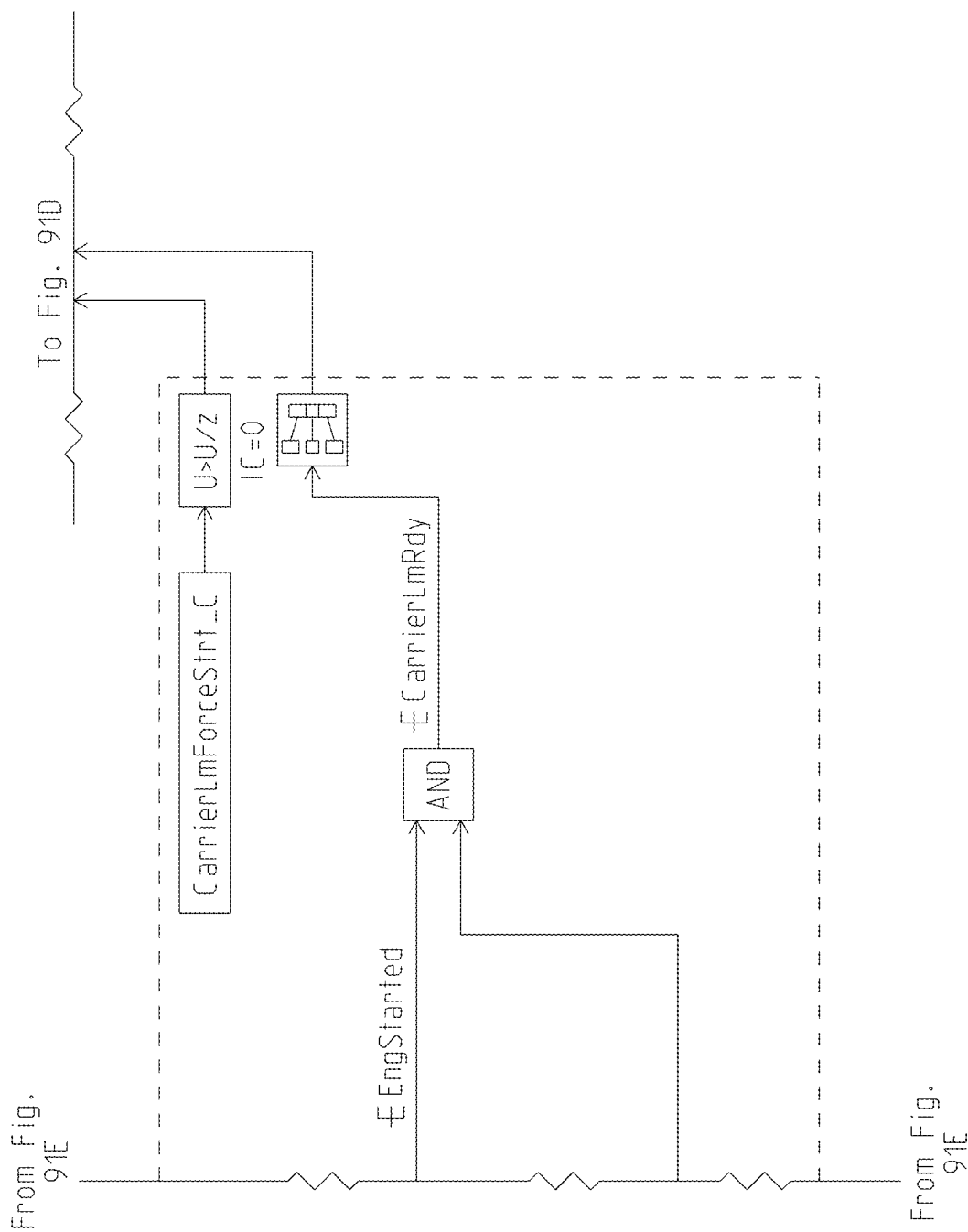
Figure 92A:
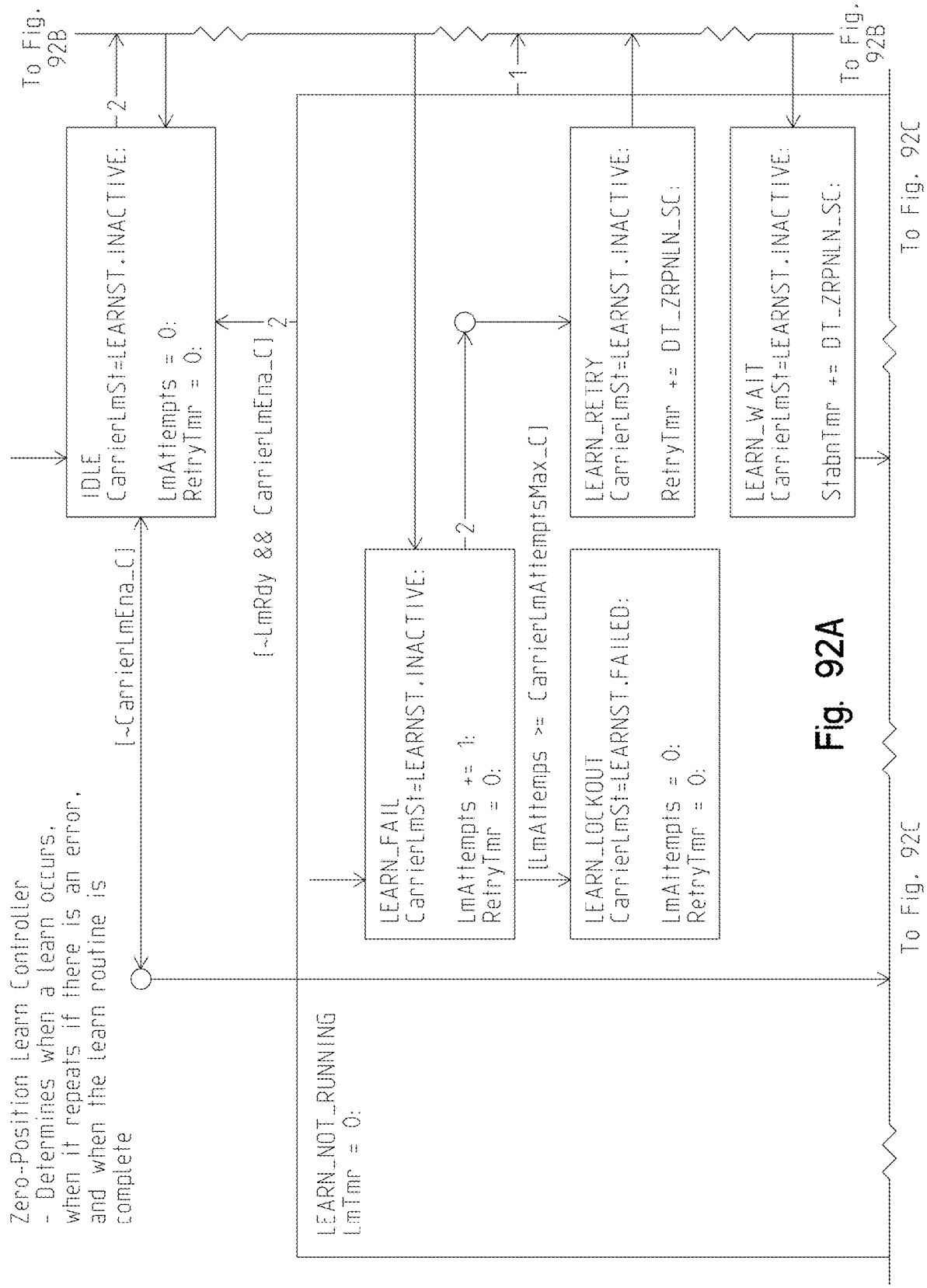
Figure 92B:
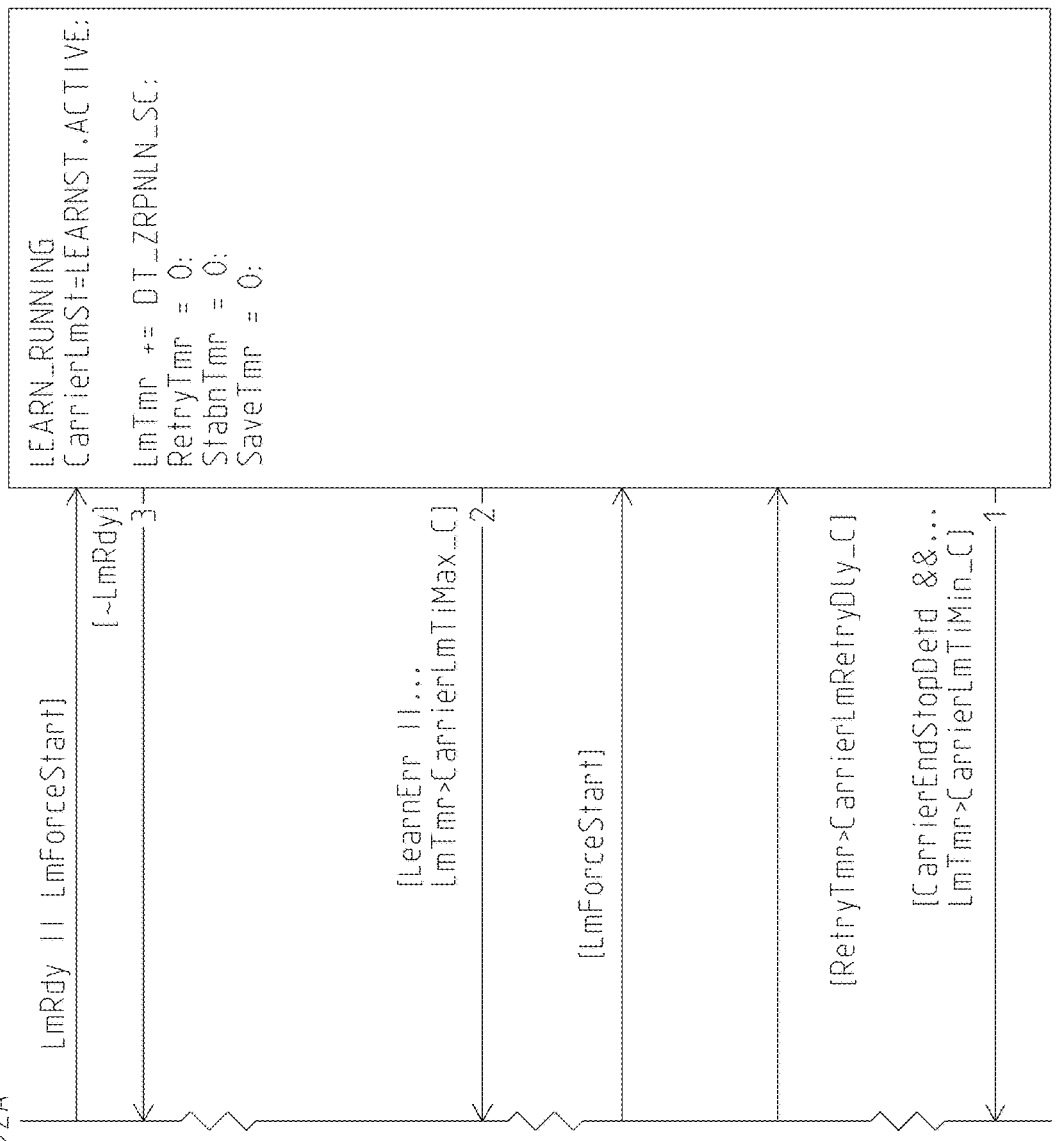
Figure 92C:
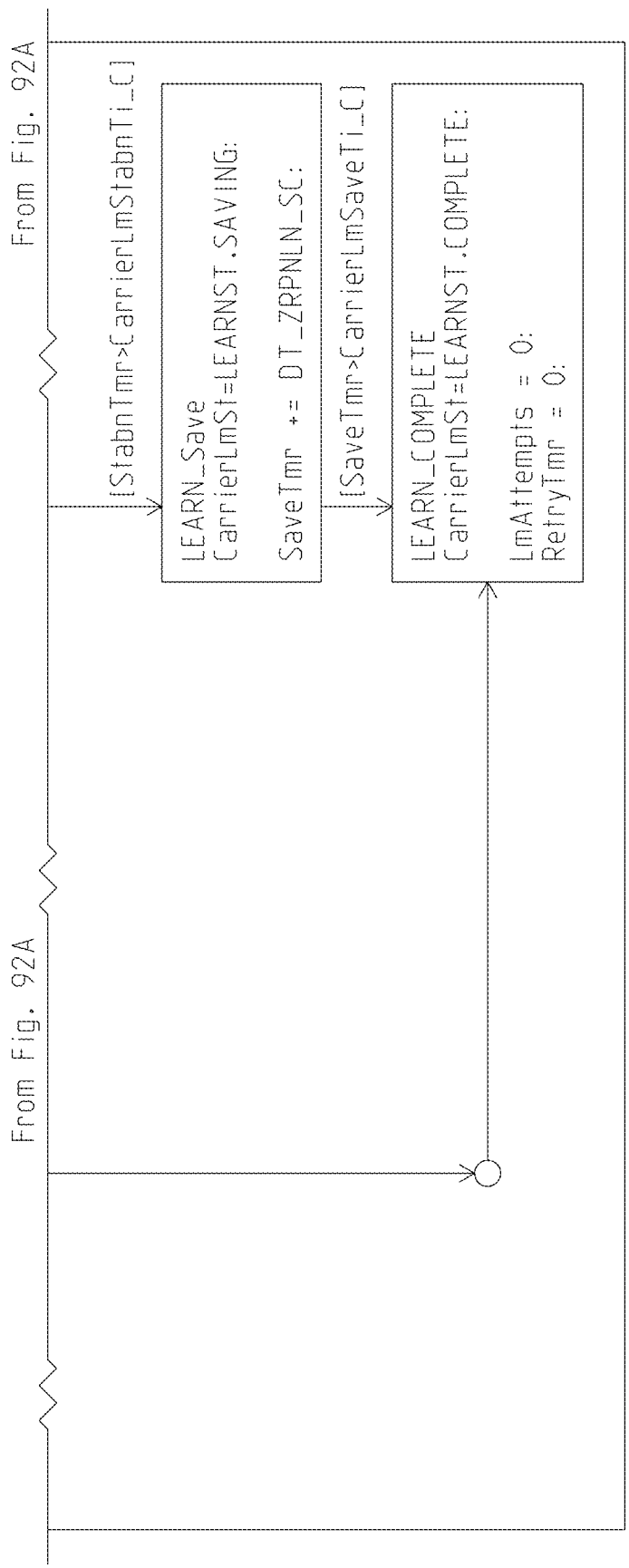
Figure 93A:
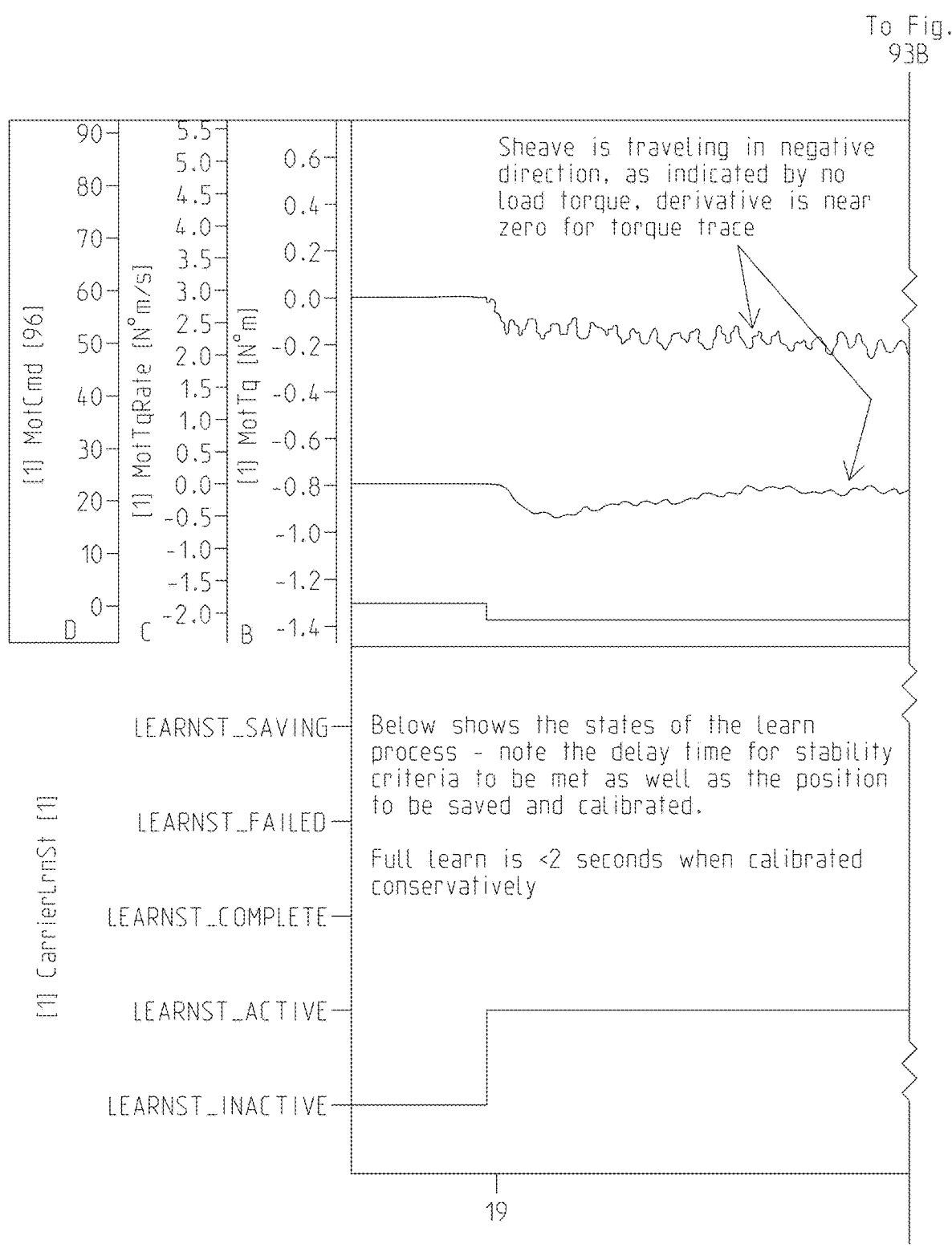
Figure 93B:
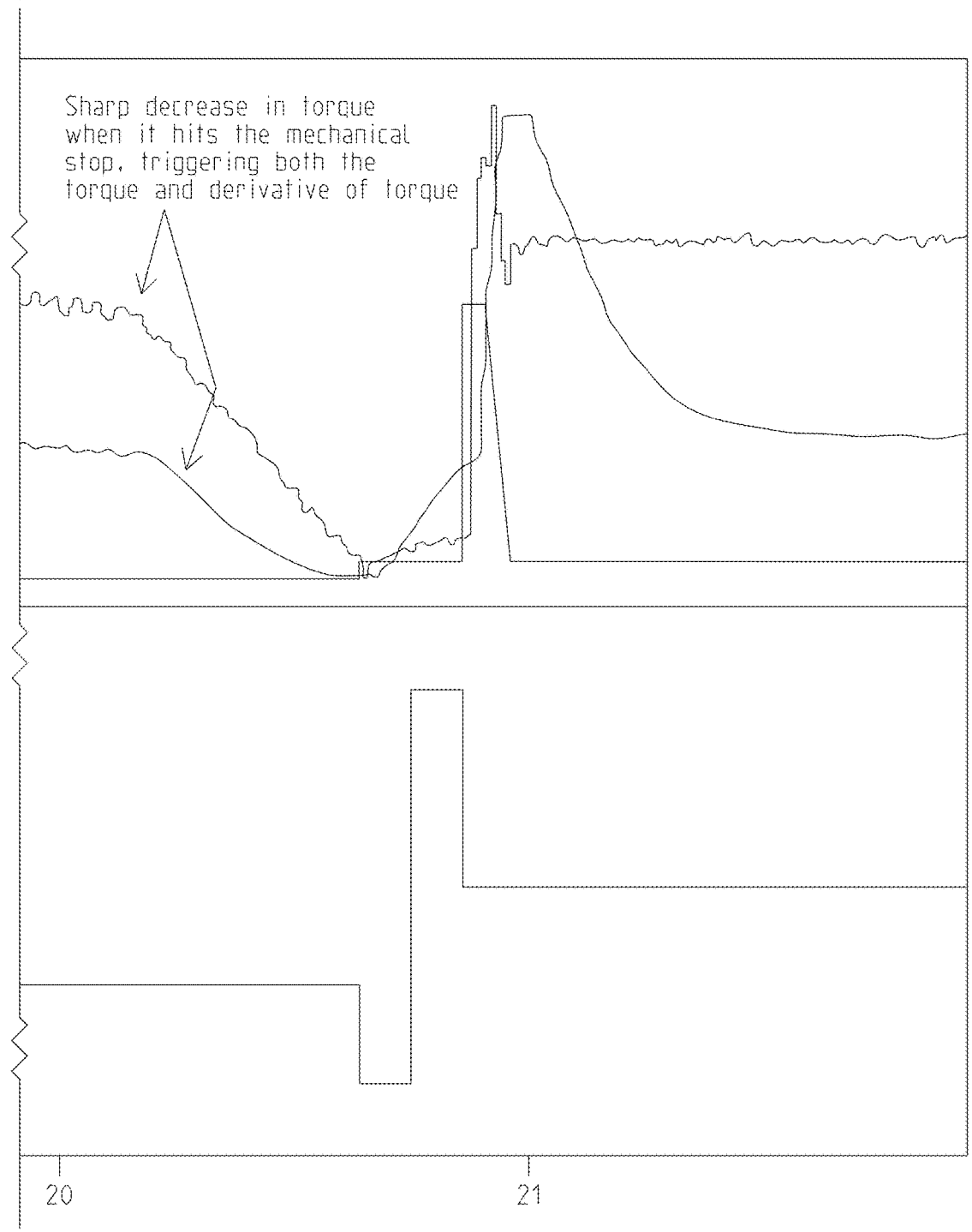

Referring to FIGS. 89 and 90, as disclosed herein, a single electronic actuator may be used to control both the launch of vehicle 2 and the ratio of CVT 34 during normal operation of vehicle 2. CVT 34 needs to understand the kiss-point of belt 54 (or dry clutch assembly, if so equipped). This kiss-point location is the point at which moveable sheave 56 of drive clutch 50 begins transferring torque to belt 54. This kiss-point location is to be learned at the start of the life of CVT 34, adapted, and stored to non-volatile memory through the life of vehicle 2 to ensure adequate control of launch spring 344 during vehicle launch for variations in belt width, hardware tolerate stacks and component wear through the life of vehicle 2, an accurate estimate for the basis of sheave displacement to CVT ratio relationship, sheave 56 is sufficiently far from this location for adequate belt to sheave clearance in order to have smooth shifting of the transfer case, and for maximum sheave position targets that guarantee no torque is transferred from engine 32 to wheels 4. Additionally, knowing the kiss-point location allows for accurate estimations of the spring force acting against belt 54 (based on position from this point).

CVT 34 of the present disclosure incorporates a BLDC motor and controller that provides speed control of actuator assembly 100 along with feedback for the position of sheave 55, motor torque, and motor current. This information can be monitored to approximate where sheave 56 begins to contact belt 54 and/or the spring pack (e.g., spring 344) begins to compress. The monitoring of this point may occur during a normal drive-away event or as a routine event during engine idle, engine off, controller post driver, or triggered externally by a service tool (e.g., a digital wrench).

More particularly, and referring to FIG. 89, the electronically-controlled CVT system (e.g., CVT 34) measures the position of lead screw nut 1340 indirectly with a known relationship of gear ratios and leadscrew pitch. This is not a direct indication of the position of sheave 56 since it does not account for travel of launch spring 1344. FIG. 89 displays an illustrative data set collected with instrumented absolute sheave position of sheave 56 to give a positive indication of belt contact because Nut Displacement and Movable Sheave Displacement will repeatably separate when sheave 56 contacts belt 54. At this same point, the motor controller unit ("MCU") current (or torque, which may be reported by the MCU) repeatably increases at this kiss-point location.

Alternatively, in the presence of an absolute sensor for the position of moveable sheave 56, the kiss point can be detected by correlating motion of lead screw nut 1340 (indirectly measured as described above) with motion of moveable sheave 56. The kiss point can be directly identified when motion of lead screw nut 1340 in the positive direction no longer corresponds to motion of moveable sheave 56 as detected by the absolute position sensor, as illustrated in FIG. 89 when sheave displacement and nut displacement are separate. The position sensor itself may be located in motor 200, a rotational sensor on an intermediary gear or at the output thereof, or may be a laser proximity sensor, a lever arm, or any type of potentiometer device that has a linear position feedback.

As shown in FIG. 90, with this behavior known, several different control strategies may be implemented to determine the kiss-point of belt 54, such as using the rising edge of MCU current or torque, the moving average of MCU current or torque, the windowed rate of change of MCU current or torque, etc. In some embodiments, the routine for determining the kiss-point is expected to occur when the operator keys off and the TCM controller enters post-drive before shut down, but it may also occur at key-on, engine off, engine at idle in P/N gear only, engine at idle in directional gear, during driveaway events, or may be triggered as a learn routine during service (either from the gauge or using a service tool).

Referring to FIGS. 91-93B, various strategies may be used for learning the "home" or "zero" position of a clutch as a reference for absolute position when using a relative position sensor or calibrating an absolute position sensor. The position sensor itself may be located in motor 200, a rotational sensor on an intermediary gear or at the output thereof, or may be a laser proximity sensor, a lever arm, or any type of potentiometer device that has a linear position feedback.

This function is used to automatically calibrate the home position of drive clutch 50 whenever the transmission control module ("TCM") is powered on or the absolute position is lost. There are several strategies to achieve this function. One strategy is for the control system to apply constant motor speed toward the zero stop and monitor the motor torque feedback to determine when the hardware reaches the mechanical stop by surpassing an absolute motor torque or electrical current threshold. Combined with this, there may be some stability criteria of motor speed that is reached for a defined, calibratable time to ensure the hardware is completely stopped at the zero position.

A second strategy is to monitor the motor speed alone at a target torque input to determine when the hardware is at a mechanical stop.

A third strategy is to set the motor at a constant speed and monitor the derivative of motor torque or current that captures an instantaneous rise in torque that indicates it has reached the mechanical stop. This strategy can be used to improve response time and/or ensure motor 200 does not need to excessively torque against the hard stop in order to calibrate.

Finally, a fourth strategy may use a discrete switch in combine with a position sensor that indicates when sheave 56 has reaches the home or zero position.

These various strategies allow the entire control system to ensure the absolute position of drive clutch 50 is known whenever in operation. For example, if absolute positioning is not used to find the home position, speed and/or torque may be used for finding the zero point. The position of sheave 56 is helpful for having a consistent response of vehicle 2 during drive-away events and also may be used for feedforward control of the transmission ratio. Being able to calibrate this position on each ignition cycle gives more flexibility in the selection of a position sensor that does not give absolute feedback and is more robust against tampering or drift in the hardware over time.

Additional details of vehicle 2 and/or the powertrain assembly may be disclosed in U.S. patent application Ser. No. 15/388,436, filed Dec. 22, 2016 ; U.S. patent application Ser. No. 15/388,106, filed Dec. 22, 2016 ; and U.S. patent application Ser. No. 16/238,991, filed Jan. 3, 2019 , the complete disclosures of which are expressly incorporated by reference herein.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A utility vehicle, comprising: a frame assembly; a plurality of ground-engaging members supporting the frame assembly; a powertrain assembly operably coupled to the ground-engaging members and including a prime mover and a continuously variable transmission, the continuously variable transmission comprising a fixed sheave and a moveable sheave; an operator area defined by a portion of the frame assembly and including seating for at least an operator; an electrical assembly comprising an electric motor operably coupled to the continuously variable transmission, the electric motor being positioned rearward of the operator area and having an output extending outwardly from the electric motor away from the prime mover, and the electrical assembly configured to control a spacing between the fixed sheave and the moveable sheave; and a housing defining a first compartment and a second compartment, a drive clutch of the continuously variable transmission positioned within the first compartment and the electric motor positioned within the second compartment.

2. The utility vehicle of claim 1, wherein the seating includes an operator seat and a passenger seat, and the electric motor is positioned generally rearward of the operator seat.

3. The utility vehicle of claim 2, wherein the electric motor is positioned laterally outward of a portion of the operator seat.

4. The utility vehicle of claim 1, wherein the electric motor is longitudinally intermediate the seating and the continuously variable transmission.

5. The utility vehicle of claim 1, wherein the electric motor is longitudinally intermediate a portion of the prime mover and the seating.

6. The utility vehicle of claim 1, wherein the continuously variable transmission includes a housing and the electric motor is positioned within the housing.

7. The utility vehicle of claim 6, further comprising an actuation assembly operably coupled to the continuously variable transmission, and the actuation assembly is positioned within the housing.

8. The utility vehicle of claim 7, wherein the actuation assembly includes the electric motor.

9. The utility vehicle of claim 1, further comprising a torsion damper positioned generally intermediate a portion of the prime mover and a drive clutch of the continuously variable transmission.

10. The utility vehicle of claim 8, further comprising a controller operably coupled to the powertrain, and the controller is operable to control the position of the moveable sheave.

11. The utility vehicle of claim 1, wherein the electrical assembly is configured to discretely control the spacing between the fixed sheave and the moveable sheave.

12. A utility vehicle, comprising:
a frame assembly;
a plurality of ground-engaging members supporting the frame assembly;
a powertrain assembly operably coupled to the ground-engaging members and including a prime mover and a continuously variable transmission comprising a drive clutch and a driven clutch;
an operator area defined by a portion of the frame assembly and including seating for at least an operator;
an electrical assembly comprising an electric motor operably coupled to the continuously variable transmission, the electric motor being positioned rearward of the operator area;
a housing defining a first compartment and a second compartment, a drive clutch of the continuously variable transmission positioned within the first compartment and the electric motor positioned within the second compartment; and
wherein the prime mover is operably coupled to the continuously variable transmission on a first side of the drive clutch and the electrical assembly is operably coupled to the continuously variable transmission on a second side of the drive clutch opposite the first side.

13. The utility vehicle of claim 12, further comprising a geartrain coupled between the electric motor and the continuously variable transmission.

14. The utility vehicle of claim 12, further comprising a linear actuator coupled between the electric motor and the continuously variable transmission.

15. The utility vehicle of claim 12, wherein the electric motor includes an output extending outwardly on a first side of the continuously variable transmission, and the prime mover is positioned on a second side of the continuously variable transmission opposite the first side.

16. The utility vehicle of claim 12, wherein the second compartment is integral with the first compartment.

17. The utility vehicle of claim 16, wherein the second compartment separates the electric motor from the drive clutch of the continuously variable transmission.

18. The utility vehicle of claim 16, wherein the second compartment defines an aperture, and the aperture is adapted to direct air toward the electric motor.

\* \* \* \* \*